United States Patent [19]

Sobotka et al.

[11] Patent Number: 5,164,899
[45] Date of Patent: Nov. 17, 1992

[54] METHOD AND APPARATUS FOR COMPUTER UNDERSTANDING AND MANIPULATION OF MINIMALLY FORMATTED TEXT DOCUMENTS

[75] Inventors: David Sobotka, Sunnyvale; Ka L. Leung, San Jose; Yul J. Inn, Mountain View; Lance Tokuda, Milpitas, all of Calif.

[73] Assignee: Resumix, Inc., Santa Clara, Calif.

[21] Appl. No.: 345,930

[22] Filed: May 1, 1989

[51] Int. Cl.$^5$ .............................. G06F 15/00
[52] U.S. Cl. .................................. 364/419
[58] Field of Search ............ 364/200, 900, 419

[56] References Cited

U.S. PATENT DOCUMENTS

| | | | |
|---|---|---|---|
| 4,803,651 | 2/1989 | Galkowski | 364/900 |
| 4,937,439 | 6/1990 | Wanniger | 235/456 |
| 4,964,030 | 10/1990 | Suzuki et al. | 364/419 |
| 4,965,763 | 10/1990 | Zamorg | 364/900 |
| 4,980,829 | 12/1990 | Okajima et al. | 364/419 |
| 5,043,891 | 8/1991 | Goldstein | 364/419 |

*Primary Examiner*—Dale M. Shaw
*Assistant Examiner*—Andrew Bodendorf
*Attorney, Agent, or Firm*—Townsend & Townsend

[57] ABSTRACT

A method and apparatus which enables a computer to understand and manipulate minimally formatted text of such documents as resumes, purchase order forms, insurance forms, bank statements and similar items is disclosed. The documents are digitized by an optical scanner and translated into ASCII text by an optical character reader. The invention manipulates the digital image of the document to find blocks of contiguous text. After separating the text by block, each block is converted into an ASCII character file. Next, these files are processed by a Grammar, which uses pattern matching techniques and syntax rules to enable the host computer to understand the text. After further manipulation by the invention, the text is either stored or outputted in a form which greatly facilitates its use and readability. In this manner documents whose information content is partially location dependent can be understood despite the fact that the documents' text is written using English language phrases with little or no grammatical structure.

12 Claims, 34 Drawing Sheets

Figure 5

RESUME

833 Mora Drive
Los Altos, California
94022

Home Phone: (415) 948-0245
Work Phone: (408) 721-3708

JOB OBJECTIVE: PROCESS ENGINEERING MANAGER/PROGRAM MANAGER

SUMMARY OF QUALIFICATIONS:

- O  PROCESS ENGINEERING MANAGER: EEPROM PRODUCTION/DEVELOPMENT FAB
- O  MASKING SECTION HEAD (PLASMA/PHOTO): EEPROM FAB
- O  PHOTOMASKING ENGINEER (GCA/ULTRATECH STEPPERS): EEPROM/DRAM FAB
- O  MASK MAKING ENGINEER
- O  POLYMER CHEMIST

EXPERIENCE:

Aug 1983 to Present  National Semiconductor Corp., EEPROM Development Group, Santa Clara, California.
Title: Process Engineering Manager Manage a Process Sustaining/Development Group in a EEPROM Development Line. Have responsibility for the Photomasking, Plasma Etch and Thin Films and Diffusion Process Areas. This Group Sustains the Manufacturing of Highly Profitable Low Density NMOS EEPROMS, and is Developing the New Processes for the CMOS EEPROM for National's Cell Library.

Jan 1980 to Aug 1983  National Semiconductor Corp., DRAM/EEPROM Memories Group, Santa Clara, California.
Title: Process Engineer/Engineering Section Head: Masking Put the Triple-Poly 64K DRAM on the GCA 10X Stepper. Put the 1.75u Programming Window on PE 240 Imaged EEPROMs with GCA Steppers. Brought up National's first Ultratech 1X Stepper. Managed the conversion from Wet Etch Processing to Plasma Etch Processing for the early EEPROM devices.

Feb 1979 to Jan 1980  National Semiconductor Corp., Mask Making Group, Santa Clara, California.
Title: Process Engineer: Chrome Mask Reprint Improved the Quality and the Yield (from 92% to 97%) and put Automated Mask Inspection (KLA) on line in the Chrome Reprint Area.

Figure 6A

| Col | Pixels |
|---|---|
| 0001 | 3: 0 |
| 0002 | 4: 3 |
| 0003 | 5: 291 |
| 0004 | 6: 335 |
| 0005 | 7: 552 |
| 0006 | 8: 184 |
| 0007 | 9: 382 |
| 0008 | 10: 548 |
| 0009 | 11: 533 |
| 0010 | 12: 470 |
| 0011 | 13: 296 |
| 0012 | 14: 258 |
| 0013 | 15: 638 |
| 0014 | 16: 936 |
| 0015 | 17: 882 |
| 0016 | 18: 720 |
| 0017 | 19: 802 |
| 0018 | 20: 765 |
| 0019 | 21: 741 |
| 0020 | 22: 739 |
| 0021 | 23: 654 |
| 0022 | 24: 767 |
| 0023 | 25: 671 |
| 0024 | 26: 668 |
| 0025 | 27: 645 |
| 0026 | 28: 622 |
| 0027 | 29: 628 |
| 0028 | 30: 599 |
| 0029 | 31: 683 |
| 0030 | 32: 636 |
| 0031 | 33: 608 |
| 0032 | 34: 627 |
| 0033 | 35: 617 |
| 0034 | 36: 522 |
| 0035 | 37: 525 |
| 0036 | 38: 567 |
| 0037 | 39: 600 |
| 0038 | 40: 616 |
| 0039 | 41: 545 |
| 0040 | 42: 468 |
| 0041 | 43: 504 |
| 0042 | 44: 640 |
| 0043 | 45: 692 |
| 0044 | 46: 678 |
| 0045 | 47: 669 |
| 0046 | 48: 534 |
| 0047 | 49: 572 |
| 0048 | 50: 526 |
| 0049 | 51: 585 |
| 0050 | 52: 481 |
| 0051 | 53: 448 |
| 0052 | 54: 454 |
| 0053 | 55: 520 |
| 0054 | 56: 475 |
| 0055 | 57: 544 |
| 0056 | 58: 509 |
| 0057 | 59: 433 |
| 0058 | 60: 418 |
| 0059 | 61: 406 |
| 0060 | 62: 370 |
| 0061 | 63: 484 |
| 0062 | 64: 366 |
| 0063 | 65: 473 |

```
Figure 6B
         Col Pixels
0064     66:  504
0065     67:  522
0066     68:  441
0067     69:  2
0068     70:  1
0069     71:  0
0070     72:  0
0071     73:  0
0072     74:  0
0073     75:  0
0074     76:  0
0075
0076     margin column= 16
```

```
Figure 7A
         Row Pixels
0001      .
0002      .
0003      .
0004      78:  0
0005      79:  0
0006      80:  0
0007      81:  0
0008      82:  0
0009      83:  0
0010      84:  0
0011      85:  0
0012      86:  0
0013      87:  0
0014      88:  0
0015      89:  0
0016      90:  0
0017      91:  0
0018      92:  0
0019      93:  0
0020      94:  0
0021      95:  0
0022      96:  1
0023      97:  4
0024      98:  6
0025      99:  35
0026      100: 31
0027      101: 32
0028      102: 30
0029      103: 33
0030      104: 19
0031      105: 0
0032      106: 0
0033      107: 0
0034      108: 0
0035      109: 0
0036      110: 0
0037      111: 6
0038      112: 9
0039      113: 9
0040      114: 9
0041      115: 7
0042      116: 5
0043      117: 0
0044      118: 0
0045      119: 0
0046      120: 0
0047      121: 5
0048      122: 9
0049      123: 12
0050      124: 29
0051      125: 27
0052      126: 27
0053      127: 29
0054      128: 32
0055      129: 10
0056      130: 0
0057      131: 0
0058      132: 0
0059      133: 0
0060      134: 17
0061      135: 24
0062      136: 16
0063      137: 18
```

Figure 7B

```
         Row  Pixels
0064     138:  18
0065     139:  14
0066     140:  20
0067     141:  18
0068     142:  0
0069     143:  0
0070     144:  0
0071     145:  0
0072     146:  0
0073     147:  0
0074     148:  0
0075     149:  0
0076     150:  0
0077     151:  0
0078     152:  0
0079     153:  0
0080     154:  0
0081     155:  0
0082     156:  0
0083     157:  0
0084     158:  0
0085     159:  37
0086     160:  40
0087     161:  24
0088     162:  35
0089     163:  31
0090     164:  21
0091     165:  37
0092     166:  30
0093     167:  0
0094     168:  0
0095     169:  0
0096     170:  0
0097     171:  0
0098     172:  0
0099     173:  0
0100     174:  0
0101     175:  0
0102     176:  0
0103     177:  0
0104     178:  0
0105     179:  0
0106     180:  0
0107     181:  0
0108     182:  0
0109     183:  0
0110     184:  35
0111     185:  37
0112     186:  22
0113     187:  26
0114     188:  33
0115     189:  31
0116     190:  34
0117     191:  29
0118     192:  0
0119     193:  0
0120     194:  0
0121     195:  0
0122     196:  0
0123     197:  0
0124     198:  0
0125     199:  0
0126       .
```

```
Figure 8
        Dist Freq
0001    0:   0
0002    1:   0
0003    2:   0
0004    3:   0
0005    4:   0
0006    5:   0
0007    6:   0
0008    7:   0
0009    8:   0
0010    9:   0
0011   10:   1
0012   11:   0
0013   12:  10
0014   13:  13
0015   14:   1
0016   15:   1
0017   16:   0
0018   17:   0
0019   18:   0
0020   19:   0
0021   20:   0
0022   21:   0
0023   22:   0
0024   23:   1
0025   24:   2
0026   25:   5
0027   26:   0
0028   27:   0
0029   28:   0
0030   29:   0
0031   30:   0
0032   31:   0
0033   32:   0
0034   33:   0
0035   34:   0
0036   35:   0
0037   36:   0
0038   37:   0
0039   38:   0
0040   39:   0
0041   40:   0
0042   41:   0
0043   42:   0
0044   43:   0
0045   44:   0
0046   45:   0
0047   46:   0
0048   47:   0
0049   48:   0
0050   49:   0
0051
0052   line_space= 13
```

```
Figure 10A
        Row Pixels
0001     .
0002     .
0003     .
0004    27:  0
0005    28:  0
0006    29:  0
0007    30:  0
0008    31:  0
0009    32:  0
0010    33:  0
0011    34:  0
0012    35:  0
0013    36:  0
0014    37:  0
0015    38:  0
0016    39:  0
0017    40:  0
0018    41:  0
0019    42:  0
0020    43:  0
0021    44:  0
0022    45:  0
0023    46:  0
0024    47:  0
0025    48:  0
0026    49:  0
0027    50:  0
0028    51:  0
0029    52:  0
0030    53:  0
0031    54:  0
0032    55:  0
0033    56:  0
0034    57:  0
0035    58:  0
0036    59:  29    starting block of text at 56
0037    60:  27
0038    61:  20
0039    62:  29
0040    63:  26
0041    64:  17
0042    65:  29
0043    66:  20
0044    67:  0
0045    68:  0
0046    69:  0
0047    70:  0
0048    71:  0
0049    72:  0
0050    73:  0
0051    74:  0
0052    75:  0     ending block of text at 70
0053    76:  0
0054    77:  0
0055    78:  0
0056    79:  0
0057    80:  0
0058    81:  0
0059    82:  0
0060    83:  0
0061    84:  0
0062    85:  0
0063    86:  0
```

```
Figure 10B
        Row Pixels
0064    87:   0
0065    88:   0
0066    89:   0
0067    90:   0
0068    91:   0
0069    92:   0
0070    93:   0
0071    94:   0
0072    95:  20    starting block of text at 92
0073    96:  58
0074    97:  68
0075    98:  94
0076    99: 165
0077   100: 151
0078   101: 138
0079   102: 141
0080   103: 119
0081   104:  35
0082   105:   0
0083   106:   0
0084   107:   0
0085   108:  44
0086   109:  88
0087   110:  87
0088   111: 124
0089   112: 133
0090   113: 111
0091   114: 111
0092   115: 121
0093   116:  50
0094   117:   0
0095   118:   0
0096   119:   0
0097   120:   0
0098   121:  10
0099   122:  20
0100   123:  24
0101   124:  59
0102   125:  51
0103   126:  58
0104   127:  61
0105   128:  72
0106   129:  34
0107   130:   1
0108   131:   0
0109   132:   0
0110   133:   0
0111   134:  17
0112   135:  24
0113   136:  16
0114   137:  18
0115   138:  18
0116   139:  14
0117   140:  20
0118   141:  18
0119   142:   0
0120   143:   0
0121   144:   0
0122   145:   0
0123   146:   0
0124   147:   0
0125   148:   0
0126   149:   0
```

```
Figure 10C
        Row Pixels
0127    150:  0     ending block of text at 145
0128    151:  0
0129    152:  0
0130    153:  0
0131    154:  0
0132    155:  0
0133    156:  0
0134    157:  0
0135    158:  41    starting block of text at 155
0136    159:  234
0137    160:  219
0138    161:  179
0139    162:  227
0140    163:  221
0141    164:  169
0142    165:  227
0143    166:  144
0144    167:  0
0145    168:  0
0146    169:  0
0147    170:  0
0148    171:  0
0149    172:  0
0150    173:  0
0151    174:  0
0152    175:  0     ending block of text at 170
0153    176:  0
0154    177:  0
0155    178:  0
0156     .
0157     .
0158     .
```

```
Figure 12
0001
0002      horizontal block 0: 56,3,14,74
0003      vertical block 0, in horizontal block 0: 31,56,8,14
0004
0005      horizontal block 1: 92,3,53,74
0006      vertical block 0, in horizontal block 1: 4,92,22,53
0007      vertical block 1, in horizontal block 1: 43,92,27,53
0008
0009      horizontal block 2: 155,3,15,74
0010      vertical block 0, in horizontal block 2: 4,155,57,15
0011
0012      horizontal block 3: 181,3,14,74
0013      vertical block 0, in horizontal block 3: 4,181,27,14
0014
0015      horizontal block 4: 205,3,65,74
0016      vertical block 0, in horizontal block 4: 6,205,64,65
0017
0018      horizontal block 5: 281,3,14,74
0019      vertical block 0, in horizontal block 5: 4,281,13,14
0020
0021      horizontal block 6: 300,3,47,74
0022      vertical block 0, in horizontal block 6: 4,300,66,47
0023
0024      horizontal block 7: 355,3,90,74
0025      vertical block 0, in horizontal block 7: 14,355,56,90
0026
0027      horizontal block 8: 455,3,43,74
0028      vertical block 0, in horizontal block 8: 4,455,66,43
0029
0030      horizontal block 9: 505,3,78,74
0031      vertical block 0, in horizontal block 9: 14,505,56,78
0032
0033      horizontal block 10: 593,3,41,74
0034      vertical block 0, in horizontal block 10: 4,593,58,41
0035
0036      horizontal block 11: 642,3,40,74
0037      vertical block 0, in horizontal block 11: 14,642,56,40
```

```
Figure 13
0001
0002    Block    x,y,w,h
0003    -----    ---------------
0004    0        248,56,64,14
0005    1        32,93,176,52
0006    2        344,92,216,28
0007    3        32,155,456,15
0008    4        32,181,216,14
0009    5        48,205,512,65
0010    6        32,281,104,14
0011    7        32,300,528,47
0012    8        112,355,448,90
0013    9        32,455,528,43
0014    10       112,505,448,78
0015    11       32,592,464,42
0016    12       112,642,448,40
```

```
Figure 15
0001
0002    Block   x,y,w,h
0003    -----   ---------------
0004    1       248,56,64,14
0005    2       1,93,207,52
0006    3       344,92,296,28
0007    4       1,155,487,15
0008    5       1,181,247,14
0009    6       1,205,639,65
0010    7       1,281,135,14
0011    8       1,300,639,47
0012    9       112,355,528,90
0013    10      1,455,639,43
0014    11      112,505,528,78
0015    12      1,592,495,42
0016    13      112,642,528,40
```

```
Figure 16
0001
0002      ORIGINAL TEXT
0003      --------------
0004          Jan 1980      National Semiconductor Corp., DRAM/EEPROM Memories Group,
0005             to         Santa Clara, Cal ifornia.
0006          Aug 1983      Title: Process Engineer/Engineering Section Head: Masking
0007
0008      TEXT BLOCKED TEXT
0009      -----------------
0010          Jan 1980
0011             to
0012          Aug 1983
0013          National Semiconductor Corp., DRAM/EEPROM Memories Group,
0014          Santa Clara, Cal ifornia.
0015          Title: Process Engineer/Engineering Section Head: Masking
```

```
Figure 18A
0001
0002    \
0003    RESUME
0004    \
0005
0006
0007
0008
0009
0010         833 Mora Drive
0011         Los Altos, California
0012                   94022
0013     Home Phone: (415) 948-0245
0014     Work Phone: (408) 721-3708
0015    \
0016
0017         JOB OBJECTIVE: PROCESS ENGINEERING MANAGER/PROGRAM MANAGER
0018    \
0019
0020         SUMMARY OF QUALIFICATIONS:
0021    \
0022
0023
0024
0025
0026
0027         0   PROCESS ENGINEERING MANAGER: EEPROM PRODUCTION/DEVELOPMENT FAB
0028         0   MASKING SECTION HEAD (PLASMA/PHOTO): EEPROM FAB
0029         0   PHOTOMASKING ENGINEER (SCA/ULTRATECH STEPPERS): EEPROM/DRAM FAB
0030         0   MASK MAKING ENGINEER
0031         0   POLYMER CHEMIST
0032    \
0033
0034         EXPERIENCE:
0035    \
0036
0037
0038
0039
0040
0041
0042
0043
0044
0045         Aug 1983
0046
0047
0048
0049
0050          to
0051         Present
0052                                                                    -- - -- ---- -,
0053         National Semiconduc        .'            Development Group,    ,
0054                                                                         . .-.-
0055                                              ---,--,. -7' -    . . . . . --.
0056                                        cot!   'SS!!0m
0057         Santa Clara, Cal ifoto'                 7
0058                                  rnia.                 .
0059         Title: Process Engineering Manager
0060     Manage a Process Sustaining/Development Group in a EEPROM
0061     Development Line.  Have responsibil ity for  the   Photo-
0062     masking, Plasma Etch and Thin Films and Diffusion  Process
0063     Areas. This Group Sustains  the  Manufacturing  of  Highly
0064     Profitable Low Density NMOS  EEPROMS,  and  is  Developing
```

```
Figure 18B
0065     the New Processes for the CMOS EEPROM +or National's Cell
0066     Library.
0067     \
0068
0069
0070
0071       Jan 1980
0072          to
0073        Aug 1983
0074     National Semiconductor Corp., DRAM/EEPROM Memories Group,
0075       Santa Clara, Cal ifornia.
0076       Title: Process Engineer/Engineering Section Head: Masking
0077     Put the Triple-Poly 64K DRAM on  the   OCA   IOX  Stepper.  Put
0078     the  1.75u  Programming  Window  on  PE  240  Imaged  EEPROMs
0079     w i th OCA Steppers. Brough t up Nat i onal 's f i rst Ul tratech
0080     Ix   Stepper.   Managed  the    conversion   from   Wet    Etch
0081     Processing to Plasma Etch Processing  for  the  early  EEPROM
0082     devices.
0083     \
0084
0085
0086
0087       Feb 1979
0088           to
0089       Jan 1980
0090     National Semiconductor Corp., Mask Making Group%
0091       Santa Clara, Cal i+ornia.
0092       Title: Process Engineer: Chrome Mask Reprint
0093     Improved the Qua) i tx and the Yi el d (from 92% to 97%)  and
0094     put Automated Mask Inspection (KLA) on line in the Chrome
0095     Reprint Area.
```

```
Figure 20A
0001
0002        #uses system.def
0003    SYN     DATE_SEPARATOR
0004            -
0005            ^/
0006
0007    SYN     Jan
0008            january
0009            jan [O] .
0010            1 -DATE_SEPARATOR
0011            01 -DATE_SEPARATOR
0012
0013    SYN     Feb
0014            february
0015            feb [O] .
0016            2 -DATE_SEPARATOR
0017            02 -DATE_SEPARATOR
0018
0019    SYN     Mar
0020            march
0021            mar [O] .
0022            3 -DATE_SEPARATOR
0023            03 -DATE_SEPARATOR
0024
0025    SYN     Apr
0026            april
0027            apr [O] .
0028            4 -DATE_SEPARATOR
0029            04 -DATE_SEPARATOR
0030
0031    SYN     May
0032            may
0033            5 -DATE_SEPARATOR
0034            05 -DATE_SEPARATOR
0035
0036    SYN     Jun
0037            june
0038            jun [O] .
0039            6 -DATE_SEPARATOR
0040            06 -DATE_SEPARATOR
0041
0042    SYN     Jul
0043            july
0044            jul [O] .
0045            7 -DATE_SEPARATOR
0046            07 -DATE_SEPARATOR
0047
0048    SYN     Aug
0049            august
0050            aug [O] .
0051            8 -DATE_SEPARATOR
0052            08 -DATE_SEPARATOR
0053
0054    SYN     Sep
0055            september
0056            sept [O] .
0057            sep [O] .
0058            9 -DATE_SEPARATOR
0059            09 -DATE_SEPARATOR
0060
0061    SYN     Oct
0062            october
0063            oct [O] .
0064            10 -DATE_SEPARATOR
```

```
Figure 20B
0065
0066    SYN     Nov
0067            november
0068            nov [O] .
0069            11 -DATE_SEPARATOR
0070
0071    SYN     Dec
0072            december
0073            dec [O] .
0074            12 -DATE_SEPARATOR
0075
0076    CLASS   MONTH
0077            -Jan
0078            -Feb
0079            -Mar
0080            -Apr
0081            -May
0082            -Jun
0083            -Jul
0084            -Aug
0085            -Sep
0086            -Oct
0087            -Nov
0088            -Dec
0089
0090    CLASS   DAY
0091    ACTION  Days
0092            /NUMBER1A
0093            /NUMBER2A
0094
0095    CLASS   YEAR
0096    ACTION  Years
0097            /NUMBER4A
0098            /NUMBER2A [N O I] %
0099
0100    CLASS   MONTH_DAY_YEAR
0101            /MONTH [1] /DAY [1] /YEAR
0102
0103    CLASS   MONTH_YEAR
0104            /MONTH [1 I] /DAY [1] /YEAR
0105            /MONTH [1] /YEAR [N W I] /MONTH_DAY_YEAR
0106
0107    SYN     Present
0108            present
0109            date
0110            current
0111
0112    SYN     Summer
0113            summer
0114
0115    SYN     Fall
0116            fall
0117            autumn
0118
0119    SYN     Spring
0120            spring
0121
0122    SYN     Winter
0123            winter
0124
0125    CLASS   SEASON_YEAR
0126            -Summer [1] /YEAR
0127            -Fall [1] /YEAR
0128            -Winter [1] /YEAR
```

```
Figure 20C
0129            =Spring [1] /YEAR
0130
0131    CLASS   JUST_YEAR
0132            /YEAR [N W I] /MONTH_YEAR [N W I] /SEASON_YEAR
0133
0134    CLASS   DATE
0135            /MONTH_YEAR
0136            /SEASON_YEAR
0137            /JUST_YEAR
0138
0139    SYN     to
0140            [0] /EOL [0] until [0 0] /EOL
0141            [0] /EOL [0] to [0 0] /EOL
0142            [0] /EOL [0] - [0 0] /EOL [N W I] /DATE
0143
0144    CLASS   DATE_RANGE
0145            /DATE =to [2 F] /DATE [N C I] < [N C I] >
0146            /DATE =to [2 F] =Present
0147            /MONTH [0] =to [2 F] /DATE
```

```
Figure 21
0001
0002     #uses states.def
0003     #uses dates.def
0004     #uses sections.def
0005     #uses header.def
0006     #uses category.def
0007     #uses years.def
0008     #uses educate.def
0009
0010     TEMPLATE       APPLICANT_NAME
0011     SLOT  Applicant       APPLICANT
0012
0013     TEMPLATE       APP_ADDRESS
0014     SLOT  Address_type    ADDRESS_TYPE
0015     SLOT  Address         ADDRESS
0016     SLOT  City            CITY
0017     SLOT  State           STATE
0018     SLOT  Zip             ZIP_CODE
0019
0020     TEMPLATE       HOME_PHONE
0021     SLOT  Home_Phone      PHONE_NUMBER
0022
0023     TEMPLATE       BUSINESS_PHONE
0024     SLOT  Work_Phone      PHONE_NUMBER
0025
0026     TEMPLATE       MESSAGE_PHONE
0027     SLOT  Message_Phone   PHONE_NUMBER
0028
0029     TEMPLATE       EDUCATION
0030     SLOT  Degree          DEGREE_YEAR
0031
0032     TEMPLATE       YEARS
0033     SLOT  Dates           POS_TITLE
0034
0035     TEMPLATE       ROOT2
0036     SLOT  Exp_Category    Category
0037
0038     TEMPLATE       ROOT
0039     SLOT  Experience      Experience
0040
```

Figure 22A

```
0001
0002    Class  NUMBER1A         59    59  0
0003    Class  NUMBER1A         70    70  0
0004    Class  NUMBER1A         83    83  0
0005    Class  NUMBER1A         98    98  0
0006    Class  NUMBER1A        103   103  0
0007    Class  NUMBER1A        137   137  7
0008    Class  NUMBER1A        162   162  7
0009    Class  NUMBER1A        300   300  1
0010    Class  NUMBER1A        313   313  1
0011    Class  NUMBER1A        322   322  1
0012    Class  NUMBER1A        327   327  1
0013    Class  NUMBER1A        378   378  1
0014    Class  NUMBER1A        396   396  1
0015    Class  NUMBER1A        238   238  5
0016    Class  NUMBER1A        325   325  5
0017    Class  NUMBER2A        288   288  64
0018    Class  NUMBER2A        302   302  75
0019    Class  NUMBER2A        405   405  92
0020    Class  NUMBER2A        408   408  97
0021    Class  NUMBER2A        325   327  51
0022    Class  NUMBER2A        151   151  55
0023    Class  NUMBER3A         10    10  833
0024    Class  NUMBER3A         25    25  415
0025    Class  NUMBER3A         27    27  948
0026    Class  NUMBER3A         35    35  408
0027    Class  NUMBER3A         37    37  721
0028    Class  NUMBER3A        308   308  240
0029    Class  NUMBER3A        300   302  175
0030    Class  NUMBER4A         29    29  0245
0031    Class  NUMBER4A         39    39  3708
0032    Class  NUMBER4A        113   113  1983
0033    Class  NUMBER4A        246   246  1980
0034    Class  NUMBER4A        251   251  1983
0035    Class  NUMBER4A        357   357  1979
0036    Class  NUMBER4A        362   362  1980
0037    Class  NUMBER5A         19    19  94022
0038    Syn    DATE_SEPARATOR   28    28
0039    Syn    DATE_SEPARATOR   38    38
0040    Syn    DATE_SEPARATOR  128   128
0041    Syn    DATE_SEPARATOR  129   129
0042    Syn    DATE_SEPARATOR  130   130
0043    Syn    DATE_SEPARATOR  132   132
0044    Syn    DATE_SEPARATOR  133   133
0045    Syn    DATE_SEPARATOR  136   136
0046    Syn    DATE_SEPARATOR  139   139
0047    Syn    DATE_SEPARATOR  144   144
0048    Syn    DATE_SEPARATOR  145   145
0049    Syn    DATE_SEPARATOR  194   194
0050    Syn    DATE_SEPARATOR  286   286
0051    Syn    DATE_SEPARATOR   48    48
0052    Syn    DATE_SEPARATOR   66    66
0053    Syn    DATE_SEPARATOR   76    76
0054    Syn    DATE_SEPARATOR   88    88
0055    Syn    DATE_SEPARATOR   94    94
0056    Syn    DATE_SEPARATOR  178   178
0057    Syn    DATE_SEPARATOR  259   259
0058    Syn    DATE_SEPARATOR  276   276
0059    Syn    Jan             245   245
0060    Syn    Jan             361   361
0061    Syn    Feb             356   356
0062    Syn    Jul             137   139
0063    Syn    Aug             112   112
0064    Syn    Aug             250   250
```

```
Figure 22B
0065    Class MONTH         245  245 Jan
0066    Class MONTH         361  361 Jan
0067    Class MONTH         356  356 Feb
0068    Class MONTH         137  139 Jul
0069    Class MONTH         112  112 Aug
0070    Class MONTH         250  250 Aug
0071    Class DAY            59   59 0
0072    Class DAY            70   70 0
0073    Class DAY            83   83 0
0074    Class DAY            98   98 0
0075    Class DAY           103  103 0
0076    Class DAY           137  137 7
0077    Class DAY           162  162 7
0078    Class DAY           238  238 5
0079    Class DAY           300  300 1
0080    Class DAY           313  313 1
0081    Class DAY           322  322 1
0082    Class DAY           325  325 5
0083    Class DAY           327  327 1
0084    Class DAY           378  378 1
0085    Class DAY           396  396 1
0086    Class DAY           151  151 55
0087    Class DAY           288  288 64
0088    Class DAY           302  302 75
0089    Class DAY           325  327 51
0090    Class DAY           405  405 92
0091    Class DAY           408  408 97
0092    Class YEAR           29   29 0245
0093    Class YEAR           39   39 3708
0094    Class YEAR          113  113 1983
0095    Class YEAR          246  246 1980
0096    Class YEAR          251  251 1983
0097    Class YEAR          357  357 1979
0098    Class YEAR          362  362 1980
0099    Class YEAR          151  151 55
0100    Class YEAR          288  288 64
0101    Class YEAR          302  302 75
0102    Class YEAR          325  327 51
0103    Class MONTH_YEAR    112  113 Aug 83
0104    Class MONTH_YEAR    245  246 Jan 80
0105    Class MONTH_YEAR    250  251 Aug 83
0106    Class MONTH_YEAR    356  357 Feb 79
0107    Class MONTH_YEAR    361  362 Jan 80
0108    Syn   Present       117  117
0109    Class JUST_YEAR     151  151 55
0110    Class JUST_YEAR     288  288 64
0111    Class JUST_YEAR     302  302 75
0112    Class JUST_YEAR     325  327 51
0113    Class DATE          112  113 Aug 83
0114    Class DATE          245  246 Jan 80
0115    Class DATE          250  251 Aug 83
0116    Class DATE          356  357 Feb 79
0117    Class DATE          361  362 Jan 80
0118    Class DATE          151  151 55
0119    Class DATE          288  288 64
0120    Class DATE          302  302 75
0121    Class DATE          325  327 51
0122    Syn   to            114  116
0123    Syn   to            247  249
0124    Syn   to            358  360
0125    Syn   to            115  116
0126    Syn   to            248  249
0127    Syn   to            343  343
0128    Syn   to            359  360
```

```
Figure 22C
0129    Syn     to                  407  407
0130    Syn     to                  127  128
0131    Syn     to                   28   28
0132    Syn     to                   38   38
0133    Syn     to                  128  128
0134    Syn     to                  129  129
0135    Syn     to                  130  130
0136    Syn     to                  132  132
0137    Syn     to                  133  133
0138    Syn     to                  136  136
0139    Syn     to                  139  139
0140    Syn     to                  144  144
0141    Syn     to                  145  145
0142    Syn     to                  194  195
0143    Syn     to                  286  286
0144    Class   DATE_RANGE          245  251  Jan 80 to Aug 83
0145    Class   DATE_RANGE          356  362  Feb 79 to Jan 80
0146    Class   DATE_RANGE          112  117  Aug 83 to Present
0147      .
0148      .
0149      .
0150    Dates               Aug 83 to Present, Process Engineer, Development Group
0151    Dates               Jan 80 to Aug 83, Process Engineer, Dram/Eeprom Memorie
0152    Dates               Feb 79 to Jan 80, Process Engineer, Mask Making Group
```

METHOD AND APPARATUS FOR COMPUTER UNDERSTANDING AND MANIPULATION OF MINIMALLY FORMATTED TEXT DOCUMENTS

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF INVENTION

This invention relates to the field of computer scanning and analysis of text documents. More specifically, it relates to the field of computer artificial intelligence and its use in converting English text documents into computer readable form and analyzing the computer readable text.

BACKGROUND OF THE INVENTION

Information retrieval from text documents has been a major area of research in computer science for the past three decades. Although a number of techniques have been developed which enable computers to understand text, none of these techniques has been wholly satisfactory.

The simplest of these techniques is 'keyword matching'. Using this technique, the computer scans through an ASCII text file looking for each and every occurrence of the desired 'keyword'. By using a variety of logical operations such as AND and OR, the computer can be instructed to retrieve only the combinations of keywords which the operator believes will be most relevant. Unfortunately this technique is highly literal and even a well-crafted search can miss relevant documents. For example, if a paragraph contains the sentence:

California is a leading producer of oranges, and the user wishes to know which fruits are grown in California, searching the paragraph for "California" and "oranges" will detect the sentence and provide the correct answer. However, if the sentence read:

California is a leading consumer of oranges, the same search will still detect this sentence, in this case erroneously.

obviously this technique is less than wholly satisfactory. Another technique uses 'Natural Language Understanding'. The use of this technique combines syntactic knowledge of English with semantic information about the topic in the text being analyzed. See, for example, James Allen, *Natural Language Understanding*, The Benjamin/Cummings Publishing Company, Inc., Menlo Park, Calif. 1987. These techniques are limited due to their dependence on the grammatical correctness of the text and their failure to make use of the text's physical layout.

Many documents and forms are comprised of numerous unrelated text phrases, which can be ungrammatical but which are nonetheless easily understood by humans. Examples of such documents include resumes, purchase order forms, bank statements, insurance form, and so on. Human understanding of these documents entails realizing how the spatial relationship between blocks of text contributes to the meaning of the document.

Resumes provide a classic example of documents which are very easily understood by humans through the use of spatial and textual analysis. To find the name of the person, for example, the human uses the fact that it normally appears near the top of the resume, often centered or set apart from the rest of the text. Current natural language understanding systems cannot use such spatial information in detecting names.

Another example of how such information is easily used by humans but not so easily used by computers is contained in the following excerpt from a resume:

| | |
|---|---|
| 1977–1980 | Worked during this period of time for a large chip manufacturer designing chips and writing software simulations for new designs. I participated in the design of several different memory chips. |

In a computer this text fragment might actually be stored as:

Worked during this period of time for a large chip 1977—manufacturer de5igning chips and wrlting 1980 simulations for new designs. I participated in the design of several different memory chips.

Typographical errors during data entry result in text which natural language systems could not understand. Even if the typographical errors were corrected, it is evident that correct understanding of this stored text would be difficult as the range of years of employment has become separated and embedded in the job description. Another problem which would result in incorrect analysis by natural language processing systems is the fact that the first sentence is grammatically not a complete sentence.

It is an object of this invention to provide a method and apparatus for use with a computer which analyzes text documents using both sophisticated text pattern matching techniques which are insensitive to typographical errors and to the ungrammatical nature of text fragments, and spatial analysis techniques for analyzing the spatial structure of the text document, the method providing greatly improved computer textual analysis.

SUMMARY OF THE INVENTION

This object and others are fulfilled by the present invention wherein a document is first converted into a digital image form by means of an optical scanner. Once the document has been converted into a digital image, the digital image is analyzed to determine areas of contiguous text, contiguous being measured across both the document's vertical and horizontal axes. These areas of contiguous text are then further processed by a character recognition unit to generate an ASCII text form of the document. The contents of the ASCII form are analyzed using a tree-like "grammar" structure. The result of this analysis can be used to store the text in the computer's memory in a pre-selected format which the user believes will enhance data readability and useability.

These objects and other objects and advantages of the invention will appear more clearly from the following specification in connection with the accompanying drawings, in which:

BRIEF DESCRIPTION OF THE DRAWINGS

FIG. 5 is a sample text document;

FIGS. 6A and 6B show the output from step 4.1 in FIG. 4;

FIGS. 7A and 7B show the output from step 4.3 in FIG. 4;

FIG. 8 shows the output from step 4.4 in FIG. 4;

FIGS. 10A, 10B, and 10c show the output from step 9.3 of FIG. 9.

FIG. 12 shows the output after the initial blocking operation is completed;

FIG. 13 shows the output of the blocking method after the blocking/process is repeated;

FIG. 15 shows the output of the blocking method after step 14.3 in FIG. 14;

FIG. 16 shows a text sample before and after the text blocking procedure;

FIGS. 18A and 18B are a printout of the ASCII text file after spatial analysis has been completed on the sample resume of FIG. 5;

FIGS. 20A, 20B and 20C form a sample grammar used to recognize dates in text documents;

FIG. 21 is a sample of the templates used to output the grammar;

FIGS. 22A, 22B and 22C are listings of the output from the extractor;

DETAILED DESCRIPTION

Figure 1:
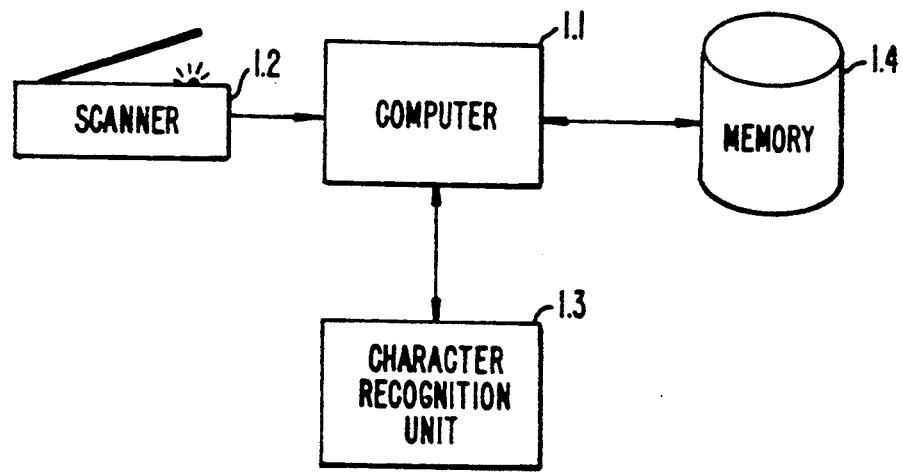
FIG. 1 is a block diagram of the physical components of the present invention.

FIG. 1 illustrates the preferred embodiment of this invention. The apparatus comprises host computer 1, scanner 2, and character recognition unit 3. In this embodiment the document to be processed is digitized by the scanner and stored in memory 4, which may comprise either internal or external memory devices. Processing takes place on the host computer using character recognition unit 3.

The host computer 1 is a programmable digital computer having a bit map display and incorporating a keyboard and mouse for user input. A 'Sun 3/60' workstation from Sun Microsystems, Inc. of Mountain View, CA has been used as the host computer. Character recognition unit 3 is an optical character recognition (OCR) processor. OCR processors translate digitized images into ASCII computer text files. Scanner 2 converts paper documents into digitized images for storage in computer main and secondary memory. The OCR and scanner may be contained in the same unit. For example, the 'CDP-9000' from Calera Recognition Systems of Santa Clara, Calif. can be used.

The digitized document image is processed by host computer 1 using the present invention. The digitized image is represented as a matrix of picture elements (pixels), 300 pixels per inch. A pixel has a value 0 if it represents a white dot in the digitized image and 1 if it represents a black dot. The computer representation of an image of a single 8.5×11 inch page therefore requires approximately one megabyte of memory (packing eight pixels per byte).

Figure 2:
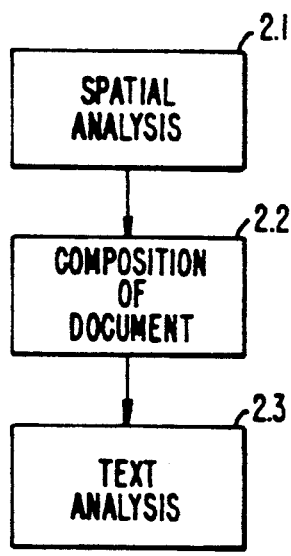
FIG. 2 is a flow chart of the process used by the present invention to analyze documents.

FIG. 2 shows the operation of the present invention in broadest outline. There are three main stages of operation: spatial analysis of the text 2.1, composition of the document text 2.2, and text analysis 2.3. In the preferred embodiment these stages are each executed on the host computer.

In the present invention, many of the steps use one or more predefined constants. These constants are listed below in Table 1.

TABLE 1

| |
|---|
| TOP_MARGIN 15 |
| BOTTOM_MARGIN 15 |
| LEFT_MARGIN 3 |
| RIGHT_MARGIN 3 |
| MARGIN_WIDTH 8 |
| MIN_LINE_THRESHOLD 3 |
| MIN_LINE_SPACE 5 |
| MAX_LINE_SPACE 20 |
| MIN_HORIZ_LINE_THRESHOLD 2 |
| HORIZ_BLOCK_FACTOR 5/8 |
| MIN_COLUMN_THRESHOLD 2 |
| WHITE_WIDTH 3 |
| DELTA 1/2 |
| CENTER_WIDTH 2 |
| VERTICAL_BLOCK_FACTOR 2 |

These constants were defined by a preliminary examination of numerous documents which might be processed by this invention. In some cases, values were initially chosen based on well-known printing conventions for documents. For example, many documents have a 1" margin on the left and right side of the paper. The initial values were further refined during testing. It should be understood that the exact value of these constants is not the essence of this invention. Other values could be used which might optimize the operation of this invention on a particular group of documents. The constants in Table 1 are therefore to be seen as examples only.

Spatial Analysis

Figure 3:
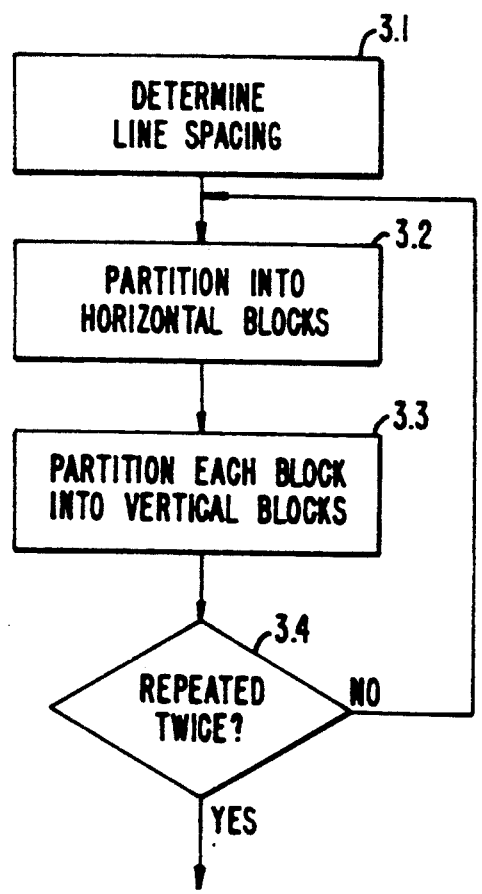
FIG. 3 is a flow chart of the method used to decompose the text into contiguous text blocks.

The spatial analysis of the text takes the digitized image generated by the scanner and decomposes it into blocks of contiguous text. The decomposition process is illustrated in FIG. 3. In order to correctly identify blocks of related textual information the minimum spacing between lines (the line spacing) is first determined at step 3.1. In step 3.2 the image is partitioned into horizontal text blocks and, in step 3.3 the horizontal text blocks are partitioned into vertical blocks. This sequence of partitioning steps is performed twice (step 3.4).

Figure 4:
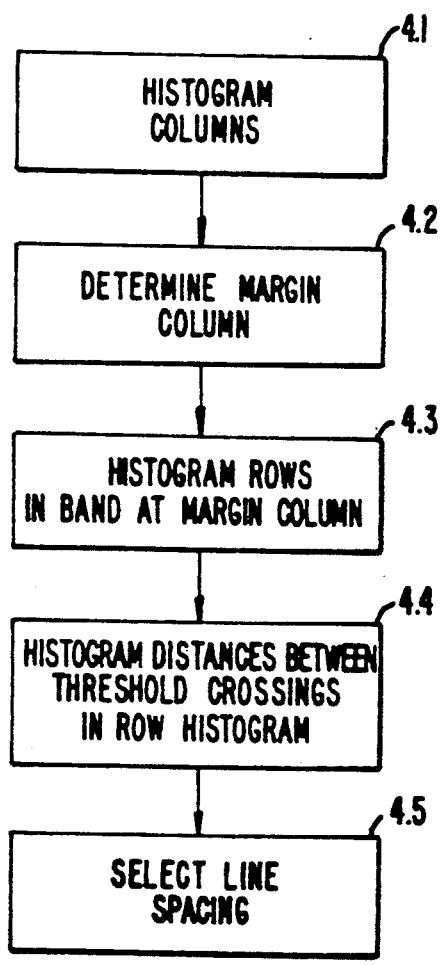
FIG. 4 is a flow chart detailing the process of selecting the proper, line spacing.

The method used to determine the line spacing is shown in FIG. 4. First, and not shown in the figure, the image of the text document is down-sampled to 75 dots per inch (this reduces the amount of memory required during spatial analysis) and stored in row major order. Unless otherwise noted, constants used in the blocking process are chosen to be consistent with the 75 dots per inch density. Additionally, in this embodiment, pixels are operated upon as bytes. As a byte is 8 bits long and as each pixel is a bit, the down-sampled text is treated as being in vertical columns of 8 bits/pixels width.

The borders of the text document are ignored during blocking operations. A strip of a given width comprised of a preset number of pixel rows, the preset number being called TOP_MARGIN, is ignored at the top of the text. Similarly, a row of BOTTOM_MARGIN pixels in width is ignored at the bottom of the image, and columns of LEFT_MARGIN*8 and RIGHT_MARGIN*8 are ignored on the left and right side of the document. The size of these constants is listed in Table 1.

After the edges of the document have been ignored, the first step of the process, forming a histogram of the pixel values of the text's columns is performed (see step 4.1). In this step, the total number of pixel elements of value 1 in each vertical column of the document is summed. The column containing the most such elements is used for further processing. The results of performing this step upon the sample resume shown in FIG. 5 are given in FIGS. 6A and 6B. As stated, in creating the histogram of FIGS. 6A and 6B, the margins of the sample text document in FIG. 5 are ignored and the pixels of value 1 in each 8 bit column of the text are counted. Column 16 contains 936 such pixels and is determined in step 4.2 to have the highest total number of pixels (see line 0014 16 in FIG. 6A), thereby becoming the margin column. A band of MARGIN_WIDTH columns, the leftmost column being the margin column, is now used to calculate the line spacing. As the MARGIN_WIDTH variable equals 8 in this embodiment, a column of 64 bits in width is used for calculating the line spacing.

In step 4.3 of FIG. 4 the pixels of value 1 in each row of the band at margin column are summed to determine if there is text in the margin column. The results of this processing are shown in FIGS. 7A and 7B. Consecutive values equal to or greater than a preset threshold variable, called the MIN_LINE THRESHOLD, indicate the presence of text.

In step 4.4 of FIG. 4 the distance from consecutive points where the number of pixels of value 1 went from below the MIN_LINE_THRESHOLD value to above that value is summed and a histogram of these values is formed. In other words, a count or measure of the distance from a first occurrence of text through the end of that first occurrence to the start of a second occurrence of text is taken. This count or measure is taken through the entire text document. These measures produce the histogram shown in FIG. 8, where column B is the distance from successive starting points of text and column C is the number of times that distance was found. The value for line spacing is selected in step 4.5 by choosing the most common value returned from step 4.4. This value must lie between the constants MIN_LINE_SPACE and a MAX_LINE_SPACE. These values are determined by the process discussed earlier. As shown in FIG. 8, the line space is set at 13 when the sample resume of FIG. 5 is used. It should be noted that the row histogram given in FIGS. 7A and 7B is not a complete histogram of the resume shown in FIG. 5. Consequently, all 13 occurrences of a line spacing of 13 are not shown.

Figure 9:
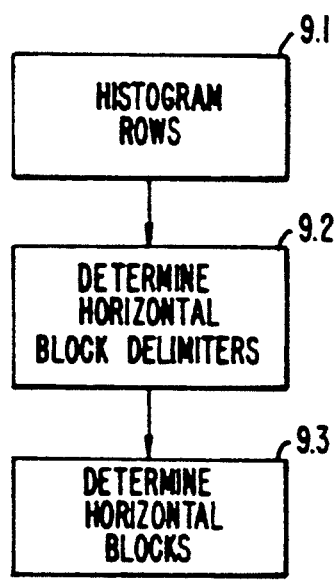
FIG. 9 is a flow chart of the process used to separate the text document into horizontal blocks.
Figure 9A:
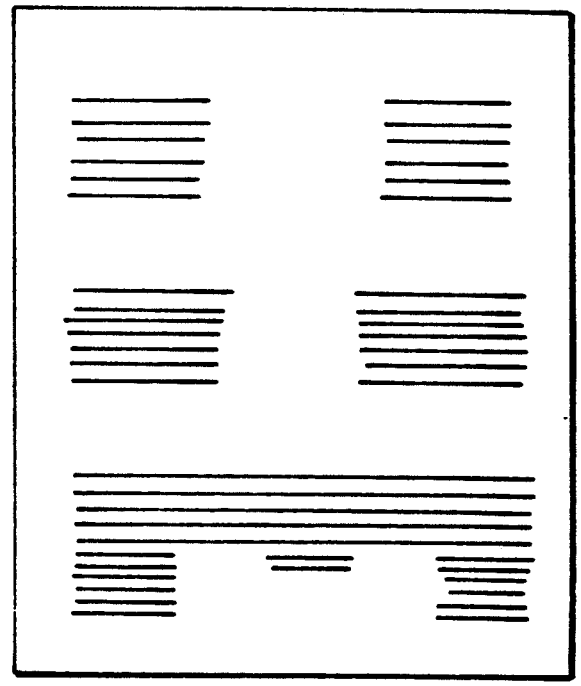
FIG. 9A is a second sample text document.
Figure 9B:
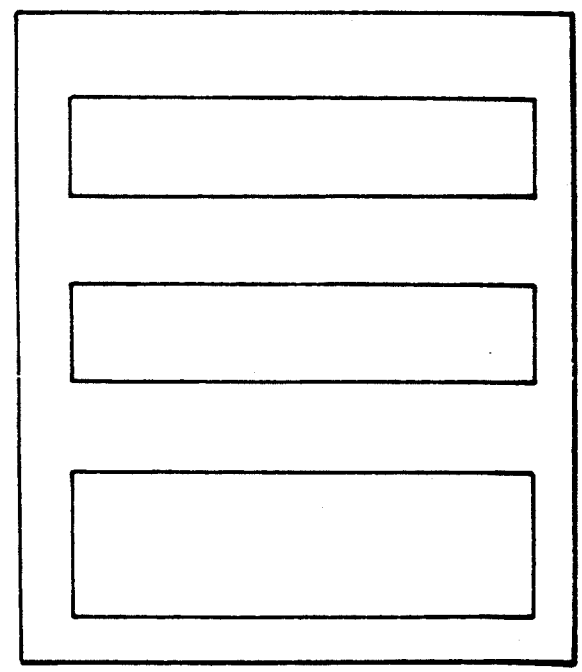
FIG. 9B shows the horizontal blocks which make up the sample text document in FIG. 9A.

FIG. 9 illustrates the method used to determine horizontal text blocks (see FIG. 3, step 3.2), i.e. those blocks of text which are vertically separated from one another by a space larger than a minimum spacing dependant on the line spacing. For example, the method of FIG. 9 will separate the document shown in FIG. 9A into the horizontal text blocks shown in FIG. 9B. Step 9.1 of FIG. 9 comprises summing the number of pixels of value 1 in each row of the image. In step 9.2 the values determined in step 9.1 are examined. Values above a certain minimum, denoted the MIN_HORIZ_LINE_THRESHOLD, indicate the presence of text. Therefore, a transition from a row whose value is below the minimum to one whose value is above the minimum denotes the start of a text block. The block continues until a number of rows or a space without text larger than the HORIZ_BLOCK_FACTOR § is detected. This space is equal to 1.625 times the line space. The detection of a space of this width indicates the end of a text block. The first and last rows in the text document are also considered to be delimiters. The determination of the horizontal text blocks in the text sample shown in FIG. 5 is indicated by the output shown in FIG. 10. This is accomplished in step 9.3 of FIG. 9.

Figure 11:
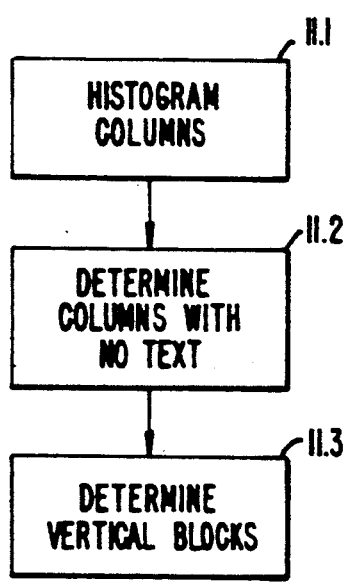
FIG. 11 is a flow chart of the process used to separate the vertical text blocks within the horizontal text blocks.
Figure 11A:
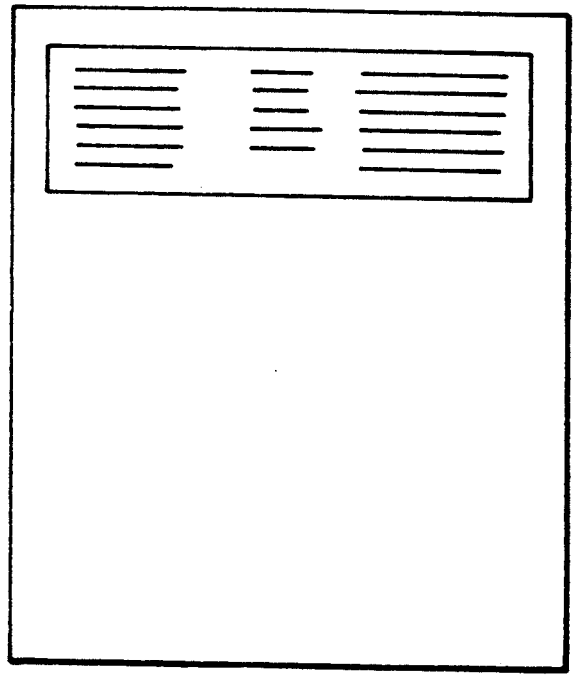
FIG. 11A shows a horizontal text block with multiple vertical text blocks.
Figure 11B:
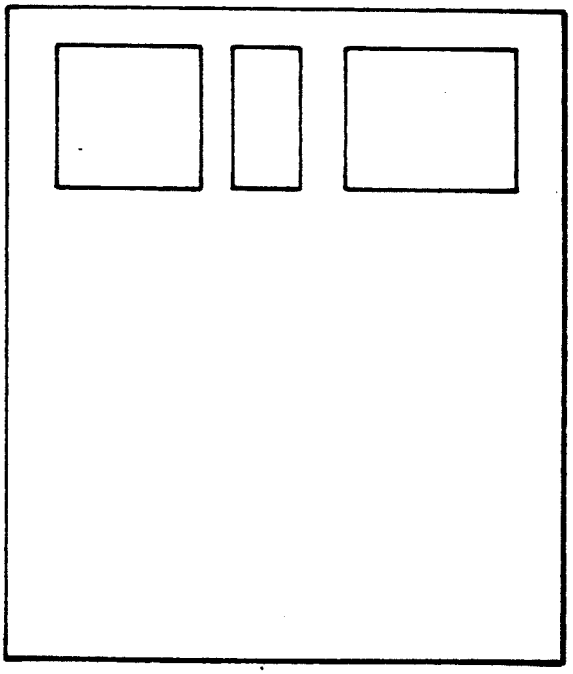
FIG. 11B shows the same horizontal text as in FIG. 11A's horizontal block, broken up into individual vertical text blocks.

The process used to determine the vertical text blocks (see step 3.3 in FIG. 3) is illustrated in FIG. 11. This process divides each horizontal block, as determined in step 9.3 of FIG. 9, into separate vertical sub-blocks, where appropriate. As an example, the process of FIG. 11 takes the horizontal text block shown in FIG. 11A and resolves it into three horizontally separated blocks, as shown in FIG. 11B. In step 11.1 the number of pixels with value 1 are summed within each column (a column here being one byte in width) in the horizontal block. The sums indicate the presence or absence of text within a given vertical column. In step 11.2 the values of each column are compared to a preset value called the MIN_COLUMN_THRESHOLD. Columns which fall below this value are considered to have no text. In step 11.3, the vertical blocks are separated from each other, each block being considered to start from a first transition where the text in the vertical column exceeds the MIN_COLUMN_THRESHOLD to a point where there have been at least VERTICAL_BLOCK_FACTOR consecutive columns whose histogram value is below MIN_COLUMN_THRESHOLD. This ensures that the sides of each such group of columns are buffered by an appropriate amount of space. It is assumed that the first and last column delimit the start of the first vertical block and the end of the last vertical block.

Figure 12A:
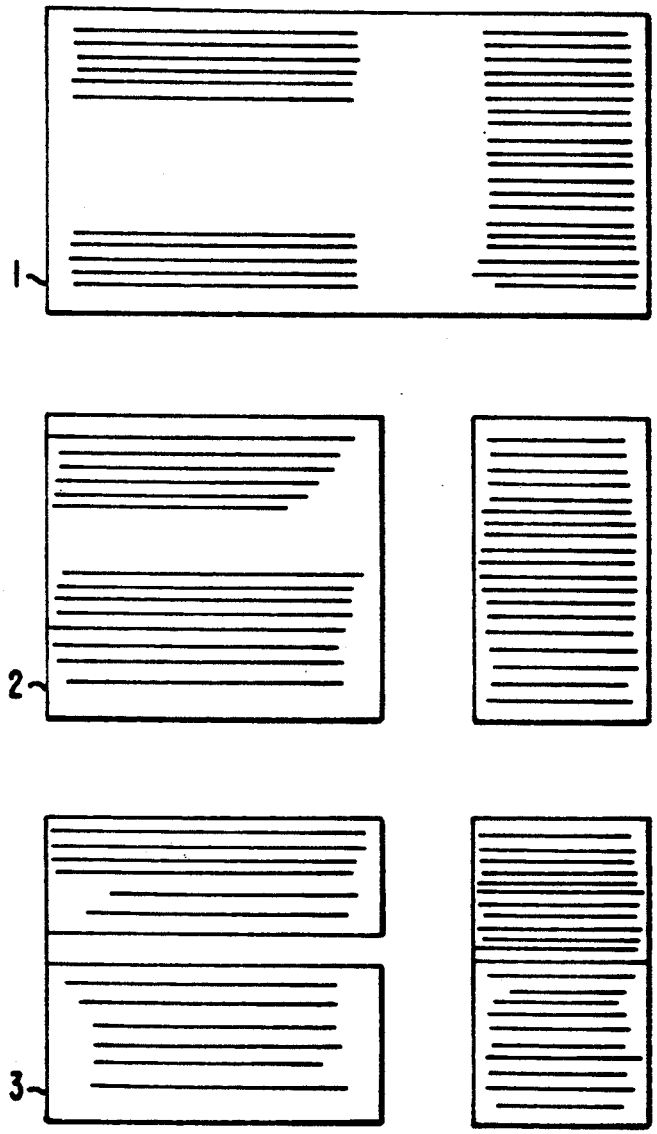
FIG. 12A is a third sample text document.

At this point the image has been partitioned into a collection of text blocks. FIG. 12 shows the blocks which exist after one pass though the horizontal and vertical blocking procedures. It is possible that each of these blocks themselves has an internal block structure. A sample of such a document is shown in FIG. 12A. The original text is seen in FIG. 12A.1. As there is text on each line of this block, the horizontal blocking process only created one large horizontal block. After the first vertical blocking, the separation of blocks shown in FIG. 12A.2 is obtained. A problem still clearly exists in that spatially separated text in the left side block is still treated as a single block. The repetition of the blocking process catches this mistake and returns the properly blocked text shown in FIG. 12A.3. Therefore, the horizontal and vertical blocking process is repeated on each of the blocks shown in FIG. 12. This repetition is indicated by step 3.4 in FIG. 3. Once this is done the document image has been decomposed into blocks of contiguous regions of text. This is the output of the spatial analysis portion of this invention. For the document shown in FIG. 5, after the output shown in FIG. 12 passes through the blocking method a second time, the output shown in FIG. 13 is obtained. In both FIG. 12 and FIG. 13 the four variables related to each block are the X and Y location where the block begins on the document and the block's height and width. Note that the units used in FIG. 12 for the X location and width are in bytes whereas in FIG. 13 the units are in pixels.

Composition of The Document

After the spatial analysis of the document is completed, the document's composition is analyzed (step 2.2 in FIG. 2).

Figure 14:
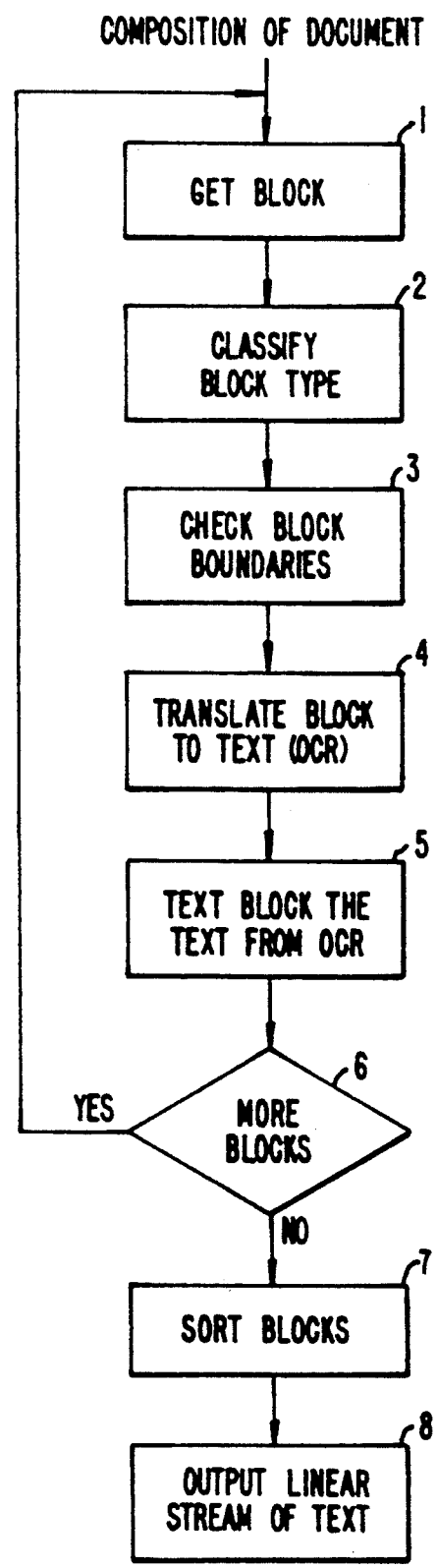
FIG. 14 is a flow chart of the process used to classify, sort and convert the digital block into an ASCII block.

As shown in FIG. 14, the text blocks are classified, translated into an ASCII text file by the optical character reader, and sorted. First, blocks are obtained from memory (step 14.1). Each block is then classified in step 14.2. The classification of the text blocks is based upon the spatial location of each text block and results in the text block being classified as either a header or body block. What characterizes a header block is customized as to the particular type of document being analyzed. Generally, the classification will depend upon coordinate information derived from the blocking process. FIG. 13 shows how the blocks are stored as coordinates. In the example of the text document shown in FIG. 5, a header block is defined as either a block whose upper-left corner is within a preset distance DELTA from the left margin, or a block which is centered on the page and whose width is less than the result of the page width minus a preset variable whose value is CENTER_WIDTH.

In step 14.3 in FIG. 14 the relationship of each block to the edge of the image is checked. If the block is within the preset distance DELTA from the right or left margin of the document, its edge is extended to the edge of the image. This contingency deals with the situation where the text in a text block actually extends into the margin area originally ignored when spatial analysis began. By extending margins into this space, the pixels of text that might have been lost are recovered. FIG. 15 lists the blocks after the left and right boundaries have been reblocked, i.e., extended to the image edges.

After being reblocked in step 14.3, each block, or more specifically, the region of the digitized image within the blocks' boundary is passed to the character recognition unit to translate the image into an ASCII text file. This occurs at step 14.4. Upon completion of this step each block has two components: 1) coordinates indicating where on the document page the block is physically located and 2) the text segment in the block, represented in the computer as an ASCII string.

In step 14.5, each individual vertical subblock is partitioned into vertically separated sub-blocks of text. This step is called text blocking. This text blocking step, which may appear to be duplicative of the previously described spatial analysis, is necessitated by the passing of the text blocks through the character recognition unit. It is possible that stray marks or other disfigurations of the document being analyzed result in pixels of value 1 in locations where no text actually exists. These pixels might result in the spatial analysis being unable to detect a space between blocks where such stray pixels are found. However, after these same pixels pass through the character recognition unit, they are not recognized as proper text and these stray pixels are ignored. Now, by performing a final text blocking step, the blocking errors caused by this type of problem can be eliminated. Also, the vertical blocking is now based on a minimum number of characters separating the blocks, not a certain number of pixels. Although the sensitivity of these measures is comparable, different errors are corrected by using the different measures. The separators between the sub-blocks must consist of at least a preset number of consecutive columns, each column one character wide, called WHITE_WIDTH. The space between columns must contain only blanks. These sub-blocks are reformed into a single block by reading the sub-blocks sequentially from left to right. A sample of text shown before and after the text blocking is shown in FIG. 16. In step 14.6 the program loops back to step 14.1 and repeats until the classification and reblocking on all text blocks has occurred.

Figure 17:
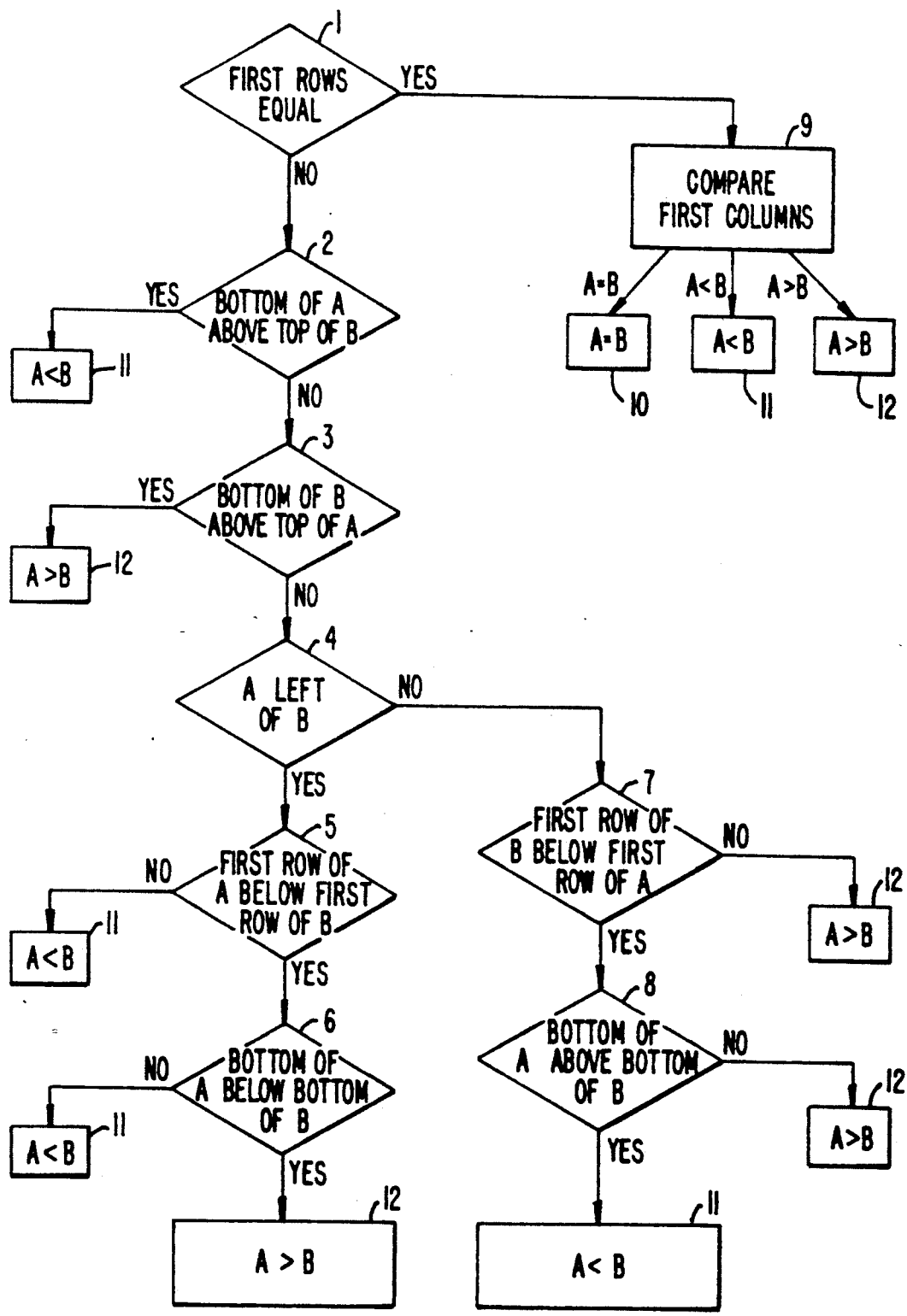
FIG. 17 is a flow chart of the method used to sort the blocks.

After all blocks have been classified as header or body blocks and, if necessary, text blocked, the texts of the blocks are reassembled by sorting the blocks at step 14.7. FIG. 17 shows the sort process in detail. The sort uses an ordering function which results in a list of text blocks such that the text contents of the blocks, when read sequentially, have the same visual order as a person would naturally want to see when scanning the original document. This ordering further results in blocks of related text being located in proper relational proximity to one another.

As shown in FIG. 17, the tops (measured by the Y position of the first row of text in the block) of two of the blocks (here A & B) are first compared to one another (step 17.1). If the tops of A and B are equal, the first columns of both blocks are compared (step 17.9). If the columns are equal, the process returns the value that blocks A and B are equal (step 17.10). If block A is to the left of block B, then the value that A is less than B is returned (step 17.11). Finally, if block A is to the right of B, then A is greater than B (step 17.12).

If the first rows are not equal, another series of tests begins. At step 17.2, if the bottom of block A is above the top of block B, then A is less than B (step 17.11). If the bottom of A is not above the top of B, the next test is if the bottom of B is above the top of A (step 17.3) if it is, then A is greater than B (step 17.12). If not, step 17.4 determines if A is to the left of B.

If A is left of B, then another test is made. If the first row of A is below the first row of B (step 17.5) and the bottom of A is below the bottom of B (step 17.6), then A is greater than B (step 17.12). The alternative result is that A is less than B (step 17.11).

If A is not to the left of B, then two other conditions are checked. If the first row of B is below the first row of A (step 17.7) and the bottom of A is above the bottom of B (step 17.8), then A is less than B. Otherwise A is greater than B (step 17.12).

In step 14.8 the contents of the text blocks are delivered to the text analysis process as a linear stream of characters using the ordering derived from step 14.7. Those blocks characterized as header blocks are padded with a ' ' character. Other indicators generated include line indicators and beginning and end of document marks. FIG. 18 shows a text sample after the spatial text analysis process has been completed.

Although this description discusses the processes of spatial analysis, composition of document, and text analysis separately, these processes are all codependant and the proper functioning of the entire invention depends upon their inter-relationship. Text analysis depends upon the document being correctly resolved into its component text blocks and the correct determination of the blocks' composition. The separate discussion of these processes simplifies understanding the invention, but it should not be concluded that the processes or modules are separate entities.

Text Analysis

Figure 19:
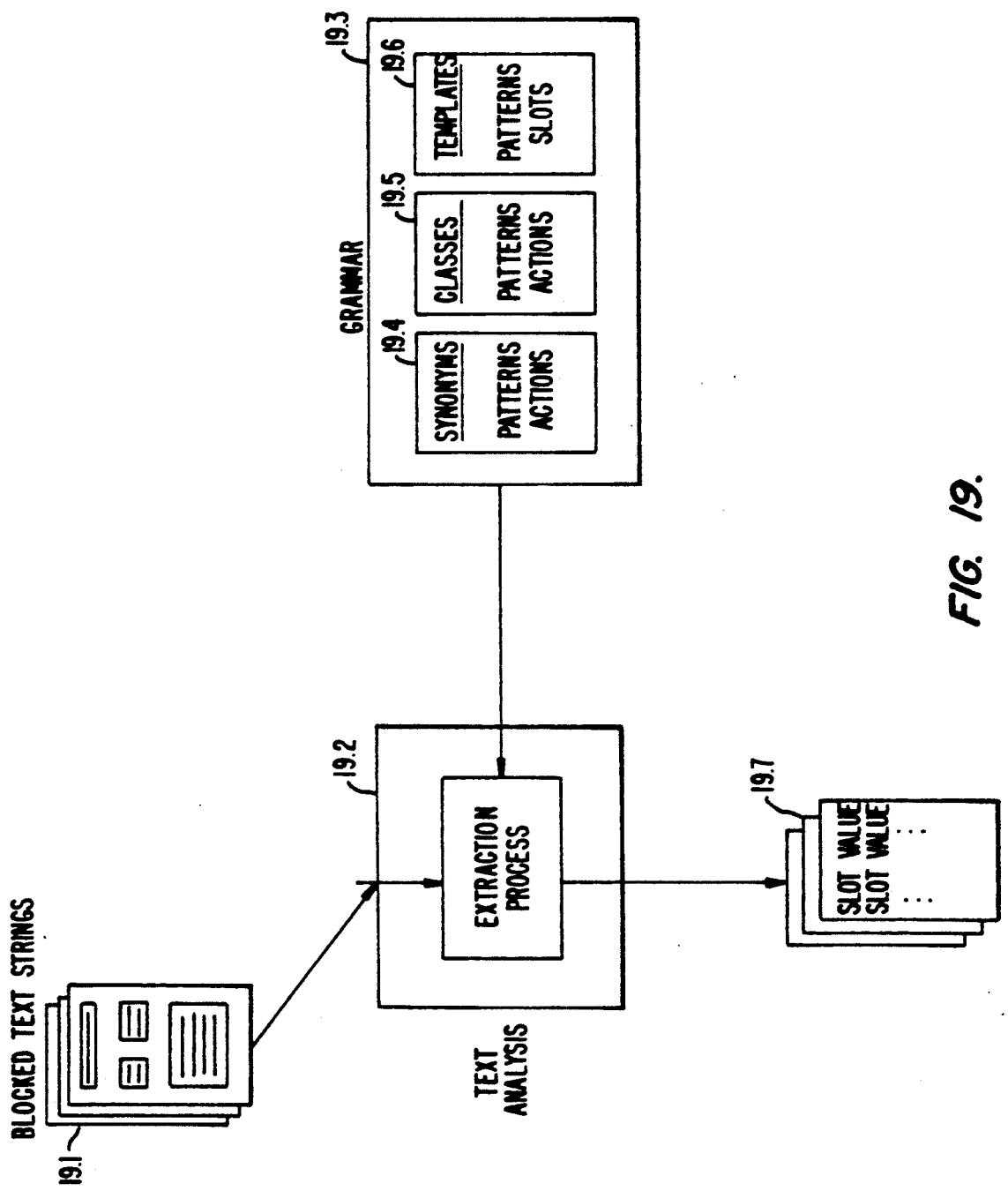
FIG. 19 shows the components of the text analysis process and their relationship to one another.

As shown in FIG. 2, once the text has been blocked in step 2.1 and translated into an ASCII text file in step 2.2, textual analysis, step 2.3, begins. The main components used to analyze the text and their relationship with one another are shown in FIG. 19. Blocked ASCII text strings 19.1 are the input for the textual analysis process. These strings can be denoted with special characters, such as a ' ', to indicate the type of string. The blocks so denoted carry special meaning because of their position on the documents. During textual analysis, predefined text patterns in strings 19.1 are located by the extraction process 19.2. A module called the extractor executes this pattern matching. The extractor finds all occurrences or instances of the predefined text patterns in the document.

In the preferred embodiment, the extractor module can be used on a 'Sun 3/60' workstation and is realized by the C program attached as Appendix 1.

In addition to a properly blocked text, the extractor requires a knowledge base of relevant text patterns to perform text analysis properly. These patterns are described in a pattern definition language. A knowledge base written in this language is known as grammar 19.3. The extractor uses the grammar to extract text patterns of interest. A sample grammar, written in the pattern definition language is attached as Appendix 2.

The grammar used in the present invention is created prior to any specific text analysis and is unchanged by the text analysis. The grammar comprises pattern objects formed into synonyms and classes. The creation of the grammar is determined by the specific types of information whose referral or processing is desired.

The text patterns defined by the grammar are chosen by their relevance to the type of document being analyzed. In the case of resumes, patterns for job titles, educational degrees, job skills, etc. are defined in the grammar. In order to correctly identify such patterns, it is necessary to create patterns utilizing the ' ' character (inserted during the spatial analysis) which identifies header blocks. Header block patterns defined in a resume grammar include an education header, a work history header, an objective header, etc.

The pattern definition language or more specifically, the grammar, uses synonyms 19.4 and classes 19.5 to define key textual patterns for the extractor to locate and uses templates 19.6 to format and store the patterns located by the extractor. A synonym is a collection of patterns used for the same word. For example, "January", "Jan", "Jan.", "1", or "01", in the proper context, are all synonyms for January. A class is a collection of patterns, each pattern potentially having many synonyms, which collectively relate to the same type of object. For example, "Jan. 12, 1977", "Oct. 27, 1959", "12-01-57" are all in the class called 'DATES'. The difference between classes and synonyms appears when they are matched as patterns.

The different patterns (see the previous example for January) which make up a synonym group are all treated as having the same value, regardless of which of the patterns occurs in the text. Classes, on the other hand, even when they contain only a single pattern, have a different value for each instance the pattern is detected in the text. For example, the class of "AGE" is comprised of only a single pattern, that being a single number, each pattern object within the preset range for the class "AGE" having a value equal to the actual number found in the text. When a pattern of a class is comprised of a plurality of elements, the value of the pattern is the concatenation of the values of the individual elements. It is impotant to note that a synonym, which is a pattern object, is formed from a plurality of patterns. Likewise, a class is a pattern object, the individual members which comprise the class being patterns.

Patterns consist of elements which can be numbers, words, or previously defined objects, separated by operators. The following operators are recognized by the extractor:

[I]=ignore;
[N]=not;
[n]=within n words of, where n is equal to 0 or a positive integer;
[W]=within;
[C]=containing;
[0]=optional;
[B]=before;
[F]=first; and
!:n spelling corrected by n letters, where n is 0 or a positive integer.

Thus "/CITY [4]/STATE [W]/FIRST_TEN_LINES" might be a pattern which is matched if a city is within four words of a state, and the city/state combination is within the first ten lines. If no operator is specified, the default, [1], is assumed.

FIGS. 20A, 20B, and 20C show the portion of a grammar used to define and recognize dates in a document. The synonym "Jan", defined on line 0006 of FIG. 20A, is a synonym for the month of January. There are four patterns which match the synonym "Jan". Each represents how "January" would appear in the text of a document. The second pattern "Jan [0].", contains two elements, "Jan" and ".", and one operator, "[0]". The "[0]" indicates that "Jan" may be optionally followed by a period. The class "MONTH", defined on line 0075, contains as patterns all of the synonyms for the twelve months.

Operators can be used to overcome typographical errors introduced during the character recognition phase. In the example above, if the period following "Jan" is missing after the character recognition step, the optional operator in the pattern for January ensures that this occurrence is still recognized as an instance of the month January.

Patterns make use of the formatting information left behind by the text blocking process by referring to lines, headers, and the beginning and end of document marks. This feature allows the authors of various grammars to incorporate spatial clues or information in pattern objects, thereby aiding computer understanding of documents in which text data location contributes to the document meaning.

For each pattern object an action can be specified. An action indicates what is to be done when instances of the pattern object are found in the text document. This allows text analysis of pattern objects as they are located in the document. For example, in FIG. 20B, line 0094, the class "YEAR" has action 'Years' associated with it. The action is used to ensure that only numbers in a certain range are regarded as years. This allows the extractor to rule out 7893 as a year when it occurs in a document. Thus, actions perform such functions as range checking, counting occurrences of pattern objects, data output or other similar actions.

Templates are data structures that specify how the extractor should format the output. A template comprises a first pattern object which gives the template its name and a collection of slots. Each slot in turn has its own pattern object associated with it. A pattern object associated with a template slot must be a component (i.e. an element of, or an element of an element of, or an element of an element of an element of, etc.) of the first pattern object of the template. Each instance of the first pattern object of a template in the input document results in the filling in of the template's slots. The value used by the extractor to fill in each slot is the corresponding instance of the slot's pattern object. FIG. 21 illustrates a group of template definitions. For example, on line 0009 of FIG. 21, the template pattern object APPLICANT_NAME causes all instances of the 'Applicant' slot pattern object 'APPLICANT' to be extracted and labeled with the slot name, 'Applicant'. On line 0012, the template pattern object 'APP_ADDRESS' requires several pattern objects to fill in the template slots.

Once the grammar, with its synonyms 19.4, classes 19.5 and templates 19.6 is created, it may be stored in any known computer memory. When this invention is to be used, the grammar is loaded into the host computer (see step 23.1, FIG. 23). It should be understood that the loading of the grammar and the use of the extractor to find text patterns defined by the grammar do not in any way alter the grammar itself. Conceptually it may be easiest to view the extractor as creating a partial mirror image of the stored grammar, the practical image containing only those text patterns detected in the incoming ASCII text stream 19.1.

In other words, after the text blocking and composition processes occur, the resulting ASCII data streams 19.1 are scanned and those elements therein which match the synonyms 19.4 and classes 19.5 of the grammar 19.3 are used to fill out the grammar's templates 19.6. This filling out process does not alter the original grammar in any way. It does create a new text file comprised of only the information which was defined by the grammar and detected by the extractor. It is this file which is used to fill the templates 19.6 and to generate output. This output file can be altered by the user. The original grammar is untouched and available for processing other new documents.

The output (19.7 in FIG. 19) from the extractor can be used in many ways. For example, it can be saved in a computer file, displayed on an output device such as a cathode ray screen, printed, or placed into a database for future retrieval. Templates are defined depending on where and how the output will be used. An example of the output of the extractor is shown in FIGS. 22A, 22B, and 22C. In this example all class and synonym instances are printed. Lines 0149-0151 of FIG. 22C shows the output of template "YEARS", slot 'Dates' from FIG. 21, line 0032, and the pattern object POS_TITLE.

Figure 23:
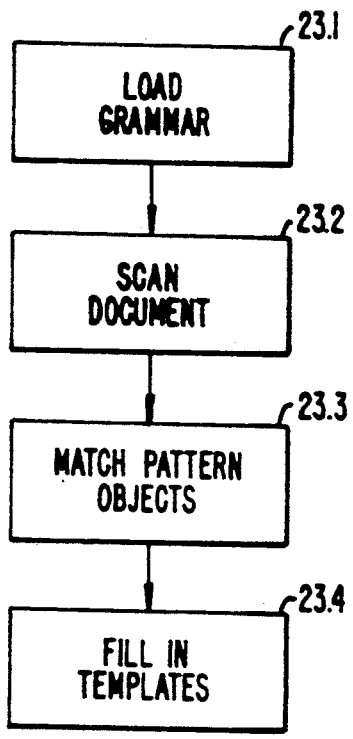
FIG. 23 is a flow chart of the text analysis process.

A high-level flow chart for the text analysis process is shown in FIG. 23. The grammar is loaded into the computer at step 23.1. In step 23.2 the document text is scanned, identifying key words from the grammar. The pattern objects specified by the grammar are matched with the words identified during the document scan in step 23.3. The templates are filled in using pattern objects found during the scan in step 23.4.

Figure 24:
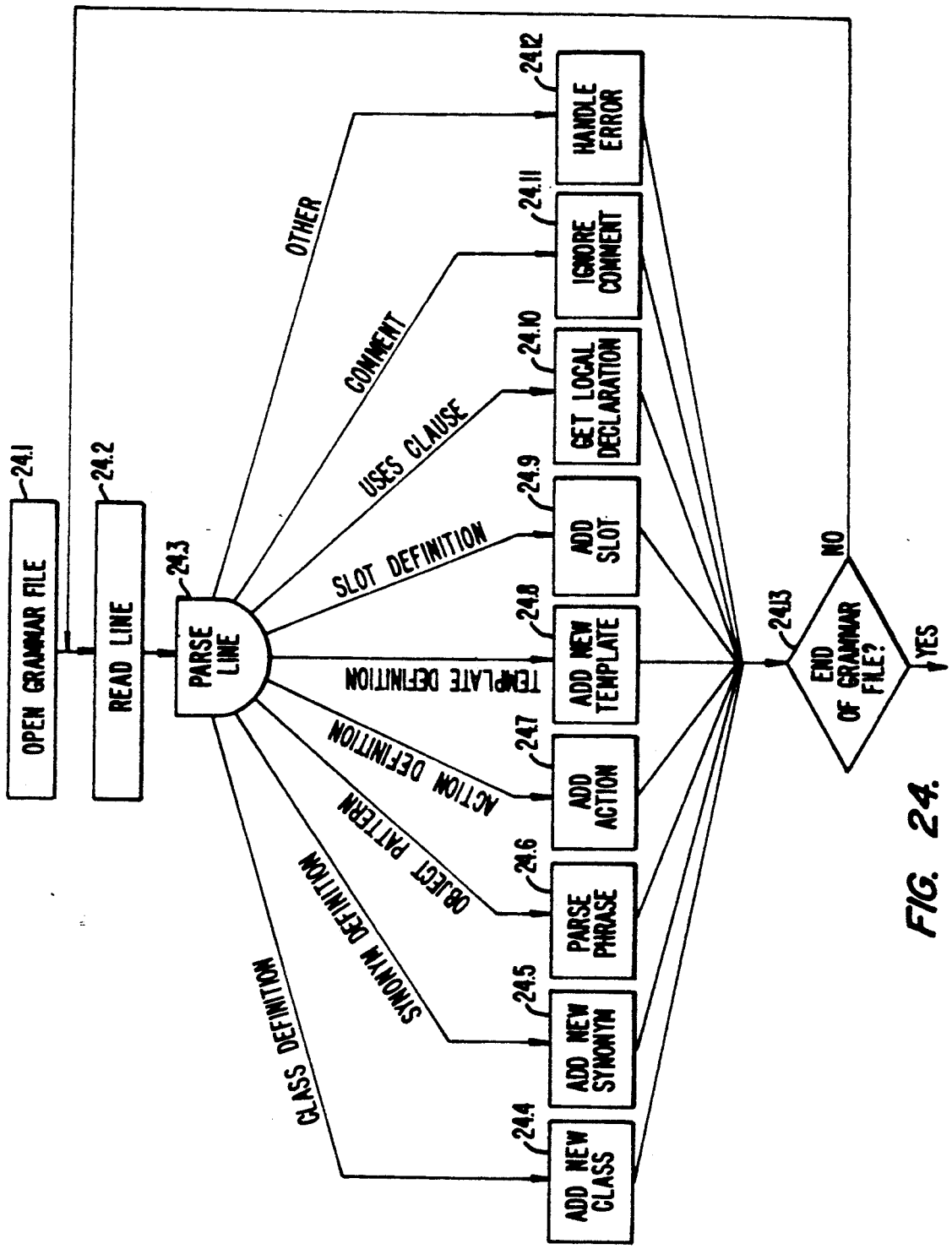
FIG. 24 is a block diagram of how the grammar is loaded into the host computer.

FIG. 24 illustrates the process of loading the grammar into the extractor (see step 23.1, FIG. 23). The primary effects of loading the grammar are to parse and analyze the grammar, and to build a hierarchical symbol table of patterns objects. The data structure for a pattern object in the symbol table is shown below in Table 2.

TABLE 2

| typedef struct _class { | |
|---|---|
| char *name; | (pattern object name) |
| unsigned short num_phrases; | (number of pattern elements) |
| unsigned short first_phrase; | (pointer to first pattern) |
| ENTITY_TYPE entity_type; | (identifier for this object) |
| int (*action) ( ); | (pointer to action) |
| char *action_name; | (action name) |
| unsigned short class_syn; }CLASS; | (type of pattern) |

The grammar file is opened at step 24.1. In step 24.2, a line from the grammar file is read sequentially. Depending on the type of line, the appropriate action is taken in step 24.3. If a new class or synonym is read, it is added to the symbol table, at step 24.4 or 24.5, respectively. Each of these steps creates a new entry into the symbol table.

If a pattern is read, it is parsed at step 24.6. Patterns are made of numbers, words, or previously defined objects. In step 24.6, patterns are represented in the computer as lists of pairs, an element and its operator. The list of the pairs is stored in an array of pair list descriptors using the data structure shown in Table 3.

TABLE 3

| typedef struct _phrase { | |
|---|---|
| unsigned short num_pairs; | (number of pairs) |
| unsigned short first_pair; }PHRASE; | (pointer to first pair) |

The actual pair is stored in the date structure shown in Table 4.

TABLE 4

```
typedef struct __phrase__pair
{
    unsigned short entity__type;    (identifier for pattern
                                     element)
    unsigned short operator;        (pattern element operator)
}PHRASE__PAIR;
```

At step 24.7, if an action is read, this action is associated with the last class or synonym defined. Step 24.8 shows the entry of a new template definition. Each template is stored in a structure which is used to generate the output of the extractor. The data structure used for templates is shown in Table 5.

TABLE 5

```
typedef struct __template
{
    Char *name;                              (template name)
    ENTITY__TYPE entity__type;               (identifier for template)
    int num__slots;                          (number of slots)
    int current__slot;
    int num__instances;                      (number of instances)
    int current__instance;
    SLOT slot[MAX__SLOTS];                   (slot descriptor)
    SLOT__INSTANCE                           (instance slot
    instance[MAX__INSTANCES];                value)
}TEMPLATE;
```

At step 24.9 slot definitions are parsed and inserted into the template structure.

At step 24.10, pattern object definitions store in other files can be added to the grammar. This allows pattern object definition files to be modularized. Step 24.11 tells the process to ignore comments placed in the grammar by the author. Any other line is unrecognized and hence an error. Step 24.12 indicates the handling of these errors.

In step 24.13, the process loops back to read the next input grammar line until the end of the grammar is reached.

Figure 25:
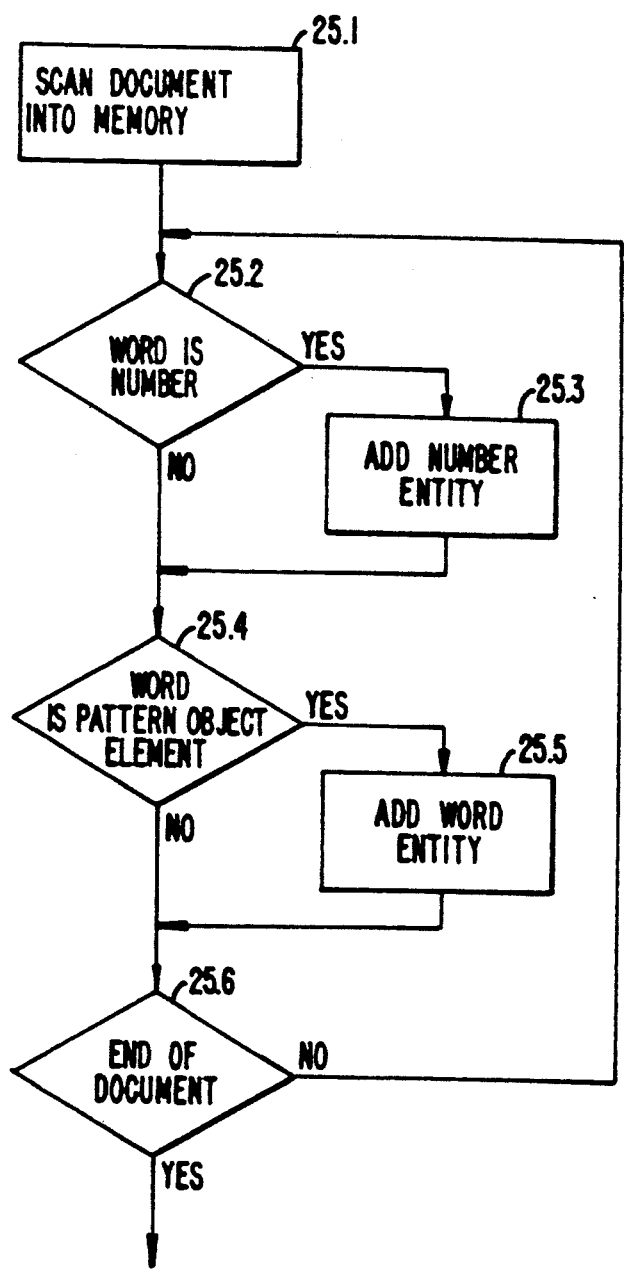
FIG. 25 illustrates how the text is initially scanned and analyzed.

The process of scanning a document, shown in step 23.2 of FIG. 23, is detailed in FIG. 25. The document is sequentially read into memory at step 25.1. During the reading, lines containing no alphabetic or numeric characters are ignored. Leading blank space on each line is removed and consecutive blanks are compressed to a single blank space. Once in memory, the document is scanned sequentially, one word at a time.

When a pattern defined by the grammar is found in the document text, it is recorded as an instance. The simplest instance is a single word or number. More complex instances arise from pattern objects whose patterns contain several elements separated by operators. Such instances are stored in the data structure shown in Table 6.

TABLE 6

```
typedef struct __class__entity
{
    char *value;                     (pattern object instance)
    unsigned short children;         (pointer to leftmost child
                                      pattern)
    ENTITY__TYPE entity__type;       (identifier for this
                                      entity)
    unsigned short next;             (pointer to next instance)
    unsigned short start, end;       (start and end of instance)
    unsigned short phrase;           (pointer to pattern)
}ENTITY;
```

When the scanning process of FIG. 25 detects a number (step 25.2), a number instance is added into the set of matched patterns (step 25.3). At step 25.4, if a word is detected, the process checks to see if the word occurs as an element of or as a spelling corrected word of some pattern object in the grammar. If it does, an instance for that particular grammar element is added at step 25.5. A function "AddEntity" adds new instances by creating a new ENTITY structure. At step 25.6 a check is made to see if the end of document has been reached. If it has, the scanning phase is complete. If not the next word is processed.

Figure 26:
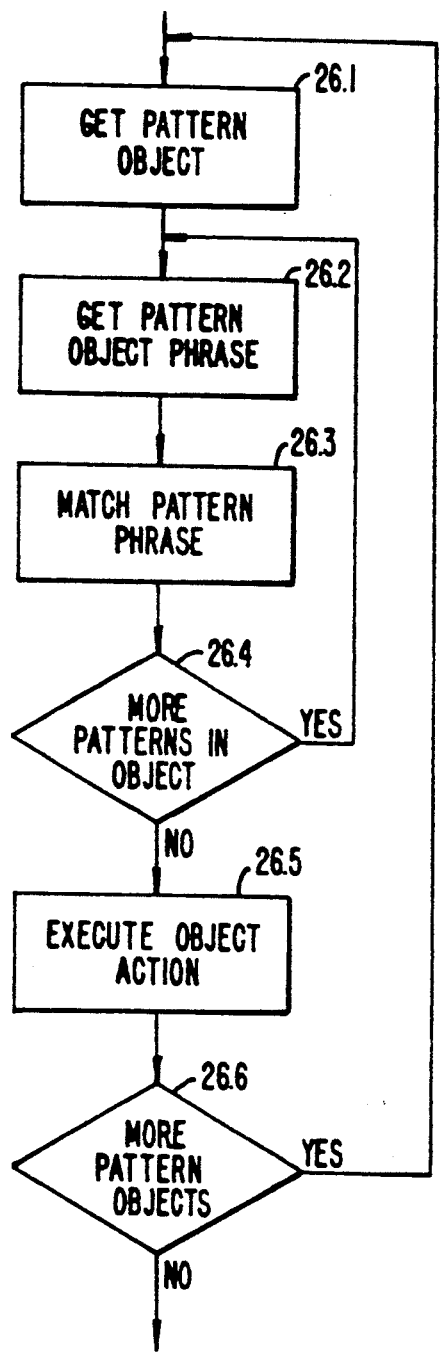
FIG. 26 is a flow chart of the process used to match pattern objects of the grammar against the text.

After scanning the document for simple word and number instances, the more complex patterns of the document are matched and assembled. FIG. 26 illustrates this process. Each pattern object defined in the grammar is examined to see if any occurrences of it appear in the document. A first pattern object is loaded at step 26.1. Step 26.2 retrieves the pattern object phrases (patterns) in the current pattern object sequentially and one at a time. A search for instances of these pattern object phrases occurs at step 26.3. All instances are added by using a function "AddEntity". This process is repeated for each pattern object phrase in the current pattern object by looping at step 26.4. After each pattern has been examined any action associated with the pattern object is executed at step 26.5. This procedure is repeated for each pattern object in the grammar. See step 26.6.

Referring back to FIGS. 22A, 22B, and 22C, an example of how the process shown in FIG. 26 is performed can be seen.

Figure 27:
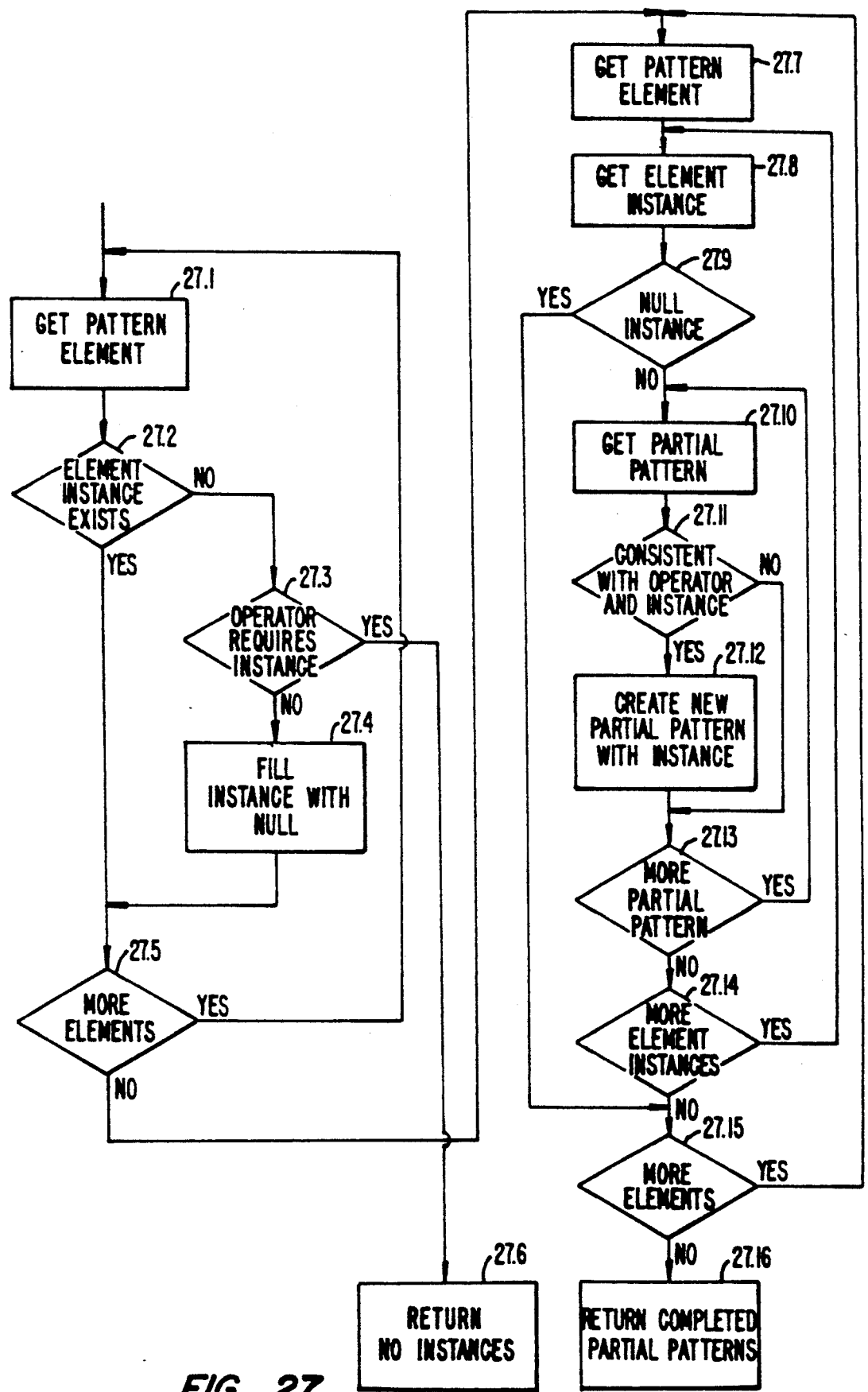
FIG. 27 is a flow chart of the process used to match a specific pattern.

FIG. 27 illustrates the major steps in the pattern matching process. The essence of this process is to build up instances of pattern objects by sequentially examining each element in the pattern. Each instance of an element is adjoined to previously constructed partial pattern instances, i.e. instances of a subpattern consisting of the elements of the pattern up to but not including the pattern element whose instances are currently being considered. Thus, for example, for the pattern

/MONTH /DAY /YEAR the process first finds all instances of the first subpattern "/MONTH". Instances of the next subpattern, "/MONTH /DAY", are determined by first examining all instances of the first subpattern (months), and then creating a new instance if the month subpattern is followed by a day. Finally, instances of the last subpattern, "/MONTH /DAY /YEAR", are determined by examining all instances of the second subpattern (month day) and creating a new instance if the month-day subpattern is followed by a year.

At each step this process constructs all instances of the subpattern based upon what has previously been constructed. This is done for each pattern element and, as the last subpattern is the pattern itself, every instance of the pattern occurring in the document will have been found.

The steps used to create partial pattern instances of a given pattern are shown in FIG. 27. In step 27.1, a first pattern element is retrieved from the pattern. Instances of this element in the document are obtained from the extractor in step 27.2. As the pattern element is either a previously defined pattern or a simple word or number, all instances of it (if they exist) are already known. If none exist but the element operator requires instances, then the pattern has no instances (see step 27.6). If the operator associated with the element does not require instances of the element (for example when the operator is "optional"), a null instance is added at step 27.4. This process is repeated (see step 27.5) for each pattern element in the pattern object.

A first pattern element of the pattern is obtained at step 27.7. Instances of this element in the document are found at step 27.8. If the instance is null, the process of creating new partial pattern instances is skipped (step 27.9) and the process looks for the next element instance. Otherwise new partial pattern instances are created for all currently existing partial pattern instances, starting at step 27.8. The element operator and the instance returned in step 27.8 are checked to see if they are consistent with the partial pattern also retrieved at step 27.10 in step 27.11. If they are, the element instance is appended to the partial pattern instance to create a new pattern instance (see step 27.12). If not, the process begun at step 27.10 will be repeated for all previously existing partial pattern instances, if any (see step 27.13).

At Step 27.14, a check is made to see if there are more instances of the current pattern element. If there are, then the process returns to step 27.8 and repeats, this time with the next instance of the pattern element. If not, if there are more pattern elements in the pattern, the process returns to step 27.7 to work on the next pattern element (see step 27.15). If not, all partial pattern instances which have been completed are returned as valid matching patterns at step 27.16. This will be all instances of the pattern which occur in the document.

Figure 28:
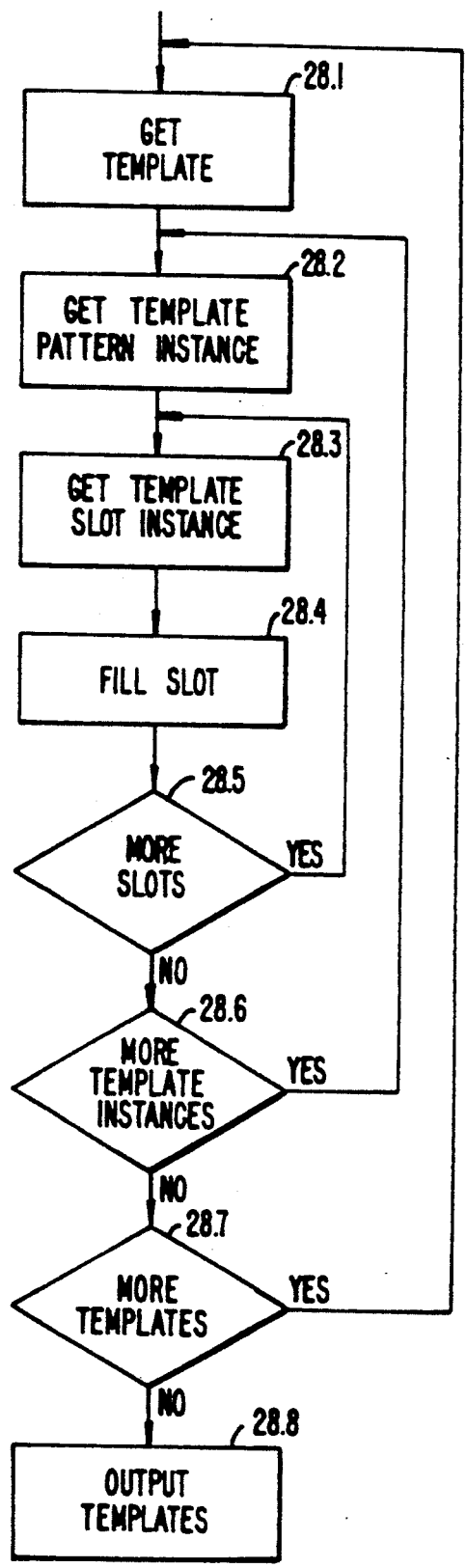
FIG. 28 is a flow chart of the process used to fill in the templates used to output the data.

FIG. 28 illustrates the process used to fill templates. A first template from the grammar is retrieved at step 28.1. An instance of the template pattern is retrieved at step 28.2. The corresponding instance of the next slot of this template is retrieved by searching the children of the instance of the template pattern for the instance corresponding to the slot's pattern object. This occurs at step 28.3. This value is assigned to the slot in step 28.4. The program loops between step 28.3 and 28.5 until all template slots have been filled. The process loops between steps 28.2 and 28.6 until all template pattern instances have been operated upon. This process is repeated for each template in the grammar by looping between step 28.1 and step 28.7. Finally, at step 28.8 the results of the template filling process are supplied to memory or any other output form. This output can be used by other programs, displayed on a computer terminal, or stored into a database for future use.

In summary, the present invention accepts as input text documents which can be either grammatical or non-grammatical. The invention disassembles the document into separate blocks of contiguous text but preserves the information that the location of these blocks provides and maintains the blocks in ordered relationship to one another. The text blocks are then converted into ASCII text files. Using a grammar (a type of pattern definition language), the extractor scans each ASCII file and retrieves desired word patterns. The patterns are formatted by using a part of the grammar called templates. Finally, the output from the templates may be printed or stored. In this manner, a unique method and apparatus for analyzing non-grammatical text documents is realized.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, the constants in Table 1 could be changed for optimum performance with different document types. The grammar could also be modified to retrieve more or different types of information. Many such changes or modifications are readily envisioned. The specification and drawings are, accordingly, to be regarded in an illustrative rather than in a restrictive sense.

A METHOD AND APPARATUS FOR COMPUTER UNDERSTANDING
AND MANIPULATION OF MINIMALLY FORMATTED TEXT DOCUMENTS

Appendix 1

```
/*----------------------------------------------------------------
 * utils.h
 *---------------------------------------------------------------*/ include <stdio.h> define MESSAGE_COLLECT 0
define REINIT_COLLECT 1 extern char *Memory;

extern int HashString();
extern char *StrSave();
extern char *StrNSave();
extern BOOLEAN StrEqu();
extern BOOLEAN StrEquiv();
extern int ConvertString();
extern GarbageCollect();
```

```c
typedef struct _converter
{
    char *string;
    int value;
}CONVERTER;
```

Copyright, Resumix, Inc. 1988

```c
/*----------------------------------------------------------------------
 * Copyright 1988, Resumix, Inc.
 *
 * utils.c
 *---------------------------------------------------------------------*/ include <stdio.h>
include <ctype.h>
include "includes.h"

char *Memory;
static int MemoryPointer;
static int MessageStart = 0;

/*----------------------------------------------------------------------
 * HashString hashes 'string' and returns its hashed value
 * bug - the algorith is extremely simpleminded
 *---------------------------------------------------------------------*/
int
HashString(string)
char *string;
{
    register int hash;

hash = 0;
    while(*string != '\0')
        hash = (hash + 1) * UpperMap[*string++];
    return(hash & 0x3ff);
}

/*----------------------------------------------------------------------
 * StrSave saves 'string' in the dynamic character memory and returns a pointer
 * to the saved string
 *---------------------------------------------------------------------*/
char *
StrSave(string)
char *string;
{
    char *str;

if (string == NULL) return(NULL);
    str = &Memory[MemoryPointer];
    MemoryPointer += strlen(string) + 1;
    if (MemoryPointer>=MAX_MEMORY)
    {
        fprintf(stderr,"ERROR in StrSave: out of space\n");
        return("");
    }
    strcpy(str, string);
    return(str);
}

/*----------------------------------------------------------------------
 * StrNSave saves up to 'nchar' characters from 'string' in the dynamic
 * character memory and returns a pointer to the saved string
 *---------------------------------------------------------------------*/
```

```
char *
StrNSave(string, nchar)
char *string;
int nchar;
{
    char *str;

if (string == NULL) return(NULL);
    str = &Memory[MemoryPointer];
    MemoryPointer += nchar + 1;
    if (MemoryPointer>=MAX_MEMORY)
    {
      return("");
    }
    strncpy(str, string, nchar);
    str[nchar] = '\0';
    return(str);
}

BOOLEAN
StrStarEqu(string1, string2)
char string1[], string2[];
{
    int len;
    char save;
    BOOLEAN answer;

len = strlen(string1);
/*
    printf("STAREQU %s %s %d\n", string1, string2, len);
*/
    if (len <= strlen(string2))
    {
       save = string2[len];
       string2[len]= '\0';
       answer = StrEquiv(string1, string2);
       string2[len] = save;
/*
       if (answer) printf("gotit\n");
*/
       return(answer);
    }
    else
        return(FALSE);
}

BOOLEAN
CharEquiv(char1, char2)
char char1, char2;
{
   if (char1 == UpperMap[char1])
      return(char1==char2);
   else
      return(UpperMap[char1] == UpperMap[char2]);
}
static
BOOLEAN
StrSpellCheck(correct, unknown, count)
char *correct, *unknown;
int count;
{
    int len1, len2, errors;

/* get the lengths of the 2 strings */
    len1= strlen(correct);
    len2= strlen(unknown);
/* initialize errors to the extra characters in the correct string */
    errors = MAX(len1 - len2, 0);
```

```
/* until the error count exceeds the maximum */
    while(errors <= count)
    {
/*      if the ends of the strings have been reached, return success */
        if (*correct == '\0' && *unknown == '\0')
            return(TRUE);
/*      if the next characters of each string are different */
        if (UpperMap[*correct] != UpperMap[*unknown])
        {
            if (len1 > len2)
            {
                correct++; len1--;
            }
            else
            {
                errors++;
                unknown++; len2--;
            }
        }
        else
        {
            correct++; len1--;
            unknown++; len2--;
        }
    } return(FALSE);
}

BOOLEAN
StrSpellEqu(string1, string2, count)
char *string1, *string2;
int count;
{
    if (StrSpellCheck(string1, string2, count))
        return(TRUE);
    return(StrSpellCheck(string2, string1, count));
}

/*----------------------------------------------------------------
 * GarbageCollect resets the dynamic string save memory pointer to
 *    - start of character memory when 'mode' = REINIT
 *    - start of message specific memory when 'mode' = MESSAGE
 *----------------------------------------------------------------*/

GarbageCollect(mode)
int mode;
{
    switch(mode)
    {
        case REINIT_COLLECT:
            MemoryPointer = 0;
            MessageStart = 0;
            NumPhrase = 0;
            NumPair = 0;
            break;
        case MESSAGE_COLLECT:
            if (MessageStart == 0)
                MessageStart = MemoryPointer;
            MemoryPointer = MessageStart;
            break;
    }
}

PrintUtilStats()
{
    printf("ClassSave = %d, ResumeSave = %d\n", MessageStart,
           MemoryPointer-MessageStart);
}
```

```c
/*----------------------------------------------------------------------
 * Copyright 1988, Resumix, Inc.
 *
 * template.c
 *----------------------------------------------------------------------*/ include <stdio.h> include "includes.h"

DATA_FIELD *Person;
int NumPerson;

WriteTemplates(text_file, bitmap_file)
char *text_file, *bitmap_file;
{
    register int i, j, k, n, ln;
    int uniq, child, grandchild;

for(i = 0, ln=0; i < NumTemplate; i++)
    {
        for(j = 0; j < Template[i].num_instances; j++)
        {
            for(n=0, uniq=1; n<j && uniq; n++)
            {
                for(k=0, uniq=0; k < Template[i].num_slots && !uniq; k++)
                {
                    uniq=strcmp(Entity[Template[i].instance[j].entity[k]].value,
                        Entity[Template[i].instance[n].entity[k]].value);
                }
            }
            if (uniq)
                for(k = 0; k < Template[i].num_slots; k++)
                {
                    child = Template[i].instance[j].entity[k];
                    if (Entity[child].value[0]!='\0')
                    {
                        if (ln==MAX_DATA_FIELDS-1) break;
                        strcpy(Person[ln].title, Template[i].slot[k].name);
                        strcpy(Person[ln].value, Entity[child].value);
                        Person[ln].warning= Entity[child].warning;
                        ln++;
                    }
                }
        }
        Template[i].num_instances = 0;
    }
    strcpy(Person[ln].title, "End");
    NumPerson = ln;
} int
EntityMatch(slot, child, parent_found)
SLOT *slot;
int child;
BOOLEAN parent_found;

{
    int ret_val;

for(ret_val= NO_ENTITY; EntityChild[child] != NO_ENTITY; child++)
    {
        if (parent_found)
        {
            if (Entity[EntityChild[child]].entity_type == slot->entity_type)
            {
                ret_val= EntityChild[child];
                break;
```

```
            }
            else
            {
                ret_val = EntityMatch(slot, Entity[EntityChild[child]].children,
                        TRUE);
            }
        }
        else
        {
            if (Entity[EntityChild[child]].entity_type == slot->parent_type)
            {
                ret_val = EntityMatch(slot, Entity[EntityChild[child]].children,
                        TRUE);
            }
            else
            {
                ret_val = EntityMatch(slot, Entity[EntityChild[child]].children,
                        FALSE);
            }
        }
        if (ret_val!=NO_ENTITY) break;
    }
    return(ret_val);
}

FillTemplates()
{
    register int j;
    int i, entity;
    int instance, child;

for(i = 0; i < NumTemplate; i++)
    {
        instance = 0;
        for(entity = EntityPtr[Template[i].entity_type];
            entity != NO_ENTITY;
            entity = Entity[entity].next)
        {
            if (entity==NULL_ENTITY) break;
            if (instance==MAX_INSTANCES-1) break;
            for(j = 0; j < Template[i].num_slots; j++)
            {
                Template[i].instance[instance].entity[j] =
                    EntityMatch(&Template[i].slot[j], Entity[entity].children,
                        Template[i].slot[j].parent_type==Template[i].entity_type);
            }
            instance++;
        }
        Template[i].num_instances = instance;
        Template[i].current_instance = 0;
    }
}

InitTemplates()
{
    register int i, j;

Person = (DATA_FIELD *)malloc(MAX_DATA_FIELDS * sizeof(DATA_FIELD));
    for(i = 0; i < NumTemplate; i++)
    {
        Template[i].num_instances = 0;
        Template[i].current_instance = 0;
        for(j = 0; j < Template[i].num_slots; j++)
        {
            Template[i].instance[0].entity[j] = NO_ENTITY;
        }
    }
}
```

```c
/*-----------------------------------------------------------------
 * Copyright 1988, Resumix, Inc.
 *
 * prescan.c
 *-----------------------------------------------------------------*/ include <stdio.h>
include <ctype.h>
include "includes.h"

ENTITY *Entity;
int NumEntity;
ENTITY_TYPE *EntityPtr;
LOCATION *WordLoc;
int NumWord;
unsigned short *EntityChild;
int NumEntityChild;

static unsigned char Word[500];
static int Start, End;
static BOOLEAN Warning;

static BOOLEAN FirstNumWordError;
static BOOLEAN FirstNumEntityError;

static
BOOLEAN
GetWord(pointer)
unsigned char **pointer;
{
    register unsigned char *ptr, *word;
    int i, len, is_alpha, error_code;

/* while skipping over blank space */
    for(ptr = *pointer; DocumentMap[*ptr] == 0; ptr++)
    {
        Warning = FALSE;
/*      if a bad character is encountered */
        Warning = *ptr >= 0x80;
/*      if white space character is non blank */
        if (InsideMap[*ptr] > ' ')
        {
/*          save the character as a word */
            AddEntity(InsideMap[*ptr], NO_PHRASE, Ascii[*ptr], NumWord, NumWord,
                    NO_ENTITY, Warning);
            AddWordLoc( ptr - Message, ptr - Message);
        }
/*      else if white space character is a new line */
        else if (*ptr == '\n')
        {
/*          add new line as a word */
            AddEntity(LINE_END, NO_PHRASE, "", NumWord, NumWord,
                    NO_ENTITY, Warning);
/*          remember where the word came from in the resume */
            AddWordLoc( ptr - Message, ptr - Message);
        }

}
/* if the end of the document has been reached, kick out */
    if ((*ptr == '\0') || (*ptr == 0x80)) return(FALSE);
/* prepare to parse the word */
    word = Word;
    Start = ptr - Message;
/* remember whether the word starts with an alpha character */
    is_alpha = AlphaMap[*ptr];
/* for each character in the current word */
    while(DocumentMap[*ptr] > 1)
    {
```

```
        Warning |= *ptr > 0x80;
/*      if type has changed between alpha and numeric, break the word */
        if (is_alpha && NumMap[*ptr])
            break;
        else if (!is_alpha && AlphaMap[*ptr])
            break;
/* put current character into word being built */
        *word++ = InsideMap[*ptr++];
    }
/* remember where word ended */
    End = (ptr - 1) - Message;
    *word = '\0';
    *pointer= ptr;
    return(TRUE);
}

AddEntity(type, phrase, value, start, end, children, warning)
int type;
unsigned short phrase;
char *value;
unsigned short start, end;
int children;
BOOLEAN warning;
{
    register int i;
    register unsigned short *before;

for(i = EntityPtr[type]; i != NO_ENTITY; i = Entity[i].next)
    {
        if (start==Entity[i].start && end==Entity[i].end &&
                strcmp(value, Entity[i].value)==0)
            return;
    } ifdef DEBUG
    if (type >= FIRST_CLASS)
    {
        if (ClassList[type-FIRST_CLASS].class_syn == TYPE_CLASS)
            printf("Class %-15s %4d %4d %s\n", ClassList[type-FIRST_CLASS].name,
                start, end, value);
        else
            printf("Syn   %-15s %4d %4d\n", ClassList[type-FIRST_CLASS].name,
                start, end);
    }
endif if (NumEntity == MAX_ENTITY)
    {
        if (FirstNumEntityError)
        {
            ExtractWarning("Exceeded maximum number of entities");
            FirstNumEntityError = FALSE;
        }
        return;
    }
/* sort entity based on start position */
    before = &EntityPtr[type];
    for(i = EntityPtr[type]; Entity[i].start < start; i = Entity[i].next)
    {
        before = &Entity[i].next;
    }
    Entity[NumEntity].next = *before;
    *before = NumEntity;

Entity[NumEntity].phrase = phrase;
    Entity[NumEntity].value = value;
    Entity[NumEntity].start = start;
    Entity[NumEntity].end = end;
```

```
      Entity[NumEntity].children = children;
      Entity[NumEntity].entity_type = type;
      Entity[NumEntity].warning = warning;
      NumEntity++;
}

AddWordLoc(start, end)
int start, end;
{
    if (NumWord == MAX_RES_WORDS)
    {
        if (FirstNumWordError)
        {
            ExtractWarning("Exceeded maximum number of words in resume");
            FirstNumWordError = FALSE;
        }
        return;
    }
    WordLoc[NumWord].start = start;
    WordLoc[NumWord].end = end;
    NumWord++;
} static
GetString()
{
    register int hash, i;

hash = HashString(Word);
    for(i = WordHashTable[hash]; i != NO_WORD; i = WordIndex[i].next_word)
    {
        if (StrEquiv(&WordList[WordIndex[i].word], Word))
            AddEntity(WordIndex[i].entity_type, NO_PHRASE, &WordList[WordIndex[i].word],
                    NumWord, NumWord, NO_ENTITY, Warning);
    } for(i = 0; i < NumStarWords; i++)
    {
        if (StrStarEqu(&WordList[WordIndex[StarWord[i]].word], Word))
            AddEntity(WordIndex[StarWord[i]].entity_type, NO_PHRASE,
                    &WordList[WordIndex[StarWord[i]].word],
                    NumWord, NumWord, NO_ENTITY, TRUE);
    } for(i = 0; i < NumSpellWords; i++)
    {
        if (StrSpellEqu(&WordList[WordIndex[SpellWord[i]].word], Word,
                    WordIndex[SpellWord[i]].error_count))
            AddEntity(WordIndex[SpellWord[i]].entity_type, NO_PHRASE,
                    &WordList[WordIndex[SpellWord[i]].word],
                    NumWord, NumWord, NO_ENTITY, TRUE);
    }
} static
GetNumber()
{
    register int value;
    register unsigned char *num, *str;

value = 0;
    for(str = Word; isdigit(*str); str++)
        value = value * 10 + (*str - '0');
    if (*str == '\0')
    {
        str = (unsigned char *)StrSave(Word);
        switch(strlen(Word))
```

```
        {
        case 1:
            AddEntity(NUMBER1_ENTITY, NO_PHRASE, str, NumWord, NumWord,
                     NO_ENTITY, Warning);
            break;
        case 2:
            AddEntity(NUMBER2_ENTITY, NO_PHRASE, str, NumWord, NumWord,
                     NO_ENTITY, Warning);
            break;
        case 3:
            AddEntity(NUMBER3_ENTITY, NO_PHRASE, str, NumWord, NumWord,
                     NO_ENTITY, Warning);
            break;
        case 4:
            AddEntity(NUMBER4_ENTITY, NO_PHRASE, str, NumWord, NumWord,
                     NO_ENTITY, Warning);
            break;
        case 5:
            AddEntity(NUMBER5_ENTITY, NO_PHRASE, str, NumWord, NumWord,
                     NO_ENTITY, Warning);
            break;
        }
        AddEntity(NUMBER_ENTITY, NO_PHRASE, str, NumWord, NumWord,
                 NO_ENTITY, Warning);
    }
}

PreScanMessage()
{
    unsigned char *pointer;
    register int i;
/***
    FILE *blk;

blk = fopen("Block.out", "w");
    fprintf(blk, "%s", message);
    fclose(blk);
***/
    pointer = Message;
    NumEntity = 1;
    NumEntityChild = 1;
    EntityChild[NO_ENTITY] = NO_ENTITY;
    Entity[NO_ENTITY].start = SHORT_INFINITY;
    Entity[NO_ENTITY].value = "";
    NumWord = 0;
    for(i = 0; i < MAX_ENTITY_TYPE; i++)
        EntityPtr[i] = NO_ENTITY;
    AddEntity(DOCUMENT_BEGIN, NO_PHRASE, "", 0, 0, NO_ENTITY, FALSE);
    AddWordLoc(0, 0);
    while(GetWord(&pointer))
    {
        GetString();
        GetNumber();
        AddWordLoc(Start, End);
    }
    AddEntity(DOCUMENT_END, NO_PHRASE, "", NumWord, NumWord, NO_ENTITY, FALSE);
    AddWordLoc(SHORT_INFINITY, SHORT_INFINITY);
    for(i = 0; i < NumClass; i++)

ScanForClasses(i);
        if (ClassList[i].action!=NULL)
        {
            (ClassList[i].action)(&ClassList[i]);
        }
    }
/***
    PrintPrescanStats();
    PrintUtilStats();
```

```c
***/
}

InitPrescan()
{
    Entity = (ENTITY *)malloc(MAX_ENTITY * sizeof(ENTITY));
    EntityPtr = (ENTITY_TYPE *)malloc(MAX_ENTITY_TYPE * sizeof(ENTITY_TYPE));
    WordLoc = (LOCATION *)malloc(MAX_RES_WORDS * sizeof(LOCATION));
    EntityChild = (unsigned short *)malloc(MAX_ENTITY_CHILD * sizeof(unsigned
                                                                    short)

FirstNumWordError = TRUE;
    FirstNumEntityError = TRUE;
    InitAction();
}

PrintPrescanStats()
{
    printf("NumEntity = %d\n", NumEntity);
    printf("NumEntityChild = %d\n", NumEntityChild);
    printf("NumWordInResume = %d\n", NumWord);
}

/*-------------------------------------------------------------------------
 * Copyright 1988, 1989, Resumix, Inc.
 *
 * readdefs.c
 *-------------------------------------------------------------------------*/
#include "../EXTRACT/includes.h"

extern char *ClassMemory;
extern long NumMemory;

define NUM_HASH 1024 long Errors = 0;

static long FirstLocalSymbol;
static long SymTabSize, LocalSymTabSize;
Symbol GlobalSymbolTable[SYMTAB_SIZE];
long LocalSymbolTable[LOCAL_SYMTAB_SIZE];
char FileName[50];

static
FatalError(format, arg1, arg2, arg3, arg4, arg5)
char *format;
int arg1, arg2, arg3, arg4, arg5;
{
    fprintf(stderr, format, arg1, arg2, arg3, arg4, arg5);
    exit(1);
}

CheckErrors(format, arg1, arg2, arg3, arg4, arg5)
char *format;
int arg1, arg2, arg3, arg4, arg5;
{
    fprintf(stderr, format, arg1, arg2, arg3, arg4, arg5);
    Errors++;
    if (Errors > 20)
    {
        fprintf(stderr, "Exceeded 20 errors. Good bye.\n");
        exit(1);
    }
} char *
ClassStrSave(string)
char *string;
```

```
{
    char *str;

if (string == NULL) return(ClassMemory);
    str = &ClassMemory[NumMemory];
    NumMemory += strlen(string) + 1;
    if (NumMemory >= MAX_CLASS_MEMORY)
    {
        FatalError("Exceeded maximum class memory");
    }
    strcpy(str, string);

return(str);
}

/* look for keywords in first column of .def files */
static int
CheckType(type)
char *type;
{
    if (StrEquiv("class", type)) return(DEF_CLASS);
    if (StrEquiv("syn", type)) return(DEF_SYNONYM);
    if (StrEquiv("action", type)) return(DEF_ACTION);
    if (StrEquiv("template", type)) return(DEF_TEMPLATE);
    if (StrEquiv("slot", type)) return(TEMPLATE_LINE);
    if (StrEquiv(";", type)) return(COMMENT);
    if (StrEquiv("#uses", type)) return(USES_LINE);
    return(UNKNOWN);
}

/* special classes define with hard code */
static CONVERTER SpecialClassList[] =
{
    "EOD", DOCUMENT_END,
    "BOD", DOCUMENT_BEGIN,
    "EOL", LINE_END,
    "NUMBER", NUMBER_ENTITY,
    "NUMBER1", NUMBER1_ENTITY,
    "NUMBER2", NUMBER2_ENTITY,
    "NUMBER3", NUMBER3_ENTITY,
    "NUMBER4", NUMBER4_ENTITY,
    "NUMBER5", NUMBER5_ENTITY,
    NULL, 0
};

/* find the entity type for 'name' */
ENTITY_TYPE
FindClass(name, class_type)
char *name;
char class_type;
{
    long first_symbol, j;
    register CLASS *class, *end;
    register char type;

type = class_type;
    if ((type == TYPE_CLASS) &&
        (j = ConvertString(name, SpecialClassList)) > 0)
      return(j);

end = &ClassList[NumClass];
    for(class = &ClassList[FirstLocalSymbol]; class < end; class++)
    {
        if ((class->class_syn == type) &&
            (strcmp(class->name, name) == 0))
          return(class->entity_type);
    }
```

```
    for(j = 0; j < LocalSymTabSize; j++)
    {
        first_symbol = GlobalSymbolTable[LocalSymbolTable[j]].first_symbol;
        end = &ClassList[GlobalSymbolTable[LocalSymbolTable[j]].num_symbols + first_s
        for(class = &ClassList[first_symbol]; class < end; class++)
        {
            if ((class->class_syn == type) &&
                    (strcmp(class->name, name) == 0))
                return(class->entity_type);
        }
    }
    return(NO_CLASS);
}

CLASS *
StartClass(class_name, class_type)
char *class_name;
char class_type;
{
    if (NumClass==MAX_CLASS)
        FatalError("Exceeded maximum number of classes");
    switch(class_type)
    {
    case DEF_CLASS:
        ClassList[NumClass].class_syn = TYPE_CLASS;
        if (FindClass(class_name, TYPE_CLASS)!=NO_CLASS)
            CheckErrors("%s:\tRedefining class    : %s\n", FileName, class_name);
        break;
    case DEF_SYNONYM:
        ClassList[NumClass].class_syn = TYPE_SYNONYM;
        if (FindClass(class_name, TYPE_SYNONYM)!=NO_CLASS)
            CheckErrors("%s:\tRedefining synonym  : %s\n", FileName, class_name);
        break;
    }
    ClassList[NumClass].name = ClassStrSave(class_name);
    ClassList[NumClass].num_phrases = 0;
    ClassList[NumClass].first_phrase = NumPhrase;
    ClassList[NumClass].entity_type = NumClass + FIRST_CLASS;
    ClassList[NumClass].action = NULL;
    ClassList[NumClass].action_name = NULL;
    return(&ClassList[NumClass++]);
} static CONVERTER OperatorPairs[] =
{
    "N", NOT_OPERATOR,
    "I", IGNORE_OPERATOR,
    "O", OPTIONAL_OPERATOR,
    "*", REMEMBER_OPERATOR,
    "B", BEFORE_OPERATOR,
    "F", FIRST_OPERATOR,
    "W", WITHIN_OPERATOR,
    "C", CONTAINS_OPERATOR,
    "S", STOP_OPERATOR,
    "M", MERGE_OPERATOR,
    NULL, NO_OPERATOR
};

int
ConvertOperator(string)
char *string;
{
    register char *ptr;
    long result, n;
    char operator[32];

result = NO_OPERATOR;
    while(*string != '\0')
    {
```

```
        while(*string == ' ')
            string++;
        if (*string == '\0') break;
        if ((*string >= '0') && (*string <= '9'))
        {
            for(n=0; *string > ' '; string++)
                n= 10*n+ (*string-'0');
            result = (n & NUMBER_MASK) | (result & ~NUMBER_MASK);
        }
        else
        {
            ptr = operator;
            while(*string > ' ')
                *ptr++ = *string++;
            *ptr = '\0';
            result |= ConvertString(operator, OperatorPairs);
        }
    }
    return(result);
}

ENTITY_TYPE
AddWord(word)
char *word;
{
    register long ind, hash;
    long i, len;
    BOOLEAN star;
    char error_count;

star = FALSE;
    error_count = 0;
    len = strlen(word);
    for(i = 1; i < len; i++)
    {
        if (word[i] == ERROR_CHAR)
        {
            word[i++] = '\0';
            error_count = word[i] - '0';
        }
        if (word[i] == STAR_CHAR)
        {
            word[i] = '\0';

star = TRUE;
        }
    } hash = HashString(word);
    for(ind = WordHashTable[hash]; ind != NO_WORD; ind = WordIndex[ind].next_word)
    {
        if ((WordIndex[ind].star == star) &&
            (WordIndex[ind].error_count == error_count) &&
            (StrEqu(word, &WordList[WordIndex[ind].word])))
        {
            return(WordIndex[ind].entity_type);
        }
    }
    ind = NumWords++;
    if (ind==MAX_WORDS)
        FatalError("Exceeded maximum dictionary words");
    WordIndex[ind].next_word = WordHashTable[hash];
    WordHashTable[hash] = ind;
    WordIndex[ind].entity_type = ind + FIRST_WORD;
    WordIndex[ind].word = NumWordChars;
    WordIndex[ind].star = star;
    WordIndex[ind].error_count = error_count;
    while(*word != '\0')
```

```
         WordList[NumWordChars++] = *word++;
      if (NumWordChars >= (MAX_WORD_CHARS - 50))
         FatalError("Exceeded maximum dictionary chars");
      WordList[NumWordChars++] = '\0';
      if (star)
      {
         StarWord[NumStarWords++] = ind;
         if (NumStarWords >= MAX_STAR_WORDS)
            FatalError("Exceeded maximum number of star words");
      }
      if (error_count > 0)
      {
         SpellWord[NumSpellWords++] = ind;
         if (NumSpellWords >= MAX_SPELL_WORDS)
            FatalError("Exceeded maximum number of spell words");
      }
      return(WordIndex[ind].entity_type);
}

PutInDictionary(text, phrase)
char *text;
PHRASE *phrase;
{
   register long i;
   register char *ptr;
   char string[128], error_msg[80];
   long temp, class, special;
   unsigned char type;
   BOOLEAN is_alpha;
   char *str, *start, save;

ptr = text;

PhrasePair[NumPair].operator = NO_OPERATOR;
while(*ptr != '\0')
{
   for(special=0; !special && DocumentMap[*ptr] == 0; )
   {
      switch ( *ptr)
      {
      case SYNONYM_CHAR:
      case CLASS_CHAR:
      case OPERATOR_CHAR:
         special= 1;
         break;
      default:
         if (*ptr > ' ')
         {
            if (*ptr==ESCAPE_CHAR && *(ptr+1)!='\0') ptr++;
            phrase->num_pairs++;
            PhrasePair[NumPair++].entity_type = *ptr;
            if (NumPair==MAX_PHRASE_PAIR)
               FatalError("Exceeded maximum number of phrase pairs");
            PhrasePair[NumPair].operator = NO_OPERATOR;
         }
         ptr++;
         break;
      }
   }
   if (*ptr == 0) break;
   if ((*ptr == CLASS_CHAR) || (*ptr == SYNONYM_CHAR))
   {
      type = *ptr++;
      if (*ptr == '(')
      {
         ptr++;
         for(i = 0; *ptr != ')'; i++, ptr++)
            string[i] = *ptr;
         ptr++;
```

```c
        }
        else
        {
            for(i = 0; (*ptr != ' ') && (*ptr != '\0'); i++, ptr++)
                string[i] = *ptr;
        }
    }
    else if (*ptr == OPERATOR_CHAR)
    {
        type = *ptr++;
        for(i = 0; *ptr != ']'; ptr++)
            string[i++] = *ptr;
        ptr++;
    }
    else
    {
        type = 0;
        for(i = 0; PhraseMap[*ptr] > 1; i++, ptr++)
        {
            string[i] = PhraseMap[*ptr];
        }
    }
}
string[i] = '\0';

switch(type)
{
    case SYNONYM_CHAR:
    case CLASS_CHAR:
        phrase->num_pairs++;
        class = FindClass(string,
                    (type==CLASS_CHAR) ? TYPE_CLASS : TYPE_SYNONYM);
        if (class==NO_CLASS)
        {
            if (type == CLASS_CHAR)
                CheckErrors("%s:\tUndefined class    : %s\n", FileName, string);
            else
                CheckErrors("%s:\tUndefined synonym  : %s\n", FileName, string);
        }
        PhrasePair[NumPair++].entity_type = class;
        if (NumPair==MAX_PHRASE_PAIR)
            FatalError("Exceeded maximum number of phrase pairs");
        PhrasePair[NumPair].operator = NO_OPERATOR;
        break;
    case OPERATOR_CHAR:
        PhrasePair[NumPair].operator = ConvertOperator(string);
        break;
    default:
        start = string;
        is_alpha = AlphaMap[*start];
        for(str = string; *str != '\0'; str++)
        {
            if (is_alpha && NumMap[*str])
            {
                if (*(str-1) == ERROR_CHAR) continue;
                save = *str;
                *str = '\0';
                phrase->num_pairs++;
                PhrasePair[NumPair++].entity_type = AddWord(start);
                if (NumPair==MAX_PHRASE_PAIR)
                    FatalError("Exceeded maximum number of phrase pairs");
                PhrasePair[NumPair].operator = NO_OPERATOR;
                start = str;
                *str = save;
                is_alpha = AlphaMap[*start];
            }
            if (!is_alpha && AlphaMap[*str])
            {
                save = *str;
                *str = '\0';
```

```
                phrase->num_pairs++;
                PhrasePair[NumPair++].entity_type = AddWord(start);
                if (NumPair==MAX_PHRASE_PAIR)
                    FatalError("Exceeded maximum number of phrase pairs");
                PhrasePair[NumPair].operator = NO_OPERATOR;
                start = str;
                *str = save;

is_alpha = AlphaMap[*start];
                }
            }
            phrase->num_pairs++;
            PhrasePair[NumPair++].entity_type = AddWord(start);
            if (NumPair==MAX_PHRASE_PAIR)
                FatalError("Exceeded maximum number of phrase pairs");
            PhrasePair[NumPair].operator = NO_OPERATOR;
            break;
        }
    }
    i = phrase->first_pair;
    if (PhrasePair[i].operator & NOT_OPERATOR)
    {
        temp = PhrasePair[i + 1].entity_type;
        PhrasePair[i + 1].entity_type = PhrasePair[i].entity_type;
        PhrasePair[i].entity_type = temp;
        PhrasePair[i + 1].operator |= NOT_OPERATOR;
        PhrasePair[i].operator = NO_OPERATOR;
        PhrasePair[i + 1].operator ^= NUMBER_MASK;   /* negate repeat count */
    }
}

AddPhrase(text, class)
char *text;
CLASS *class;
{
    register char *ptr;

class->num_phrases++;
    if (NumPhrase==MAX_PHRASE)
        FatalError("Exceeded maximum number of phrases");
    Phrase[NumPhrase].num_pairs = 0;
    Phrase[NumPhrase].first_pair = NumPair;

while(*text <= ' ')
        text++;
    for(ptr = text; *ptr >= ' '; ptr++);
    *ptr = '\0';

PutInDictionary(text, &Phrase[NumPhrase]);
    NumPhrase++;
}

BOOLEAN
LineIsWhite(line)
char *line;
{
    while((*line > '\0') && (*line <= ' '))
        line++;
    return(*line == '\0');
}

ReadClasses(def_path, fid)
char def_path[];
FILE *fid;
```

```
{
    char line[512], type[32], args[256], class_type;
    CLASS *class;

while(fgets(line, 256, fid) != NULL)
    {
        if (LineIsWhite(line)) continue;
        while(line[strlen(line)-2] == '$')
            fgets(&line[strlen(line)-2], 256, fid);
        line[strlen(line) - 1] = '\0'; /* remove \n */
        args[0] = '\0';
        sscanf(line, "%s %[^\n]", type, args);
        class_type= ((line[0] == ' ') || (line[0] == '\t')) ? PHRASE_LINE : CheckType
        switch(class_type)
        {
            case DEF_CLASS:
            case DEF_SYNONYM:
                if (strlen(args) > 19)
                    CheckErrors("%s:\tName exceeds 19 char: %s\n", FileName, line);
                class = StartClass(args, class_type);
                break;
            case DEF_ACTION:
                AddAction(FileName, class, args);
                break;
            case DEF_TEMPLATE:
                StartTemplate(args);
                break;
            case TEMPLATE_LINE:
                AddTemplateLine(args);
                break;
            case PHRASE_LINE:
                AddPhrase(line, class, fid);
                break;
            case USES_LINE:
                AddLocal(args);
                break;
            case COMMENT:
                break;
            case UNKNOWN:
                CheckErrors("%s:\tSyntax error          : %s\n", FileName, line);
                break;
        }
    }
}

InitDictionary()
{
    register int i;

WordList = (char *)malloc(MAX_WORD_CHARS);
    for(i = 0; i < NUM_HASH; i++)
        WordHashTable[i] = NO_WORD;
    NumWords = 0;
    NumWordChars = 0;
    NumStarWords = 0;
    NumSpellWords = 0;

WordIndex = (WORD_INDEX *)malloc(MAX_WORDS * sizeof(WORD_INDEX));
    StarWord = (unsigned short *)malloc(MAX_STAR_WORDS * sizeof(unsigned short));
}

ReadClassDefs(def_path, class_file)
char def_path[], class_file[];
{
    char path[80];
    FILE *fid, *class_fd;

ClassMemory = (char *)malloc(MAX_CLASS_MEMORY * sizeof(char));
    ClassMemory[0] = '\0';
    NumMemory = 1;
    ClassList = (CLASS *)malloc(MAX_CLASS * sizeof(CLASS));
    Template = (TEMPLATE *)malloc(MAX_TEMPLATE * sizeof(TEMPLATE));
```

```
    Phrase = (PHRASE *)malloc(MAX_PHRASE * sizeof(PHRASE));
    PhrasePair = (PHRASE_PAIR *)malloc(MAX_PHRASE_PAIR * sizeof(PHRASE_PAIR));
    InitDictionary();
    NumClass = 0;
    NumTemplate = 0;
    SymTabSize= 0;
    strcpy(path, def_path);
    strcat(path, class_file);
    fid= fopen(path, "r");
    if (fid == NULL)
        FatalError("Can't open %s\n", class_file);
    while(fscanf(fid, "%s", FileName) == 1)
    {
        strcpy(path, def_path);
        strcat(path, FileName);
        class_fd = fopen(path, "r");
        if (class_fd == NULL)
            FatalError("%s:\tCan't open file     : %s\n", class_file, FileName);
        LocalSymTabSize = 1;
        FirstLocalSymbol= NumClass;
        ReadClasses(def_path, class_fd);
        fclose(class_fd);
        AddGlobal(GetFileName(FileName));
    }
    fclose(fid);
    if (Errors > 0)
    {
       exit(1);
    }
    InitTemplates();
    return(0);
}

AddGlobal(class_name)
char class_name[];
{
    strcpy(GlobalSymbolTable[SymTabSize].def_file_name, class_name);
    GlobalSymbolTable[SymTabSize].first_symbol= FirstLocalSymbol;
    GlobalSymbolTable[SymTabSize].num_symbols=
        NumClass-GlobalSymbolTable[SymTabSize].first_symbol;
    SymTabSize++;
}

AddLocal(def_name)
char def_name[];
{
    char def_file[80], error_msg[80];
    long i;

sscanf( def_name, "%s", def_file);
    for(i=0; i<SymTabSize; i++)
    {
        if (StrEqu(GlobalSymbolTable[i].def_file_name, def_file))
        {
            LocalSymbolTable[LocalSymTabSize++]= i;
            return;
        }
    }
    FatalError("%s\tUndefined file     : %s\n", FileName, def_name);
}

StartTemplate(rest_of_line)
char rest_of_line[];
{
    char name[32];

if (NumTemplate==MAX_TEMPLATE)
        FatalError("Exceeded maximum number of templates");
```

```c
    sscanf(rest_of_line, "%s", name);
    Template[NumTemplate].num_instances = 0;
    Template[NumTemplate].current_slot = 0;
    Template[NumTemplate].name = ClassStrSave(name);
    Template[NumTemplate].entity_type = FindClass(name, TYPE_CLASS);
    Template[NumTemplate].num_slots = 0;
    NumTemplate++;
}

AddTemplateLine(line)
char line[];
{
    long slot, temp;
    char name[32], class1[32], class2[32];

temp= NumTemplate-1;
    slot= Template[temp].num_slots;

if (slot==MAX_SLOTS)
        FatalError("Exceeded maximum number of slots");
    sscanf(line, "%s %s", name, class1);
    Template[temp].slot[slot].name = ClassStrSave(name);
    Template[temp].slot[slot].entity_type = FindClass(class1, TYPE_CLASS);
    if ( Template[temp].slot[slot].entity_type == NO_CLASS)
        CheckErrors("%s:\tUndefined Template Slot : %s \n", name, class1);
    Template[temp].slot[slot].parent_type = Template[temp].entity_type;
    Template[temp].num_slots++;
}

PrintClassStats()
{
    printf("NumMemory = %d\n", NumMemory);
    printf("NumClass = %d\nNumPhrase = %d\nNumPairs = %d\n",
           NumClass, NumPhrase, NumPair);
    printf("NumWords = %d\nNumWordChars = %d\n", NumWords, NumWordChars);
    printf("NumTemplate = %d\n", NumTemplate);
}

/*-------------------------------------------------------------------
 * Copyright 1988, Resumix, Inc.
 *
 * post.c
 *------------------------------------------------------------------*/
include <stdio.h>
include <ctype.h> include "includes.h"
include "../DB/dbase.h"
#include "../DB/dbresume.h"

static char NameMap[] =
{
    '?','?','?','?','?','?','?','?','?','?','?','?','?','?','?','?',
    '?','?','?','?','?','?','?','?','?','?','?','?','?','?','?','?',
    ' ','?','"','?','?','?','?','\'','?','?','?','?',',','-','.','?',
    '0','1','2','3','4','5','6','7','8','9','?','?','?','?','?','?',
    '?','A','B','C','D','E','F','G','H','I','J','K','L','M','N','O',
    'P','Q','R','S','T','U','V','W','X','Y','Z','?','?','?','?','?',
    '?','a','b','c','d','e','f','g','h','i','j','k','l','m','n','o',
    'p','q','r','s','t','u','v','w','x','y','z','?','?','?','?','?'
};

static char *BadNames[]=
{
    "OF",
    "FOR",
    "RESUME",
    "R E S U M E",
    "NAME"
};
```

```
static
char *
NextWord(ptr)
char *ptr;
{
    for(ptr++; (*ptr != ' ') && (*ptr != '\0'); ptr++);
    return(++ptr);
} static
char *
PreviousWord(ptr)
char *ptr;
{
    for(ptr--; (*ptr != ' ') && (*ptr != '\0'); ptr--);
    return(++ptr);
} char *RemoveLeadingAndTrailingSpace( name)
char *name;
{
    char *end;

while (isspace(*name)) name++;
    end=name+strlen(name);
    do {
       end--;
       if (end<name) break;
    } while (isspace(*end));
    *(end+1)= '\0';
    return( name);
} static ParseName( line, res)
char *line;
RESUME_STRUCT *res;
{
    int i, j, ind, spaces;
    char name[100], *ret_name;
    char *first, *middle, *last, *title, *trailer;
    BOOLEAN warning;
    static char *titles[] = {"DR.", "MR.", "MS.", "MRS.", "MISS"};
    static char *trailers[] = {"JR", "SR", "II", "III", "IV", "V", "VI"};
#define NUM_TITLES 5
#define NUM_TRAILERS 7
    char *ptr;

warning = FALSE;
    name[0] = '\0';
    name[1] = '\0';

if (SpacedName(line))
        ImplodeName(line);
    FixCaseToUpper(line);
    for(i=0; i<sizeof(BadNames)/sizeof(char *); i++)
    {
        if (strncmp(line, BadNames[i], strlen(BadNames[i]))==0
            && !isalpha(line[strlen(BadNames[i])]))
        {
            break;
        }
    }
    if (i == sizeof(BadNames)/sizeof(char *))
    {
        ret_name = line;
        strcpy(&name[1], line);
        for(j = 1; name[j] != '\0'; j++)
        {
```

```
            if (NameMap[name[j]] == '?')
            {
                warning = TRUE;
                break;
            }
        }
        spaces = 0;
        for(j = 1; name[j] != '\0'; j++)
            if (name[j] == ' ') spaces++;
        if (spaces > 5)
            warning = TRUE;
} if (name[1] == '\0') return(0);

title = name;
first = &name[1];
middle = NextWord(first);
last = PreviousWord(&name[strlen(first)]);
trailer = &name[strlen(first) + 2];
*trailer = '\0';
for(i = 0; i < NUM_TITLES; i++)
{
    if (strncmp(first, titles[i], strlen(titles[i])) == 0)
    {
        title = first;
        first = NextWord(first);
        middle = NextWord(first);
        break;
    }
}
for(ptr = middle; *ptr != '\0'; ptr++)
{
    if (*ptr == ',')
    {
        *ptr = '\0';
        trailer = NextWord(ptr);
        last = PreviousWord(ptr);
        break;
    }
}
for(i = 0; i < NUM_TRAILERS; i++)
{
    if (StrEqu(trailers[i], last))
    {
        trailer = last;
        last = PreviousWord(trailer-1);
        break;
    }
}
*(first-1) = '\0';
*(middle-1) = '\0';
if (middle >= last)
    middle = "";
else
    *(middle-1) = '\0';
*(last-1) = '\0';
*(trailer-1) = '\0';
first= RemoveLeadingAndTrailingSpace(first);
last= RemoveLeadingAndTrailingSpace(last);
strncpy(res->first_name, first, NAME_LENGTH);
strncpy(res->middle_name, middle, NAME_LENGTH);
strncpy(res->last_name, last, NAME_LENGTH);
strncpy(res->prefix_name, title, sizeof(res->prefix_name));
strncpy(res->postfix_name, trailer, sizeof(res->postfix_name));
res->first_name[NAME_LENGTH-1] = '\0';
res->middle_name[NAME_LENGTH-1] = '\0';
```

```c
        res->last_name[NAME_LENGTH-1] = '\0';
        res->prefix_name[sizeof(res->prefix_name)-1] = '\0';
        res->postfix_name[sizeof(res->postfix_name)-1] = '\0';
        return(1);
} char *
PostProcessName(res, ln)
RESUME_STRUCT *res;
int *ln;
{
    char *ret_name;

while(StrEqu(Person[*ln].title, "Applicant"))
    {
        if (ParseName( Person[*ln].value, res)) {
            ret_name = Person[*ln].value;
            while(StrEqu(Person[*ln].title, "Applicant"))
                (*ln)++;
            return( ret_name);
        } else {
            (*ln)++;
        }
    }
    return(NULL);
} static char *AddressTitle[]=
{
    "Address_type",
    "Address",
    "City",
    "State",
    "Zip",
};
#define NUM_ADDR_TITLE 5

PostProcessAddress(res, ln)
RESUME_STRUCT *res;
int *ln;
{
    int i, j;
    int type[NUM_ADDR_TITLE][20];
    int ntype[NUM_ADDR_TITLE];

res->num_address = 0;
    for(i = 0; i < NUM_ADDR_TITLE; i++)
        ntype[i]= 0;
/* while working on an address set */
    while(TRUE)
    {
        for(i = 0; i < NUM_ADDR_TITLE; i++)
        {
            if (StrEqu(Person[*ln].title, AddressTitle[i]))
            {
                if ((res->num_address == NUM_ADDRESS) && (i == 1))

{
                    while(TRUE)
                    {
                        for(i = 0; i < NUM_ADDR_TITLE; i++)
                        {
                            if (StrEqu(Person[*ln].title, AddressTitle[i]))
                                break;
                        }
                        if (i == NUM_ADDR_TITLE) return;
                        (*ln)++;
                    }
```

```
            }
            printf("%s: %s\n", Person[*ln].title, Person[*ln].value);
            type[i][ntype[i]++] = *ln;
            switch(i)
            {
            case 0: /* Address_type */
                break;
            case 1: /* Address */
                res->num_address++;
                Address[res->num_address-1].type = NONE;
                if (ntype[0] >= ntype[1])
                {
                    Address[res->num_address-1].type = Person[type[0][ntype[1]-1]].va
                }
                FixCaseToMixed(Person[*ln].value);
                strncpy(Address[res->num_address-1].street, Person[*ln].value,sizeof
                Address[res->num_address-1].street[sizeof(Address[0].street)-1] = '\
                break;
            case 2: /* City */
                FixCaseToMixed(Person[*ln].value);
                strncpy(Address[res->num_address-1].city_state_zip, Person[*ln].valu
                Address[res->num_address-1].city_state_zip[16] = '\0';
                break;
            case 3: /* State */
                strcat(Address[res->num_address-1].city_state_zip, ", ");
                strcat(Address[res->num_address-1].city_state_zip, Person[*ln].value
                break;
            case 4: /* Zip */
                strcat(Address[res->num_address-1].city_state_zip, " ");
                strcat(Address[res->num_address-1].city_state_zip, Person[*ln].value
                break;
            }
            break;
        }
    }
    if (i == NUM_ADDR_TITLE) break;
    (*ln)++;

}
}

IsAddrTitle(s)
char s[];
{
    register char *ptr;
    for(ptr = AddressTitle[0]; *ptr != NULL; ptr++)

{
        if (strncmp(s, *ptr, strlen(*ptr))==0)
            return(TRUE);
    }
    return(FALSE);
} static char *PhoneTitles[] =
{
    "Home_Phone",
    "Work_Phone",
    "Message_Phone"
};
#define NUM_PHONE_TITLES 3

ParsePhone(line, phone)
char *line;
PHONE_STRUCT *phone;
{
    char arg[4][10];
    long narg;
```

```c
        narg = sscanf(line, "%s %s %s ext %s", arg[0], arg[1], arg[2], arg[3]);
        if (narg == 4)
        {
            strcpy(phone->area_code, arg[0]);
            strcpy(phone->number, arg[1]);
            strcat(phone->number, "-");
            strcat(phone->number, arg[2]);
            strcpy(phone->ext, arg[3]);
        }
        else if (narg == 3)
        {
            if (strlen(arg[1]) == 3)
            {
                strcpy(phone->area_code, arg[0]);
                strcpy(phone->number, arg[1]);
                strcat(phone->number, "-");
                strcat(phone->number, arg[2]);
            }
            else
            {
                strcpy(phone->number, arg[0]);
                strcat(phone->number, "-");
                strcat(phone->number, arg[1]);
                strcpy(phone->ext, arg[2]);
            }
        }
        else
        {
            strcpy(phone->number, arg[0]);
            strcat(phone->number, "-");
            strcat(phone->number, arg[1]);
        }
    }
PostProcessPhone(res, ln)
RESUME_STRUCT *res;
int *ln;
{
    int i;

res->num_phone = 0;
    while(TRUE)
    {
        for(i = 0; i < NUM_PHONE_TITLES; i++)
            if (StrEqu(Person[*ln].title, PhoneTitles[i])) break;
        if (i == NUM_PHONE_TITLES) break;
        if (res->num_phone < NUM_PHONE)
        {
            ParsePhone(Person[*ln].value, &Phone[res->num_phone]);
            Phone[res->num_phone].type = Person[*ln].title[0];
            res->num_phone++;
        }
        (*ln)++;
    }
}

ParseDegree(line, degree)
char *line;
DEGREE_STRUCT *degree;
{
    register int i, j;
    char level[16], field[21], school[21], due[8], year[8], gpa[16];

due[0] = '\0';
    year[0] = '\0';
    sscanf(line, "%[^,],%[^,],%[^,],%[^,],%[^,], %[1234567890.]",
            level, field, school, due, year, gpa);
    if (gpa[0]>'5' || gpa[0]<'2' || gpa[1]!='.')
        gpa[0]= '\0';
    gpa[5] = '\0';
```

```c
      strcpy(degree->level, level);
      strcpy(degree->field, &field[1]);
      strcpy(degree->school, &school[1]);
/*
      if (due[1]!='\0')
         degree->due = TRUE;
      else
         degree->due = FALSE;
*/
      if (year[1] != '\0')
         sscanf(year, "%hd", °ree->year);
      else
         degree->year = NO_YEAR;
      strcpy(degree->gpa, gpa);
}

PostProcessDegree(res, ln)
RESUME_STRUCT *res;
int *ln;

{
   int i;

res->num_degree = 0;
   for (i=0; StrEqu(Person[*ln].title, "Degree"); i++)
   {
      if (i < NUM_DEGREE)
         ParseDegree(Person[*ln].value, &Degree[res->num_degree++]);
      (*ln)++;
   }
}

PostProcessCategory(res, ln, title)
RESUME_STRUCT *res;
int *ln;
char *title;
{
   int i, j;

res->num_category = 0;
   for(i = *ln; StrEqu(Person[i].title, title); i++)
   {
/*    check for a duplicate */
      for(j = 0; j < res->num_category; j++)
         if (strcmp(Category[j].string, Person[i].value)== 0)
            break;
/*    put the unique ones into the data base */
      if ((j == res->num_category) && (j < NUM_CATEGORY))
      {
         strcpy(Category[res->num_category].string, Person[i].value);
         res->num_category++;
      }
   }
   *ln = i;
}

ParseDates(line, job)
char *line;
JOB_STRUCT *job;
{
   char dates[40], title[60], company[60];

title[0]= '\0';
   company[0]= '\0';
   sscanf(line, "%[^,],%[^,],%[^,]", dates, title, company);
   ConvertDateRange(dates, &job->mstart, &job->ystart, &job->mend, &job->yend);
   strncpy(job->title, &title[1], sizeof(job->title)-1);
   job->title[sizeof(job->title)-1]= '\0';
```

```c
    strncpy(job->company, &company[1], sizeof(job->company)-1);
    job->company[sizeof(job->company)-1]= '\0';
}

GetFirstYear( res, job)
RESUME_STRUCT *res;
JOB_STRUCT *job;
{

/* if it was not a summer job */
    if (job->mstart < 12)
/*      find start year for the first job */
        res->first_year = MIN(res->first_year, job->ystart);
}

PostProcessJobs(res, ln)
RESUME_STRUCT *res;
int *ln;
{
    int i;

res->num_job = 0;
    for(i=0; StrEqu(Person[*ln].title, "Dates"); i++)
    {
        if (i < NUM_JOB)
        {
            ParseDates(Person[*ln].value, &Job[i]);
            GetFirstYear(res, &Job[i]);
            res->num_job++;
        }
        (*ln)++;
    }
}

PostProcessBuzzwords(res, ln)
RESUME_STRUCT *res;
int *ln;
{
    int i, j;

res->num_buzzword = 0;
/* for each buzzword in the resume */
    for(i = *ln; StrEqu(Person[i].title, "Experience"); i++)
    {
/*      check for a duplicate */
        for(j = 0; j < res->num_buzzword; j++)
            if (strcmp(Buzzword[j].string, Person[i].value) == 0)
                break;
/*      put the unique ones into the data base */
        if ((j == res->num_buzzword) && (j < NUM_BUZZWORD))
        {
            strcpy(Buzzword[res->num_buzzword].string, Person[i].value);
            res->num_buzzword++;
        }
    }
    *ln = i;
}

/*-----------------------------------------------------------
 * Copyright 1988, 1989, Resumix, Inc.
 *
 * name.c
 *----------------------------------------------------------*/ include <stdio.h>
include "../EXTRACT/includes.h"
#include <ctype.h>
```

```c
ValidName(name)
char *name;
{
  int len, pos, word, chars, inword, junk, vowel;
  len = strlen(name);
  word = 0;
  chars = 0;
  inword = 0;
  vowel = 0;
  junk = 0;
  for (pos = 0; pos < len; pos ++)
  {
    if (isalpha(name[pos]))
    {
      chars++;
      if (!inword)
        inword = 1;
    }
    else if ((name[pos] == ' ') && inword)
    {
      if (chars >= 2)
        word++;
      inword = chars = 0;
    }
    else if (name[pos] != '.') junk++;
  }
  if (inword && (chars >= 2))
    word++;
  if (junk * 2 >= len)
  {
    return(0);
  }
  if ((word >= 2) && (word <= 5))
  {
    return(1);
  }
  return(0);
} int SpacedName(name)
char *name;
{
  int ok, bad, i, len, other;

ok = 0;
  bad = 0;
  other = 0;
  i = 0;
  len = strlen(name);

for (i=0;i<len;i++)
  {
    if (isalpha(name[i]))
    {
      if (isalpha(name[i+1]))
        ok++;
      else if (name[i+1]==' ')
        bad++;
    }
    else if (!isalpha(name[i]) &&
      (name[i] != ' '))
      other++;
  }
  return((bad > (ok * 4)) && (other < ok));
} int CountWhite(name,i)
char *name;
```

```c
int *i;
{
  int white;

white = 0;

while(name[*i] == ' ')
  {
    white++;
    (*i)++;
  }
  return(white);
} int AverageSpacing(name,len)
char *name;
int len;
{
  int i, space[5], spaces, max;

for (i=0;i<5;i++)
    space[i] = 0;

for (i=0;i<len;i++)
    if (name[i] == ' ')
    {
      spaces = CountWhite(name,&i);
      if (spaces > 4) spaces = 4;
      space[spaces]++;
    }
  for(spaces=0,max=space[0],i=1;i < 5;i++)
    if (space[i] > max)
    {
      spaces = i;

max = space[i];
    }
  return(spaces);
} int Initial(name,i)
char *name;
int i;
{
  i++;
  CountWhite(name,&i);
  return(name[i] == '.');
} void PassInitial(name,i)
char *name;
int *i;
{
  while(name[(*i)++] != '.');
  CountWhite(name,i);
} void ImplodeName(name)
char *name;
{
  int i,j,len,word,spacer;

word = FALSE;
  len = strlen(name);
  spacer = AverageSpacing(name,len);
  i=0;j=0;
  while(i<len)
  {
    if (CountWhite(name,&i) > spacer)
```

```c
    {
      word = FALSE;
      name[j++] = ' ';
    }
    else if (!word && isalpha(name[i]))
    {
      name[j++] = name[i++];
      word = TRUE;
    }
    else if (isalpha(name[i]))
    {
      if (!Initial(name,i))
      {
        name[j++] = name[i++];
      }
      else
      {
        name[j++] = '.';
        name[j++] = name[i];
        name[j++] = '.';
        name[j++] = ' ';
        PassInitial(name,&i);

word = FALSE;
      }
    }
    else
    {
      i++;
    }
  }
  name[j] = 0;
}

PrintNames(class)
CLASS *class;
{
  int entity;
  for (entity = EntityPtr[class->entity_type];
       entity != NO_ENTITY;
       entity = Entity[entity].next)
  {
    fprintf(stderr," Name is %s\n", Entity[entity].value);
  }
  fprintf(stderr,"Done\n\n");
}

PruneName(class)
CLASS *class;
{
  int entity, lastent=NO_ENTITY;
  for (entity = EntityPtr[class->entity_type];
       entity != NO_ENTITY;
       entity = Entity[entity].next)
  {
    if (SpacedName(Entity[entity].value))
      ImplodeName(Entity[entity].value);
    if (!ValidName(Entity[entity].value))
    {
      if (lastent == NO_ENTITY)
        EntityPtr[class->entity_type] = Entity[entity].next;
      else
        Entity[lastent].next = Entity[entity].next;
    }
    else lastent = entity;
  }
}
```

```c
/*----------------------------------------------------------------------
 * Copyright 1988, Resumix, Inc.
 *
 * maps.c
 *----------------------------------------------------------------------*/
#include "includes.h"

unsigned char PhraseMap[] =
{
    1,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0, ERROR_CHAR, 0, 0, 0, 0, 0, 0, 0, 0, 0, 0, 0, 0, 0, 0,
    '0','1','2','3','4','5','6','7','8','9', 0,  0,  0,  0,  0,  0,
    0,'A','B','C','D','E','F','G','H','I','J','K','L','M','N','O',
    'P','Q','R','S','T','U','V','W','X','Y','Z', 0, 0, 0, 0, 0,
    0,'a','b','c','d','e','f','g','h','i','j','k','l','m','n','o',
    'p','q','r','s','t','u','v','w','x','y','z', 0, 0, 0,STAR_CHAR,0
};

unsigned char DocumentMap[] =
{
    1,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    '0','1','2','3','4','5','6','7','8','9', 0,  0,  0,  0,  0,  0,
    0,'A','B','C','D','E','F','G','H','I','J','K','L','M','N','O',
    'P','Q','R','S','T','U','V','W','X','Y','Z', 0, 0, 0, 0, 0,
    0,'a','b','c','d','e','f','g','h','i','j','k','l','m','n','o',
    'p','q','r','s','t','u','v','w','x','y','z', 0, 0, 0, 0, 0,
    1,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    '0','1','2','3','4','5','6','7','8','9', 0,  0,  0,  0,  0,  0,
    0,'A','B','C','D','E','F','G','H','I','J','K','L','M','N','O',
    'P','Q','R','S','T','U','V','W','X','Y','Z', 0, 0, 0, 0, 0,
    0,'a','b','c','d','e','f','g','h','i','j','k','l','m','n','o',
    'p','q','r','s','t','u','v','w','x','y','z', 0, 0, 0, 0, 0
};

unsigned char NumMap[] =
{
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    '0','1','2','3','4','5','6','7','8','9', 0,  0,  0,  0,  0,  0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    '0','1','2','3','4','5','6','7','8','9', 0,  0,  0,  0,  0,  0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0
};

unsigned char AlphaMap[] =
{
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,   0,   0,   0,   0,   0,   0,   0,   0,   0,   0,   0,   0,   0,   0,   0,
    0,'A','B','C','D','E','F','G','H','I','J','K','L','M','N','O',
    'P','Q','R','S','T','U','V','W','X','Y','Z', 0, 0, 0, 0, 0,
    0,'a','b','c','d','e','f','g','h','i','j','k','l','m','n','o',
```

```c
    'p','q','r','s','t','u','v','w','x','y','z',  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,'A','B','C','D','E','F','G','H','I','J','K','L','M','N','O',
    'P','Q','R','S','T','U','V','W','X','Y','Z',  0,  0,  0,  0,  0,
      0,'a','b','c','d','e','f','g','h','i','j','k','l','m','n','o',
    'p','q','r','s','t','u','v','w','x','y','z',  0,  0,  0,  0,  0
};

char *Ascii[] =
{
    " "," "," "," "," "," "," "," "," "," "," "," "," "," "," "," ",
    " "," "," "," "," "," "," "," "," "," "," "," "," "," "," "," ",
    " ","!","\"","#","$","%","&","'","(",")","*","+",",","-",".","/",
    "0","1","2","3","4","5","6","7","8","9",":",";","<","=",">","?",
    "@","A","B","C","D","E","F","G","H","I","J","K","L","M","N","O",
    "P","Q","R","S","T","U","V","W","X","Y","Z","[","\\","]","^","_",
    "`","a","b","c","d","e","f","g","h","i","j","k","l","m","n","o",
    "p","q","r","s","t","u","v","w","x","y","z","{","|","}","~"," ",
    " "," "," "," "," "," "," "," "," "," "," "," "," "," "," "," ",
    " "," "," "," "," "," "," "," "," "," "," "," "," "," "," "," ",
    " ","!","\"","#","$","%","&","'","(",")","*","+",",","-",".","/",
    "0","1","2","3","4","5","6","7","8","9",":",";","<","=",">","?",
    "@","A","B","C","D","E","F","G","H","I","J","K","L","M","N","O",
    "P","Q","R","S","T","U","V","W","X","Y","Z","[","\\","]","^","_",
    "`","a","b","c","d","e","f","g","h","i","j","k","l","m","n","o",
    "p","q","r","s","t","u","v","w","x","y","z","{","|","}","~"," "
};

unsigned char UpperMap[] = {
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ','!','"','#','$','%','&','\'','(',')','*','+',',','-','.','/',
    '0','1','2','3','4','5','6','7','8','9',':',';','<','=','>','?',
    '@','A','B','C','D','E','F','G','H','I','J','K','L','M','N','O',
    'P','Q','R','S','T','U','V','W','X','Y','Z','[','\\',']','^','_',
    '`','A','B','C','D','E','F','G','H','I','J','K','L','M','N','O',
    'P','Q','R','S','T','U','V','W','X','Y','Z','{','|','}','~',' ',
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ','!','"','#','$','%','&','\'','(',')','*','+',',','-','.','/',
    '0','1','2','3','4','5','6','7','8','9',':',';','<','=','>','?',
    '@','A','B','C','D','E','F','G','H','I','J','K','L','M','N','O',
    'P','Q','R','S','T','U','V','W','X','Y','Z','[','\\',']','^','_',
    '`','A','B','C','D','E','F','G','H','I','J','K','L','M','N','O',
    'P','Q','R','S','T','U','V','W','X','Y','Z','{','|','}','~',' '
};

unsigned char LowerMap[] = {
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ','!','"','#','$','%','&','\'','(',')','*','+',',','-','.','/',
    '0','1','2','3','4','5','6','7','8','9',':',';','<','=','>','?',
    '`','a','b','c','d','e','f','g','h','i','j','k','l','m','n','o',
    'p','q','r','s','t','u','v','w','x','y','z','[','\\',']','^','_',
    '`','a','b','c','d','e','f','g','h','i','j','k','l','m','n','o',
    'p','q','r','s','t','u','v','w','x','y','z','{','|','}','~',' ',
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ','!','"','#','$','%','&','\'','(',')','*','+',',','-','.','/',
    '0','1','2','3','4','5','6','7','8','9',':',';','<','=','>','?',
    '`','a','b','c','d','e','f','g','h','i','j','k','l','m','n','o',
    'p','q','r','s','t','u','v','w','x','y','z','[','\\',']','^','_',
    '`','a','b','c','d','e','f','g','h','i','j','k','l','m','n','o',
    'p','q','r','s','t','u','v','w','x','y','z','{','|','}','~',' '
};
```

```c
unsigned char OutsideMap[] =
{
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    '0','1','2','3','4','5','6','7','8','9',' ',' ',' ',' ',' ',' ',
    ' ','A','B','C','D','E','F','G','H','I','J','K','L','M','N','O',
    'P','Q','R','S','T','U','V','W','X','Y','Z',' ',' ',' ',' ',' ',
    ' ','a','b','c','d','e','f','g','h','i','j','k','l','m','n','o',
    'p','q','r','s','t','u','v','w','x','y','z',' ',' ',' ',' ',' ',
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    '0','1','2','3','4','5','6','7','8','9',' ',' ',' ',' ',' ',' ',
    ' ','A','B','C','D','E','F','G','H','I','J','K','L','M','N','O',
    'P','Q','R','S','T','U','V','W','X','Y','Z',' ',' ',' ',' ',' ',
    ' ','a','b','c','d','e','f','g','h','i','j','k','l','m','n','o',
    'p','q','r','s','t','u','v','w','x','y','z',' ',' ',' ',' ',' ',
};

unsigned char InsideMap[] =
{
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ','!','"','#','$','%','&','\'','(',')','*','+',',','-','.','/',
    '0','1','2','3','4','5','6','7','8','9',':',';','<','=','>','?',
    '@','A','B','C','D','E','F','G','H','I','J','K','L','M','N','O',
    'P','Q','R','S','T','U','V','W','X','Y','Z','[','\\',']','^','_',
    '`','a','b','c','d','e','f','g','h','i','j','k','l','m','n','o',
    'p','q','r','s','t','u','v','w','x','y','z','{','|','}','~',' ',
    ' ',' ',' ',' ',' ',' ',' ',' ',' ',' ',' ',' ',' ',' ',' ',' ',
    ' ','!','"','#','$','%','&','\'','(',')','*','+',',','-','.','/',
    '0','1','2','3','4','5','6','7','8','9',':',';','<','=','>','?',
    '@','A','B','C','D','E','F','G','H','I','J','K','L','M','N','O',
    'P','Q','R','S','T','U','V','W','X','Y','Z','[','\\',']','^','_',
    '`','a','b','c','d','e','f','g','h','i','j','k','l','m','n','o',
    'p','q','r','s','t','u','v','w','x','y','z','{','|','}','~',' ',
};
#include <stdio.h>
include <sys/types.h>
#include <sys/timeb.h>
#include <time.h>
#include <malloc.h>
#include "devaluate.h"
include <ctype.h> include "../EXTRACT/includes.h"

struct _jobstruc {
    int date, datetype, title, titletype, company, companytype;
    int eol, blank, block, processed, next;
} JOBSTRUC;

#define MAX_POSS_JOBS 60
#define LONE_DATE 1
define DATERANGE 2 static struct _jobstruc Job[MAX_POSS_JOBS];
static int current;

extern int FirstNumChildErr;

ClearJob(i)
int i;
{
```

```c
    Job[i].datetype = 0;
    Job[i].date = 0;
    Job[i].title = 0;
    Job[i].company = 0;
    Job[i].eol = 0;
    Job[i].blank = 0;
    Job[i].block = 0;
    Job[i].processed = 0;
    Job[i].next = i+1;
}

InitJobs()
{
  int i;
  for (i=0;i<MAX_POSS_JOBS;i++)
    ClearJob(i);
}

GetFirstDate(str)
char *str;
{
  int pos=0;
  while (str[pos] && !isdigit(str[pos]))
    pos++;
  if (!str[pos]) return(99);
  return(atoi(&str[pos]));
}

GetNextDate(entity, daterange)
int entity, daterange;
{
  int firstdate, pos;
  char *str;
  entity = Entity[entity].next;
  while (entity != NO_ENTITY &&
         (PhrasePair[Entity[entity].phrase
            ].entity_type != daterange))
    entity = Entity[entity].next;
  if (entity == NO_ENTITY) return (0);
  pos=0;
  str = Entity[entity].value;
  while (str[pos] && !isdigit(str[pos]))
    pos++;
  if (!str[pos]) firstdate = 99;
  firstdate = atoi(&str[pos]);
  pos += 2;
  if (str[pos] == 0) return(firstdate);
  while (str[pos] && !isdigit(str[pos]))
    pos++;
  if (!str[pos]) return(firstdate);
  return(atoi(&str[pos]));
}

RemoveBadDates(entity, date, daterange, eol)
int entity, date, daterange, eol;
{
  int type, lastdate=99, currdate;
  while (entity != NO_ENTITY)
   {
     type = PhrasePair[Entity[entity].phrase].entity_type;
     if (type == daterange)
      {
        lastdate = GetFirstDate(Entity[entity].value);
/* fprintf(stderr,"Date %s, currdate %d lastdate %d\n",
  Entity[entity].value, currdate, lastdate); */
      }
     else if (type == date)
      {
```

```
        currdate = GetFirstDate(Entity[entity].value);
/* fprintf(stderr,"Date %s, currdate %d lastdate %d nextdate %d\n",
   Entity[entity].value, currdate, lastdate,
   GetNextDate(entity,daterange)); */
        if (currdate > lastdate ||
            currdate < GetNextDate(entity, daterange))
          PhrasePair[Entity[entity].phrase].entity_type = eol;
      }
      entity = Entity[entity].next;
    }
} void ExtractJob (class)
CLASS *class;
{
  int date, title, company, eol, daterange;
  int blank, block, blocks;
  int entities, entity, entity_type, blanks, eols, jobnum, i;
  current = 0;
  InitJobs();
  date = PhrasePair[Phrase[class->first_phrase].first_pair].entity_type;
  daterange = PhrasePair[Phrase[class->first_phrase+1].first_pair].entity_type;
  company = PhrasePair[Phrase[class->first_phrase+2].first_pair].entity_type;
  title = PhrasePair[Phrase[class->first_phrase+3].first_pair].entity_type;
  eol = PhrasePair[Phrase[class->first_phrase+4].first_pair].entity_type;
  blank = PhrasePair[Phrase[class->first_phrase+5].first_pair].entity_type;
  block = PhrasePair[Phrase[class->first_phrase+6].first_pair].entity_type;

entities = EntityPtr[class->entity_type];
  EntityPtr[class->entity_type] = NO_ENTITY;
  entity = entities;
  RemoveBadDates(entities, date, daterange, eol);
  while (entity != NO_ENTITY && PhrasePair[Entity[entity
      ].phrase].entity_type == eol)
    entity = Entity[entity].next;
  while (entity != NO_ENTITY)
  {
    while((entity_type = PhrasePair[Entity[entity].phrase].entity_type)
      != eol && entity_type != blank && entity_type != block)
    {
      if (entity_type == date)
      {
        if (!Job[current].date)
        {
          Job[current].date = entity;
          Job[current].datetype = LONE_DATE;
        }
      }
      else if (entity_type == daterange)
      {
        if (!Job[current].date)
        {
          Job[current].date = entity;
          Job[current].datetype = DATERANGE;
        }
      }
      else if (entity_type == company)
      {
        Job[current].company = entity;
      }
      else if (entity_type == title)
      {
        if (!Job[current].title)
          Job[current].title = entity;
      }
      else fprintf(stderr,"ERROR: Invalid type in ExtractJob\n");
      entity = Entity[entity].next;
      if (entity == NO_ENTITY) break;
    }
```

```
      while (entity != NO_ENTITY && ((entity_type =
        PhrasePair[Entity[entity].phrase].entity_type) == eol ||
        entity_type == blank || entity_type == block))
      {
       if (entity_type == blank)
         Job[current].blank++;
       else if (entity_type == eol)
         Job[current].eol++;
       else if (entity_type == block)
         Job[current].block++;
       entity = Entity[entity].next;
      }
      if ((entity == NO_ENTITY) || (current+1 == MAX_POSS_JOBS)) break;
      current++;
   }
   blanks = 0;
   blocks = 0;
   eols = 0;
   jobnum = -1;
   PrintJobs();
   while (FindClose(&blocks, &blanks, &eols, &jobnum))
      if (JobAgree(jobnum))
        CombineJob(jobnum);
   PrintJobs();
   for(jobnum = 0; jobnum != MAX_POSS_JOBS; jobnum = Job[jobnum].next)
      if (GoodJob(jobnum))
        AddJob(class, jobnum);
   PrintJobs();
} extern char Value[];

AddJob(class, jobnum)
int jobnum;
CLASS *class;
{
   unsigned short first, last;
   int first_child;
   first_child = NumEntityChild;
   first = 100000;
   last = -100000;
   Value[0] = 0;
   if (Job[jobnum].date)
   {
      strcat(Value, Entity[Job[jobnum].date].value);
      first = MIN(first,Entity[Job[jobnum].date].start);
      last = MAX(last,Entity[Job[jobnum].date].end);
      if (NumEntityChild >= MAX_ENTITY_CHILD-2)
      {
        if (FirstNumChildErr)
        {
          FirstNumChildErr = FALSE;
          ExtractWarning("Exceeded maximum number of entity children");
        }
        goto ERROR;
      }
      EntityChild[NumEntityChild++] = Entity[Job[jobnum].date].entity_type;
   }
   strcat(Value, ", ");
   if (Job[jobnum].title)
   {
      strcat(Value, Entity[Job[jobnum].title].value);
      first = MIN(first,Entity[Job[jobnum].title].start);
      last = MAX(last,Entity[Job[jobnum].title].end);
      if (NumEntityChild >= MAX_ENTITY_CHILD-2)
      {
        if (FirstNumChildErr)
        {
```

```
                  FirstNumChildErr = FALSE;
                  ExtractWarning("Exceeded maximum number of entity children");
                }
                goto ERROR;
              }
              EntityChild[NumEntityChild++] = Entity[Job[jobnum].title].entity_type;
          }
        strcat(Value, ", ");
        if (Job[jobnum].company)
          {
            strcat(Value, Entity[Job[jobnum].company].value);
            first = MIN(first,Entity[Job[jobnum].company].start);
            last = MAX(last,Entity[Job[jobnum].company].end);
            if (NumEntityChild >= MAX_ENTITY_CHILD-2)
              {
                if (FirstNumChildErr)
                  {
                    FirstNumChildErr = FALSE;
                    ExtractWarning("Exceeded maximum number of entity children");
                  }
                goto ERROR;
              }
            EntityChild[NumEntityChild++] = Entity[Job[jobnum].company].entity_type;
          }
        if (NumEntityChild >= MAX_ENTITY_CHILD-2)
          if (FirstNumChildErr)
            {
              FirstNumChildErr = FALSE;
              ExtractWarning("Exceeded maximum number of entity children");
            }
ERROR:
      EntityChild[NumEntityChild++] = NO_ENTITY;
      if (NumEntityChild>=MAX_ENTITY_CHILD - 1)
        {
          if (FirstNumChildErr)
            {
              ExtractWarning("Exceeded maximum number of entity children");
              FirstNumChildErr = FALSE;
              EntityChild[NumEntityChild] = NO_ENTITY;
              AddEntity(class->entity_type, NO_PHRASE, StrSave(Value),
                 first,last,first_child,FALSE);
            }
          return;
        }
      EntityChild[NumEntityChild++] = NO_ENTITY;
      AddEntity(class->entity_type, NO_PHRASE, StrSave(Value),
         first,last,first_child,FALSE);
}
PrintJobs()
{
  int job;
/* for (job = 0; job <= current; job++)
    {
      fprintf(stderr, "Job %d\n", job);
      fprintf(stderr, "  Date is %s type is %d\n", Entity[Job[job].date].value,
        Job[job].datetype);
      fprintf(stderr, "  Company is %s\n", Entity[Job[job].company].value);
      fprintf(stderr, "  Title is %s\n\n", Entity[Job[job].title].value);
      fprintf(stderr, "  Eols = %d Blanks = %d Blocks = %d\n", Job[job].eol,
        Job[job].blank, Job[job].block);
    } */
}

GoodJob(jobnum)
int jobnum;
{
  return ((Job[jobnum].date &&
      (Job[jobnum].datetype == DATERANGE ||
       Job[jobnum].company || Job[jobnum].title)));
```

```
/* ||
    (Job[jobnum].company && Job[jobnum].title)); */
}

JobAgree(jobnum)
int jobnum;
{
/* fprintf(stderr, "Testing for agreement between job %d and job %d\n", jobnum, Jok return(((!Job[jobnum].date || !Job[Job[jobnum].next].date) &&
      (!Job[jobnum].company || !Job[Job[jobnum].next].company) &&
      (!Job[jobnum].title || !Job[Job[jobnum].next].title)) &&
      (!Job[jobnum].blank || Job[jobnum].eol < 5) &&
      Job[jobnum].block <= 1);
}

CombineJob(jobnum)
int jobnum;
{
  if (!Job[jobnum].date)
    {
      Job[jobnum].date = Job[Job[jobnum].next].date;
      Job[jobnum].datetype = Job[Job[jobnum].next].datetype;
    }
  if (!Job[jobnum].company)
     Job[jobnum].company = Job[Job[jobnum].next].company;
  if (!Job[jobnum].title)
     Job[jobnum].title = Job[Job[jobnum].next].title;
  Job[jobnum].eol = Job[Job[jobnum].next].eol;
  Job[jobnum].blank = Job[Job[jobnum].next].blank;
  Job[jobnum].block = Job[Job[jobnum].next].block;
  Job[jobnum].processed = Job[Job[jobnum].next].processed;
  Job[jobnum].next = Job[Job[jobnum].next].next;
}

JobGreaterEq(job, blocks, blanks, eols, jobnum)
int job, blanks, eols, jobnum;
{
  return (Job[job].block >= blocks ||
     (Job[job].block == blocks &&
       Job[job].blank >= blanks) ||
     (Job[job].block == blocks &&
       Job[job].blank == blanks && Job[job].eol >= eols) ||
     (Job[job].block == blocks &&
       Job[job].blank == blanks && Job[job].eol == eols &&
       job >= jobnum));
}

JobLess(job, blocks, blanks, eols, jobnum)
int job, blocks, blanks, eols, jobnum;
{
  return((Job[job].block < blocks) ||
     (Job[job].block == blocks && Job[job].blank < blanks) ||
     (Job[job].block == blocks && Job[job].blank == blanks &&
       Job[job].eol < eols) ||
     (Job[job].block == blocks && Job[job].blank == blanks &&
       Job[job].eol == eols && job < jobnum));
}

FindClose(blocks, blanks, eols, jobnum)
int *blocks, *blanks, *eols, *jobnum;
{
  int minblank = 10000, mineol = 10000, minjob = MAX_POSS_JOBS, i, minblock = 10000
  for(i=0; i<current; i = Job[i].next)
    {
      if (!Job[i].processed &&
        JobGreaterEq(i, *blocks, *blanks, *eols, *jobnum) &&
        JobLess(i, minblock, minblank, mineol, minjob))
        {
          minblock = Job[i].block;
          minblank = Job[i].blank;
```

```
        mineol = Job[i].eol;
        minjob = i;
      }
   }
   if (minjob == MAX_POSS_JOBS) return(0);
   *blocks = minblock;
   *blanks = minblank;
   *eols = mineol;
   *jobnum = minjob;
   Job[*jobnum].processed = 1;
   return(1);
}
/*-------------------------------------------------------------------
 * Copyright 1988, Resumix, Inc.
 *
 * extract.c
 *-------------------------------------------------------------------*/ include <stdio.h>
include <malloc.h>
#include <ctype.h>
include "includes.h"

include <palantir/cdp.h> unsigned char *Message;
jmp_buf ExtractRecover;

InitExtract( def_path, class_file)
char *def_path, *class_file;
{
    jmp_buf Recover;

if (setjmp(Recover) != -1)
    {
       if (!InitMemory())
           Error(Recover, "Cannot allocate memory");
       GarbageCollect(REINIT_COLLECT);
       InitSegment();
       InitPrescan();
       ReadClassDefs(def_path, class_file);
       InitTemplates();
       return(TRUE);
    }
    else
        return(FALSE);
}

InitMemory()
{
    Message = (unsigned char *)malloc(MAX_MESSAGE);
    WordList= malloc(MAX_WORD_CHARS);
    Memory= malloc(MAX_MEMORY);
    if (WordList==NULL || Memory==NULL || Message == NULL)
    {
        return(FALSE);
    }
    return(TRUE);
}

FreeMemory()
{
   free(Message);
   free(WordList);
   free(Memory);
} do_extract( res, bitmap)
```

```c
char res[], bitmap[];
{
   FILE *res_file;
   long len;

if (setjmp(ExtractRecover)!= -1)
   {
      GarbageCollect(MESSAGE_COLLECT);
      res_file= fopen( res, "r");
      len = fread(Message, 1, MAX_MESSAGE-1, res_file);
      Message[len]= '\0';
      fclose( res_file); .
      FormatMessage();
      PreScanMessage();
/*       PrintPrescanStats(); */
      FillTemplates();
      WriteTemplates(res, bitmap);
/*       PrintUtilStats(); */
    . return(0);
   }
   return(1);
}

FormatMessage()
{
   unsigned char *dest_ptr, *source_ptr, *line_ptr;
   int    last_blank, line_has_alpha, line_length;
   BOOLEAN warning;
   int error_code;
   FILE *out;
define MAX_HEADER_LENGTH 40 warning = FALSE;
/* get rid of CSI strings and flag bad characters */
   for(source_ptr = dest_ptr = Message; *source_ptr != '\0'; source_ptr++)
   {
      while((*source_ptr == (unsigned char)CSI) || (*source_ptr == 27))
      {
/*       get the reason for doubt and skip over the CSI string */
         source_ptr =
              (unsigned char *)c_csiparse(source_ptr, NULL, &error_code);
         warning = error_code == CSI_CMARK;
      }
      if (warning)
      {
/* kludge when Palantir ends a file with an error indicator */
         if (*source_ptr == '\0') break;

*dest_ptr++ = *source_ptr | 0x80;
         warning = FALSE;
      }
      else
         *dest_ptr++ = *source_ptr;
   }
   *dest_ptr = '\0';
   line_length= 0;
   for(source_ptr= dest_ptr= line_ptr= Message; *source_ptr!='\0';
      source_ptr++)
   {
      line_has_alpha= FALSE;
      last_blank= TRUE;
      for( ; (*source_ptr != '\n') && (*source_ptr != '\0'); source_ptr++)
      {
         if (isalnum(*source_ptr)) line_has_alpha= TRUE;
/*          if (!last_blank || *source_ptr != ' ')
            { */
            last_blank= *source_ptr==' ';
            *dest_ptr= *source_ptr;
```

```
                    dest_ptr++;
                    line_length++;
/*              } */
            }
            if (line_has_alpha)
            {
                if (*line_ptr=='\\' && line_length>MAX_HEADER_LENGTH)
                    *line_ptr= '|';
                *dest_ptr= *source_ptr;
                dest_ptr++;
                line_ptr= dest_ptr;
                line_length= 0;
            }
            else
            {
                if (line_length>0 && (*line_ptr=='\\' || *line_ptr=='/'))
                {
                    line_length= 1;
                    dest_ptr=line_ptr+1;
                }
                else
                {
                    line_length= 0;
                    dest_ptr=line_ptr;
                }
            }
        }
    *dest_ptr= *source_ptr;

/*
    out = fopen("RESUME", "w");
    fwrite(Message, dest_ptr-Message, 1, out);
    fclose(out);
*/
}
/*----------------------------------------------------------------
 * Copyright 1988, Resumix, Inc.
 *
 * ext.c
 *---------------------------------------------------------------*/
include <stdio.h>
#include <fcntl.h>
#include <malloc.h>
include <setjmp.h>
#include <search.h>
#include "../defines.h"
#include "defines.h"
#include "utils.h"
#include "extract.h"
#include "template.h"
#include "../DB/dbase.h"
#include "../DB/dbresume.h"

static RESUME_STRUCT *CurrentResume;

ExtractWarning(string)
char *string;
{
    CurrentResume->status |= EXTRACT_ERRORS;
}

DoExtract( res)
RESUME_STRUCT *res;
{
    int text;
    char file_name[120], errmsg[180];
    extern char *DBReadText();
```

```c
    CurrentResume = res;
    if (setjmp(ExtractRecover)!= -1)
    {
        strcpy( file_name, "'no directory'");
        if (!GetTextFileName( res->date_received, res->file_id, file_name, 0) ||
            (text= open( file_name, O_RDONLY))== -1)
        {
            sprintf( errmsg, "Cannot read text %s for unverif resume %d", file_name, r
            Error( ExtractRecover, errmsg);
        }
        GarbageCollect(MESSAGE_COLLECT);
        read( text, Message, MAX_MESSAGE);
        Message[MAX_MESSAGE-1]= '\0';
        close( text);
        FormatMessage();
        PreScanMessage();
/*      PrintPrescanStats(); */
        FillTemplates();
        WriteTemplates();
/*      PrintUtilStats(); */
        SaveExtract( res);
        return(0);
    }
    return(1);
}

SaveExtract( res)
RESUME_STRUCT *res;
{
    int i;
    char *PostProcessName();
    ADDRESS_STRUCT *addr;
    PHONE_STRUCT *phon;

res->first_name[0] = 0;
    res->last_name[0] = 0;
    res->middle_name[0] = 0;
    res->postfix_name[0] = 0;
    res->prefix_name[0] = 0;
    res->num_address = 0;
    res->num_phone = 0;
    res->num_job = 0;
    res->num_category = 0;
    res->num_buzzword = 0;
    res->num_degree = 0;
    res->num_comment = 0;
    res->first_year = PRESENT_YEAR;
    i = 0;
    while(i < NumPerson)
    {
        if (StrEqu(Person[i].title, "Applicant"))
        {
            PostProcessName(res, &i);
        }
        else if (StrEqu(Person[i].title, "Address") ||
                 StrEqu(Person[i].title, "Address_type"))
        {
            PostProcessAddress(res, &i);
        }
        else if (StrEqu(Person[i].title, "Degree"))
        {
            PostProcessDegree(res, &i);
        }
        else if (StrEqu(Person[i].title, "Home_Phone") ||
                 StrEqu(Person[i].title, "Work_Phone") ||
                 StrEqu(Person[i].title, "Message_Phone"))
        {
            PostProcessPhone(res, &i);
        }
        else if (StrEqu(Person[i].title, "Dates"))
        {
```

```
            PostProcessJobs(res, &i);
        }
        else if (StrEqu(Person[i].title, "Experience"))
        {
            PostProcessBuzzwords(res, &i);
        }
        else if (StrEqu(Person[i].title, "Obj_Category") ||
                 StrEqu(Person[i].title, "Exp_Category"))
        {
            PostProcessCategory(res, &i, Person[i].title);
        }
        else
        {
            i++;
        }
    }
    if (res->num_category == 0)
    {
        res->num_category = 1;
        strcpy(Category[0].string, "None");
    }
    AddNewResume(res);
}
/*----------------------------------------------------------------
 * Copyright 1988, Resumix, Inc.
 *
 * dict.c
 *----------------------------------------------------------------*/ include <stdio.h>
include "includes.h"

char Value[1024];
static char InBetween[256];
extern int FirstNumChildErr;

static
Words(operator, nwords, ind, entity, ent, phrase, class)
int operator, nwords, ind, entity[], ent[];
CLASS *class;
PHRASE *phrase;
{
    register long ent0, ent1;
    long i;
    BOOLEAN found;

found = FALSE;
    for(i=ind; ent[i]==NULL_ENTITY; i--) ;
    ent0 = ent[i];
    if (nwords < 0)
    {
        nwords = -nwords;
        for(ent1 = entity[ind + 1]; ent1 != NO_ENTITY; ent1 = Entity[ent1].next)
        {
            if ((Entity[ent0].start > Entity[ent1].end) &&
                (Entity[ent0].start <= Entity[ent1].end + nwords))
            {
                if (operator & NOT_OPERATOR)
                    return;
                else
                {
                    ent[ind + 1] = ent1;
                    NextOperator(ind + 1, entity, ent, phrase, class);
                    found = TRUE;
                }
            }
        }
    }
```

```
    else
    {
        nwords++;
        for(ent1 = entity[ind + 1]; ent1 != NO_ENTITY; ent1 = Entity[ent1].next)
        {
            if ((Entity[ent1].start > Entity[ent0].end) &&
                (Entity[ent1].start <= Entity[ent0].end + nwords))
            {
                if (operator & NOT_OPERATOR)
                    return;
                else
                {
                    ent[ind + 1] = ent1;
                    NextOperator(ind + 1, entity, ent, phrase, class);
                    found = TRUE;
                    if (operator & FIRST_OPERATOR) break;
                }
            }
        }
    }
}
if (!found)
{
    if ((operator & NOT_OPERATOR) || (operator & OPTIONAL_OPERATOR))
    {
        ent[ind + 1] = NULL_ENTITY;
        NextOperator(ind + 1, entity, ent, phrase, class);
    }
}
} static
Within(operator, ind, entity, ent, phrase, class)
int operator, ind, entity[], ent[];
CLASS *class;
PHRASE *phrase;
{
    register long i, ent1;
    long start, end;
    BOOLEAN found;

found = FALSE;
    start= SHORT_INFINITY;
    end= 0;
    for(i=0; i<=ind; i++)
    {
        if ( ent[i]!=NULL_ENTITY &&
            !(PhrasePair[phrase->first_pair+i].operator &
                (WITHIN_OPERATOR | CONTAINS_OPERATOR)) &&
            (PhrasePair[phrase->first_pair+i].operator & IGNORE_OPERATOR)) )
        {
            start= MIN( Entity[ent[i]].start, start);
            end= MAX( Entity[ent[i]].end, end);
            found= TRUE;
        }
    }
    if (!found)
    {
        start= 0;
        end= SHORT_INFINITY;
    } else
        found= FALSE;
    for( ent1 = entity[ind + 1]; ent1 != NO_ENTITY; ent1 = Entity[ent1].next)
    {
        if (Entity[ent1].start <= start && Entity[ent1].end >= end)
        {
            if (operator & NOT_OPERATOR)
                return;
```

```
        } else if (!(operator & NOT_OPERATOR)
                || (operator & IGNORE_OPERATOR))
            continue;
        ent[ind + 1] = ent1;
        NextOperator(ind + 1, entity, ent, phrase, class);
        found= TRUE;
    }
    if (!found)
    {
        if ((operator & (IGNORE_OPERATOR | NOT_OPERATOR))==
            (IGNORE_OPERATOR | NOT_OPERATOR))
        {
            ent[ind + 1] = NULL_ENTITY;
            NextOperator(ind + 1, entity, ent, phrase, class);
        }
    }
} static
Contains(operator, ind, entity, ent, phrase, class)
int operator, ind, entity[], ent[];
CLASS *class;
PHRASE *phrase;
{
    register long i, ent1;
    long start, end;
    BOOLEAN found;

found = FALSE;
    start= SHORT_INFINITY;
    end= 0;
    for(i=0; i<=ind; i++)
    {
        if ( ent[i]!=NULL_ENTITY &&
            !((PhrasePair[phrase->first_pair+i].operator &
                (WITHIN_OPERATOR | CONTAINS_OPERATOR)) &&
              (PhrasePair[phrase->first_pair+i].operator & IGNORE_OPERATOR)) )
        {
            start= MIN( Entity[ent[i]].start, start);
            end= MAX( Entity[ent[i]].end, end);
        }
    }
    for( ent1 = entity[ind + 1]; ent1 != NO_ENTITY; ent1 = Entity[ent1].next)
    {
        if (Entity[ent1].start >= start && Entity[ent1].end <= end)
        {
            if (operator & NOT_OPERATOR)
                return;
        } else if (!(operator & NOT_OPERATOR)
                || (operator & IGNORE_OPERATOR))
            continue;
        ent[ind + 1] = ent1;
        NextOperator(ind + 1, entity, ent, phrase, class);
        found= TRUE;
    }
    if (!found)
    {
        if ((operator & (IGNORE_OPERATOR | NOT_OPERATOR))==
            (IGNORE_OPERATOR | NOT_OPERATOR))
        {
            ent[ind + 1] = NULL_ENTITY;
            NextOperator(ind + 1, entity, ent, phrase, class);
        }
    }
} static
Before(operator, ind, entity, ent, phrase, class)
int operator, ind, entity[], ent[];
```

```
CLASS *class;
PHRASE *phrase;
{
    register long ent0, ent1;
    long i;
    BOOLEAN found;

found = FALSE;
    for(i=ind; ent[i]==NULL_ENTITY; i--) ;
    ent0 = ent[i];
    for(ent1 = entity[ind + 1]; ent1 != NO_ENTITY; ent1 = Entity[ent1].next)
    {
        if (Entity[ent1].start > Entity[ent0].end)
        {
            if (operator & NOT_OPERATOR)
                return;
            else
            {
                ent[ind + 1] = ent1;
                NextOperator(ind + 1, entity, ent, phrase, class);
                found = TRUE;
                if (operator & FIRST_OPERATOR) break;
            }
        }
    }
    if (!found)
    {
        if ((operator & NOT_OPERATOR) || (operator & OPTIONAL_OPERATOR))
        {
            ent[ind + 1] = NULL_ENTITY;
            NextOperator(ind + 1, entity, ent, phrase, class);
        }
    }
} static
BOOLEAN
GetInBetween(first, second)
int first, second;
{
    register unsigned char *ptr, *end;
    long i, in_white;
    long error_code;
    BOOLEAN warning;

InBetween[0] = '\0';
    warning = FALSE;
    ptr = &Message[WordLoc[first].end + 1];
    end = &Message[WordLoc[second].start];
/* skip over leading white space */
    while((ptr < end) && (OutsideMap[*ptr] == ' ')) ptr++;
    if (ptr == end) return(warning);
/* get useful info deleting excess white space */
    for(i=0, in_white=FALSE; ptr < end; ptr++)
    {
        warning |= *ptr >= 0x80;
/*      if (InsideMap[*ptr] != ' ')
        { */
            if (in_white)
            {
                if (i>=sizeof(InBetween)-2)
                    break;
                InBetween[i++]= ' ';
            }
            else
            {
                if (i>=sizeof(InBetween)-1)
                    break;
```

```c
        }
        InBetween[i++] = InsideMap[*ptr];
        in_white= FALSE;
/*    }
    else
        in_white= TRUE; */
    }
    while (i>0 && OutsideMap[InBetween[i-1]] == ' ') i--;
    InBetween[i] = '\0';
    return(warning);
}

AddValue(string)
char *string;
{
    if (*string == '\0') return;
    if (strlen(Value)+strlen(string)>=sizeof(Value))
        return;
    strcat(Value, string);
} static
NextOperator(ind, entity, ent, phrase, class)
int ind, entity[], ent[];
CLASS *class;
PHRASE *phrase;
{
    register long i;
    long first_child;
    long j, ent0, ent1, operator, within_num, first, last;
    char *separator;
    BOOLEAN warning;

if ((ind + 1) == phrase->num_pairs)
    {
        warning = FALSE;
        Value[0] = '\0';
        separator= "";
        first_child = -1;
        for(i = 0; i <= ind; i++)
        {
            ent1= ent[i];
            operator= PhrasePair[phrase->first_pair + i].operator;
            separator = (operator & MERGE_OPERATOR) ? "" : " ";
            separator = (Value[0] == '\0') ? "" : separator;
            if (operator & REMEMBER_OPERATOR)
            {
                for(j= i-1; j>=0 && ent[j]==NULL_ENTITY; j--) ;
                if (j>=0)
                {
                    ent0= ent[j];
                    if (class->class_syn & TYPE_CLASS)
                    {
                        AddValue(separator);
                        warning |= GetInBetween(Entity[ent0].end, Entity[ent1].start);
                        if (InBetween[0] == '\0') return;
                        AddValue(InBetween);
                    }
                    if (first_child == -1)
                    {
                        first = Entity[ent0].end + 1;
                        last = Entity[ent1].start - 1;
                        if (first<=last) first_child = NumEntityChild;
                    }
                    else
                    {
                        first = MIN(first, Entity[ent0].end + 1);
                        last = MAX(last, Entity[ent1].start - 1);
                    }
```

```
            if (NumEntityChild>=MAX_ENTITY_CHILD - 1)
            {
              if (FirstNumChildErr)
              {
                FirstNumChildErr = FALSE;
                ExtractWarning("Exceeded maximum number of entity children");
              }
              EntityChild[NumEntityChild] = NO_ENTITY;
              return;
            }
            EntityChild[NumEntityChild++] = NO_ENTITY;
          }
        }
        if (!(operator & IGNORE_OPERATOR))
        {
            if(ent[i] != NULL_ENTITY)
            {
                if (class->class_syn & TYPE_CLASS)
                {
                AddValue(separator);
                warning |= Entity[ent1].warning;
                AddValue(Entity[ent1].value);
                }
                if (first_child == -1)
                {
                    first_child = NumEntityChild;
                    first = Entity[ent1].start;
                    last = Entity[ent1].end;
                }
                else
                {
                    first = MIN(first, Entity[ent1].start);
                    last = MAX(last, Entity[ent1].end);
                }
                if (NumEntityChild>=MAX_ENTITY_CHILD - 1)
                {
                  if (FirstNumChildErr)
                  {
                    FirstNumChildErr = FALSE;
                    ExtractWarning("Exceeded maximum number of entity children");
                  }
                  EntityChild[NumEntityChild] = NO_ENTITY;
                  return;
                }
                EntityChild[NumEntityChild++] = ent[i];
            }
        }
    }
  }
  if (first_child == -1)
     return;
  if (NumEntityChild>=MAX_ENTITY_CHILD-1)
  {
    if (FirstNumChildErr)
    {
      FirstNumChildErr = FALSE;
      ExtractWarning("Exceeded maximum number of entity children");
    }
    EntityChild[NumEntityChild] = NO_ENTITY;
    return;
  }
  EntityChild[NumEntityChild++] = NO_ENTITY;
  switch (class->class_syn)
  {
  case TYPE_SYNONYM:
      AddEntity(class->entity_type, phrase->first_pair, class->name,
              first, last, first_child, FALSE);
      break;
```

```
      case TYPE_CLASS:
         AddEntity(class->entity_type, phrase->first_pair, StrSave(Value),
               first, last, first_child, warning);
         break;
      }
      return;
   }
   operator = PhrasePair[phrase->first_pair + ind + 1].operator;
/* sign extend number */
   within_num = operator & NUMBER_MASK;
   if (within_num & SIGN_BIT)
      within_num -= NUMBER_MASK + 1;
   if (operator & BEFORE_OPERATOR)
      Before(operator, ind, entity, ent, phrase, class);
   else if (operator & WITHIN_OPERATOR)
      Within(operator, ind, entity, ent, phrase, class);
   else if (operator & CONTAINS_OPERATOR)
      Contains(operator, ind, entity, ent, phrase, class);
   else
      Words(operator, within_num, ind, entity, ent, phrase, class);
} static
ScanForPhrase(phrase, class)
PHRASE *phrase;
CLASS *class;
{
   register long i;
#define ENTITY_HOLDER_SIZE 32
   long entity[ENTITY_HOLDER_SIZE], ent[ENTITY_HOLDER_SIZE];

for(i = 0; i < phrase->num_pairs; i++)
   {
      entity[i] = EntityPtr[PhrasePair[phrase->first_pair + i].entity_type];
      if (entity[i] == NO_ENTITY)
         if (!(PhrasePair[phrase->first_pair + i].operator &
               (NOT_OPERATOR | OPTIONAL_OPERATOR)))
            return;
   } for(i = 0; i < phrase->num_pairs; i++)
   {
      ent[i]= entity[i];
      while (ent[i] == NO_ENTITY)
      {
         ent[i]= NULL_ENTITY;
         if (++i==phrase->num_pairs) break;
         ent[i]= entity[i];
      }
      if (i==phrase->num_pairs) break;
      do
      {
         NextOperator(i, entity, ent, phrase, class);
         ent[i] = Entity[ent[i]].next;
      } while (ent[i] != NO_ENTITY);
      if ( !(PhrasePair[phrase->first_pair + i].operator &
               (NOT_OPERATOR | OPTIONAL_OPERATOR)) )
      {
        break;
      }
      ent[i]= NULL_ENTITY;
   }
}

ScanForClasses(class)
int class;
{
   register long phrase, i;
```

```c
    for(i = 0, phrase = ClassList[class].first_phrase;
                i < ClassList[class].num_phrases; i++, phrase++)
    {
      ScanForPhrase(&Phrase[phrase], &ClassList[class]);
    }
}
/* Devaluates synonyms if they occur across multiple categories */ include <stdio.h>
include "includes.h"
#include "devaluate.h"

#define FALSE 0
define TRUE 1 static int HASHSIZE = MAX_CLASS * 4 / 5;
struct wlist *hashtab[MAX_CLASS * 4 / 5];

int ExperienceEntity, EducationEntity, JobEntity;

int Whash(s)
int s;
{
  /* fprintf(stderr,"HASHVAL is %d\n", s % HASHSIZE); */
  return (s % HASHSIZE);
} int newcategory(np,category)
WLIST *np;
int category;
{
  int i;
  for (i=0; i< np->number; i++)
    if (np->categories[i] == category) return(FALSE);
  return(TRUE);
}

WLIST *Wlookup(s)
int s;
{
  WLIST *np;
  /* fprintf(stderr," Wlookup s is %d",s); */
  for (np=hashtab[Whash(s)]; np != NULL; np = np->next)
     if (s == np->entity_type) return(np);
  return(NULL);
} void PrintHashTable()
{
  int i;
  for (i=0; i<HASHSIZE; i++)
  {
    if (hashtab[i])
/* && hashtab[i]->number > 0) */
        fprintf(stderr,"Class is %s, number is %d value is %d\n",
          ClassList[hashtab[i]->entity_type-FIRST_CLASS].name,
           hashtab[i]->number,hashtab[i]->Value);
  }
} void InitHash ()
{
  int i;
  for(i=0;i<HASHSIZE;i++)
    hashtab[i] = NULL;
}
```

```c
WLIST *install(entity,category)
int entity,category;
{
  WLIST *np,*Wlookup();
  char *malloc();
  int hashval;
/*
 fprintf(stderr,"Inst type %d entity %s, category %s\n",
  entity,
  ClassList[entity-FIRST_CLASS].name,
  ClassList[category-FIRST_CLASS].name);
*/
  if ((np=Wlookup(entity)) == NULL)
  {
    np = (WLIST *) malloc (sizeof (*np));
    if (np == NULL)
    {
      fprintf(stderr,"Error in devaluate::install - No Memory");
      return(NULL);
    }
    hashval = Whash(entity);
    np->next = hashtab[hashval];
    np->entity_type = entity;
    np->number = 1;
    np->Value = 2;
    np->categories[0] = category;
    hashtab[hashval] = np;
  }
  else if (newcategory(np,category))
  {
    np->categories[np->number] = category;
    if (np->number < MAX_CATEGORIES) np->number++;
    if (np->Value) np->Value /= 2;
  }
  return(np);
} void InitSpecialEntities()
{
  int i;

PointsEntity=0;
  CategoryEntity=0;
  ObjectiveEntity=0;
  ExperienceEntity=0;
  EducationEntity=0;
  JobEntity = 0;

for (i=0;i<MAX_CLASS;i++)
  {
    if (!PointsEntity && !strcmp(ClassList[i].name,"Points") &&
        ClassList[i].class_syn == TYPE_CLASS)
      PointsEntity = i+FIRST_CLASS;
    else if (!ObjectiveEntity &&
        !strcmp(ClassList[i].name,"Objective") &&
        ClassList[i].class_syn == TYPE_CLASS)
      ObjectiveEntity = i+FIRST_CLASS;
    else if (!CategoryEntity &&
        !strcmp(ClassList[i].name,"Category") &&
        ClassList[i].class_syn == TYPE_CLASS)
      CategoryEntity = i+FIRST_CLASS;
    else if (!ExperienceEntity &&
        !strcmp(ClassList[i].name,"Experience") &&
        ClassList[i].class_syn == TYPE_CLASS)
      ExperienceEntity = i+FIRST_CLASS;
    else if (!JobEntity &&
        !strcmp(ClassList[i].name,"POS_TITLE") &&
        ClassList[i].class_syn == TYPE_CLASS)
```

```
            JobEntity = i+FIRST_CLASS;
          else if (!EducationEntity &&
              !strcmp(ClassList[i].name,"DEGREE_YEAR") &&
              ClassList[i].class_syn == TYPE_CLASS)
            EducationEntity = i+FIRST_CLASS;
          else if (CategoryEntity && ObjectiveEntity && PointsEntity
              && EducationEntity && ExperienceEntity && JobEntity)
            break;
    }
}

GetClass(token)
char *token;
{
   int i;

for (i=0; i< MAX_CLASS; i++)
     if (ClassList[i].name &&
         !strcmp(ClassList[i].name, token) &&
         ClassList[i].class_syn == TYPE_SYNONYM)
       return(FIRST_CLASS + i);
   return(0);
}

RemoveUseless()
{
   static char token[24];
   FILE *fp;
   WLIST *np,*Wlookup();
   int entity, len;
   extern FILE *POpen();

if ((fp = POpen("knowledge", "useless.words", "r"))
       != NULL)
     while (fgets(token, 24, fp) != NULL)
     {
       len = strlen(token);
       if (token[len-1] == '\n') token[len-1] = 0;
       if (!(entity = GetClass(token)))
         fprintf(stderr, "ERROR: useless token %s not found.\n", token);
       else if ((np = Wlookup(GetClass(token))) != NULL)
         np->Value = 0;
       else
         fprintf(stderr, "ERROR2: useless token %s not found.\n", token);
     }
   else fprintf(stderr,"WARNING: could not find $DBPATH/knowledge/useless.words\n");
} void LoadBuzzWords ()
{
   int i,j,k,l,m,experience;
   int catfp,cat,subcat,subcatfp,skillsfp,skills,skillfp,skill,wordfp;

InitHash();
   InitSpecialEntities();
   experience = CategoryEntity-FIRST_CLASS;
   if (experience == MAX_CLASS)
     fprintf(stderr,"Category CLASS NOT FOUND");
 /* for each category */
   for (i=0,catfp=ClassList[experience].first_phrase;
        i<ClassList[experience].num_phrases;i++,catfp++)
   {
 /* for each subcategory */
     for (j=0,cat=PhrasePair[Phrase[catfp].first_pair].entity_type,
              subcatfp=ClassList[cat-FIRST_CLASS].first_phrase;
              j<ClassList[cat-FIRST_CLASS].num_phrases;j++,subcatfp++)
     {
```

```c
/* for each group of skills */
      for (k=0,subcat=PhrasePair[Phrase[subcatfp].first_pair].entity_type,
            skillsfp=ClassList[subcat-FIRST_CLASS].first_phrase;
            k<ClassList[subcat-FIRST_CLASS].num_phrases;k++,skillsfp++)
      {
/* for each skill */
            for (l=0,skills=PhrasePair[Phrase[skillsfp].first_pair].entity_type,
              skillfp=ClassList[skills-FIRST_CLASS].first_phrase;
              l<ClassList[skills-FIRST_CLASS].num_phrases;l++,skillfp++)
/* for each synonym */
            {
              if (!strncmp("Skill",ClassList[skills-FIRST_CLASS].name,5))
              {
                for (m=0,skill=
PhrasePair[Phrase[ClassList[PhrasePair[Phrase[skillfp].first_pair
].entity_type-FIRST_CLASS].first_phrase].first_pair].entity_type,
                    wordfp=ClassList[skill-FIRST_CLASS].first_phrase;
                    m<ClassList[skill-FIRST_CLASS].num_phrases;m++,wordfp++)
                {
                  install(PhrasePair[Phrase[wordfp].first_pair].entity_type,cat);
                }
              }
            }
      }
   }
   RemoveUseless();
}
/*------------------------------------------------------------------
 * Copyright 1988, Resumix, Inc.
 *
 * action.c
 *------------------------------------------------------------------*/ include <stdio.h>
include <sys/types.h>
#include <sys/timeb.h>
#include <time.h>
#include <malloc.h>
#include "devaluate.h"
include <ctype.h> include "../EXTRACT/includes.h"

static int SubcatObjective[MAX_SUBCAT];
static int Subcats[MAX_SUBCAT];
static int SubcatPoints[MAX_SUBCAT];
static int DeletedSubcats[MAX_SUBCAT];

static int CategoryObj[MAX_CATEGORIES];
static int CategorySub[MAX_CATEGORIES];
static int Category[MAX_CATEGORIES];
static int CategoryPts[MAX_CATEGORIES];
static int DeletedCats[MAX_CATEGORIES];

/* finds position of phrase in parent (0 is first phrase) */
int FindPhrase (parent,entity)
int parent,entity;
{
  int phrase,number;

for(number=0,
        phrase=ClassList[parent-FIRST_CLASS].first_phrase;
        number<ClassList[parent-FIRST_CLASS].num_phrases,
        PhrasePair[Phrase[phrase].first_pair].entity_type != entity;
        number++,phrase++);
  if (number == ClassList[parent-FIRST_CLASS].num_phrases)
  {
```

```c
      fprintf(stderr,"Error in FindPhrase, %s not found\n",
        ClassList[parent-FIRST_CLASS].name);
      return(0);
   }
   else return(number);
}

/* Gets entity in position number from parent entity */
int GetEntity(parent,number)
int parent,number;
{
   return(PhrasePair[Phrase[ClassList[parent-FIRST_CLASS].first_phrase
      + number].first_pair].entity_type);
} int NotDeleted(entity,DeleteList,num)
int entity,*DeleteList,num;
{
   int i;

for(i=0;i<num;i++)
      if(DeleteList[i]==entity)
         return(0);
   return(1);
} int NextValid(entity,DeleteList,num)
int entity,num,*DeleteList;
{
   int child;

for(;entity != NO_ENTITY; entity = Entity[entity].next)
      if (NotDeleted(Entity[EntityChild[Entity[entity].children
            ]].entity_type,DeleteList,num))
      {
         return(entity);
      }
   return(NO_ENTITY);
} int Delete(class,DeleteList,num)
CLASS *class;
int num,*DeleteList;
{
   int entity;

EntityPtr[class->entity_type] =
      NextValid(EntityPtr[class->entity_type],DeleteList,num);
   for(entity = EntityPtr[class->entity_type];
       entity != NO_ENTITY;
       entity = Entity[entity].next)
      Entity[entity].next = NextValid(Entity[entity].next,DeleteList,num);
} int MuchMoreCatPoints(p1,p2)
int p1,p2;
{
   return((p1-MIN_THRESH)>(CAT_FACTOR * (p2-MIN_THRESH)));
}
int MuchMorePoints(p1,p2)
int p1,p2;
{
   return((p1-MIN_THRESH)>(SUBCAT_FACTOR * (p2-MIN_THRESH)));
} int FindTitle(subcat)
int subcat;
{
```

```
  int i,item;

for (i=0,item=ClassList[subcat-FIRST_CLASS].first_phrase;
       i<ClassList[subcat-FIRST_CLASS].num_phrases;
       i++,item++)
    if (!strncmp("Title",ClassList[
          PhrasePair[Phrase[item].first_pair].entity_type-FIRST_CLASS
          ].name,5))
      return(PhrasePair[Phrase[ClassList[
          PhrasePair[Phrase[item].first_pair].entity_type-FIRST_CLASS
          ].first_phrase].first_pair].entity_type);
  return(NO_ENTITY);
} int ObjectiveSubcat(entity,num)
int entity,num;
{
  int i;

for(i=0;i<num;i++)
  {
    if (SubcatObjective[i] == FindTitle(entity))
      return(1);
  }
  return(0);
} int ObjectiveCat(ObjEntity,num)
int ObjEntity,num;
{
  int i;
  for(i=0;i<num;i++)
    if (CategoryObj[i] == ObjEntity)
      return(1);
  return(0);
} int AssignedSubcat(entity,num)
int entity,num;
{
  int i;

for(i=0;i<num;i++)
  {
    if (FindTitle(Subcats[i]) == entity)
    {
      return(SubcatPoints[i]);
    }
  }
  return (0);
} int InstallObjCat(entity,num)
int entity,*num;
{
  int i;

for (i=0;i < *num && i<MAX_CATEGORIES;i++)
    if (CategoryObj[i] == entity) return(0);
  if (i==MAX_CATEGORIES)
  {
     fprintf(stderr,
        "Too Many Objective Categories to disambiguate\n");
     *num=0;
  }
  else CategoryObj[(*num)++]=entity;
}
```

```c
int InstallCat(entity,num)
int entity,*num;
{
  int i;

for (i=0;i<*num && i<MAX_CATEGORIES;i++)
    if (Category[i] == entity)
      return(1);
  if (i==MAX_CATEGORIES)
  {
    fprintf(stderr,
       "Too Many Assigned Categories to disambiguate\n");
    *num=0;
    return(0);
  }
  else Category[(*num)++]=entity;
  return(1);
}

/* first child is position 1 */
int GetChild(parent,pos)
int parent,pos;
{
  int i,entity;

for(i=1,entity=EntityPtr[PointsEntity];i<pos;
      i++,entity=Entity[entity].next) {}
  return(EntityChild[Entity[entity].children]);
}

/* GetMaxPoint gets the max points of the phrase of /Points */
int GetMaxPoints(category)
{
  int entity,maxpts;

for(maxpts=0,entity=EntityPtr[category];entity!=NO_ENTITY;
      entity=Entity[entity].next)
  {
    if (atoi(Entity[entity].value)>maxpts)
      maxpts = atoi(Entity[entity].value);
  }
  return(maxpts);
} void GetMaxCatPoints(Cats,num)
int *Cats,num;
{
  int i;
  for(i=0;i<num;i++)
    CategoryPts[i] = GetMaxPoints(GetEntity(PointsEntity,
       FindPhrase(CategoryEntity,Category[i])));
} int AssignedCatPts(ObjEntity,numcats)
int ObjEntity,numcats;
{
  int CatEnt,cat;

CatEnt = GetEntity(CategoryEntity,
     FindPhrase(ObjectiveEntity,ObjEntity));
  for(cat=0;cat<numcats;cat++)
    if (Category[cat] == CatEnt)
      return(CategoryPts[cat]);
  return(0);
}

/*
if classified in two categories and objective is one of them
```

```
and there are much more points in the objective category
then eliminate the other category */
void CheckCategory(class)
CLASS *class;
{
  int entity,delete,ObjPoints,i,j;
  int cats,obj,pos, maxpts;

cats = 0;
  obj = 0;
  pos = 0;
  delete = 0;
  maxpts = 0;

for(entity=EntityPtr[ObjectiveEntity]; entity != NO_ENTITY;
      entity = Entity[entity].next)
    InstallObjCat(Entity[EntityChild[Entity[entity].children]
       ].entity_type,&obj);
  for(entity = EntityPtr[class->entity_type]; entity != NO_ENTITY;
           entity = Entity[entity].next,pos++)
     if (!InstallCat(Entity[EntityChild[Entity[entity].children
        ]].entity_type,&cats))
         break;
  if (cats) GetMaxCatPoints(Category,cats);
  for(i=0;i<cats;i++)
  {
/*   fprintf(stderr,"Category %d %s has %d points\n",
     Category[i], Entity[Category[i]].value, CategoryPts[i]);  */
     if (CategoryPts[i] > maxpts)
       maxpts = CategoryPts[i];
  }
  for(i=0;i<cats;i++)
  {
    if (maxpts > 2*CategoryPts[i])
       DeletedCats[delete++] = Category[i];
  }
  if (obj==1)
  {
    if (cats)
    {
       for(i=0;i<obj;i++)
         if (ObjPoints = AssignedCatPts(CategoryObj[i],cats))
         {
           for(j=0;j<cats;j++)
           {
             if (!ObjectiveCat(GetEntity(ObjectiveEntity,
                  FindPhrase(CategoryEntity,Category[j])),obj) &&
                DeletedCats[delete++] = Category[j];
           }
         }
    }
  }
  if (delete) Delete(class,DeletedCats,delete);
} void CheckSubcat(class)
CLASS *class;
{
  int PtsEntity,entity,subcats,obj,points,i,j,pos,delete;
  int SubcatPtsEntity,SubcatObjEntity,ObjPoints;
  int maxpts;

subcats = 0;
  obj = 0;
  points = 0;
  delete = 0;
  maxpts = 0;
```

```
   pos=FindPhrase(CategoryEntity,class->entity_type);
   SubcatPtsEntity = GetEntity(PointsEntity,pos);
   SubcatObjEntity = GetEntity(ObjectiveEntity,pos);

for(entity = EntityPtr[SubcatObjEntity]; entity != NO_ENTITY;
            entity = Entity[entity].next)
   {
      SubcatObjective[obj++] = Entity[EntityChild[Entity[
         entity].children]].entity_type;
      if (obj==MAX_SUBCAT)
      {
         fprintf(stderr,
            "Too Many Objective SubCategories to disambiguate\n");
         obj=0;
         break;
      }
   }
   for(entity = EntityPtr[class->entity_type],
          PtsEntity = EntityPtr[SubcatPtsEntity];
       entity != NO_ENTITY;
       entity = Entity[entity].next,
          PtsEntity = Entity[PtsEntity].next)
   {
      Subcats[subcats++] = Entity[EntityChild[Entity[
         entity].children]].entity_type;
      SubcatPoints[points++] = atoi(Entity[EntityChild[Entity[
         PtsEntity].children]].value);
      if (subcats==MAX_SUBCAT)
      {
         fprintf(stderr,
            "Too Many Assigned SubCategories to disambiguate\n");
         subcats=0;
         break;
      }
   }
   for(i=0;i<subcats;i++)
   {
      if (SubcatPoints[i] > maxpts)
         maxpts = SubcatPoints[i];
   }
   for(i=0;i<subcats;i++)
   {
      if (maxpts > 2*SubcatPoints[i])
         DeletedSubcats[delete++] = Subcats[i];
   }
   if (obj)
   {
      if (subcats)
      {
         for(i=0;i<obj;i++)
            if (ObjPoints = AssignedSubcat(SubcatObjective[i],subcats))
            {
               for(j=0;j<subcats;j++)
               {
                  if (!ObjectiveSubcat(Subcats[j],obj) &&
                      MuchMorePoints(ObjPoints,SubcatPoints[j]))
                     DeletedSubcats[delete++] = Subcats[j];
               }
            }
      }
   }
   if (delete) Delete(class,DeletedSubcats,delete);
} void GreaterEq(class)
CLASS *class;
{
```

```c
      if (atoi(Entity[EntityPtr[class->entity_type]].value)
         >= atoi(Entity[EntityChild[Entity[EntityPtr[
            class->entity_type]].children]].value)+2)
         Entity[EntityPtr[class->entity_type]].next = NO_ENTITY;
      else
         EntityPtr[class->entity_type] = NO_ENTITY;
}

Reformat(buffer)
char *buffer;
{
   int i, pos;
   i=0;
   pos = 0;
   while (!isgraph(buffer[i]) || buffer[i] == ',' || buffer[i] == ' ')
      i++;
   while(buffer[i])
   {
      while(isgraph(buffer[i]) && buffer[i] != ',' && buffer[i] != ' ')
         buffer[pos++] = buffer[i++];
      while(buffer[i] && (!isgraph(buffer[i]) || buffer[i] == ',' || buffer[i] == ' '
      if (buffer[i]) buffer[pos++] = ' ';
   }
   buffer[pos] = 0;
   FixCaseToMixed(buffer);
   return;
} char Buffer[100];

isproper(entity)
int entity;
{
   int first,end,numlower;
   int mark, endmark, i, len, upwords, downwords;
   first = Entity[entity].start;
   end = Entity[entity].end;
   numlower = 0;
   mark = -1;
   endmark = -1;
   upwords = 0;
   downwords = 0;
   if (WordLoc[end].end - WordLoc[first].start > 98) return(0);
   for (i=first; i<=end; i++)
      if (isupper(Message[WordLoc[i].start]))
      {
         upwords++;
         if (mark == -1) mark = i;
         endmark = i;
         numlower = downwords;
      }
      else if ((islower(Message[WordLoc[i].start])) && (mark > -1))
         downwords++;
   if ((mark == endmark) || (upwords+numlower > 4) || (numlower >= upwords))
   {
      return(0);
   }
   len = WordLoc[endmark].end - WordLoc[mark].start + 1;
   if (len > 98) return(0);
   strncpy(Buffer, &Message[WordLoc[mark].start], len);
   Buffer[len] = 0;
   Entity[entity].start = mark;
   Entity[entity].end = endmark;
   Reformat(Buffer);
   len = strlen(Buffer);
   if (len >19)
      Buffer[19] = 0;
   else
      Buffer[len] = 0;
   Entity[entity].value = StrSave(Buffer);
   return(1);
```

```
}
ispropern(entity)
int entity;
{
  int first,end,numlower;
  int mark, endmark, i, len, upwords, downwords;
  first = Entity[entity].start;
  end = Entity[entity].end;
  numlower = 0;
  mark = -1;
  endmark = -1;
  upwords = 0;
  downwords = 0;
  if (WordLoc[end].end - WordLoc[first].start > 99)
    {
/*    fprintf(stderr, "BAD1: length > 99 - %s start %d end %d startpos %d endpos %
      return(0);
    }
  for (i=first; i<=end; i++)
    if (isupper(Message[WordLoc[i].start]))
      {
        upwords++;
        if (mark == -1) mark = i;
        endmark = i;
        numlower = downwords;
      }
    else if ((islower(Message[WordLoc[i].start])) && (mark > -1))
        downwords++;
  if ((mark == -1) || (upwords+numlower > 4) || (numlower >= upwords))
    {
/*  fprintf(stderr, "BAD: value %s mark %d endmark %d upowrds %d numlower %d\n", Ent
      return(0);
    }
  len = WordLoc[endmark].end - WordLoc[mark].start + 1;
  if (len > 98)
    {
      fprintf(stderr, "BAD2: length > 98 - %s start %d end %d\n",
        Entity[entity].value, WordLoc[mark].start,
        WordLoc[endmark].end);
      return(0);
    }
  strncpy(Buffer, &Message[WordLoc[mark].start], len);
  Buffer[len] = 0;
    Entity[entity].start = mark;
  Entity[entity].end = endmark;
  Reformat(Buffer);
  len = strlen(Buffer);
  if (len >19)
    Buffer[19] = 0;
  else
    Buffer[len] = 0;
  Entity[entity].value = StrSave(Buffer);
/*  fprintf(stderr, "GOOD: %s\n", Entity[entity].value); */
  return(1);
}

GetProperNouns(class)
CLASS *class;
{
  int entity;
  unsigned short *previous;

previous = &EntityPtr[class->entity_type];
  for (entity = EntityPtr[class->entity_type]; entity != NO_ENTITY;
       entity = Entity[entity].next)
    if (!isproper(entity))
      *previous = Entity[entity].next;
    else
      previous = &Entity[entity].next;
}
```

```
GetProperNoun(class)
CLASS *class;
{
  int entity;
  unsigned short *previous;

previous = &EntityPtr[class->entity_type];
  for (entity = EntityPtr[class->entity_type]; entity != NO_ENTITY;
       entity = Entity[entity].next)
    if (!ispropern(entity))
      *previous = Entity[entity].next;
    else
      previous = &Entity[entity].next;
}

/*-------------------------------------------------------------------
 * Copyright 1988, 1989, Resumix, Inc.
 *
 * addaction.c
 *-----------------------------------------------------------------*/
#include "../EXTRACT/includes.h"

extern int Educate(), Threshhold2(), GreaterEq(), Zero(), AtLeast4(),
    SumMAX(), Sum(), PointSum(), Threshhold(), ThreshPointSum(),
    AtLeastSTANDARD(), CheckSubcat(), CheckCategory(),
    TotalSkillBuzz(), GetProperNouns(), GetProperNoun(),
    AtLeast2(), ExtractJob(), Years(), FirstOccurrence(),
    AtLeast3Diff(), FirstFit(), Days(), PruneName();

ActionRecord ActionRoutines[]= {
    {"Educate", Educate},
    {"AtLeast2",    AtLeast2},
    {"AtLeastSTANDARD",   AtLeastSTANDARD},
    {"TotalSkillBuzz", TotalSkillBuzz},
    {"Threshhold2",   Threshhold2},
    {"Threshhold",    Threshhold},
    {"AtLeast4",    AtLeast4},
    {"GreaterEq", GreaterEq},
    {"AtLeast3Diff",    AtLeast3Diff},
    {"ExtractJob", ExtractJob},
    {"Sum", Sum},
    {"PruneName", PruneName},
    {"GetProperNouns", GetProperNouns},
    {"GetProperNoun", GetProperNoun},
    {"Zero", Zero},
    {"CheckSubcat", CheckSubcat},
    {"CheckCategory", CheckCategory},
    {"SumMAX", SumMAX},
    {"PointSum", PointSum},
    {"ThreshPointSum", ThreshPointSum},
    {"Years", Years},
    {"FirstFit", FirstFit},
    {"FirstOccurrence",   FirstOccurrence},
    {"Days",  Days},
    {NULL, NULL}
};

ConvertAction(class)
CLASS *class;
{
    int i;

for(i = 0; ActionRoutines[i].name != NULL; i++)
       if (strcmp(class->action_name, ActionRoutines[i].name)==0)
           break;
    class->action = ActionRoutines[i].func;
}
```

```
AddAction(file, class, args)
char *file;
CLASS *class;
char args[];
{
   char action[80];
   char error_msg[80];
   int n;

sscanf( args, "%s", action);
   for(n=0; ActionRoutines[n].name != NULL; n++)
      if ( strcmp( action, ActionRoutines[n].name)==0)
      {
         class->action = ActionRoutines[n].func;
         class->action_name = (char *)ClassStrSave(args);
         break;
      }
   if (class->action == NULL)
      CheckErrors("%s\tUndefined action   : %s\n", file, action);
}
/*----------------------------------------------------------------
 * Copyright 1988, Resumix, Inc.
 *
 * action.c
 *---------------------------------------------------------------*/ include <stdio.h>
include <sys/types.h>
#include <sys/timeb.h>
#include <time.h>
#include <malloc.h>
#include "devaluate.h"
include <ctype.h> include "../EXTRACT/includes.h"

define MAX_CHOICE 32
define MAX_DEGREES 22 extern void CombineKeyDegree();

int FirstNumChildErr = TRUE;
int FirstNumPairsErr = TRUE;

InitAction ()
{
  FirstNumChildErr = TRUE;
} void Mess(recovery_block, message)
int recovery_block;
char *message;
{
/*   fprintf(stderr, "%s: \n", message);
*/
}

...rent;

typedef struct _degree {
   int degree;
   int school;
   int date;
   int field;
   int gpa;
   int due;
   int share;
} DEGREE;
```

```c
static DEGREE Degree[MAX_DEGREES];

void reverse(s)
char s[];
{
   int c,i,j;
   for (i=0,j=strlen(s)-1;i<j;i++,j--) {
      c=s[i];
      s[i] = s[j];
      s[j] = c;
   }
} char *itoa(n)
int n;
{
   char *s;
   int i;

s = malloc(10);
   i=0;
   do {
      s[i++] = n%10+'0';
   } while (n/=10);
   s[i]=0;
   reverse(s);
   return(s);
}

/* Prints the frames */
void Printout(str)
char *str;
{
 int i;
 char message[200];
 for(i=0;i<=current;i++) {
 sprintf(message, "%s curr %d deg %s sch %s date %s fld %s gpa %s shar %d",
    str, i,
    Entity[Degree[i].degree].value,
    Entity[Degree[i].school].value,
    Entity[Degree[i].date].value,
    Entity[Degree[i].field].value,
    Entity[Degree[i].gpa].value ,
    Degree[i].share );
 fputs(ExtractRecover, message);
}} void InitDegrees()
{
    int i;
    for(i=0;i<MAX_DEGREES;i++)
    {
      Degree[i].degree = 0;
      Degree[i].school = 0;
      Degree[i].date   = 0;
      Degree[i].field  = 0;
      Degree[i].gpa    = 0;
      Degree[i].due    = 0;
      Degree[i].share  = 0;
    }
} void InitDegree(i)
int i;
{
     Degree[i].degree = 0;
     Degree[i].school = 0;
     Degree[i].date   = 0;
```

```c
        Degree[i].field  = 0;
        Degree[i].gpa    = 0;
        Degree[i].due    = 0;
        Degree[i].share  = 0;
}

/* True if degree, school, date do not intersect */
/*    Used to kick off a new degree.            */
int Agree(i)
int i;
{
    int j;
    j=i-1;
    while (Degree[j].share && Degree[j].share == Degree[i].share)
    {
        j--;
        if (j<0) return(0);
    }
    return((!Degree[i].degree || !Degree[j].degree) &&
        (!Degree[i].school || !Degree[j].school) &&
        (!Degree[i].date   || !Degree[j].date)   &&
        (!Degree[i].field  || !Degree[j].field)  &&
        (!Degree[i].gpa    || !Degree[j].gpa)    &&
        (!Degree[i].due    || !Degree[j].due));
} void Copy(i)
int i;
{
    Degree[i].degree = Degree[i-1].degree;
    Degree[i].school = Degree[i-1].school;
    Degree[i].date   = Degree[i-1].date;
    Degree[i].field  = Degree[i-1].field;
    Degree[i].gpa    = Degree[i-1].gpa;
    Degree[i].due    = Degree[i-1].due;
}

/* Combine the fields of all shared frames */
void Combine(i)
int i;
{
    int j,k;
    j=i-1;
    while (Degree[j].share && Degree[j].share == Degree[i].share)
    {
        j--;
    }
    if (j==i-1)
    {
        k=i;
        i=j;
        j=k;
    }
Printout("BEFORE COMBINE");
    if (!Degree[i].degree) Degree[i].degree = Degree[j].degree;
    if (!Degree[i].school) Degree[i].school = Degree[j].school;
    if (!Degree[i].date)   Degree[i].date   = Degree[j].date;
    if (!Degree[i].field)  Degree[i].field  = Degree[j].field;
    if (!Degree[i].gpa)    Degree[i].gpa    = Degree[j].gpa;
    if (!Degree[i].due)    Degree[i].due    = Degree[j].due;
    InitDegree(j);
Printout("AFTER COMBINE");
    if (i==j-1) current--;
}

/* True if the degrees are different but no other information intersects */
int DoubleMajor(i,j)
int i,j;
```

```c
{
    return (Degree[i].field && Degree[j].field &&
        (!Degree[i].degree || !Degree[j].degree) &&
        (!Degree[i].school || !Degree[j].school) &&
        (!Degree[i].date || !Degree[j].date) &&
        !Degree[i].gpa &&
        !Degree[i].due);
}

/* True if the degrees are different but no other information intersects */
int DoubleDegree(i,j)
int i,j;
{
    return (Degree[i].degree && Degree[j].degree &&
            strcmp(Entity[Degree[i].field].value,
                   Entity[Degree[j].field].value) &&
        (!Degree[i].school || !Degree[j].school) &&
        (!Degree[i].date || !Degree[j].date) &&
        (!Degree[i].gpa || !Degree[j].gpa) &&
        (!Degree[i].due || !Degree[j].due) );
} int sharing(i,j)
int i,j;
{
    return(Degree[i].share && Degree[i].share == Degree[j].share);
}

/* Share all slots of frame execept degree. Used for doubledegree */
void ShareButDegree(i)
int i;
{
    int j,school,date,field,gpa,due,share;

school = 0;
    date = 0;
    field = 0;
    gpa = 0;
    due = 0;
    share = Degree[i].share;
    for (j=i;j<i+2;j++)
    {
        if (Degree[j].school) school = Degree[j].school;
        if (Degree[j].date) date = Degree[j].date;
        if (Degree[j].field) field = Degree[j].field;
        if (Degree[j].gpa) gpa = Degree[j].gpa;
        if (Degree[j].due) due = Degree[j].due;
    }
    for (j=i;j<i+2;j++)
    {
        if (!Degree[j].school) Degree[j].school = school;
        if (!Degree[j].date) Degree[j].date = date;
        if (!Degree[j].field) Degree[j].field = field;
        if (!Degree[j].gpa) Degree[j].gpa = gpa;
        if (!Degree[j].due) Degree[j].due = due;
        Degree[j].share = 0;
    }
}

/* Share all slots of frame execept degree. Used for doublemajors */
void ShareButMajor(i)
int i;
{
    int j,school,date,degree,gpa,due,share;

school = 0;
    date = 0;
    degree = 0;
```

```
      gpa = 0;
      due = 0;
      share = Degree[i].share;
      for (j=i;j<i+2;j++)
      {
         if (Degree[j].school) school = Degree[j].school;
         if (Degree[j].date) date = Degree[j].date;
         if (Degree[j].degree) degree = Degree[j].degree;
         if (Degree[j].gpa) gpa = Degree[j].gpa;
         if (Degree[j].due) due = Degree[j].due;
      }
      for (j=i;j<i+2;j++)
      {
         if (!Degree[j].school) Degree[j].school = school;
         if (!Degree[j].date) Degree[j].date = date;
         if (!Degree[j].degree) Degree[j].degree = degree;
         if (!Degree[j].gpa) Degree[j].gpa = gpa;
         if (!Degree[j].due) Degree[j].due = due;
         Degree[j].share = 0;
      }
}

/* Returns true if the degree is the same and no other fields intersect */
/* Opposite of DoubleDegree */
int SingleDegree(i)
int i;
{
   return (!strcmp(Entity[Degree[i].degree].value,
                   Entity[Degree[i+1].degree].value) &&
           (!Degree[i].gpa || !Degree[i+1].gpa) &&
           (!Degree[i].school || !Degree[i+1].school) &&
           (!Degree[i].date || !Degree[i+1].date) &&
           (!Degree[i].due || !Degree[i+1].due) &&
           (!Degree[i].field || !Degree[i+1].field));
}

/* Share all values between frames */
void Share(i)
int i;
{
   int j,degree,school,date,field,gpa,due,share;

degree = 0;
   school = 0;
   date = 0;
   field = 0;
   gpa = 0;
   due = 0;
   if (SingleDegree(i))
      CombineKeyDegree(i+1);
   else
   {
   share = Degree[i].share;
   for (j=i;share == Degree[j].share;j++)
   {
      if (Degree[j].degree) degree = Degree[j].degree;
      if (Degree[j].school) school = Degree[j].school;
      if (Degree[j].date) date = Degree[j].date;
      if (Degree[j].field) field = Degree[j].field;
      if (Degree[j].gpa) gpa = Degree[j].gpa;
      if (Degree[j].due) due = Degree[j].due;
   }
   for (j=i;share == Degree[j].share;j++)
   {
      if (!Degree[j].degree) Degree[j].degree = degree;
      if (!Degree[j].school) Degree[j].school = school;
      if (!Degree[j].date) Degree[j].date = date;
      if (!Degree[j].field) Degree[j].field = field;
```

```
      if (!Degree[j].gpa) Degree[j].gpa = gpa;
      if (!Degree[j].due) Degree[j].due = due;
      Degree[j].share = 0;
    }
  }
} static char Value[300];

void AddDegree(class,degree)
CLASS *class;
DEGREE *degree;
{
  unsigned short first, last, *previous, num_parts;
  int first_child;
  first_child = NumEntityChild;
  strcpy(Value,Entity[degree->degree].value);
  first = Entity[degree->degree].start;
  last = Entity[degree->degree].end;
  if (NumEntityChild >= MAX_ENTITY_CHILD-3)
  {
    if (FirstNumChildErr)
    {
      FirstNumChildErr = FALSE;
      ExtractWarning("Exceeded maximum number of entity children");
    }
    return;
  }
  EntityChild[NumEntityChild++] = degree->degree;
  strcat(Value, ", ");
  if (degree->field)
  {
    strcat(Value, Entity[degree->field].value);
    first = MIN(first,Entity[degree->field].start);
    last = MAX(last,Entity[degree->field].end);
    if (NumEntityChild >= MAX_ENTITY_CHILD-2)
    {
      if (FirstNumChildErr)
      {
        FirstNumChildErr = FALSE;
        ExtractWarning("Exceeded maximum number of entity children");
      }
      goto ERROR;
    }
    EntityChild[NumEntityChild++] = Entity[degree->degree].entity_type;
  }
  strcat(Value, ", ");
  if (degree->school && strcmp(Entity[degree->school].value,"UNKNOWN_SCHOOL"))
  {
    strcat(Value, Entity[degree->school].value);
    first = MIN(first,Entity[degree->school].start);
    last = MAX(last,Entity[degree->school].end);
    if (NumEntityChild >= MAX_ENTITY_CHILD-2)
    {
      if (FirstNumChildErr)
      {
        FirstNumChildErr = FALSE;
        ExtractWarning("Exceeded maximum number of entity children");
      }
      goto ERROR;
    }
    EntityChild[NumEntityChild++] = Entity[degree->degree].entity_type;
  }
  strcat(Value, ", ");
  if (degree->due)
  {
    strcat(Value, Entity[degree->due].value);
    first = MIN(first,Entity[degree->due].start);
```

```
      last = MAX(last,Entity[degree->due].end);
      if (NumEntityChild >= MAX_ENTITY_CHILD-2)
      {
        if (FirstNumChildErr)
        {
          FirstNumChildErr = FALSE;
          ExtractWarning("Exceeded maximum number of entity children");
        }
        goto ERROR;
      }
      EntityChild[NumEntityChild++] = Entity[degree->degree].entity_type;
  }
  strcat(Value, ", ");
  if (degree->date)
  {
      strcat(Value, Entity[degree->date].value);
      first = MAX(first,Entity[degree->date].start);
      last = MAX(last,Entity[degree->date].end);
      if (NumEntityChild >= MAX_ENTITY_CHILD-2)
      {
        if (FirstNumChildErr)
        {
          FirstNumChildErr = FALSE;
          ExtractWarning("Exceeded maximum number of entity children");
        }
        goto ERROR;
      }
      EntityChild[NumEntityChild++] = Entity[degree->degree].entity_type;
  }
  strcat(Value, ", ");
  if (degree->gpa)
  {
      strcat(Value, Entity[degree->gpa].value);
      first = MAX(first,Entity[degree->gpa].start);
      last = MAX(last,Entity[degree->gpa].end);
      if (NumEntityChild >= MAX_ENTITY_CHILD-2)
      {
        if (FirstNumChildErr)
        {
          FirstNumChildErr = FALSE;
          ExtractWarning("Exceeded maximum number of entity children");
        }
        goto ERROR;
      }
      EntityChild[NumEntityChild++] = Entity[degree->degree].entity_type;
  }
  if (NumEntityChild >= MAX_ENTITY_CHILD-2)
    if (FirstNumChildErr)
    {
      FirstNumChildErr = FALSE;
      ExtractWarning("Exceeded maximum number of entity children");
    }
ERROR:
  EntityChild[NumEntityChild++] = NO_ENTITY;
  if (NumEntityChild>=MAX_ENTITY_CHILD - 1)
  {
    if (FirstNumChildErr)
    {
      ExtractWarning("Exceeded maximum number of entity children");
      FirstNumChildErr = FALSE;
      EntityChild[NumEntityChild] = NO_ENTITY;
      AddEntity(class->entity_type, NO_PHRASE, StrSave(Value),
         first,last,first_child,FALSE);
    }
    return;
  }
  EntityChild[NumEntityChild++] = NO_ENTITY;
  AddEntity(class->entity_type, NO_PHRASE, StrSave(Value),
```

```
          first,last,first_child,FALSE);
}

/* Returns true if any slots of frame are instantiated */
int exists(Degree)
DEGREE *Degree;
{
    return(Degree->degree || Degree->field || Degree->gpa ||
      Degree->due || Degree->date || Degree->school);
} int PlaceLastSchool (first,degree)
int first,degree;
{
    if (!Degree[degree].school && Degree[degree+1].degree)
    {
        Degree[degree].school = first;
        return(1);
    }
    return (0);
} int PlaceLastDate (first,degree)
int first,degree;
{
    if (!Degree[degree].date && Degree[degree+1].degree)
    {
        Degree[degree].date = first;
        return(1);
    }
    return (0);
} int PlaceLastGPA (first,degree)
int first,degree;
{
    if (!Degree[degree].gpa && Degree[degree+1].gpa)
    {
        Degree[degree].gpa = first;
        return(1);
    }
    return (0);
} void CombineKeyDegree(curr)
int curr;
{
    int i;
    i = curr-1;
    if (Degree[curr].degree)
    {
        while (i >= 0)
           if (strcmp(Entity[Degree[curr].degree].value,
              Entity[Degree[i].degree].value))
                i--;
              else break;
        if ((i >= 0) && (!Degree[i].gpa || !Degree[curr].gpa) &&
           (!Degree[i].due || !Degree[curr].due) &&
           (!Degree[i].school || !Degree[curr].school) &&
           (!Degree[i].field || !Degree[curr].field) &&
           (!Degree[i].date || !Degree[curr].date))
            {
                if (!Degree[curr].field) Degree[curr].field = Degree[i].field;
                if (!Degree[curr].school) Degree[curr].school = Degree[i].school;
                if (!Degree[curr].date) Degree[curr].date = Degree[i].date;
                if (!Degree[curr].gpa) Degree[curr].gpa = Degree[i].gpa;
                if (!Degree[curr].due) Degree[curr].due = Degree[i].due;
```

```c
            InitDegree(i);
        }
    }
} void CombineKeyField(curr)
int curr;
{
    int i;
    char message[500];
    i = curr-1;
    if (Degree[curr].field)
    {
        while (i >= 0)
            if (strcmp(Entity[Degree[curr].field].value,
                Entity[Degree[i].field].value))
                    i--;
                else break;
Printout("AWHILE FLD");
        if ((i >= 0) && (!Degree[i].gpa || !Degree[curr].gpa) &&
            (!Degree[i].due || !Degree[curr].due) &&
            (!Degree[i].school || !Degree[curr].school) &&
            (!Degree[i].degree || !Degree[curr].degree) &&
            (!Degree[i].date || !Degree[curr].date))
            {
                if (!Degree[curr].degree) Degree[curr].degree = Degree[i].degree;
                if (!Degree[curr].school) Degree[curr].school = Degree[i].school;
                if (!Degree[curr].date) Degree[curr].date = Degree[i].date;
                if (!Degree[curr].gpa) Degree[curr].gpa = Degree[i].gpa;
                if (!Degree[curr].due) Degree[curr].due = Degree[i].due;
                InitDegree(i);
            }
    }
} void CombineKeySchool(curr)
int curr;
{
    int i;
    i = curr-1;
    if (Degree[curr].school)
    {
        while (i >= 0)
            if (strcmp(Entity[Degree[curr].school].value,
                Entity[Degree[i].school].value))
                    i--;
                else break;
        if ((i >= 0) && (!Degree[i].gpa || !Degree[curr].gpa) &&
            (!Degree[i].due || !Degree[curr].due) &&
            (!Degree[i].field || !Degree[curr].field) &&
            (!Degree[i].degree || !Degree[curr].degree) &&
            (!Degree[i].date || !Degree[curr].date))
            {
                if (!Degree[curr].degree) Degree[curr].degree = Degree[i].degree;
                if (!Degree[curr].field) Degree[curr].field = Degree[i].field;
                if (!Degree[curr].date) Degree[curr].date = Degree[i].date;
                if (!Degree[curr].gpa) Degree[curr].gpa = Degree[i].gpa;
                if (!Degree[curr].due) Degree[curr].due = Degree[i].due;
                InitDegree(i);
            }
    }
} static char message[500];
void Educate(class)
CLASS *class;
{
```

```
    int eol,gpa,due,date,field,school,degree,entity_type,sharecode;
    int num_phrase,j,first,phrase,entity,entities,repeat;
    current = 0;
    first = 0;
    sharecode = 0;
    InitDegrees();
    degree = PhrasePair[Phrase[class->first_phrase].first_pair].entity_type;

field = PhrasePair[Phrase[class->first_phrase+1].first_pair].entity_type;
    school = PhrasePair[Phrase[class->first_phrase+2].first_pair].entity_type;
    due = PhrasePair[Phrase[class->first_phrase+3].first_pair].entity_type;
    date = PhrasePair[Phrase[class->first_phrase+4].first_pair].entity_type;
    gpa = PhrasePair[Phrase[class->first_phrase+5].first_pair].entity_type;
    eol = PhrasePair[Phrase[class->first_phrase+6].first_pair].entity_type;

entities=EntityPtr[class->entity_type];
    EntityPtr[class->entity_type] = NO_ENTITY;
    for(entity = entities;entity != NO_ENTITY;
        entity = Entity[entity].next)
    {
        first = entity;
        while.((entity_type = PhrasePair[Entity[entity].phrase].entity_type)
            != eol)
        {
          if (entity_type == gpa)
          {
            if (Degree[current].gpa)
            {
              if ((Degree[current].gpa == first) &&
                  PlaceLastGPA(first,current-1))
                  Degree[current].gpa = entity;
            }
            else Degree[current].gpa = entity;
          }
          else if (entity_type == degree)
          {
            if (!Degree[current].degree)
                Degree[current].degree = entity;
            else
            {
Printout("BEFOREDOUBLE Degree");
              if (Degree[current].share)
                Degree[current+1].share = Degree[current].share;
              else
              {
                Degree[current].share = ++sharecode;
                Degree[current+1].share = sharecode;
              }
              current++;
              if (current >= MAX_DEGREES-2) break;
              Copy (current);
              Degree[current].degree = entity;
 Mess(ExtractRecover, "Sharing Degree DOUBLEDEGREE");
Printout("AFTERDOUBLE Degree");
            }
          }
          else if (entity_type == field)
          {
            if (!Degree[current].field)
                Degree[current].field = entity;
            else if (strcmp(Entity[Degree[current].field].value,
                           Entity[entity].value))
            {
Printout("BEFOREDOUBLE Field");
              if (Degree[current].share)
                Degree[current+1].share = Degree[current].share;
              else
              {
```

```
                    Degree[current].share = ++sharecode;
                    Degree[current+1].share = sharecode;
                }
                current++;
                if (current >= MAX_DEGREES-2) break;
                Copy (current);
                Degree[current].field = entity;
 Mess(ExtractRecover, "Sharing Field DOUBLEMAJOR");
Printout("AFTERDOUBLE Field");
            }
        }
        else if (entity_type == school)
        {
            if ((Degree[current].school) &&
                (Degree[current].school == first))
                    PlaceLastSchool(first,current-1);
            Degree[current].school = entity;
        }
        else if (entity_type == due)
            Degree[current].due = entity;
        else if (entity_type == date)
        {
            if (Degree[current].date)
            {
                if (Degree[current].date == first)
                {
                    if (PlaceLastDate(first,current-1))
                        Degree[current].date = entity;
                }
            }
            else Degree[current].date = entity;
        }
 sprintf(message, "WORD is %s type is %d",
        Entity[entity].value,
        PhrasePair[Entity[entity].phrase].entity_type);
Mess(ExtractRecover, message);
Printout("AFTERWORD");
            entity = Entity[entity].next;
            if (entity == NO_ENTITY)
                break;
    }
/* check for intersection of university, date or degree  */
/* combine last date, first gpa                          */
        if (exists(&Degree[current]))
        {
sprintf(message,"agree is %d current is %d",
    Agree(current),current);
Mess(ExtractRecover, message);
Printout("BEFOREAGREE");
            if ((current > 0) && Agree(current))
                Combine(current);
            current++;
            if (current >= MAX_DEGREES-2) break;
Printout("AFTERAGREE");
        }
    }
/* try to combine frames */
Printout("BEFORE SHARE");
    j=1;
    while (j<=current)
    {
        if (sharing(j-1,j)) Share(j-1);
        j++;
    }
Printout("AFTER SHARE bDOUBLE");
/*  j=1;
    while (j<=current)
    {
        if (DoubleMajor(j-1,j))
```

```
                ShareButMajor(j-1);
            j++;
        }
Printout("AFTER SHARE MAJOR"); */
        j=1;
        while (j<=current)
        {
            if (DoubleDegree(j-1,j))
                ShareButDegree(j-1);
            j++;
        }
Printout("DBL bComb deg");
        j=1;
        while (j <= current)
        {
                CombineKeySchool(j);
Printout("DBL BComb FLD");
                CombineKeyField(j);
Printout("DBL AFTER FLD");
                CombineKeyDegree(j);
                j++;
        }
Printout("DBL aComb deg");
        j=0;
        while (j <= current)
        {
            if (Degree[j].degree)
                AddDegree(class,&Degree[j]);
            j++;
        }
}

CheckJob( phrase_entity, entity, first_found)
int phrase_entity[], entity, first_found;
{
    /* Make sure they are approx. contiguous */
    /* Clear out company address if found */
    int i, j, k, m, last_end, num_found, proximity;
#define NUM_PHRASE 4
#define  DATE_RANGE 0
#define  JOB_TITLE  1
#define  COMPANY    2
#define  CO_ADDRESS 3
    static int SIZE[NUM_PHRASE]= { 8, 4, 4, 10};

num_found= 0;
    for( j=first_found; j!=entity; j= Entity[j].next)
        num_found++;

last_end= Entity[first_found].end;
    for( j=Entity[first_found].next; j!=entity; j= Entity[j].next)
    {
        for(i=0; i<NUM_PHRASE; i++)
            if (phrase_entity[i]==j) break;
        if (i<NUM_PHRASE)
        {
            proximity= (i!=COMPANY && num_found==2) ? 14 : 4;
            if (last_end+proximity<Entity[j].start)
            {
                if (i!=DATE_RANGE)
                {
                    phrase_entity[i]= NO_ENTITY;
                    last_end+= SIZE[i];
                }
                else
                {
                    for(k= first_found; k!=j; k= Entity[k].next)
                    {
```

```
                for(m=0; m<NUM_PHRASE; m++)
                    if (phrase_entity[m]==k) break;
                if (m<NUM_PHRASE) phrase_entity[m]= NO_ENTITY;
            }
            last_end= Entity[j].end;
        }
    }
    else
        last_end= Entity[j].end;
    if (i==CO_ADDRESS) phrase_entity[i]= NO_ENTITY;
        }
    }
} int atoi(s)
char s[];
{
  int i, n;
  n=0;
  for (i=0;s[i]>= '0' && s[i] <= '9'; ++i)
    n=10*n+s[i] - '0';
  return(n);
}

/* Preserves all answers if there are at least two */
Threshhold(class)
CLASS *class;
{
    int entity, child, count;

count = 0;
/* for each occurence of any entity in this class */
    for(entity = EntityPtr[class->entity_type];
       entity != NO_ENTITY;
       entity = Entity[entity].next)
    {
      for (child = Entity[entity].children;
        EntityChild[child] != NO_ENTITY; child++)
      {
        count += atoi(Entity[EntityChild[child]].value);
      }
    }
    if (count < MIN_THRESH)
        EntityPtr[class->entity_type] = NO_ENTITY;
    else
    {
      Entity[EntityPtr[class->entity_type]].next = NO_ENTITY;
    }
}

/* Preserves all answers if there are at least two */
Threshhold2(class)
CLASS *class;
{
    int entity, count;

count = 0;
/* for each occurence of any entity in this class */
    for(entity = EntityPtr[class->entity_type]; entity != NO_ENTITY;
                 entity = Entity[entity].next)
        count++;
    if (count < 2)
        EntityPtr[class->entity_type] = NO_ENTITY;
}
```

```c
/* returns the entity type of the matched synonym given
   the entity type of the class containing the synonym */
int FindSyn(entity)
int entity;
{
 int fp;
 if (Entity[entity].entity_type < FIRST_CLASS)
 {
    fprintf(stderr, "Error in FindSyn: %s is a word, not a synonym\n",
        Entity[entity].value);
    return(0);
 }
 else
 {
  for(fp=ClassList[PhrasePair[Phrase[ClassList[Entity[entity].entity_type
        -FIRST_CLASS].first_phrase].first_pair].entity_type-FIRST_CLASS
        ].first_phrase;
      strcmp(
        ClassList[PhrasePair[Phrase[fp].first_pair
          ].entity_type-FIRST_CLASS].name,
        Entity[entity].value);
      fp++);
  return(PhrasePair[Phrase[fp].first_pair].entity_type);
 }
} static int used[MIN_THRESH+1];

int check_repeats(entity,i)
int entity,*i;
{
   int j;

for(j=0;j<*i && j < MIN_THRESH;j++)
     if (used[j]==entity) return(1);
   used[j] = entity;
   (*i)++;
   return(0);
} void TotalSkillBuzz(class)
CLASS *class;
{
   int entity, count, repeats;
   WLIST *np,*Wlookup();

count = 0;
   repeats = 0;
/* for each occurence of any entity in this class */
   for(entity = EntityPtr[class->entity_type]; entity != NO_ENTITY;
                 entity = Entity[entity].next)
     {
       np = Wlookup(FindSyn(entity));
       if (!np)
       {
         fprintf(stderr,
           "Error in TotalSkillBuzz: %s not in buzzword structure\n\n",
           ClassList[FindSyn(entity)-FIRST_CLASS].name);
         count += STANDARD_VALUE;
       }
       else if (np->Value < STANDARD_VALUE)
       {
         if (!check_repeats(np->entity_type,&repeats))
           count += np->Value;
       }
       else count += np->Value;
     }
```

```
    Entity[EntityPtr[class->entity_type]].next = NO_ENTITY;
    Entity[EntityPtr[class->entity_type]].value=itoa(count);
}

SumMAX(class)
CLASS *class;
{
    int entity, count;

count = 0;
    for(entity = EntityPtr[class->entity_type]; entity != NO_ENTITY;
                entity = Entity[entity].next)
      count += MIN_THRESH;
    if (count)
    {
      Entity[EntityPtr[class->entity_type]].end += 2;
      Entity[EntityPtr[class->entity_type]].next = NO_ENTITY;
      Entity[EntityPtr[class->entity_type]].value=itoa(count);
    }
    else EntityPtr[class->entity_type] = NO_ENTITY;
}

Sum(class)
CLASS *class;
{
    int entity, count;

count = 0;
    for(entity = EntityPtr[class->entity_type]; entity != NO_ENTITY;
                entity = Entity[entity].next)
      count += STANDARD_VALUE;
    Entity[EntityPtr[class->entity_type]].next = NO_ENTITY;
    Entity[EntityPtr[class->entity_type]].value=itoa(count);
    Entity[EntityPtr[class->entity_type]].end++;
}

ThreshPointSum(class)
CLASS *class;
{
    int entity, count;
    WLIST *np,*Wlookup();

count = 0;
    for(entity = EntityPtr[class->entity_type]; entity != NO_ENTITY;
                entity = Entity[entity].next)
    {
        count += atoi(Entity[entity].value);
    }
    if (count < MIN_THRESH)
        EntityPtr[class->entity_type] = NO_ENTITY;
    else
    {
      Entity[EntityPtr[class->entity_type]].next = NO_ENTITY;
      Entity[EntityPtr[class->entity_type]].value=itoa(count);
    }
}

PointSum(class)
CLASS *class;
{
    int entity, count;
    WLIST *np,*Wlookup();

count = 0;
    for(entity = EntityPtr[class->entity_type]; entity != NO_ENTITY;
                entity = Entity[entity].next)
        count += atoi(Entity[entity].value);
    if (count)
    {
```

```
      Entity[EntityPtr[class->entity_type]].next = NO_ENTITY;
      Entity[EntityPtr[class->entity_type]].value=itoa(count);
    }
    else EntityPtr[class->entity_type] = NO_ENTITY;
}

Zero (class)
CLASS *class;
{
   EntityPtr[class->entity_type] = NO_ENTITY;
}

AtLeastSTANDARD(class)
CLASS *class;
{
    int entity, count;
    WLIST *np,*Wlookup();

count = 0;
    for(entity = EntityPtr[class->entity_type]; entity != NO_ENTITY;
                 entity = Entity[entity].next)
    {
       np = Wlookup(FindSyn(entity));
       if (!np)
       {
         fprintf(stderr,
           "Error in AtLeastSTANDARD: %s not in buzzword structure\n\n",
           ClassList[FindSyn(entity)-FIRST_CLASS].name);
         count += 2;
       }
       else
          count += np->Value;
    }
    if (count < STANDARD_VALUE)
        EntityPtr[class->entity_type] = NO_ENTITY;
    else Entity[EntityPtr[class->entity_type]].next = NO_ENTITY;
}

AtLeast2(class)
CLASS *class;
{
    int entity, count;

count = 0;
/* for each occurence of any entity in this class */
    for(entity = EntityPtr[class->entity_type]; entity != NO_ENTITY;
                 entity = Entity[entity].next)
        count++;
    if (count < 2)
        EntityPtr[class->entity_type] = NO_ENTITY;
    else Entity[EntityPtr[class->entity_type]].next = NO_ENTITY;
}

AtLeast4(class)
CLASS *class;
{
    int entity, count;

count = 0;
/* for each occurence of any entity in this class */
    for(entity = EntityPtr[class->entity_type]; entity != NO_ENTITY;
                 entity = Entity[entity].next)
        count++;
    if (count < 4)
        EntityPtr[class->entity_type] = NO_ENTITY;
    else Entity[EntityPtr[class->entity_type]].next = NO_ENTITY;
```

```
} int Different(entity,count,types)
int entity,count,*types;
{
        int i;
        for (i = 0; i<count;i++)
            if (types[i] == Entity[entity].phrase)
                 return(0);
        return(1);
}

AtLeast3Diff(class)
CLASS *class;
{
   int entity, count;
   int types[4];
   count = 0;

/* for each occurence of a unique in this class */
   for(entity = EntityPtr[class->entity_type]; entity != NO_ENTITY;
                   entity = Entity[entity].next)
   {
      if (!count)
      {
        types[count] = Entity[entity].phrase;
        count++;
      }
      else if (count == 3) break;
      else if (Different(entity,count,types))
      {
        types[count] = Entity[entity].phrase;
        count++;
      }
   }
   if (count < 3)
      EntityPtr[class->entity_type] = NO_ENTITY;
   else Entity[EntityPtr[class->entity_type]].next = NO_ENTITY;
}

Days(class)
CLASS *class;
{
   int entity, day;
   unsigned short *previous;

/* for each occurence of any entity in this class */
   for(previous = &EntityPtr[class->entity_type], entity = EntityPtr[class->entity_
       entity != NO_ENTITY; entity = Entity[entity].next)
   {
       sscanf( Entity[entity].value, "%d", &day);
/* if it is not within the range of a day, get rid of it */
       if ((day < 1) || (day > 31))
           *previous = Entity[entity].next;
       else
           previous = &Entity[entity].next;

}
}

Years(class)
CLASS *class;
{
    int last, entity, year;
    static int Year= -1, Year2= 88;
define GOOD_YEAR_SPAN 40 if (Year==-1) {
        long c;
        struct tm *date;
```

```c
        c= time((time_t *) NULL);
        date= localtime(&c);
        Year= 1900+date->tm_year+2;
        Year2= date->tm_year+2;
    }
/* for each occurence of any entity in this class */
    for(last=NO_ENTITY, entity = EntityPtr[class->entity_type];
            entity != NO_ENTITY; entity = Entity[entity].next)
    {
        sscanf( Entity[entity].value, "%d", &year);
        if (year<100 &&
            ( (year<=Year2) ? (year+GOOD_YEAR_SPAN>=Year2) :
                (year>=Year2+(100-GOOD_YEAR_SPAN)) ))
        {
            last= entity;
        }
        else if (year>=100 && year<=Year && Year<=year+GOOD_YEAR_SPAN)
        {
            Entity[entity].value+= 2;
            last= entity;
        }
        else
        {
            if (last==NO_ENTITY)
            {
                EntityPtr[ class->entity_type] = Entity[entity].next;
            }
            else
            {
                Entity[last].next= Entity[entity].next;
            }
        }
    }
}

AddNewBest(class, num_phrase, phrase_entity, warning)
CLASS *class;
int num_phrase;
int phrase_entity[];
BOOLEAN warning;
{
    int j, first_child;

unsigned short first, last;

/* create an occurence of this class containing all of the found info */
    Value[0] = '\0';
    first_child = -1;
    for(j = 0; j < num_phrase; j++)
    {
        if (j!=0)
        {
          strcat(Value, ", ");
        }
        if (phrase_entity[j] != NO_ENTITY)
        {
            strcat(Value, Entity[phrase_entity[j]].value);
            if (first_child == -1)
            {
               first_child = NumEntityChild;
               first = Entity[phrase_entity[j]].start;
               last = Entity[phrase_entity[j]].end;
            }
            else
            {
                first = MAX( first, Entity[phrase_entity[j]].start);
                last = MAX( last, Entity[phrase_entity[j]].end);
            }
            if (NumEntityChild>=MAX_ENTITY_CHILD - 1)
```

```
   {
      if (FirstNumChildErr)
      {
         ExtractWarning("Exceeded maximum number of entity children");
         FirstNumChildErr = FALSE;
      }
      break;
   }
      EntityChild[NumEntityChild++] = phrase_entity[j];
   }
   if (NumEntityChild>=MAX_ENTITY_CHILD)

if (FirstNumChildErr)
      {
         ExtractWarning("Exceeded maximum number of entity children");
         FirstNumChildErr = FALSE;
      }
      return;
   }
   EntityChild[NumEntityChild++] = NO_ENTITY;
   AddEntity(class->entity_type, NO_PHRASE, StrSave(Value),
         first, last, first_child, warning);
}

FirstFit(class)
CLASS *class;
{
   int entity, last;
   unsigned short phrase;

/* find the first phrase (pair) which has an instance */
   phrase= Phrase[class->first_phrase+class->num_phrases- 1].first_pair;
   for(entity = EntityPtr[class->entity_type]; entity != NO_ENTITY;
            entity = Entity[entity].next)
   {
      if (Entity[entity].phrase<phrase)
      {
         phrase= Entity[entity].phrase;
      }
   }

/* delete each instance of later phrases in this class */
   last= NO_ENTITY;
   for(entity = EntityPtr[class->entity_type]; entity != NO_ENTITY;
            entity = Entity[entity].next)
   {
      if (Entity[entity].phrase>phrase)
      {
         if (last!= NO_ENTITY)
            Entity[last].next= Entity[entity].next;
         else
            EntityPtr[class->entity_type]= Entity[entity].next;
      }
      else
         last= entity;
   }
}

FirstOccurrence(class)
CLASS *class;
{
   int entity, good;
   int start, end;

good = NO_ENTITY;
   start = INFINITY;
   end = INFINITY;
```

```c
    for(entity = EntityPtr[class->entity_type]; entity != NO_ENTITY;
            entity = Entity[entity].next)
    {
        if ((Entity[entity].start < start) ||
            ((Entity[entity].start == start) && (Entity[entity].end < end)))
        {
            good = entity;
            start = Entity[entity].start;
            end = Entity[entity].end;
        }
    }

EntityPtr[class->entity_type] = good;
    Entity[good].next = NO_ENTITY;
}

/*------------------------------------------------------------
 * template.h
 *------------------------------------------------------------*/ define MAX_TEMPLATE 20
define MAX_SLOTS 5
define MAX_INSTANCES 100 define MAX_DATA_FIELDS 500 define STRING_TYPE 3
define INTEGER_TYPE 2
define DATE_TYPE 1 typedef struct _slot_instance
{
    unsigned short entity[MAX_SLOTS];
}SLOT_INSTANCE;

typedef struct _slot
{
    char *name;
    ENTITY_TYPE entity_type;
    ENTITY_TYPE parent_type;
}SLOT;

typedef struct _template
{
    char *name;
    ENTITY_TYPE entity_type;
    int num_slots;
    int current_slot;
    int num_instances;
    int current_instance;
    SLOT slot[MAX_SLOTS];
    SLOT_INSTANCE instance[MAX_INSTANCES];
}TEMPLATE;

typedef struct _data_field
{
    char title[16];
    char value[64];
    BOOLEAN warning;
}DATA_FIELD;

extern DATA_FIELD *Person;
extern int NumPerson;

extern int NumTemplate;
extern FillTemplates();
extern ReadTemplates();
extern PutEntityInTemplate();
extern TEMPLATE *Template;
```

```c
/*----------------------------------------------------------------
 * prescan.h
 *----------------------------------------------------------------*/ define DOCUMENT_END       MAX_ENTITY_TYPE-1
define DOCUMENT_BEGIN     MAX_ENTITY_TYPE-2
#define NUMBER_ENTITY      MAX_ENTITY_TYPE-3
#define NUMBER1_ENTITY     MAX_ENTITY_TYPE-4
#define NUMBER2_ENTITY     MAX_ENTITY_TYPE-5
#define NUMBER3_ENTITY     MAX_ENTITY_TYPE-6
#define NUMBER4_ENTITY     MAX_ENTITY_TYPE-7
#define NUMBER5_ENTITY     MAX_ENTITY_TYPE-8
#define LINE_END           '\n'
define FIRST_SPECIAL_CLASS NUMBER5_ENTITY define NO_MORE   0xffff
define NO_ENTITY 0       /* this value MUST be 0 */
#define NULL_ENTITY -1
define NO_PHRASE 0xffff typedef struct _entity
{
    char              *value;
    unsigned short    children;
    ENTITY_TYPE       entity_type;
    unsigned short    next;
    unsigned short    start, end;
    unsigned short    phrase;
    BOOLEAN           warning;
}ENTITY;

typedef struct _location
{
    unsigned short    start, end;
}LOCATION;

extern LOCATION *WordLoc;
extern int NumLoc;
extern char *DocPoint;
extern ENTITY *Entity;
extern ENTITY_TYPE *EntityPtr;
extern int NumEntity;
extern unsigned short *EntityChild;
extern int NumEntityChild;
extern unsigned char PhraseMap[];
extern unsigned char DocumentMap[];
extern unsigned char NumMap[];
extern unsigned char AlphaMap[];
extern unsigned char UpperMap[];
extern unsigned char LowerMap[];
extern unsigned char OutsideMap[];
extern unsigned char InsideMap[];
extern char *Ascii[];
#include "../defines.h"
#include "defines.h"
#include "utils.h"
#include "extract.h"
#include "class.h"
#include "prescan.h"
#include "dict.h"
#include "maps.h"
#include "template.h"
```

```
/*------------------------------------------------------------------
 * extract.h
 *------------------------------------------------------------------*/
include <setjmp.h> extern unsigned char *Message;
extern PHRASE *Phrase;
extern int NumPhrase;
extern PHRASE_PAIR *PhrasePair;
extern int NumPair;
extern jmp_buf ExtractRecover;

#define MAX_MATCHES 4

/*------------------------------------------------------------------
 * dict.h
 *------------------------------------------------------------------*/ define END_TYPE 0 define NO_WORD -1
define INFINITY 0x7fffffff
#define SHORT_INFINITY 0x7fff
define ENTITY_HOLDER_SIZE 32 typedef struct _word_index
{
    int word;
    ENTITY_TYPE entity_type;
    BOOLEAN star;
    char error_count;
    short next_word;
}WORD_INDEX;

typedef struct _searcher
{
    unsigned short entity;
    unsigned short next;
    unsigned short previous;
}SEARCHER;

extern int PutInDictionary();
extern InitDictionary();

extern long WordHashTable[];
extern char *WordList;
extern WORD_INDEX *WordIndex;
extern unsigned short *StarWord;
extern unsigned short *SpellWord;
extern int NumWords;
extern int NumWordChars;
extern int NumStarWords;
extern int NumSpellWords;
extern char Value[];
#define MIN_THRESH 12
#define STANDARD_VALUE 2
#define MAX_CATEGORIES 5
#define MAX_SUBCAT 10
#define SUBCAT_FACTOR 1
define CAT_FACTOR 1 typedef struct wlist {
  int entity_type;
  unsigned short number;
  unsigned short categories[MAX_CATEGORIES];
  int Value;
  struct wlist *next;
} WLIST;

int ObjectiveEntity,CategoryEntity,PointsEntity;
```

```
/*-------------------------------------------------------------------
 * defines.h
 *------------------------------------------------------------------*/ typedef unsigned short ENTITY_TYPE;

/* resume related sizes */
#define MAX_MESSAGE         25000
#define MAX_ENTITY          20000
#define MAX_ENTITY_CHILD    50000
/* Need to fix memory allocation failures (in StrSave)
   xxxxxxxxxxxxxxxxxxxxxxx XXXXXXXXXXXXXXXXXXXXXXXxxx */
#define MAX_MEMORY          100000
#define MAX_RES_WORDS       5000

/* class definition related sizes */
#define MAX_CLASS           5000
#define MAX_CLASS_MEMORY    45000
#define MAX_PHRASE          10000
#define MAX_PHRASE_PAIR     19000
#define MAX_WORDS           3500
#define MAX_WORD_CHARS      35000
#define MAX_STAR_WORDS      300
#define MAX_SPELL_WORDS     300
#define FIRST_WORD          128
#define FIRST_CLASS         (FIRST_WORD + MAX_WORDS)
#define MAX_ENTITY_TYPE     (FIRST_CLASS + MAX_CLASS)

typedef struct _phrase_pair
{
    ENTITY_TYPE entity_type;
    unsigned short operator;
}PHRASE_PAIR;

typedef struct _phrase
{
    unsigned short num_pairs;
    unsigned short first_pair;
}PHRASE;

typedef struct _class
{
    char *name;
    unsigned short num_phrases;
    unsigned short first_phrase;
    ENTITY_TYPE entity_type;
    int (*action)();
    char *action_name;
    unsigned short class_syn;
}CLASS;

/*-------------------------------------------------------------------
 * class.h
 *------------------------------------------------------------------*/ define NO_TYPE         0
define NO_CLASS        MAX_ENTITY_TYPE+1 define CLASS_CHAR      '/'
define SYNONYM_CHAR    '='
#define OPERATOR_CHAR   '['
#define LITERAL_CHAR    '"'
#define ESCAPE_CHAR     '^'
#define ERROR_CHAR      '!'
define STAR_CHAR       '~' define NUMBER_MASK     0x3f
define SIGN_BIT        0x20
```

```
#define NO_OPERATOR          1
#define MERGE_OPERATOR       0x40
#define CONTAINS_OPERATOR    0x80
#define STOP_OPERATOR        0x100
#define FIRST_OPERATOR       0x200
#define WITHIN_OPERATOR      0x400
#define BEFORE_OPERATOR      0x800
#define REMEMBER_OPERATOR    0x1000
#define OPTIONAL_OPERATOR    0x2000
#define IGNORE_OPERATOR      0x4000
define NOT_OPERATOR         0x8000 define UNKNOWN         0
define DEF_CLASS       1
#define DEF_SYNONYM     2
#define PHRASE_LINE     3
#define INCLUDE_LINE    4
#define COMMENT         5
#define USES_LINE       6
#define DEF_TEMPLATE    7
#define TEMPLATE_LINE   8
define DEF_ACTION      9 define TYPE_CLASS 0x01
define TYPE_SYNONYM 0x02 define END_TYPE 0 define SYMTAB_SIZE         50
define LOCAL_SYMTAB_SIZE   40
define DEF_FILE_NAME_SIZE  50 typedef struct {
    char def_file_name[DEF_FILE_NAME_SIZE];
    int  first_symbol, num_symbols;
} Symbol;

extern Symbol GlobalSymbolTable[SYMTAB_SIZE];
extern int LocalSymbolTable[LOCAL_SYMTAB_SIZE];
extern CLASS *ClassList;
extern int NumClass;

typedef struct {
    char *name;
    int (*func)();
} ActionRecord;
extern ActionRecord ActionRoutines[];

long
FindWord(word_hash, word)
long word_hash;
char *word;
{
    register long list;

for(list = WordHash[word_hash];
        (list != NO_WORD) && (!StrEqu(word, &WordList[WordIndex[list].word]);
        list = WordIndex[list].next);
    return(list);
} long
GetRoot(word)
char *word;
{
    char *word_end;
    register char *sptr, *wptr;
    long list;
```

```
char original[250];
long rule;
char wild_card;

if ((list = FindWord(HashWord(word), word)) != NO_WORD) return(list);

strcpy(original, word);
word_end = word + (strlen(word) - 1);

for(rule = 0; rule < NumRules; rule++)
{
   wild_card = 0;
   wptr = word_end;
   sptr = &RuleTable[Suffix[rule].minus];
   while(*sptr != '\0')
   {
      if (*sptr == '*')
      {
         if (wild_card == 0)
            wild_card = *wptr;
         else
            if (*wptr != wild_card) break;
      }
      else
         if (*wptr != *sptr) break;
      wptr--;
      sptr++;
   }
   if (*sptr == '\0')
   {
      for(wptr++, sptr = &RuleTable[Suffix[rule].plus];
         *sptr != '\0'; wptr++, sptr++)
      {
         if (*sptr == '*')
            *wptr = wild_card;
         else
            *wptr = *sptr;
      }
      *wptr = '\0';
      if ((list = FindWord(HashWord(word), word)) != NO_WORD) return(list);
      strcpy(word, original);
   }
}
return(NO_WORD);
}

/****************************************************************
 * Copyright 1988, Resumix, Inc.
 ****************************************************************/
static char SccsId[]="@(#)ocr.c 1.1\t3/1/89";
#include <stdio.h>
#include <fcntl.h>
#include <sys/types.h>
#include <sys/stat.h>
#include <search.h>
#include <ctype.h>
#include <malloc.h>
include <setjmp.h> include "ocr.h"
include "../BLOCK/segment.h"

static box boxes[MAX_BLOCKS];

static int breaks,
   splits[MAX_BREAKS];
```

```
static char Zone[6000];

#define CTL_J 0x0a
#define CTL_K 0x0b
define CTL_L 0x0c char *ReadZone( file, zone)
char *file;
int zone;
{
    int i, n, ch;
    int c;
    FILE *f;

f=fopen(file, "r");
    if( f==NULL) return( NULL);

c= fgetc( f);
    while (c!=CTL_L) {
        if (zone-- ==0) {
            ch= 0;
            while ((c= fgetc( f))!=CTL_J) ;
            for (c=fgetc( f); c!=CTL_K; c=fgetc( f)) {
                for (i=0, n=c-'0'; i<3; i++) {
                    n= 10*n+(fgetc(f)-'0');
                }
                if (ch+n>=sizeof(Zone)) break;
                for (i=0; i<n; i++) {
                    Zone[ch++]= fgetc( f);
                }
            }
            Zone[ch]= '\0';
            fclose( f);
            return( Zone);
        } else {
            while ((c= fgetc( f))!=CTL_J) ;
            for (c=fgetc( f); c!=CTL_K; c=fgetc( f)) {
                for (i=0, n=c-'0'; i<3; i++) {
                    n= 10*n+(fgetc(f)-'0');
                }
                for (i=0; i<n; i++) {
                    fgetc( f);
                }
            }
        }
        c= fgetc( f);
    }
    fclose(f);
    return( NULL);
} static char Line[120];
char *NextLine( text)
char *text;
{
    int i;

if (*text=='\0') return( NULL);
    for (i=0; i<sizeof(Line)-2 && *text!='\n'; ) {
        Line[i++]= *text++;
    }
    Line[i++]= *text++;
    Line[i]='\0';
    return( text);
}

ReblockHeader(text)
char *text;
{
```

```
int m, n, max_len;
char *line;
char white[120];

for (n=0; n<sizeof(white); n++) white[n]= 1;
max_len= 0;
while ((text=NextLine( text))!=NULL) {
    line= Line;
    for (n=0; n<sizeof(white) && *line!='\0'; ) {
        if (*line==CSI) {
            line= c_csiparse( line, NULL, NULL);
        } else {
            if (*line!=' ') white[n]= 0;
            line++, n++;
        }
    }
    if (n>max_len) max_len= n;
}
breaks= 0;
for (n=0; n<sizeof(white) && n<max_len; n++) if (!white[n]) break;
splits[breaks++]= n;
for (n=0; n<sizeof(white)-WHITE_WIDTH && n<max_len-WHITE_WIDTH; n++) {
    for (m=0; m<WHITE_WIDTH; m++)
        if (!white[n+m]) break;
    if (m==WHITE_WIDTH) {
        splits[breaks++]= n;
        while (white[n]) n++;
        if (breaks==MAX_BREAKS-1) break;
    }
}
splits[breaks]= max_len+1;
}

ImageToText( text_file, blocks, page, density, pitch)
char *text_file;
int *blocks, page;
int density, pitch;
{
    char shell_file[L_tmpnam];
    char buffer[120];
    FILE *f;
    int i, stat;
    int first_block;
    int CompareBox(), AssignBlockType();

tmpnam( shell_file);
    f= fopen( shell_file, "w");
    fprintf( f, "#\n");
    fprintf( f, "# set verbose\n");
    fprintf( f, "c_s_marklevel -d%s 2\n", OCR_DEVICE);
    fprintf( f, "c_s_resolution -d%s 4\n", OCR_DEVICE);
    fprintf( f, "c_s_density -d%s %d\n", OCR_DEVICE, density);
    fprintf( f, "c_s_fixedpitch -d%s %d\n", OCR_DEVICE, pitch);
    first_block= *blocks= 0;
    if (segment(blocks, boxes)!=0) return(TOO_MANY_BLOCKS);
    for (i=first_block; i<*blocks; i++) boxes[i].page= page;
    qsort(&boxes[first_block], *blocks-first_block,
        sizeof(box), CompareBox);
    AssignBlockType( *blocks-first_block);
    fprintf( f, "c_c_pzones -d%s\n", OCR_DEVICE);
    for (i=first_block; i<*blocks; i++) {
        fprintf( f, "c_a_pzone -d%s 3 %d %d %d %d\n", OCR_DEVICE,
                    boxes[i].column1,
                    boxes[i].row1,
                    boxes[i].width,
                    boxes[i].height);
    }
    fprintf( f, "c_goperm -d%s %s\n", OCR_DEVICE, text_file);
```

```c
    fprintf( f, "rm %s\n", shell_file);
    fclose( f);
    chmod( shell_file, S_IEXEC | S_IWRITE | S_IREAD);

sprintf( buffer, "csh -e -c %s", shell_file);
    if ((stat=system( buffer))==0) {
        StatusLine( "Character recognition successful");
        return( 0);
    } else {
        sprintf( buffer, "OCR error number %d during recognition", stat);
            ErrorReturn( buffer);
            return( stat);
    }
}

BitmapToText( bitmap_file_name, text_file_name, ocr_density, ocr_pitch)
char *bitmap_file_name, *text_file_name;
int ocr_density, ocr_pitch;
{
    FILE *file_ptr;
    int status, i, page, blocks, zone;
    char *line;
    int m, n, k, len;
    char file_name[120], text_tmp[L_tmpnam], buffer[120];
    char *text, *block_text, *end_csi;
    struct stat buf;

status= CDP_SUCCESS;
    tmpnam( text_tmp);
    for (page=0; ; page++) {
        sprintf( file_name, "%s.%d", bitmap_file_name, page);
        if (stat( file_name, &buf)== -1) {
            if (page==0) status= NO_BITMAP_FILE;
            break;
        }

StatusLine("Spatial Text Analysis in Progress");
        sprintf( buffer, "csh -e -c 'scan75dpi %s %s'", OCR_DEVICE,
            file_name);
        if ((status=system( buffer))!=0) break;
        if (OpenBitmapFile(file_name)==-1) {
            status= CDP_NOPAGE;
            break;
        }
        status= ReadBitmapFile();
        if (status!=CDP_SUCCESS && status!=CDP_WRONGLEN) {
            CloseBitmapFile(1);
            break;
        }

StatusLine("Character Recognition in Progress");
        status=ImageToText( text_tmp, &blocks, page, ocr_density, ocr_pitch);
        CloseBitmapFile(1);
        if (status!=0) break;

StatusLine("Spatial Text Analysis in Progress");
        file_ptr= fopen( text_file_name, "a");
        i=0;
        for (zone= 0; zone<blocks; zone++) {
            if ((text= ReadZone( text_tmp, zone))==NULL) continue;
            if (boxes[i].type==HEADER_BLOCK) {
                ReblockHeader(text);
                for (m=n=0; n<breaks; n++) {
                    block_text= text;
                    while ((block_text=NextLine(block_text))!=NULL) {
                        line= Line;
                        for (k= 0; k<splits[n]; ) {
                            if (*line==CSI) {
```

```
                line= c_csiparse( line, NULL, NULL);
            } else {
                line++, k++;
            }
            if (*line=='\0') break;
        }
        if (*line=='\0') continue;
        if (m++==0) fputc( '\\', file_ptr);
        while (k<splits[n+1] && *line!='\0') {
            if (*line==CSI) {
                end_csi= c_csiparse( line, NULL, NULL);
                while (line!=end_csi) {
                    fputc( *line, file_ptr);
                    line++;
                }
            } else {
                fputc( *line, file_ptr);
                line++, k++;
            }
        }
        if (*line!='\0') fputc( '\n', file_ptr);
    }
        }
    } else {
        while ((text=NextLine(text))!=NULL) {
            line= Line;
            if (*line!='\n') {
                while (*line!='\0') {
                    if (*line==CSI) {
                        line= c_csiparse( line, NULL, NULL);
                    } else {
                        fputc( *line, file_ptr);
                        line++;
                    }
                }
            }
        }
    }
    i++;
}
        fclose( file_ptr);
    }
    unlink( text_tmp);
    return(status);
}

DoBlock(page, blocks)
int page;
int *blocks;
{
    int i, stat;
    int first_block;
    int CompareBox(), AssignBlockType();
    c_s_marklevel( CDP_MARK2);
    if ((stat= c_s_resolution(4))!=CDP_SUCCESS) return(stat);
    first_block= *blocks= 0;
    if (segment(blocks, boxes)!=0) return(TOO_MANY_BLOCKS);
    for (i=first_block; i<*blocks; i++) boxes[i].page= page;
    qsort(&boxes[first_block], *blocks-first_block,
        sizeof(box), CompareBox);
    AssignBlockType( *blocks-first_block);
    if ((stat= c_c_tzones()) != CDP_SUCCESS) return(stat);
    for (i=first_block; i<*blocks; i++) {
        stat= c_a_tzone(CDP_TXT,
                    boxes[i].column1,
                    boxes[i].row1,
                    boxes[i].width,
                    boxes[i].height);
```

```
        if (stat!= CDP_SUCCESS)
            break;
    }
    c_s_marklevel( CDP_NONE);
    return(stat);
}

CompareBox(b1, b2)
box *b1, *b2;
{
    if ( ApproxEq(b1->row1, b2->row1)==0)
        return(ApproxEq(b1->column1, b2->column1));
    if ( ApproxEq(b1->row1+b1->height, b2->row1)<=0)
        return(-1);
    if ( ApproxEq(b1->row1, b2->row1+b2->height)>=0)
        return(1);
    if ( b1->column1 < b2->column1)
        if ( ApproxEq(b1->row1, b2->row1)>0 &&
             ApproxEq(b1->row1+b1->height, b2->row1+b2->height)>0)
            return(1);
        else
            return(-1);
    else
        if ( ApproxEq(b2->row1, b1->row1)>0 &&
             ApproxEq(b1->row1+b1->height, b2->row1+b2->height)<0)
            return(-1);
        else
            return(1);
}

AssignBlockType( blocks)
int blocks;
{
    int i, left_margin, right_margin;

left_margin=INCH*8;
    right_margin= 0;
    for (i=0; i<blocks; i++) {
        if (boxes[i].column1<left_margin) left_margin= boxes[i].column1;
        if (boxes[i].column1+boxes[i].width>right_margin)
            right_margin= boxes[i].column1+boxes[i].width;
    }
    for (i=0; i<blocks; i++) {
        if (About(boxes[i].column1, left_margin)==0) {
/***
            boxes[i].width<right_margin-INCH*2)
***/
            boxes[i].type= HEADER_BLOCK;
            boxes[i].width= boxes[i].column1+boxes[i].width-16;
            boxes[i].column1= 16;
        } else if (About(boxes[i].column1+boxes[i].width/2,
                    (left_margin+right_margin)/2)==0 &&
                boxes[i].width<right_margin-left_margin-INCH*2 &&
                (i==0 || ApproxEq(boxes[i].row1, boxes[i-1].row1)!=0) &&
                (i==blocks-1 || ApproxEq(boxes[i].row1, boxes[i+1].row1)!=0))
            boxes[i].type= HEADER_BLOCK;
        else if (i==0)
            boxes[i].type= HEADER_BLOCK;
        else
            boxes[i].type= BODY_BLOCK;
        if (About(boxes[i].column1+boxes[i].width, right_margin)==0) {
            boxes[i].width= 640*16-boxes[i].column1;
        }
    }
}
```

```
/******************************************************************
 * Copyright 1988, Resumix, Inc.
 ******************************************************************/
include <stdio.h> include "segment.h"

vertical(row1, column1, row2, column2, left_edge, right_edge, num_col)
   int row1, column1, row2, column2, *num_col;
   int left_edge[20], right_edge[20];

{
int i, j, i1, j1, i2, j2;
int column_sum = 0;
char forming_line=0;
unsigned char t;
int last_fill = 0;
int blank_space;
int threshold;

*num_col = 0;
/***
blank_space = line_space/7;
***/
blank_space = 2;
threshold= column_threshold;
/***
 *(row2-row1)/line_space/2;
***/
/*line_spacing(row1, column1, row2, column2);*/ for(j = column1; j <= column2; j++)
        {
            column_sum = 0;
            for (i=row1;i < row2; i++)
            {
               column_sum += BitCount[ BitmapBuffer[i*COLUMNS+j] ];
            }
            if ((column_sum < threshold) && (forming_line) &&
                        ((j-last_fill) > blank_space) )
               {
                 forming_line = 0;
                 right_edge[*num_col] = j-blank_space+1;
                 *num_col = *num_col + 1;
               }
              else if( (column_sum >= threshold) && !(forming_line) )
               {
                 forming_line = 1;
                 left_edge[*num_col] = j-1;
                 last_fill = j;
               }
             if( column_sum > threshold ) last_fill = j;
          }
         if (forming_line)
            {
              forming_line = 0;
              right_edge[*num_col] = column2;
              *num_col = *num_col + 1;
            }
  left_edge[*num_col] = column2;
  right_edge[*num_col] = column2;
}

/******************************************************************
 * Copyright 1988, Resumix, Inc.
 ******************************************************************/
#define ROWS   800
#define COLUMNS 80
```

```c
#define INCH 1200
#define MAX_SPACING 50
#define MAX_BLOCKS 50
#define TOO_MANY_BLOCKS 9999
#define BITMAP_OVERFLOW 9998
#define NO_BITMAP_FILE  9997
#define TOP_MARGIN 15
#define BOTTOM_MARGIN (ROWS - TOP_MARGIN)
#define LEFT_MARGIN 3
#define RIGHT_MARGIN (COLUMNS - LEFT_MARGIN)
define SECOND_ROUND_THRESHOLD 2 define MIN_LINE_SPACING 5
define MAX_LINE_SPACING 20 define HEADER_BLOCK 0
define BODY_BLOCK   1 typedef struct {
     int page, row1, column1, width, height;
     int type;
} box;

extern int line_space;
extern unsigned char *BitmapBuffer;
extern int line_threshold, column_threshold;
int BitCount[256];

/***********************************************************************
 * Copyright 1988, Resumix, Inc.
 ***********************************************************************/
include <stdio.h> include "segment.h"

unsigned char *BitmapBuffer;
int line_space;
int BitCount[256];
int line_threshold = 3;
int column_threshold = 2;

segment(box_count,boxes)
int *box_count;
box boxes[];
{
int ir1, ir2, ic1, ic2;
int top_1[50], top_2[50];
int bottom_1[50], bottom_2[50];
int left_1[50], left_2[50];
int right_1[50], right_2[50];
int num_row_1, num_row_2;
int num_col_1, num_col_2;

line_space= 0;
line_spacing(TOP_MARGIN, LEFT_MARGIN, BOTTOM_MARGIN, RIGHT_MARGIN);

horiz(TOP_MARGIN, LEFT_MARGIN, BOTTOM_MARGIN, RIGHT_MARGIN,
        top_1, bottom_1, &num_row_1);

line_threshold = SECOND_ROUND_THRESHOLD;

for ( ir1 = 0; ir1 < num_row_1; ir1++)
  {
   printf("horizontal block %d: %d,%d,%d,%d\n", ir1, top_1[ir1], LEFT_MARGIN, bottc
   vertical(top_1[ir1], LEFT_MARGIN, bottom_1[ir1], RIGHT_MARGIN,
           left_1, right_1, &num_col_1);
    for ( ic1 = 0; ic1 < num_col_1; ic1++)
      {
```

```
    printf("vertical block %d, in horizontal block %d: %d,%d,%d,%d\n", ic1, ir1,
      horiz(top_1[ir1], left_1[ic1], bottom_1[ir1], right_1[ic1],
           top_2, bottom_2, &num_row_2);
      for( ir2 = 0; ir2 < num_row_2; ir2++)
        {
          vertical( top_2[ir2], left_1[ic1], bottom_2[ir2], right_1[ic1],
               left_2, right_2, &num_col_2);
          for(ic2 = 0; ic2 < num_col_2; ic2++)
            {
              if(top_2[ir2] != bottom_2[ir2] && left_2[ic2] != right_2[ic2])
                {
                  boxes[*box_count].row1 = top_2[ir2]*16;
                  boxes[*box_count].height = (bottom_2[ir2]-top_2[ir2])*16;
                  boxes[*box_count].column1 = left_2[ic2]*8*16;
                  boxes[*box_count].width = (right_2[ic2]-left_2[ic2])*8*16;
                  if (boxes[*box_count].width>=INCH/2 &&
                      boxes[*box_count].height>=INCH/8) {
                    *box_count= *box_count+1;
                    if (*box_count>=MAX_BLOCKS)
                       return(1);
                  }
                }
            }
        }
   }
  for (ir1=0; ir1<*box_count; ir1++)
    printf("block %d: %d,%d,%d,%d\n", ir1, boxes[ir1].column1/16, boxes[ir1].row1/16
  return(0);
}

InitSegment()
{
    int t;

for (t=0; t<sizeof(BitCount)/sizeof(int); t++) {
        BitCount[t]= (int)((t & 1) + ((t>>1) & 1) + ((t>>2) & 1) + ((t>>3) & 1)
             + ((t>>4) & 1) + ((t>>5) & 1) + ((t>>6) & 1) + ((t>>7) & 1));
    }
}

/************************************************************************
 * Copyright 1988, Resumix, Inc.
 ************************************************************************/
include <stdio.h> include "segment.h"

line_spacing(row1, column1, row2, column2)
int row1, column1, row2, column2;

{
int i, j, i1, j1, i2, j2;
int row_sum = 0, line_histogram[MAX_SPACING];
int column_sum[COLUMNS];
char forming_line=0;
unsigned char t;
int top_line, old_top_line;
int num_line = 0;
int center_column;

for(i=0; i < MAX_SPACING; i++) line_histogram[i] = 0;

for(j = column1; j < column2; j++)
        {
          column_sum[j] = 0;
          for (i = row1;i < row2; i++)
            {
               column_sum[j] += BitCount[ BitmapBuffer[i*COLUMNS+j] ];
            }
        }
         center_column= column1;
```

```c
                    for (i2 = column1; i2 < column2; i2++)
                        {
                            if(column_sum[i2] > column_sum[center_column])
                                {
                                    center_column = i2;
                                }
                        }
printf("COLUMN HISTOGRAM\n");
for (i=column1; i<column2; i++) printf("%d:   %d\n", i, column_sum[i]);
printf("margin column= %d\n", center_column);

printf("ROW HISTOGRAM\n");
for (i = row1;i < row2; i++)
        {
            row_sum = 0;
            for(j = (center_column>column1) ? center_column: column1;
                j <= ((center_column+8<column2) ? (center_column+8): column2); j++)
                {
                row_sum += BitCount[ BitmapBuffer[i*COLUMNS+j] ];
                }
printf("%d:   %d\n", i, row_sum);
            if ((row_sum < line_threshold) && (forming_line) )
                {
                    forming_line = 0;
                    num_line++;
                    old_top_line= top_line;
                }
                else if( (row_sum >= line_threshold) && !(forming_line) )
                {
                    forming_line = 1;
                    top_line= i;
                    if(num_line > 0)
                        {
                            if( top_line - old_top_line < MAX_SPACING)
                              line_histogram[top_line - old_top_line]++;
                        }
                }
        }
            line_space= 5;
            for (i2 = 5; i2 <= 20; i2++)
                {
                    if(line_histogram[i2] > line_histogram[line_space])
                        {
                            line_space = i2;
                        }
                }
printf("LINE SPACING HISTOGRAM\n");
for (i=0; i<MAX_SPACING; i++) printf("%d:   %d\n", i, line_histogram[i]);
printf("line_space= %d\n", line_space);
}

/************************************************************************
 * Copyright 1988, Resumix, Inc.
 ***********************************************************************/
include <stdio.h> include "segment.h"

horiz(row1, column1, row2, column2, top_line, bottom_line, num_line)
   int row1, column1, row2, column2, *num_line;
   int bottom_line[], top_line[];
{
int i, j, i1, j1, i2, j2;
int row_sum = 0;
char forming_line=0;
unsigned char t;
int last_fill = 0;
int blank_space;

*num_line = 0;
blank_space = (5 * line_space)/8;
```

```
/*line_spacing(row1, column1, row2, column2);*/ printf( "HORIZONTAL BLOCK HISTOGRAM\n");
for (i=row1;i < row2; i++)
        {
            row_sum = 0;
            for(j = column1; j <= column2; j++)
            {
              row_sum += BitCount[ BitmapBuffer[i*COLUMNS+j] ];
            }
printf("%d:   %d", i, row_sum);
            if ((row_sum < line_threshold) && (forming_line) &&
                        ((i-last_fill) > blank_space) )
              {
                forming_line = 0;
                bottom_line[*num_line] = i-blank_space+3;
                *num_line = *num_line + 1;
printf("    ending region of text at %d\n", i-blank_space+3);
              }
            else if( (row_sum >= line_threshold) && !(forming_line) )
              {
printf("    starting region of text at %d\n", i-3);
                forming_line = 1;
                top_line[*num_line] = i-3;
                last_fill = i;
              } else {
printf( "\n");
              }
            if( row_sum > line_threshold ) last_fill = i;
        }
        if (forming_line)
            {
printf("ending region of text at %d\n", row2);
              forming_line = 0;
              bottom_line[*num_line] = row2;
              *num_line = *num_line + 1;
            }
   top_line[*num_line] = row2;
   bottom_line[*num_line] = row2;
}
```

A METHOD AND APPARATUS FOR COMPUTER UNDERSTANDING

AND MANIPULATION OF MINIMALLY FORMATTED TEXT DOCUMENTS

Appendix 2

```
#uses states.def
#uses dates.def
#uses sections.def
#uses header.def
#uses experience.def
#uses category.def
#uses years.def
uses educate.def TEMPLATE          APPLICANT_NAME
SLOT  Applicant        APPLICANT TEMPLATE          APP_ADDRESS
SLOT  Address_type     ADDRESS_TYPE
SLOT  Address          ADDRESS
SLOT  City             CITY
SLOT  State            STATE
SLOT  Zip              ZIP_CODE TEMPLATE          HOME_PHONE
SLOT  Home_Phone       PHONE_NUMBER
```

```
TEMPLATE        BUSINESS_PHONE
SLOT   Work_Phone      PHONE_NUMBER

TEMPLATE        MESSAGE_PHONE
SLOT   Message_Phone   PHONE_NUMBER

TEMPLATE        EDUCATION
SLOT   Degree          DEGREE_YEAR

TEMPLATE        YEARS
SLOT   Dates           POS_TITLE

TEMPLATE        ROOT2
SLOT   Exp_Category    Category

TEMPLATE        ROOT
SLOT   Experience      Experience

; category.def
; Copyright 1989, Resumix, Inc.
;
#uses sections.def
#uses objective.def
#uses experience.def
#uses titles.def
uses S_Legal.def SYN     Legal
ACTION  Threshhold
        /(Titles_Legal)
        /(Skills_Legal)
        /(Other_Legal)

CLASS   Points_Legal
ACTION  ThreshPointSum
        /(Titles_Legal)
        /(Skills_Legal)
        /(Other_Legal)

CLASS   Points_C_Administ
        /(Points_Legal)

CLASS   Administrative
ACTION  CheckSubcat
        =(Legal)

CLASS   Points
        /(Points_C_Administ)

CLASS   Category
ACTION  CheckCategory
        /(Administrative)

CLASS   Objective
        /(Object_C_Administ)

CLASS   ROOT
        /Experience [N W I] =OBJECTIVE_SECTION

CLASS   ROOT2
        /Category uses sections.def
uses dates.def
#uses header.def
#uses states.def
#uses guess.def
```

```
#uses titles.def
#uses system.def

SYN     EXP_FULL_LINE
        [I] =STOPPER [* B F I] /EOL [W I] =EXPERIENCE_SECTION

SYN     BLANK_EXP_LINE
        =LINE [W I] =EXPERIENCE_SECTION [N C I] =EXP_FULL_LINE

CLASS   POS_EXP_DATES
        [I] =STOPPER [1] /DATE [N W I] /DATE_RANGE $
  [W I] =EXPERIENCE_SECTION
        =Present [N W I] /DATE_RANGE [W I] =EXPERIENCE_SECTION CLASS   EXP_DATES
        /DATE_RANGE [W I] =EXPERIENCE_SECTION
        /SEASON_YEAR [N W I] /DATE_RANGE [W I] =EXPERIENCE_SECTION
 ;          [I] /BLOCK_MARK [1] /POS_EXP_DATES [W I] =EXPERIENCE_SECTION CLASS   GROUP
        group
        section
        department CLASS   LEADER
        leader
        head
        manager SYN     DB
        data base
        database
        db SYN     DATE_BLOCK
        /EXP_DATES [* B F I] /EXP_DATES
        /EXP_DATES [N B] /EXP_DATES [* B F I] =ANY_HEADER

SYN     NONBLANK_LINE
        [I] /EOL [* B F I] /EOL [W I] =EXPERIENCE_SECTION

SYN     BLANK_LINE
        =LINE [N C I] =NONBLANK_LINE [W I] =EXPERIENCE_SECTION

CLASS   POS_TITLE
ACTION  ExtractJob
        ./POS_EXP_DATES [N W I] /EXP_DATES
        /EXP_DATES
        /Any_Company [W I] =EXPERIENCE_SECTION
        /All_Titles [W I] =EXPERIENCE_SECTION
        =STOPPER [N W I] =BLANK_LINE [W I] =EXPERIENCE_SECTION
        =BLANK_LINE [W I] =EXPERIENCE_SECTION
        /BLOCK_MARK [W I] =EXPERIENCE_SECTION CLASS   YEARS
        /POS_TITLE
#uses system.def
uses sections.def
uses dates.def
uses degrees.def SYN     Engineering_field
        Engineering!2
        Eng
        engg SYN     Electrical
        electrical
```

```
            electronic
            electronics
            Elect

SYN         EE
            MSEE
            BSEE
            BSEET
            EE
            E.E
            =Electrical =Engineering_field SYN         Compu Eng
            computer [N 1] science =Engineering_field SYN         Aero
            aero
            aeronautical
            aerospace
            astronautical SYN         Aero Eng
            AE
            A.E
            =Aero =Engineering_field SYN         Info&Comp_Science
            Information [2] computer [1] science
            Computer [1] Information SYN         ICS
            ics
            i [1] c [1] s SYN         Computer_Science
            computer [1] science [N W I] =Info&Comp_Science

SYN         CS2
            MSCS
            BSCS
            CS
            C.S

SYN         CS
            =CS2 [N W I] =ICS
            =ICS
            =Computer_Science
            =Info&Comp_Science SYN         Mech Eng
            ME
            M.E
            mechanical!2 =Engineering_field SYN         Business
            Business
            Commerce SYN         Math
            math
            mathematics SYN         Ind Eng
            industrial!2 =Engineering_field
            industrial technology
```

```
SYN     Sys Eng
        systems -Engineering_field

SYN     Chemistry
        chemistry

SYN     Chem Eng
        chemical -Engineering_field

SYN     Civil Eng
        civil -Engineering_field

CLASS   ENG_FIELD
        =EE
        =(Mech Eng)
        =(Aero Eng)
        =(Civil Eng)
        =(Ind Eng)
        =(Compu Eng)
        =(Sys Eng)
        =(Chem Eng)

SYN     Engineer
        [N] =CS [0] =Engineering_field [N W I] /ENG_FIELD $
 [N 1] drafting SYN     Mgmt
        management
        mgmt SYN     Psych
        Psychology
SYN     S.S.Phy
        solid state physics SYN     Physics
        physics [N W I] =(S.S.Phy)

SYN     Bioeng
        bioengineering

SYN     Cybernet
        cybernetic
        cybernetics

SYN     AI
        AI
        artificial intelligence

SYN     Data Pro
        data processing

SYN     Avionics
        avionics

SYN     MIS
        MIS
        management information systems

SYN     Oper Res
        Operations Research

SYN     Astrophys
        astrophysics

SYN     Drafting
        drafting
```

| | | |
|---|---|---|
| SYN | Ind Relations<br>industrial relations | |
| SYN | HR<br>HR<br>human resources<br>=(Ind Relations) | |
| SYN | Psychology<br>psychology | |
| SYN | Education<br>education [N W I] =EDUCATION_HEADER | |
| SYN | sciences<br>science<br>sciences | |
| SYN | Social Sc<br>social =sciences | |
| SYN | Anthro<br>anthropology | |
| SYN | Behav Sc<br>behavioral =sciences | |
| SYN | Phys Edu<br>physical education | |
| SYN | Political Science<br>political =sciences | |
| SYN | Linguist<br>linguistics<br>neurolinguistics | |
| SYN | Philo<br>philosophy | |
| SYN | Music<br>music | |
| SYN | Pub Admin<br>=MPA<br>public administration [N W I] =MPA | |
| SYN | Acct<br>accounting | |
| SYN | Stats<br>statistics | |
| SYN | Economics<br>economics | |
| SYN | Banking<br>banking | |
| SYN | Finance<br>finance | |
| SYN | Law<br>law<br>=BSL | |
| SYN | Journal<br>journalism | |

| | |
|---|---|
| SYN | Comm<br>communications |
| SYN | Sociology<br>sociology |
| SYN | Lib Arts<br>liberal arts<br>liberal studies |
| SYN | English<br>english |
| SYN | Ind Arts<br>industrial arts |
| SYN | History<br>history |
| SYN | Marketing<br>marketing |
| SYN | Architect<br>architecture |
| SYN | Biology<br>biology<br>biological =sciences |
| SYN | Elec Tech<br>electronics technology<br>electronic technology |
| SYN | Mat Sci<br>material science |
| CLASS | Other_Majors<br>=(Aero Eng)<br>=AI<br>=Anthro<br>=Architect<br>=Astrophys<br>=Avionics<br>=Banking<br>=(Behav Sc)<br>=Bioeng<br>=Biology<br>=(Civil Eng)<br>=Comm<br>=(Cybernet)<br>=Drafting<br>=(Data Pro)<br>=Economics<br>=Education<br>=Engineer<br>=History<br>=(Ind Arts)<br>=Law<br>=(Lib Arts)<br>=Linguist<br>=Marketing<br>=MIS<br>=Music<br>=(Oper Res)<br>=Philo<br>=(Phys Edu)<br>=Psych<br>=(Pub Admin) |

```
                =(Social Sc)
                =Sociology
                =Stats
                =(Sys Eng)

CLASS   Major
                =Acct
                =Business
                =(Chem Eng)
                =Chemistry
                =(Compu Eng)
                =CS
                =EE
                =(Elec Tech)
                =English
                =HR
                =(Finance )
                =(Ind Eng)
                =Journal
                =(Mat Sci)
                =Math
                =(Mech Eng)
                =Mgmt
                =Physics
                =(S.S.Phy)
                /Other_Majors SYN     due
        due
        expected
        completion
        completed
        candidate
        current
        to [1] be CLASS   GPA
        /NUMBER1 [0 M] . [0 M] /NUMBER
        /NUMBER1 [0 M] - [0 M] /NUMBER SYN     gpa
        gpa
        g [1] p [1] a
        gp [1] a
        g [1] pa SYN     present
        present
        current [N 2 I] =gpa
SYN     credit
        credit
        credits

CLASS   E_DATE
        /YEAR [W I] =EDUCATION_SECTION

CLASS   E_PRESENT
        =present [W I] =EDUCATION_SECTION

CLASS   SECOND_DATE
        [I] /E_DATE [5 F] /E_DATE [W I] /DATE_RANGE
        [I] /E_DATE [5 F] /E_PRESENT [W I] /DATE_RANGE

CLASS   D_DATE
        /E_DATE [N W I] /GPA [N W I] /DATE_RANGE [N 1 I] =credit
        /SECOND_DATE
        /E_PRESENT [N W I] /DATE_RANGE
```

```
SYN     DEGREE_STOPPER
        | [W I] =EDUCATION_SECTION
        \ [W I] =EDUCATION_SECTION uses schools.def

SYN     UNKNOWN_SCHOOL
        -univ [N W I] /School
        -College [N W I] /School CLASS   ANY_SCHOOL
        /School [W I] =EDUCATION_SECTION
;         =UNKNOWN_SCHOOL [W I] =EDUCATION_SECTION ; If the order of the patterns is changed in DEGREE_YEAR,
; the system will not work. Educate in action.c must be modified.

CLASS   PossMajor
        /Major [C I] /Degree
        [I] /Degree [15] /Major [W I] =EDUCATION_SECTION
        [I] major [O I] : /Major CLASS   DEGREE_YEAR
ACTION  Educate
        /Degree [W I] =EDUCATION_SECTION
        /PossMajor [W I] =EDUCATION_SECTION
        /ANY_SCHOOL [W I] =EDUCATION_SECTION
        -due [W I] =EDUCATION_SECTION
        /D_DATE [W I] =EDUCATION_SECTION
        /GPA [W I] =EDUCATION_SECTION
        =STOPPER [W I] =EDUCATION_SECTION

CLASS   EDUCATION
        /DEGREE_YEAR [W I] =EDUCATION_SECTION

CLASS   College_Degrees
        /Bachelors
        /Masters
        =Phd

; objective.def
; Copyright 1989, Resumix, Inc.
;
#uses sections.def
uses titles.def CLASS   Object_C_Administ
        /(Buzz_Legal_Title) [W I] =OBJECTIVE_SECTION ; experience.def
; Copyright 1989, Resumix, Inc.
;
uses S_Legal.def CLASS   Experience
        /(Legal_Experience)

#uses system.def
uses dates.def
#uses sections.def
#uses states.def
#uses titles.def

CLASS   ZIP_CODE
        /NUMBER5A [O I] - [O] /NUMBER4A

CLASS   PHONE
        /NUMBER3A [N O] , [O I] - /NUMBER4A
```

```
SYN       NAME_LOCATION
ACTION    FirstOccurrence
          /BOD [B F] /STATE [N W I] =FIRST_TWO_LINES
          /BOD [B F] /ZIP_CODE [N W I] =FIRST_TWO_LINES
          /BOD [B F] /PHONE [N W I] =FIRST_TWO_LINES
          /BOD [B F] =TENTH_LINE [N W I] =FIRST_TWO_LINES
          =END_HEADER [N W I] =FIRST_TWO_LINES SYN       RES_OF
          [O] , /NonName_Titles [O O] : {W I] =LINE $
   [W I]  =FIRST_TEN_LINES CLASS     POSSAPP
          [I] =RES_OF [* B F I] =STOPPER
          [I] =STOPPER [* B F I] =RES_OF
          [I] =RES_OF [* B F I] =RES_OF [W I] =LINE
          [I] =STOPPER [* B F I] =STOPPER [W I] =FIRST_TEN_LINES CLASS     POSS_APPLICANT_LINE
ACTION    PruneName
          /POSSAPP [N C I] =RES_OF [W I] =NAME_LOCATION CLASS     APPLICANT
ACTION    FirstOccurrence
          /POSS_APPLICANT_LINE [N C I] /NUMBER [W I] =LINE SYN       START_HEADER
ACTION    FirstFit
          /BOD [B F] /APPLICANT [C I] /NUMBER
          /APPLICANT
          /BOD SYN       POSS_HEADER_SEC
ACTION    FirstFit
          =START_HEADER [B F] /ZIP_CODE [* B F I] =END_HEADER
          =START_HEADER [* B F I] =END_HEADER SYN       POSS2_HEADER_SEC
ACTION    FirstOccurrence
          =POSS_HEADER_SEC [C I] /STATE SYN       HEADER_SECTION
ACTION    FirstFit
          =POSS2_HEADER_SEC
          =POSS_HEADER_SEC

CLASS     FULL_LINE
          [I] =STOPPER [* B F I] /EOL [W I] =HEADER_SECTION

SYN       PHONE_LINE
          /PHONE [W] =LINE

CLASS     AREA_PHONE
          /NUMBER3A [2] /PHONE

CLASS     NOT_AREA_PHONE
          /PHONE [N W I] /AREA_PHONE

SYN       ext
          x
          ext [O] .
          extension

CLASS     EXT
          =ext [O] /NUMBER

SYN       BUSINESS
          business
```

```
           bus
           office
           work
           w
           wk

SYN        MESSAGE
           message

CLASS      PHONE_NUMBER
           /AREA_PHONE [2 O] /EXT
           /NOT_AREA_PHONE [2 O] /EXT

CLASS      WORK_PHONE
           =BUSINESS [4] /PHONE_NUMBER
           /PHONE_NUMBER [2] =BUSINESS

CLASS      MESSAGE_PHONE
           =MESSAGE [4] /PHONE_NUMBER [W I] /FULL_LINE
           /PHONE_NUMBER [2] =MESSAGE [W I] /FULL_LINE

CLASS      BUSINESS_PHONE
           /WORK_PHONE [W I] /FULL_LINE [W I] =HEADER_SECTION

CLASS      HOME_PHONE
           /PHONE_NUMBER [N W I] /BUSINESS_PHONE [N W I] /MESSAGE_PHONE $
    [W I] =HEADER_SECTION

SYN        CITY_STARTER
           =STOPPER [W I] =HEADER_SECTION
           , [W I] =HEADER_SECTION

SYN        CITY_STOPPER
           [O] =CITY_STARTER /STATE [W I] =HEADER_SECTION

CLASS      POSSIBLE_CITY
           [I] =CITY_STARTER [* 5 I] =CITY_STOPPER [W I] =LINE

CLASS      CITY
           /POSSIBLE_CITY [N C I] =CITY_STARTER

SYN        Street
           street
           st [O] .

SYN        Way
           way

SYN        Avenue
           Avenue
           Ave [O] .

SYN        Road
           Road
           Rd [O] .

SYN        Drive
           Drive
           Dr [O] .

SYN        Boulevard
           Boulevard
           Blvd [O] .

SYN        Route
           Route
           Rte [O] .
```

```
SYN     OtherStreet
        Court
        Ct [O] .
        Place
        Pl [O] .
        Circle SYN     STREET_INDICATOR
        =Street
        =Road
        =Avenue
        =Drive
        =Boulevard
        =Route
        =OtherStreet
        =Way SYN     ADDRESS_INDICATOR
        /NUMBER [W I] =HEADER_SECTION
        =STREET_INDICATOR
        box SYN     STATE_LINE
        /STATE [W] =LINE [W I] =HEADER_SECTION
        /STATE [W] =LINE [W I] =PERSONAL_SECTION CLASS   CITY_LINE
        [I] =CITY_STARTER [* B F I] /CITY [W I] =LINE [W I] =HEADER_SECTION
        [I] =CITY_STARTER [* B F I] /CITY [W I] =LINE [W I] =PERSONAL_SECTION CLASS   ADDRESS2
        [I] =STOPPER /NUMBER [* B F] /FULL_LINE [I] =STATE_LINE $
 [N C I] /PHONE CLASS   ADDRESS
        /ADDRESS2
        [I] =ADDRESS_INDICATOR [W] /FULL_LINE [N C I] /PHONE [N W I] /ADDRESS2
        /CITY_LINE [N C I] /PHONE SYN     Permanent
        permanent!1
        home SYN     School
        school
        campus SYN     Current
        current
        present
        local SYN     Office
        office CLASS   ADDR_TYPE
        =Permanent
        =School
        =Current
        =Office

CLASS   ADDR_HEADER
        [I] ?BOD [B] /ADDR_TYPE

SYN     address
        address
        residence
```

```
CLASS   ADDRESS_TYPE
        /ADDR_HEADER [4 I] =address [B F] /EOL [W I] =LINE [W I] =HEADER_SECTION

SYN     TWO_ADD
        /ADDR_HEADER [B F] /ADDR_HEADER

CLASS   ADDRESS_LINE
        /ADDRESS [I O] =PHONE_LINE [2] /CITY [1] /STATE $
[1 O] /ZIP_CODE

CLASS   POS_APP_W_TYPE
        /ADDRESS_TYPE [B F] /ADDRESS_LINE [N C I] =TWO_ADD

CLASS   POS_APP_WO_TYPE
        [I] /APPLICANT [B] /ADDRESS_LINE
        [I] /BOD [B F] /ADDRESS_LINE [N C I] /APPLICANT

CLASS   POS_APP_ADDRESS
        /POS_APP_W_TYPE
        /POS_APP_WO_TYPE [N W I] /POS_APP_W_TYPE

CLASS   APP_ADDRESS
        /POS_APP_ADDRESS [W I] =HEADER_SECTION
        /POS_APP_ADDRESS [W I] =PERSONAL_SECTION

CLASS   APPLICANT_NAME
        /APPLICANT uses system.def
uses sections.def
uses titles.def
#uses company.def
uses dates.def SYN     Co
        co [I O] .

SYN     Ltd
        ltd

SYN     Bros
        bros

SYN     Dept
        dept

SYN     Labs
        labs
        lab

SYN     Incorporated
        incorporated!2

SYN     Corporation
        corporation!2

CLASS   Abbrev
        =Dept

SYN     Brothers
        brothers!1

SYN     Corp
        corp

SYN     Inc
        inc
```

| | |
|---|---|
| CLASS | EndCo |
| | =(Corp ) |
| | =Co |
| | =(Inc ) |
| | =Ltd |
| | =Corporation |
| | =Incorporated |
| | Limited |
| | =Labs |
| | =Bros |
| | Brothers |
| | Company |
| | |
| CLASS | corp |
| | Bell |
| | Systems |
| | Technologies |
| | Technology |
| | Semiconductor |
| | Associates |
| | Computers |
| | College |
| | University |
| | Department |
| | Research Center |
| | Store |
| | Laboratories |
| | Companies |
| | Fort |
| | Army |
| | Navy |
| | Air Force |
| | Marines |
| | Coast Guard |
| | Division |
| | Group |
| | Site |
| | Motel |
| | Hotel |
| | Center |
| | Consultants |
| | Subsidiary |
| | Bank of |
| | Savings [2] Loan |
| | Institute |
| | Unlimited |
| | Agency |
| | Services |
| | Service |
| | National Guard |
| | of America |
| | US |
| | U.S. |
| | Clinic |
| | Microsystems |
| | & |
| | /Abbrev |
| | |
| SYN | ABBR |
| | /Abbrev . |
| | |
| SYN | StartDel |
| | /Titles_General [W I] =EXPERIENCE_SECTION |
| | /NUMBER2A [W I] =EXPERIENCE_SECTION |
| | /NUMBER3A [W I] =EXPERIENCE_SECTION |
| | /NUMBER4A [W I] =EXPERIENCE_SECTION |
| | /NUMBER5A [W I] =EXPERIENCE_SECTION |
| | /MONTH [W I] =EXPERIENCE_SECTION |

```
        /SEASON_YEAR [W I] =EXPERIENCE_SECTION
        present [W I] =EXPERIENCE_SECTION
        ] [W I] =EXPERIENCE_SECTION
        ) [W I] =EXPERIENCE_SECTION
        /All_Titles [W I] =EXPERIENCE_SECTION
        /EOL [W I] =EXPERIENCE_SECTION
        | [W I] =EXPERIENCE_SECTION
        \ [W I] =EXPERIENCE_SECTION
        - [W I] =EXPERIENCE_SECTION
        : [W I] =EXPERIENCE_SECTION
        ; [W I] =EXPERIENCE_SECTION
        . [N W I] =ABBR [W I] =EXPERIENCE_SECTION
        at [W I] =EXPERIENCE_SECTION
        for [W I] =EXPERIENCE_SECTION
        with [W I] =EXPERIENCE_SECTION SYN     EndDel
        /Titles_General [W I] =EXPERIENCE_SECTION
        /NUMBER2A [W I] =EXPERIENCE_SECTION
        /NUMBER3A [W I] =EXPERIENCE_SECTION
        /NUMBER4A [W I] =EXPERIENCE_SECTION
        /NUMBER5A [W I] =EXPERIENCE_SECTION
        /MONTH [W I] =EXPERIENCE_SECTION
        /SEASON_YEAR [W I] =EXPERIENCE_SECTION
        present [W I] =EXPERIENCE_SECTION
        [ [W I] =EXPERIENCE_SECTION
        ( [W I] =EXPERIENCE_SECTION
        /All_Titles [W I] =EXPERIENCE_SECTION
        /EOL [W I] =EXPERIENCE_SECTION
        | [W I] =EXPERIENCE_SECTION
        \ [W I] =EXPERIENCE_SECTION
        - [W I] =EXPERIENCE_SECTION
        : [W I] =EXPERIENCE_SECTION
        ; [W I] =EXPERIENCE_SECTION
        . [N W I] =ABBR [W I] =EXPERIENCE_SECTION SYN     StartPair
        =StartDel [B F] =StartDel SYN     FirstPoss
        =StartDel [B F] /EndCo [N C I] =StartPair $
           =EXPERIENCE_SECTION CLASS   FirstPossCo
        [I] =StartDel [* B F] /EndCo [W I] =FirstPoss SYN     ThirdPoss
        =StartDel [B F] /corp [0] , [N C I] =StartPair $
   [W I] =EXPERIENCE_SECTION CLASS   ThirdPossCo
        [I] =StartDel [* B F] /corp [0 I] , [W I] =ThirdPoss CLASS   SecondPossCo
        [I] =StartDel [* B F I] =EndDel [C I] /corp CLASS   PossCo
        /FirstPossCo [N C I] =EndDel
        /ThirdPossCo [N C I] =EndDel
        /SecondPossCo [N C I] /ThirdPossCo CLASS   DummyPossCo
ACTION  GetProperNouns
        /PossCo [N C I] =StartDel CLASS   UnknownCo
        /DummyPossCo [C I] /corp [N C I] /Company
        /DummyPossCo [C I] /EndCo [N C I] /Company
```

```
CLASS     Any_Company
          /Company
          /UnknownCo uses     states.def

SYN       College
          college
          coll [0] .

SYN       univ
          university
          univ [0] .
          u [0] .

SYN       inst
          institute
          inst [0] .

SYN       tech
          technology
          tech [0] .

SYN       poly
          polytechnic
          poly [0] .

SYN       Cal Poly S.L.O.
          =CA =poly [3] san

SYN       south
          southern
          south
          s.

SYN       Stanford
          stanford

SYN       UC
          uc
          =univ [1] =CA

SYN       UC Berkeley
          ucb
          =UC [1] berkeley!1

SYN       U of Ill Urbana
          =univ [1] =IL

SYN       U of Ill Chicago
          =univ [1] =IL

SYN       Carnegie Mellon
          CMU
          carnegie mellon

SYN       MIT
          MIT
          M [1] I [1] T
          =MA =inst [1] =tech SYN       Cornell
          cornell CLASS     EE_SCHOOLS
          =Stanford
          =(UC Berkeley)
          =(U of Ill Urbana)
          =(Carnegie Mellon)
```

```
              =MIT
              =Cornell

CLASS    CS_SCHOOLS
              =Stanford
              =(UC Berkeley)
              =(U of Ill Urbana)
              =(Carnegie Mellon)
              =MIT
              =Cornell SYN      Harvard
              harvard SYN      Wharton
              wharton SYN      Sloan
              sloan CLASS    MBA_SCHOOLS
              =Harvard
              =Stanford
              =Wharton
              =Sloan SYN      Los Angeles
              los angeles
              LA SYN      UCLA
              ucla
              =UC [1] =(Los Angeles)

SYN      U of Washington
              =univ [1] =WA

SYN      Georgia Tech
              =GA =tech

SYN      UC Davis
              =UC [1] davis

SYN      Southern Illinois
              =univ [1] =south =IL

SYN      Chico State
              =CA [4] chico

SYN      U of Arizona
              =univ [4] =AZ

SYN      UC Santa Barbara
              =UC [1] santa barbara

SYN      UC San Diego
              =UC [1] san diego

SYN      U of Cincinnati
              =univ [1] cincinnati

SYN      U of Michigan
              =univ [1] =MI

SYN      Oregon State
              =OR state

SYN      U of Pennsylvania
              =univ [1] =PA
```

```
SYN     Princeton
        princeton

SYN     Purdue
        purdue

SYN     RPI
        rpi
        rensallaer

SYN     SJSU
        sjsu
        san jose state

SYN     Santa Clara Univ
        =univ [1] santa clara
        santa clara =univ SYN     U of Santa Clara
        =univ [1] santa clara SYN     USC
        usc
        =univ [1] =south =CA SYN     ut
        ut
        =univ [1] =TX SYN     UT Austin
        =ut [1] austin SYN     Texas A & M
        =TX a & m SYN     UT San Antonio
        =ut [1] san antonio SYN     R.I.T.
        rochester institute
        RIT
        R [1] I [1] T SYN     Louisiana State
        =LA state SYN     N Carolina State
        =NC state SYN     Howard
        howard SYN     U of New Mexico
        =univ [1] =NM SYN     U of Chicago
        =univ [1] chicago CLASS   OP_SCHOOLS
        =UCLA
        =(U of Washington)
        =(Georgia Tech)
        =(UC Davis)
        =(Southern Illinois)
        =(Chico State)

CLASS   MFG_SCHOOLS
        =UCLA
```

```
            =(U of Washington)
            =(Georgia Tech)
            =(UC Davis)
            =(Southern Illinois)
            =(Chico State)

CLASS       SERV_SCHOOLS
            =UCLA
            =(U of Washington)
            =(Georgia Tech)
            =(UC Davis)
            =(Southern Illinois)
            =(Chico State)

SYN         Heald Business
            heald business [0] =College

SYN         Total Technical
            total technical [0] =College

SYN         De Vry Institute
            de vry [0] =inst

SYN         Cogswell
            cogswell [0] =College

SYN         S.M.U.
            SMU
            S [1] M [1] U
            southern methodist =univ SYN         Baylor
            baylor SYN         Hayward State
            hayward SYN         U of Florida Gaines
            =univ =FL [3] gaines SYN         Rice
            Rice SYN         Texas Tech
            =TX tech CLASS       School
            =(Texas Tech)
            =Rice
            =(Hayward State)
            =(S.M.U.)
            =(U of Chicago)
            =Baylor
            =(Heald Business)
            =Cogswell
            =UCLA
            =(U of Washington)
            =(Georgia Tech)
            =(UC Davis)
            =(Southern Illinois)
            =(Chico State)
            =Stanford
            =(Carnegie Mellon)
            =(UC Berkeley)
            =(U of Ill Urbana)
            =(U of Ill Chicago)
            =MIT
            =Cornell
```

```
            =Harvard
            =Wharton
            =Sloan
            =(U of Arizona)
            =(UC Santa Barbara)
            =(UC San Diego)
            =(U of Florida Gaines)
            =(U of Cincinnati)
            =(U of Michigan)
            =(Oregon State)
            =(U of Pennsylvania)
            =Princeton
            =Purdue
            =RPI
            =SJSU
            =(U of Santa Clara)
            =USC
            =(UT Austin)
            =(Cal Poly S.L.O.)
            =Howard
            =(Texas A & M)
            =(UT San Antonio)
            =(R.I.T.)
            =(Louisiana State)
            =(N Carolina State)
            =(De Vry Institute)
            =(Total Technical)
            =(U of New Mexico)

uses   legal.def uses   applic.def
uses   management.def
#uses   product.def

CLASS   Legal_Experience
;       /Buzz_Admin_Terms
        /Buzz_Legal_Terms
        /Buzz_Management
;       /Buzz_Product
        /Buzz_WordPro CLASS   Other_Legal
ACTION  Sum
;       /Skill_Admin_Terms
        /Skill_Legal_Terms
        /Skill_Management
;       /Skill_Product
        /Skill_WordPro CLASS   Skills_Legal
ACTION  PointSum
;       /(Admin Terms)
        /(Legal Terms)
        /Management
;       /Products
        /(Word Processors)

#uses   system.def
#uses   sections.def
#uses   common.def
#uses   buzz.def
#uses   dates.def
#uses   company.def
uses   management.def SYN     Mechanical Engineer
        mechanical -engineer
        ME
```

```
CLASS   Buzz_Mechanic_Title
        =(Mechanical Engineer)

SYN     CAD Applications
        cad applications

SYN     CAD Development
        cad development

SYN     CAD Engineer
        cad =engineer

SYN     lead
        lead
        leader

SYN     CAD Eng Manager
        cad =engineer [B F] manager [W I] =SENTENCE
        manager [B F] cad =engineer [W I] =SENTENCE SYN     CAD Eng Projct Lead
        cad =engineer [B F] project =lead [W I] =SENTENCE
        project =lead [B F] cad =engineer [W I] =SENTENCE SYN     CAD Eng Sect Head
        cad =engineer [B F] section head [W I] =SENTENCE
        section head [B F] cad =engineer [W I] =SENTENCE SYN     senior
        senior
        sr [O] .

SYN     Senior CAD Eng
        =senior cad engineer

SYN     CAE Engineer
        cae engineer

SYN     Elec Desgn Auto Eng
        EDA
        electronic design automation =engineer SYN     Mechanical CAD-CAM
        mechanical cad
        mechanical cam SYN     Member Tech Staff
        MTS
        member [2] technical staff SYN     Place & Route Eng
        =place =& route =engineer SYN     CAD Operator
        cad operator SYN     CAD Technician
        cad technician SYN     Layout Designer
        layout designer SYN     Product Technician
        product technician SYN     Product Engineer
        product =engineer
```

```
CLASS     Buzz_Product _Title
          =(Product Technician)
          =(Product Engineer)

CLASS     Titles_Product
ACTION    SumMAX
          /(Buzz_Product _Title) [N W I] =OBJECTIVE_SECTION SYN       technician
          tech
          technician SYN       comm
          comm
          communications
          communication SYN       Computer Operator
          computer operator SYN       Data Proc Supp Op
          data proc supp operator SYN       Datacomm Tech
          datacomm =technician
          datacommunications =technician
          datacommunication =technician
          data =comm =technician SYN       Communications Tech
          =comm =technician [N W I] =(Datacomm Tech)

SYN       Tape Librarian
          tape librarian

SYN       Analog Designer
          analog designer

SYN       Circuit Designer
          circuit =design

SYN       Component Designer
          component =design

SYN       Designer
          designer

SYN       Digital Designer
          digital designer

SYN       IC Designer
          ic designer

SYN       Library Development
          library development engineer

SYN       Logic Design Eng
          logic design engineer

SYN       VLSI Design Eng
          vlsi design engineer

SYN       Industrial Engineer
          IE
          industrial =engineer

CLASS     Buzz_Indust. _Title
          =(Human Factors Eng)
          =(Industrial Engineer)
```

```
CLASS     Titles_Indust.
ACTION    SumMAX
          /(Buzz_Indust._Title) [N W I] =OBJECTIVE_SECTION SYN       Data Analyst
          data analyst SYN       Data Planner
          data planner
          data planning SYN       Database Analyst
          database analyst SYN       Systems Programmer
          =systems programmer SYN       Assoc Programmer
          associate programmer SYN       Programmer Analyst
          programmer [2] analyst SYN       Test Programmer
          test programmer SYN       Programmer
          programmer [N W I] =(Systems Programmer) $
    [N W I] =(Programmer Analyst) [N W I] =(Assoc Programmer) $
    [N W I] =(Test Programmer)

SYN       leader
          lead
          leader

SYN       Project Leader
          project =leader

SYN       Systems Analyst
          =systems =analyst

SYN       Telecomm Analyst
          telecommunications analyst

SYN       Print Operator
          print operator

CLASS     Buzz_Informat_Title
          =(Assoc Programmer)
          =(Data Analyst)
          =(Data Planner)
          =(Database Analyst)
          =(Data Proc Supp Op)
          =(Communications Tech)
          =(Computer Operator)
          =(Datacomm Tech)
          =(Tape Librarian)
          =(Print Operator)
          =(Programmer Analyst)
    ;        =(Project Leader)
          =(Systems Analyst)
          =(System Admin)
          =(Systems Programmer)
          =(Telecomm Analyst)

CLASS     Titles_Informat
ACTION    SumMAX
          /(Buzz_Informat_Title) [N W I] =OBJECTIVE_SECTION
```

| | |
|---|---|
| SYN | Assembly Supervisor<br>assembly supervisor |
| SYN | Fab Supervisor<br>=fab supervisor |
| SYN | GF<br>GF<br>general foreman |
| SYN | Line Supervisor<br>line supervisor |
| SYN | Product Line Mgr<br>product line manager |
| SYN | Production Manager<br>production manager |
| SYN | Production Super<br>production supervisor |
| SYN | Shift Supervisor<br>shift supervisor |
| SYN | Test Supervisor<br>test supervisor |
| SYN | vp<br>V.P<br>VP<br>vice [2] president |
| SYN | Fab Manager<br>=fab manager<br>=fab director<br>=fab =vp |
| SYN | Electro-Mech Assem<br>electro-mech assembler |
| SYN | Electro-Mech Tech<br>electro-mech technician |
| SYN | electronic<br>electronic<br>electrical |
| SYN | Elect Mtce Tech<br>=electronic maintenance technician |
| SYN | Electronic Tech<br>electronic [N] maintenance technician |
| CLASS | Buzz_Ops_Title<br>=(Assembly Supervisor)<br>=(Fab Supervisor)<br>=(GF)<br>=(Line Supervisor)<br>=(Product Line Mgr)<br>=(Production Manager)<br>=(Production Super)<br>=(Shift Supervisor)<br>=(Test Supervisor)<br>=(Fab Manager)<br>=(Electro-Mech Assem)<br>=(Electro-Mech Tech)<br>=(Elect Mtce Tech))<br>=(Electronic Tech) |

```
CLASS    Titles_Ops
ACTION   SumMAX
         /Buzz_Ops_Title [N W I] -OBJECTIVE_SECTION SYN      Failure Analyst
         failure analyst SYN      Fracture Mechanic
         fracture mechanic SYN      material
         material
         materials SYN      Material Scientist
         -material scientist
         science engineer SYN      Pack Eng Sect Head
         packaging -engineer section head SYN      Pack Eng Sect Mgr
         packaging -engineer section manager SYN      Sr. Packaging Eng
         senior packaging engineer SYN      Packaging Engineer
         packaging -engineer SYN      Physicist
         physicist SYN      Process Automat Eng
         process automation -engineer SYN      Statistical Analyst
         statistical analyst SYN      Stress Analyst
         stress analyst SYN      Yield Enhance Eng
         yield enhancement -engineer SYN      Assembly Engineer
         assembly engineer CLASS    Buzz_Packagin_Title
         -(Assembly Engineer)
         -(Failure Analyst)
         -(Fracture Mechanic)
         -(Material Scientist)
         -(Mechanical Engineer)
         -(Packaging Engineer)
         -(Packaging Engineer)
         -(Pack Eng Sect Head)
         -(Pack Eng Sect Mgr)
         -(Sr. Packaging Eng)
         -(Physicist)
         -(Process Automat Eng)
         -(Statistical Analyst)
         -(Stress Analyst)
         -(Yield Enhance Eng)

CLASS    Titles_Packagin
ACTION   SumMAX
         /Buzz_Packagin_Title [N W I] -OBJECTIVE_SECTION
```

| | | |
|---|---|---|
| SYN | Chemical Handler | chemical handler |
| SYN | Chemical Technician | chemical technician |
| SYN | Equip Mtnc Tech | equip maintenance technician |
| SYN | Fab Operator | fab operator |
| SYN | Line Mtnc Tech | line maintenance technician |
| SYN | Manufacturing Tech | manufacturing technician |
| SYN | Process Technician | process [2] technician |
| SYN | Production Tech | production technician |
| SYN | Development Eng | development engineer |
| SYN | Device Engineer | device =engineer |
| SYN | Diffusion Engineer | diffusion =engineer |
| SYN | epitaxial | epitaxy epitaxial |
| SYN | Epitaxial Engineer | -epitaxial -engineer |
| SYN | Etch Engineer | etch -engineer |
| SYN | E-Beam Engineer | e-beam -engineer electron beam -engineer |
| SYN | Ion Implant Eng | ion implant -engineer |
| SYN | Masking Engineer | masking -engineer |
| SYN | Photo Engineer | photo -engineer |
| SYN | Photo Etch Engineer | photo etch -engineer |
| SYN | Photomask Engineer | photomask -engineer |
| SYN | photolithography | photolith photolitho photolithgraphy |
| SYN | Photolith Engineer | -photolithography -engineer |

```
SYN     Process Control Eng
        process control =engineer

SYN     Process Engineer
        process =engineer

SYN     Thin Films Engineer
        thin films =engineer

SYN     Yield Improve Eng
        yield improvement =engineer

CLASS   Buzz_Process_Title
        =(Development Eng)
        =(Device Engineer)
        =(Diffusion Engineer)
        =(Epitaxial Engineer)
        =(Etch Engineer)
        =(E-Beam Engineer)
        =(Ion Implant Eng)
        =(Masking Engineer)
        =(Photo Engineer)
        =(Photo Etch Engineer)
        =(Photomask Engineer)
        =(Photolith Engineer)
        =(Process Control Eng)
        =(Process Engineer)
        =(Thin Films Engineer)
        =(Yield Improve Eng)
        =(Chemical Handler)
        =(Chemical Technician)
        =(Equip Mtnc Tech)
        =(Fab Operator)
        =(Line Mtnc Tech)
        =(Manufacturing Tech)
        =(Process Technician)
        =(Production Tech)

CLASS   Titles_Process
ACTION  SumMAX
        /Buzz_Process_Title [N W I] =OBJECTIVE_SECTION SYN     Burn-In Operator
        burn-in operator SYN     Electr Maint Tech
        electronic maintenance technician SYN     Final Test Tech
        final test technician SYN     M/P Operator
        M ^/ P operator
        mark =& pack operator SYN     Metal Finish Operat
        metal finish operator SYN     Test Equip Supp Eng
        test equipment support =engineer SYN     Test Maint Engineer
        test maintenance =engineer SYN     Test Operator
        test operator SYN     Test Maint Tech
        test maintenance technician
```

```
CLASS     Buzz_Test Eng_Title
          =(Burn-In Operator)
          =(Electr Maint Tech)
          =(Final Test Tech)
          =(M/P Operator)
          =(Metal Finish Operat)
          =(Release Engineering)
          =(Test Engineering)
          =(Test Equip Supp Eng)
          =(Test Maint Engineer)
          =(Test Operator)
          =(Test Programmer)
          =(Test Maint Tech)

CLASS     Titles_Test Eng
ACTION    SumMAX
          /(Buzz_Test Eng_Title) [N W I] =OBJECTIVE_SECTION SYN       HR Assistant
          HR assistant SYN       Word Processor
          word processor CLASS     Buzz_Clerical_Title
          =(Admin Asssistant)
          =(Clerk)
          =(Executive Secretary)
          =(Office Assistant)
          =(Office Manager)
          =(Personnel Assistant)
          =(Print Operator)
          =(Receptionist)
          =(Secretary) [W I] =EXPERIENCE_SECTION
          =(Telex Operator)
          =(Typist)
          =(Word Processor)

CLASS     Titles_Clerical
ACTION    SumMAX
          /Buzz_Clerical_Title [N W I] =OBJECTIVE_SECTION SYN       illustrator
          illustrator
          illustrators SYN       Tech Illustrator
          technical =illustrator SYN       writer
          writer
          writers SYN       reviewer
          reviewer
          reviewers SYN       Spec Reviewer
          =Specifications =reviewer SYN       Spec Writer
          =Specifications =writer SYN       Technical Writer
          technical =writer SYN       Advertising Exec
          advertising executive
```

| | |
|---|---|
| SYN | specialist<br>specialist<br>specialists |
| SYN | Document Specialist<br>documentation =specialist |
| SYN | Technical Editor<br>technical editor |
| SYN | Graphic Artist<br>graphic artist |
| SYN | Graphics Coordinatr<br>graphics coordinator |
| SYN | Instructional Dsgnr<br>instructional designer |
| SYN | Librarian<br>librarian<br>librarians |
| SYN | Newsletter Editor<br>newsletter editor |
| SYN | Promo Coordinator<br>=promotion coordinator |
| SYN | PR Analyst<br>=PR =analyst |
| SYN | PR Specialist<br>=PR =specialist |
| SYN | Speech Writer<br>speech =writer |
| SYN | Video Specialist<br>video =specialist |
| CLASS | Buzz_Advertis_Title<br>=(Advertising Exec)<br>=(Document Specialist)<br>=(Graphic Artist)<br>=(Graphics Coordinatr)<br>=(Instructional Dsgnr)<br>=Librarian<br>=(Newsletter Editor)<br>=(Promo Coordinator)<br>=(PR Analyst)<br>=(PR Specialist)<br>=(Spec Reviewer)<br>=(Spec Writer)<br>=(Speech Writer)<br>=(Technical Editor)<br>=(Tech Illustrator)<br>=(Video Specialist) |
| CLASS<br>ACTION | Titles_Advertis<br>SumMAX<br>/(Buzz_Advertis_Title) [N W I] =OBJECTIVE_SECTION |
| SYN | Architect<br>Architect [W I] =EXPERIENCE_SECTION<br>ural designer |
| SYN | Construction Eng<br>construction [2] =engineer |

```
SYN      Electrical Engineer
         electrical =engineer

SYN      Facilities Manager
         facilities manager

SYN      Plant Engineer
         plant =engineer

SYN      Project Engineer
         project engineer

SYN      Electrician
         electrician

SYN      Plumber
         plumber

SYN      Drafter
         drafter

SYN      Facilities Mechanic
         facilities mechanic

SYN      Facilities Eng
         facilities =engineer

SYN      Facilities Planner
         facilities planner

SYN      HVAC Engineer
         hvac engineer

SYN      Plant Maint Engin
         plant maintenance engineer

SYN      Plant Maint Mech
         plant maintenance mechanic

SYN      Facilities Maint
         facilities maintenance

SYN      Environm Engineer
         environmental =engineer

CLASS    Buzz_Faciliti_Title
         =(Architect)
         =(Construction Eng)
         =(Environm Engineer)
         =(Facilities Manager)
         =(Facilities Eng)
         =(HVAC Engineer)
         =(Facilities Maint)
         =(Facilities Planner)
         =(Plant Maint Engin)
         =(Plant Maint Mech)
         =Electrician
         =(Mechanical Engineer)
         =Plumber
         =Drafter
         =(Facilities Mechanic)
         =(Plant Engineer)

CLASS    Titles_Faciliti
ACTION   SumMAX
         /Buzz_Faciliti_Title [N W I] =OBJECTIVE_SECTION SYN      FC
         FC
         full charge
```

| | |
|---|---|
| SYN | Payroll Specialist<br>payroll specialist |
| SYN | Assist Controller<br>assistant controller |
| SYN | Auditor<br>auditor<br>auditors |
| SYN | Acct Services Chief<br>chief [2] accounting services<br>accounting services chief |
| SYN | General Acct Chief<br>general accounting chief<br>chief [2] general accounting |
| SYN | Cost Accountant<br>cost accountant |
| SYN | CPA<br>CPA<br>certified public accountant |
| SYN | Credit Analyst<br>credit analyst |
| SYN | Financial Analyst<br>financial -analyst |
| SYN | General Accountant<br>general accountant |
| SYN | Internal Auditor<br>internal -Auditor |
| SYN | Market Plan Analyst<br>marketing plan analyst |
| SYN | Product Line Anlyst<br>product line analyst |
| SYN | Risk Manager<br>risk manager |
| SYN | Strategic Planner<br>strategic planner |
| SYN | Tax Accountant<br>tax accountant |
| SYN | Tax Analyst<br>tax analyst |
| SYN | Treasurer<br>treasurer |
| SYN | Treasury Specialist<br>treasury specialist |
| SYN | assistant<br>assistant<br>associate<br>junior<br>jr [0 0] . |
| SYN | Assoc Accountant<br>-assistant accountant |

```
SYN     Accountant
        accountant [N W I] =(Assoc Accountant) $
  [N W I] =(Cost Accountant) [N W I] =(General Accountant) $
  [N W I] =(Tax Accountant) [N W I] =CPA CLASS   Buzz_Finance_Title -(Accts Payable Clerk)
        -(Accts Receiv Clerk)
        -(Accounting Clerk)
        -(Accountant)
        -(Assoc Accountant)
        -(Assist Controller)
        -(Auditor)
        -(Acct Services Chief)
        =CPA
        -(General Acct Chief)
        -(Cost Accountant)
        -(Credit Analyst)
        -(FC)
        -(Financial Analyst)
        -(General Accountant)
        -(Internal Auditor)
        -(Market Plan Analyst)
        -(Payroll Specialist)
        -(Product Line Anlyst)
        =(Risk Manager)
        -(Strategic Planner)
        -(Tax Accountant)
        =(Tax Analyst)
        -(Treasurer) [W I] =EXPERIENCE_SECTION
        -(Treasury Specialist)

CLASS   Titles_Finance
ACTION  SumMAX
        /Buzz_Finance_Title [N W I] =OBJECTIVE_SECTION SYN     Classif Analyst
        classification analyst
        classification represenative SYN     ER Analyst
        employee relations analyst
        employee relations representative SYN     Employment Rep
        employment representative SYN     EEO/AA Rep
        -(EEO) Representative
        -(AA ) Representative SYN     HR Analyst
        =HR analyst
        =HR represenative
        =HR manager SYN     Recruiter
        recruiter SYN     Benefits Analyst
        benefits analyst SYN     Compensation Rep
        compensation analyst
        compensation representative SYN     Trainer
        trainer
```

```
CLASS    Buzz_Human Re_Title
         =(Classif Analyst)
         =(ER Analyst)
         =(Employment Rep)
         =(HR Analyst)
         =(Recruiter)
         =(Benefits Analyst)
         =(Compensation Rep)
         =(HR Assistant)

CLASS    Titles_Human Re
ACTION   SumMAX
         /(Buzz_Human Re_Title) [N W I] =OBJECTIVE_SECTION SYN      Chief Counsel
         chief counsel SYN      Corporate Counsel
         corporate counsel SYN      Legal Advisor
         legal advisor SYN      Patent Attorney
         patent attorney SYN      Legal Aide
         legal aide
         legal assistant SYN      Paralegal
         paralegal CLASS    Buzz_Legal_Title
         =(Attorney)
         =(Chief Counsel)
         =(Corporate Counsel)
         =(Legal Advisor)
         =(Legal Advisor)
         =(Patent Attorney)
         =(Legal Aide)
         =(Paralegal)

CLASS    Titles_Legal
ACTION   SumMAX
         /Buzz_Legal_Title [N W I] =OBJECTIVE_SECTION SYN      Applications Eng
         applications engineer SYN      Div Marketing Mgr
         division marketing manager
         DMM SYN      Industry Analyst
         industry analyst SYN      Marketing Manager
         marketing manager
         marketing director SYN      Mrkt Research Analy
         market research analyst SYN      Product Manager
         product manager SYN      Product Market Mgr
         product marketing manager
```

| | |
|---|---|
| SYN | Product Market Eng<br>product marketing =engineer |
| SYN | Prod Mrkt Specialst<br>product marketing specialist |
| SYN | Product Planner<br>product planning engineer<br>product planning manager |
| SYN | Systems Applic Eng<br>systems =application =engineer |
| SYN | Systems Applic Mgr<br>systems =application manager |
| SYN | Strategic Devel Eng<br>strategic development =engineer |
| SYN | Strategic Marketer<br>strategic marketing engineer<br>strategic marketing manager |
| SYN | Major Account Mgr<br>MAM'S<br>major account managers |
| CLASS | Buzz_Marketin_Title<br>=(Applications Eng)<br>=(Div Marketing Mgr)<br>=(Industry.Analyst)<br>=(Major Account Mgr)<br>=(Marketing Manager)<br>=(Mrkt Research Analy)<br>=(Product Manager)<br>=(Product Market Eng)<br>=(Product Market Mgr)<br>=(Prod Mrkt Specialst)<br>=(Product Planner)<br>=(Systems Applic Eng)<br>=(Systems Applic Mgr)<br>=(Strategic Devel Eng)<br>=(Strategic Marketer) |
| CLASS<br>ACTION | Titles_Marketin<br>SumMAX<br>/Buzz_Marketin_Title [N W I] =OBJECTIVE_SECTION |
| SYN | Buyer<br>[O] =assistant buyer |
| SYN | Material Handler<br>material handler |
| SYN | Scheduler<br>Scheduler |
| SYN | reclaim<br>reclaim<br>reclamation |
| SYN | Asset Reclaim Analy<br>asset =reclaim analyst |
| SYN | Intl Capacity Plan<br>international capacity planner<br>international capacity analyst |

```
SYN      Material Planner
         material planner

SYN      PC Expediter
         pc expediter

SYN      PC Planner
         pc planner

SYN      PC Scheduler
         pc scheduler

SYN      Planner
         planner
         planners

SYN      Prod'n Ctrl Special
         production control specialist

SYN      Purchasing Agent
         purchasing agent

SYN      Remarketing Analyst
         remarketing analyst

CLASS    Buzz_Purchasi_Title
         =(Buyer)
         =(Inventry Ctrl Clerk)
         =(Material Handler)
         =(Samples Clerk)
         =(Scheduler)
         =(Ship & Receiv Clerk)
         =(Asset Reclaim Analy)
         =(Contract Admin)
         =(Intl Capacity Plan)
         =(Material Planner)
         =(PC Expediter)
         =(PC Planner)
         =(PC Scheduler)
         =(Planner)
         =(Prod'n Ctrl Special)
         =(Purchasing Agent)
         =(Remarketing Analyst)

CLASS    Titles_Purchasi
ACTION   SumMAX
         /Buzz_Purchasi_Title [N W I] =OBJECTIVE_SECTION SYN      IH
         IH
         industrial hygienist SYN      Nurse
         nurse
         nurses SYN      Safety Engineer
         safety-engineer CLASS    Buzz_Safety_Title
         =(IH)
         =(Nurse)
         =(Safety Engineer)

CLASS    Titles_Safety
ACTION   SumMAX
         /Buzz_Safety_Title [N W I] =OBJECTIVE_SECTION
```

| | |
|---|---|
| SYN | Account Admin<br>account_admin |
| SYN | Area Sales Manager<br>area sales manager |
| SYN | Distrib Sales Mgr<br>distribution sales mgr |
| SYN | District Sales Mgr<br>district sales manager |
| SYN | Regional Sales Mgr<br>regional sales manager |
| SYN | Sales Engineers<br>sales engineer |
| SYN | Sales Coordinator<br>sales coordinator |
| SYN | Customr Service Rep<br>customer service rep |
| SYN | Inside Sales Rep<br>ISR<br>inside sales rep |
| SYN | Salesman<br>salesman<br>salesperson |
| CLASS | Buzz_Sales_Title<br>=(Account Admin)<br>=(Area Sales Manager)<br>=(Customr Service Rep)<br>=(Distrib Sales Mgr)<br>=(District Sales Mgr)<br>=(Inside Sales Rep)<br>=(Major Account Mgr)<br>=(Regional Sales Mgr)<br>=(Sales Engineers)<br>=(Sales Coordinator)<br>=(Salesman)<br>=(Field Sales Eng)<br>=(Field Applic Eng) |
| CLASS<br>ACTION | Titles_Sales<br>SumMAX<br>/Buzz_Sales_Title [N W I] =OBJECTIVE_SECTION |
| SYN | Board Designer<br>board designer |
| SYN | Hardware Eng<br>hardware designer |
| SYN | Software Eng<br>software engineer |
| CLASS | Buzz_Software_Title<br>=(Software Eng) |
| CLASS<br>ACTION | Titles_Software<br>SumMAX<br>/Buzz_Software_Title [N W I] =OBJECTIVE_SECTION |
| SYN | Mask Designer<br>Mask designer |

```
SYN      Systems Designer
         =systems designer

CLASS    Buzz_Hardware_Title
         =(CAD Applications)
         =(CAD Development)
         =(CAD Engineer)
         =(CAD Eng Manager)
         =(CAD Eng Projct Lead)
         =(CAD Eng Sect Head)
         =(CAD Operator)
         =(CAD Technician)
         =(CAE Engineer)
         =(Elec Desgn Auto Eng)
         =(Electrical Engineer)
         =(Layout Designer)
         =(Mask Designer)
         =(Mechanical CAD-CAM)
         =(Place & Route Eng)
         =(Senior CAD Eng)
         =(Analog Designer)
         =(Circuit Designer)
         =(Component Designer)
         =(Digital Designer)
         =(IC Designer)
         =(Library Development)
         =(Logic Design Eng)
         =(VLSI Design Eng)
         =(Applications Eng)
         =(Board Designer)
         =(Electronic Tech)
         =(Hardware Eng)
         =(Systems Designer)

CLASS    Titles_Hardware
ACTION   SumMAX
         /Buzz_Hardware_Title [N W I] ;=OBJECTIVE_SECTION ; SYN    Above, + Project Lead, Section Hd Or Mgr
;        above, + project lead, section hd or mgr SYN      Failure Analy Eng
         failure analysis engineer SYN      qa
         qa
         quality assurance SYN      QA Engineer
         =qa =engineer SYN      qc
         qc
         quality control SYN      QC Engineer
         =qc =engineer SYN      Statistician
         statistician SYN      Quality Inspector
         quality [2] inspector SYN      Quality Operator
         quality [2] operator SYN      Quality Technician
         quality [2] technician
```

```
CLASS     Buzz_Quality_Title
          =(Failure Analy Eng)
          =(QA Engineer)
          =(QC Engineer)
          =(Quality Inspector)
          =(Quality Operator)
          =(Quality Technician)
          =(Reliability Eng)
          =(Statistician)

CLASS     Titles_Quality
ACTION    SumMAX
          /(Buzz_Quality_Title) [N W I] =OBJECTIVE_SECTION SYN       Assembly Technician
          assembly technician SYN       Elec-Mech Assembler
          electro [O] - =mech assembler SYN       Other_Assembler
          macro [2] Assembler
          machine language [40] Assembler
          Assembler [40] machine language
          Assembler [40] compiler
          compiler [40] assembler
          computer science [B] Assembler
          CS [B] Assembler SYN       Assembler
          Assembler [N W I] =(Assembly Language) $
    [N W I] =(Elec-Mech Assembler) [N W I] =(Other_Assembler)

SYN       equip
          equip
          equipment

SYN       Equip Mtce Tech
          =equip maintinence tech

SYN       Mark&Pack Operator
          mark =& pack operator

SYN       Mtl Finish Operator
          metal finish operator

SYN       Semi-Assembler
          semi-assembler

CLASS     Buzz_Assembly_Title
          =Assembler
          =(Assembly Technician)
          =(Elec-Mech Assembler)
          =(Equip Mtce Tech)
          =(Mark&Pack Operator)
          =(Mtl Finish Operator)
          =(Semi-Assembler)

CLASS     Titles_Assembly
ACTION    SumMAX
          /Buzz_Assembly_Title [N W I] =OBJECTIVE_SECTION CLASS     ZERO
          xxxyyyzzzppp CLASS     Titles
          /Titles_Assembly
          /(Titles_Indust. )
          /Titles_Informat
```

```
        /Titles_Ops
        /Titles_Packagin
        /Titles_Process
        /(Titles_Product )
        /(Titles_Quality )
;       /ZERO                     do we need this ???xxxx
        /(Titles_Test Eng)
        /Titles_Clerical
        /(Titles_Advertis)
        /Titles_Faciliti
        /Titles_Finance
        /(Titles_Human Re)
        /Titles_Legal
        /Titles_Marketin
        /Titles_Purchasi
        /Titles_Safety
        /Titles_Sales
        /Titles_Hardware
        /Titles_Software CLASS   Buzz_Other
        =(Member Tech Staff)

CLASS   Known_Titles
        /Buzz_Assembly_Title
        /(Buzz_Indust._Title)
        /Buzz_Informat_Title
        /Buzz_Ops_Title
        /Buzz_Packagin_Title
        /Buzz_Process_Title
        /(Buzz_Product _Title)
        /(Buzz_Quality _Title)
        /Buzz_Software_Title
        /Buzz_Hardware_Title
        /(Buzz_Test Eng_Title)
        /Buzz_Clerical_Title
        /(Buzz_Advertis_Title)
        /Buzz_Faciliti_Title
        /Buzz_Finance_Title
        /(Buzz_Human Re_Title)
        /Buzz_Legal_Title
        /Buzz_Marketin_Title
        /Buzz_Purchasi_Title
        /Buzz_Safety_Title
        /Buzz_Sales_Title
        /Buzz_Other ; ***********************************
; *           General               *
; ***********************************

SYN     Leader
        leader

SYN     Supervisor
        supervisor,!1

CLASS   Titles_General
        =Auditor
        =Manager
        =Leader
        =Supervisor
        director!1
        president!1
        secretary!2
        clerk
        receptionist!1
        Intern
``` hire
processor
counselor
head
engineer
designer
administrator!1
executive!1
programmer
technician!2
researcher
analyst!1
=Accountant
buyer
purchaser
salesman
marketeer
scientist
aide
operator
planner
assistant
salesperson
teacher
consultant
professor
instructor
controller
comptroller
coordinator
specialist
Tester
scheduler
assembler
drafter
representative
trainer CLASS   Name_Header
resume!2
personal!1
data
profile!1
record!1
name
summary
r e s u m e
information
of CLASS   BEG_DELIMITER
/Company [W I] =EXPERIENCE_SECTION
/NUMBER2A [W I] =EXPERIENCE_SECTION
/NUMBER3A [W I] =EXPERIENCE_SECTION
/NUMBER4A [W I] =EXPERIENCE_SECTION
/NUMBER5A [W I] =EXPERIENCE_SECTION
/MONTH [W I] =EXPERIENCE_SECTION
/SEASON_YEAR [W I] =EXPERIENCE_SECTION
/EOL [W I] =EXPERIENCE_SECTION
present [W I] =EXPERIENCE_SECTION
\ [W I] =EXPERIENCE_SECTION
| [W I] =EXPERIENCE_SECTION
, [W I] =EXPERIENCE_SECTION
. [W I] =EXPERIENCE_SECTION
; [W I] =EXPERIENCE_SECTION
: [W I] =EXPERIENCE_SECTION
] [W I] =EXPERIENCE_SECTION
) [W I] =EXPERIENCE_SECTION

```
        - [W I] =EXPERIENCE_SECTION
        a [W I] =EXPERIENCE_SECTION
       in [W I] =EXPERIENCE_SECTION
       an [W I] =EXPERIENCE_SECTION
    title [W I] =EXPERIENCE_SECTION CLASS   END_DELIMITER
        /Company [W I] =EXPERIENCE_SECTION
        /NUMBER2A [W I] =EXPERIENCE_SECTION
        /NUMBER3A [W I] =EXPERIENCE_SECTION
        /NUMBER4A [W I] =EXPERIENCE_SECTION
        /NUMBER5A [W I] =EXPERIENCE_SECTION
        /MONTH [W I] =EXPERIENCE_SECTION
        /SEASON_YEAR [W I] =EXPERIENCE_SECTION
        present [W I] =EXPERIENCE_SECTION
        /EOL [W I] =EXPERIENCE_SECTION
        \ [W I] =EXPERIENCE_SECTION
        | [W I] =EXPERIENCE_SECTION
        , [W I] =EXPERIENCE_SECTION
        . [W I] =EXPERIENCE_SECTION
        ; [W I] =EXPERIENCE_SECTION
        : [W I] =EXPERIENCE_SECTION
        ( [W I] =EXPERIENCE_SECTION
        [ [W I] =EXPERIENCE_SECTION
        - [W I] =EXPERIENCE_SECTION
        at [W I] =EXPERIENCE_SECTION
        with [W I] =EXPERIENCE_SECTION
        for [W I] =EXPERIENCE_SECTION
        position [W I] =EXPERIENCE_SECTION CLASS   Phrase
ACTION  GetProperNoun
        [I] /BEG_DELIMITER [* B F I] /END_DELIMITER $
   [C I] /Titles_General CLASS   DummyPhrase
        /Phrase [N C I] /BEG_DELIMITER CLASS   TestBeforePhrase
        [I] /BEG_DELIMITER [* B F I] /END_DELIMITER $
   [C I] /Titles_General CLASS   TestPhrase
        /Phrase SYN     StartPr
        /BEG_DELIMITER [B F] /BEG_DELIMITER SYN     PossPh
        /BEG_DELIMITER [B F] position [N C I] =StartPr $
   [W I] =EXPERIENCE_SECTION CLASS   Phrase2
ACTION  GetProperNoun
        [I] /BEG_DELIMITER [* B F I] position [W I] =PossPh CLASS   DummyPhrase2
        /Phrase2 [N C I] /BEG_DELIMITER CLASS   Other_Titles
        /DummyPhrase [C I] /Titles_General [N C I] /Titles
        /DummyPhrase2 [N C I] /Titles
    ;   /DummyPhrase2 [C I] /Titles_General [N C I] /Titles CLASS   All_Titles
        /Known_Titles
        /Other_Titles
```

```
CLASS   NonName_Titles
        /Known_Titles
        /Titles_General
        /Name_Header
        =END_HEADER [W] =LINE uses   system.def
SYN     AL
        Al
        alabama!2

SYN     AK
        ak
        alaska!2

SYN     AZ
        az
        arizona!2

SYN     AR
        ar
        arkansas!2

SYN     CA
        ca
        california!2
        calif

SYN     CO
        Co
        Colorado!2

SYN     CT
        ct
        connecticut!2

SYN     DE
        De
        delaware!2

SYN     DC
        dc
        district of columbia!2

SYN     FL
        fl
        florida!2

SYN     GA
        ga
        georgia!2

SYN     HI
        hi
        hawaii!2

SYN     ID
        id
        idaho!1

SYN     IL
        il
        illinois!2

SYN     IN
        In
        indiana!2
```

```
SYN     IA
        ia
        iowa!1

SYN     KS
        ks
        kansas!1

SYN     KY
        ky
        kentucky!2

SYN     LA
        La
        louisiana!2

SYN     ME
        Me
        Maine!1

SYN     MD
        md
        maryland!2

SYN     MA
        ma
        mass
        massachusetts!3

Syn     MI
        mi
        mich
        michigan!2

SYN     MN
        mn
        minn
        minnesota!2

SYN     MS
        ms
        miss
        mississippi!3

Syn     MO
        mo
        missouri!2

SYN     MT
        mt
        montana!2

SYN     NE
        ne
        nebraska!2

SYN     NV
        nv
        nevada!2

SYN     NH
        nh
        new!1 Hampshire!2

SYN     NJ
        nj
        new!1 jersey!1
```

| | | |
|---|---|---|
| SYN | NM | |
| | nm | |
| | new!1 mexico!1 | |
| SYN | NY | |
| | ny | |
| | new!1 york!1 | |
| SYN | NC | |
| | nc | |
| | north!1 carolina!2 | |
| | n [1] carolina!2 | |
| SYN | ND | |
| | nd | |
| | north!1 dakota!2 | |
| | n [1] dakota!2 | |
| SYN | OH | |
| | oh | |
| | ohio!1 | |
| SYN | OK | |
| | ok | |
| | oklahoma!2 | |
| SYN | OR | |
| | Or | |
| | oregon!1 | |
| SYN | PA | |
| | pa | |
| | penn | |
| | pennsylvania!2 | |
| SYN | RI | |
| | ri | |
| | rhode!1 island!1 | |
| SYN | SC | |
| | sc | |
| | south!1 carolina!2 | |
| | s [1] carolina!2 | |
| SYN | SD | |
| | sd | |
| | south!1 dakota!2 | |
| | s [1] dakota!2 | |
| SYN | TN | |
| | tn | |
| | tenn | |
| | tennessee!2 | |
| SYN | TX | |
| | tx | |
| | texas!1 | |
| SYN | UT | |
| | ut | |
| | utah!1 | |
| SYN | VT | |
| | vt | |
| | vermont!2 | |
| SYN | VA | |
| | va | |
| | virginia!2 | |

| | | |
|---|---|---|
| SYN | WA | |
| | wa | |
| | washington!2 | |
| SYN | WV | |
| | wv | |
| | west!1 virginia!2 | |
| SYN | WI | |
| | wi | |
| | wisconsin!2 | |
| SYN | WY | |
| | wy | |
| | wyoming!2 | |
| CLASS | STATE | |
| | =AL | |
| | =AK | |
| | =AZ | |
| | =AR | |
| | =CA | |
| | =CO | |
| | =CT | |
| | =DE | |
| | =DC | |
| | =FL | |
| | =GA | |
| | =HI | |
| | =ID | |
| | =IL | |
| | =IN | |
| | =IA | |
| | =KS | |
| | =KY | |
| | =LA | |
| | =ME | |
| | =MD | |
| | =MA | |
| | =MI | |
| | =MN | |
| | =MS | |
| | =MO | |
| | =MT | |
| | =NE | |
| | =NV | |
| | =NH | |
| | =NJ | |
| | =NM | |
| | =NY | |
| | =NC | |
| | =ND | |
| | =OH | |
| | =OK | |
| | =OR | |
| | =PA | |
| | =RI | |
| | =SC | |
| | =SD | |
| | =TN | |
| | =TX | |
| | =UT | |
| | =VT | |
| | =VA | |
| | =WA | |
| | =WV | |
| | =WI | |
| | =WY | |

```
#uses sections.def
uses common.def
#uses buzz.def

SYN     Adjudicate
        adjudicate

SYN     Advise
        advise

SYN     Conflict Interest
        conflict of interest

SYN     Copyright
        copyright
        copyrights

SYN     Counsel
        counsel

SYN     Court
        court

SYN     Defend
        defend

SYN     Intellectual Prop
        intellectual property

SYN     JD Degree
        jd degree

SYN     Lawsuit
        lawsuit
        lawsuits

SYN     License Agreement
        license =agreement

SYN     Litigation
        litigate
        litigation

SYN     Patent Application
        patent =application

SYN     license
        license
        licenses

SYN     Patent License
        patent =license

SYN     Patent
        patent
        patents

SYN     Prosecute
        prosecute

SYN     Settlement
        settlement

SYN     Tech Acquisition
        technology acquisition

SYN     Tort
        tort
        torts
```

```
SYN     secret
        secret
        secrets

SYN     Trade Secret
        trade -secret

SYN     Trademark
        trademark

; begin sun
SYN     Gov't Compliance
        government compliance

SYN     Regulatory Complian
        regulatory compliance

SYN     venture
        venture
        ventures

SYN     Joint Ventures
        joint =venture

SYN     exchange
        exchange
        exchanges

SYN     Technology Exchange
        technology -exchange

SYN     assist
        assist
        assisted

SYN     Legal Assistance
        legal assistance
        legal assistant
        =assist [B F] legal [W I] =SENTENCE SYN     Legal Significance
        legal significance SYN     Legal Risk
        legal risk SYN     Standard Contract
        standard -contract SYN     Corporate Law
        corporate law SYN     Legal Applications
        legal -application SYN     research
        research
        researched
        researching
        researcher SYN     Legal Research
        legal -research
        -research [B F] legal [W I] =SENTENCE SYN     Contractual Terms
        contractual terms
```

| | |
|---|---|
| SYN | Risk Assessment<br>risk assessment |
| SYN | RFP<br>RFP<br>RFPs |
| SYN | contracting<br>contract<br>contracts<br>contracting |
| SYN | Government Contract<br>government -contracting |
| SYN | Fed Aquisition Reg<br>federal aquisition -regulation |
| SYN | Public Law<br>public -law |
| SYN | Legal<br>legal |
| SYN | Labor<br>labor |
| CLASS | Buzz_Legal_Terms<br>=(Adjudicate)<br>=(Advise)<br>=(Arbitration)<br>=(Attorney)<br>=(Conflict Interest)<br>=(Copyright)<br>=(Counsel)<br>=(Court)<br>=(Defend)<br>=(Intellectual Prop)<br>=(JD Degree)<br>=(Labor)<br>=(Lawsuit)<br>=(Legal)<br>=(License Agreement)<br>=(Licensing)<br>=(Litigation)<br>=(Negotiations)<br>=(Patent Application)<br>=(Patent License)<br>=(Patent)<br>=(Prosecute)<br>=(Settlement)<br>=(Tech Acquisition)<br>=(Tort)<br>=(Trade Secret)<br>=(Trademark)<br>=(Contract Negotia'on)<br>=(Corporate Law)<br>=(Contractual Terms)<br>=(Gov't Compliance)<br>=(Government Contract)<br>=(Fed Aquisition Reg)<br>=(Joint Ventures)<br>=(Legal Applications)<br>=(Legal Assistance)<br>=(Legal Research)<br>=(Legal Risk)<br>=(Legal Significance) |

```
            =(Public Law)
            =(Regulatory Complian)
            =RFP
            =(Risk Assessment)
            =(Standard Contract)
            =(Technology Exchange)
CLASS   Skill_Legal_Terms
ACTION  AtLeastSTANDARD
        /Buzz_Legal_Terms [N W I] =OBJECTIVE_SECTION CLASS   Legal Terms
ACTION  TotalSkillBuzz
        /Buzz_Legal_Terms [N W I] =OBJECTIVE_SECTION
#uses sections.def
#uses buzz.def
uses common.def SYN     DODGE
        Dodge

SYN     DDA
        DDA

SYN     Automenu
        automenu

SYN     Excel
        excel

SYN     Fast Back
        fast back

SYN     Fastpak Mail
        fastpak mail

SYN     First Choice
        first choice

SYN     Framework
        framework

SYN     Harvard Graphics
        harvard graphics

SYN     Hypercard
        hypercard

SYN     Hypertext
        hypertext

SYN     Lotus 123
        lotus 123
        lotus 1

SYN     Macdraw
        macdraw

SYN     Macpaint
        macpaint

SYN     Macproject
        macproject

SYN     Microsoft Works
        microsoft works

SYN     Norton Utilities
        norton utilities
```

```
SYN     Procomm
        procomm

SYN     Quattro
        quattro

SYN     Q&A
        q&a

SYN     Sidekick
        sidekick

SYN     Smartcom
        smartcom

SYN     Supercalc
        supercalc

SYN     Symphony
        symphony

CLASS   Buzz_Applic
        =Automenu
        =DDA
        =DODGE
        =(Excel)
        =(Fast Back)
        =(Fastpak Mail)
        =(First Choice)
        =(Framework)
        =(Hypercard)
        =(Hypertext)
        =(Lotus 123)
        =(Macdraw)
        =(Macpaint)
        =(Macproject)
        =(Microsoft Works)
        =(Norton Utilities)
        =(Procomm)
        =(Quattro)
        =(Q&A)
        =(Sidekick)
        =(Smartcom)
        =(Spreadsheet)
        =(Supercalc)
        =(Symphony)

CLASS   Skill_Applic
ACTION  Zero
        /Buzz_Applic [N W I] =OBJECTIVE_SECTION CLASS   SW Applications
ACTION  Zero
        /Buzz_Applic [N W I] =OBJECTIVE_SECTION SYN     Adobe Illustrator
        adobe illustrator SYN     Aldus Pagemaker
        aldus pagemaker SYN     Framemaker
        framemaker
        FRAME SYN     Interleaf
        interleaf
```

```
SYN     Ventura
        ventura

SYN     PFS
        PFS

SYN     MacWrite
        mac write
        macwrite

SYN     Wysiwyg
        wysiwyg
        what [2] you [2] see [2] is [2] what [2] you [2] get SYN     Desktop Publisher
        desktop publisher
        desktop publishing CLASS   Buzz_Desktop
        =(Adobe Illustrator)
        =(Aldus Pagemaker)
        =(Desktop Publisher)
        =(Framemaker)
        =(Harvard Graphics)
        =(Interleaf)
        =(MacWrite)
        =(PFS)
        =(Ventura)
        =(Wysiwyg)

CLASS   Skill_Desktop
ACTION  Zero
        /Buzz_Desktop [N W I] =OBJECTIVE_SECTION CLASS   Desktop Publishers
ACTION  Zero
        /Buzz_Desktop [N W I] =OBJECTIVE_SECTION SYN     ASCII
        ASCII
        american standard code for information

SYN     API
        API

SYN     Applications
        applications

SYN     Encryption
        encryption

SYN   · EBCDIC
        EBCDIC
        extended binary coded decimal interchange

SYN     Object Code
        object code

SYN     Optimization
        optimization

SYN     Source Code
        source code

SYN     User Friendly
        user friendly

SYN     Software Architect
        software architecture
```

| | |
|---|---|
| SYN | Software Develop<br>software [B F] =develop [W I] =SENTENCE<br>=develop [B F] software [W I] =SENTENCE |
| SYN | Software Design<br>software [B F] =design [W I] =SENTENCE<br>=design [B F] software [W I] =SENTENCE |
| SYN | Software Library<br>software library |
| CLASS | Buzz_SW_Terms<br>=(ASCII)<br>=(API)<br>=(Applications)<br>=(Debugging)<br>=(Documentation)<br>=(Encryption)<br>=(EBCDIC)<br>=(Fault Tolerant)<br>=(Object Code)<br>=(Realtime)<br>=(Simulation)<br>=(Software Architect)<br>=(Software Design)<br>=(Software Develop)<br>=(Software Library)<br>=(Source Code) |
| CLASS | Skill_SW_Terms |
| ACTION | AtLeastSTANDARD<br>/Buzz_SW_Terms [N W I] =OBJECTIVE_SECTION |
| CLASS | SW Terms |
| ACTION | TotalSkillBuzz<br>/Buzz_SW_Terms [N W I] =OBJECTIVE_SECTION |
| SYN | Displaywriter<br>displaywriter |
| SYN | Easywriter<br>easywrite<br>easywriter |
| SYN | Full Write<br>full write |
| SYN | Macwrite<br>macwrite |
| SYN | Multimate<br>multimate |
| SYN | PFS Write<br>pfs write |
| SYN | Q&A Write<br>q&a write |
| SYN | Samna<br>samna |
| SYN | Sprint<br>sprint |
| SYN | Unix Text Formatter<br>troff |

```
            nroff
            ptroff

SYN     Unix Editor
            vi
            ed

SYN     Volkswriter
            volkswriter

SYN     Vydec
            vydec

SYN     Wang
            wang

SYN     Word Perfect
            word perfect

SYN     Wordstar
            worsdstar

SYN     Xerox
            xerox star
            xerox 850

SYN     X-Edit
            x-edit

SYN     [IBM] Displaywriter
            displaywriter

SYN     Microsoft Word
            Microsoft Word
            ms word
            MSW SYN     troff
            nroff
            ptroff
            troff SYN     Word Processor
            word processor
            word processors CLASS   Buzz_WordPro
            =(Adobe Illustrator)
            =(Displaywriter)
            =(Easywriter)
            =(Full Write)
            =Macwrite
            =(Microsoft Word)
            =Multimate
            =(PFS Write)
            =(Q&A Write)
            =Samna
            =Sprint
            =troff
            =(Unix Text Formatter)
            =(Unix Editor)
            =Volkswriter
            =Vydec
            =Wang
            =(Word Perfect)
            =Wordstar
            =Xerox
            =(X-Edit)
            =([IBM] Displaywriter)
            =(Word Processor)
```

```
CLASS    Skill_WordPro
ACTION   AtLeastSTANDARD
         /Buzz_WordPro [N W I] =OBJECTIVE_SECTION CLASS    Word Processors
ACTION   TotalSkillBuzz
         /Buzz_WordPro [N W I] =OBJECTIVE_SECTION uses sections.def
uses common.def
#uses buzz.def

SYN      DMR
         DMR

SYN      B/I
         B ^/ I
         burn-in

SYN      Customer Samples
         customer samples

SYN      Disposition
         disposition

SYN      yield
         yields

SYN      Final Test Yield
         final test =yield

SYN      Monitoring
         monitoring

CLASS    Buzz_ProdEng_Terms
         =(ESD)
         =(DMR)
         =(CMR)
         =(Bench Test)
         =(B/I)
         =(Customer Samples)
         =(Design Verification)
         =(Device Character)
         =(Disposition)
         =(Failure Analysis)
         =(Final Test Yield)
         =(Monitoring)
         =(Yield Improvement)

CLASS    Skill_ProdEng_Terms
ACTION   AtLeastSTANDARD
         /Buzz_ProdEng_Terms [N W I] =OBJECTIVE_SECTION CLASS    Product Eng Terms
ACTION   TotalSkillBuzz
         /Buzz_ProdEng_Terms [N W I] =OBJECTIVE_SECTION uses dates.def
uses buzz.def

SYN      computer
         computer
         computers

SYN      GE Semiconductor
         ge semiconductor
```

| | |
|---|---|
| SYN | INI<br>ini<br>industrial networking |
| SYN | AIDA<br>aida |
| SYN | Terradyne<br>terradyne |
| SYN | Analog Design Tools<br>analog design tools |
| SYN | Apollo Computer<br>apollo computer |
| SYN | CAD Solutions<br>cad solutions |
| SYN | Cadence<br>cadence |
| SYN | Cadmation<br>cadmation |
| SYN | CAE Systems<br>cae systems |
| SYN | Caeco<br>caeco |
| SYN | Calay Systems<br>calay systems |
| SYN | Calma<br>calma |
| SYN | Case Technology<br>case technology |
| SYN | Clarity Systems<br>clarity systems |
| SYN | Computervision<br>computervision |
| SYN | Daisy Systems Corp<br>daisy systems corp |
| SYN | ECAD<br>ecad |
| SYN | EDA Systems<br>eda |
| SYN | Emerald Design Sys<br>emerald design systems |
| SYN | EZ CAD<br>ez cad |
| SYN | Factron<br>factron<br>applicon |
| SYN | Gateway Design Auto<br>gateway design automation |

| | | |
|---|---|---|
| SYN | IKOS | |
| | ikos | |
| SYN | Lattice Logic | |
| | lattice logic | |
| SYN | Logic Automation | |
| | logic automation | |
| SYN | Logic Modelling Sys | |
| | logic modelling systems | |
| SYN | Matra Design Sys | |
| | matra design systems | |
| SYN | Mentor Graphics | |
| | mentor graphics | |
| SYN | Meta-Software | |
| | meta [2] software | |
| SYN | Metheus-CV | |
| | metheus [2] cv | |
| SYN | Personal CAD Sys | |
| | personal cad systems | |
| | pcad | |
| SYN | Phoenix Data Sys | |
| | phoenix data systems | |
| SYN | Procase | |
| | procase | |
| SYN | Quadtree Corp | |
| | quadtree corp | |
| SYN | Royal Digital Sys | |
| | royal digital systems | |
| SYN | Rugged Digital Sys | |
| | rugged digital systems | |
| SYN | SCSC | |
| | scsc | |
| | silicon compilers systems | |
| SYN | Sda Systems | |
| | sda systems | |
| SYN | Seattle Silicn Tech | |
| | seattle silicon technology | |
| SYN | Shiva Multisystems | |
| | shiva multisystems | |
| SYN | Silicon Graphics | |
| | silicon graphics | |
| SYN | Silicon Solutions | |
| | silicon solutions | |
| | zycad | |
| SYN | Silvaco | |
| | silvaco | |
| SYN | Silvar Lisco | |
| | silvar lisco | |

| | | |
|---|---|---|
| SYN | Simucad | |
| | simucad | |
| SYN | Simulog | |
| | simulog | |
| SYN | Supercads | |
| | supercads | |
| SYN | Synopsys | |
| | synopsys | |
| SYN | Tangent Systems | |
| | tangent systems | |
| SYN | Tektronix | |
| | tektronix | |
| SYN | The CAD Group | |
| | the cad group | |
| SYN | United Silicn Struc | |
| | united silicon structures | |
| SYN | Valid Logic Systems | |
| | valid logic systems | |
| SYN | Via Systems | |
| | via systems | |
| SYN | Visionics | |
| | visionics | |
| SYN | ZYCAD | |
| | zycad | |
| CLASS | CAE | |
| | =(AIDA) | |
| | =(Terradyne) | |
| | =(Analog Design Tools) | |
| | =(Apollo Computer) | |
| | =(CAD Solutions) | |
| | =(Cadence) | |
| | =(Cadmation) | |
| | =(CAE Systems) | |
| | =(Caeco) | |
| | =(Calay Systems) | |
| | =(Calma) | |
| | =(Case Technology) | |
| | =(Clarity Systems) | |
| | =(Computervision) | |
| | =(Daisy Systems Corp) | |
| | =(ECAD) | |
| | =(EDA Systems) | |
| | =(Emerald Design Sys) | |
| | =(EZ CAD) | |
| | =(Factron) | |
| | =(Gateway Design Auto) | |
| | =(IKOS) | |
| | =(Lattice Logic) | |
| | =(Logic Automation) | |
| | =(Logic Modelling Sys) | |
| | =(Matra Design Sys) | |
| | =(Mentor Graphics) | |
| | =(Meta-Software) | |
| | =(Metheus-CV) | |
| | =(Personal CAD Sys) | |
| | =(Phoenix Data Sys) | |
| | =(Procase) | |

=(Quadtree Corp)
=(Royal Digital Sys)
=(Rugged Digital Sys)
=(SCSC)
=(Sda Systems)
=(Seattle Silicn Tech)
=(Shiva Multisystems)
=(Silicon Graphics)
=(Silicon Solutions)
=(Silvaco)
=(Silvar Lisco)
=(Simucad)
=(Simulog)
=(Supercads)
=(Synopsys)
=(Tangent Systems)
=(Tektronix)
=(The CAD Group)
=(United Silicn Struc)
=(Valid Logic Systems)
=(Via Systems)
=(Visionics)
=(ZYCAD)

SYN     Camdesigns
        camdesigns

SYN     Consilium
        consilium

SYN     PROMIS
        promis

SYN     QRONOS
        qronos

CLASS   CIM
        =(Camdesigns)
        =(Consilium)
        =(PROMIS)
        =(QRONOS)

SYN     3COM
        3com

SYN     Banyan Systems
        banyan systems

SYN     Bridge Comm
        bridge communications

SYN     CE Network Systems
        ce network systems

SYN     Corvus Systems
        corvus systems

SYN     CXI
        cxi

SYN     David Systems
        david systems

SYN     DSC
        dsc

SYN     Excelan
        excelan

```
SYN       Nestar
          nestar
          dsc

SYN       NET
          NET
          Network Equipment

SYN       Network Gen'l Corp
          network general

SYN       Novell
          novell

SYN       Novellus
          novellus

SYN       Synoptics
          synoptics

SYN       Sytek
          sytek

SYN       Sun
          sun

SYN       Ungermann-Bass
          ungermann [2] bass

CLASS     LAN
          =(3COM)
          =(Banyan Systems)
          =(Bridge Comm)
          =(CE Network Systems)
          =(Corvus Systems)
          =(CXI)
          =(David Systems)
          =(DSC)
          =(Excelan)
          =(INI)
          =(Nestar)
          =(NET)
          =(Network Gen'l Corp)
          =(Novell)
          =(Novellus)
          =(Synoptics)
          =(Sytek)
          =(Sun)
          =(Ungermann-Bass)

SYN       Abb Hafo
          abb hafo

SYN       Acrian
          acrian

SYN       Actel Corp
          actel corp

SYN       Adv Linear Devices
          advanced linear devices

SYN       Alliance Semi
          alliance semiconductor

SYN       Alphatron
          alphatron

SYN       Altera Semi
          altera semiconductor
```

| | |
|---|---|
| SYN | AMCC<br>amcc<br>applied microcircuits |
| SYN | AMD<br>amd<br>advanced micro devices |
| SYN | AMI<br>ami |
| SYN | Analog Devices<br>analog devices |
| SYN | Anthem Electronics<br>anthem electronics |
| SYN | Array Technology<br>array technology |
| SYN | Arrow Electronics<br>arrow electronics |
| SYN | Aspen Semi<br>aspen semiconductor |
| SYN | AT&T<br>at&t<br>american telephone and telegraph |
| SYN | ATMEL<br>atmel |
| SYN | Avantek<br>avantek |
| SYN | Barvon Research<br>barvon research |
| SYN | Bipolar Integ Tech<br>bipolar integ tech |
| SYN | Brooktree Corp<br>brooktree |
| SYN | Burr-Brown<br>burr-brown |
| SYN | California Devices<br>california devices |
| SYN | Calif Micro Devices<br>california micro devices |
| SYN | Calogic Corp<br>calogic corp |
| SYN | Catalyst Semi<br>catalyst semiconductor |
| SYN | Cermetek Microelect<br>cermetek microelectronics |
| SYN | Cherry Semi<br>cherry semiconductor |
| SYN | &<br>&<br>and |

| | | |
|---|---|---|
| SYN | Chips & Tech | |
| | chips =& technologies | |
| SYN | Cirrus Logic | |
| | cirrus logic | |
| SYN | CITEL | |
| | citel | |
| SYN | Commodore | |
| | commodore | |
| SYN | Crystal Semi Corp | |
| | crystal semiconductor | |
| SYN | Custom Arrays Corp | |
| | custom arrays | |
| SYN | Custom Mos Arrays | |
| | custom mos arrays | |
| SYN | Custom Silicon | |
| | custom silicon | |
| SYN | Cypress | |
| | cypress | |
| SYN | Dallas Semi Corp | |
| | dallas semiconductor | |
| SYN | Data General | |
| | data general | |
| SYN | Data Linear Corp | |
| | data linear corp | |
| SYN | DEC | |
| | dec [N W I] /DATE | |
| | digital equipment | |
| SYN | ECI Semiconductor | |
| | eci semiconductor | |
| SYN | EG&G Reticon | |
| | eg&g reticon | |
| SYN | Elantec | |
| | elantec | |
| SYN | Electronic Designs | |
| | electronic designs | |
| SYN | European Silicon | |
| | european silicon | |
| SYN | EXAR | |
| | exar | |
| SYN | Exel Micro | |
| | exel micro | |
| SYN | Fairchild | |
| | fairchild | |
| SYN | Faraday Electronics | |
| | faraday electronics | |
| SYN | Focus Semi Systems | |
| | focus semi systems | |

| | | |
|---|---|---|
| SYN | Ford Microelectron | |
| | ford microelectron | |
| SYN | Fujitsu Microelect | |
| | fujitsu microelectronics | |
| SYN | G2 | |
| | g2 | |
| SYN | Gain Electronics | |
| | gain electronics | |
| SYN | Gazelle Microcirc | |
| | gazelle microcircuits | |
| SYN | GE Corporate R&D | |
| | ge corporate r&d | |
| SYN | GE Microelectronics | |
| | ge microelectronics | |
| SYN | General Instruments | |
| | general instruments | |
| SYN | General Semi Ind | |
| | general semi ind | |
| SYN | GESS | |
| | gess | |
| SYN | Gigabit Logic | |
| | gigabit logic | |
| SYN | Goldstar Tech | |
| | goldstar tech | |
| SYN | Gould | |
| | gould | |
| SYN | Hamilton/Avnet | |
| | hamilton [2] avnet | |
| SYN | Harris Microwv Semi | |
| | harris microwave semiconductor | |
| SYN | Harris Semi | |
| | harris [N] microwave semiconductor | |
| SYN | Hilevel Technology | |
| | hilevel technology | |
| SYN | Hitachi Semi | |
| | hitachi semiconductor | |
| SYN | Holt ICs | |
| | holt integrated circuits | |
| SYN | Honeywell GaAs Prod | |
| | honeywell gaas production | |
| SYN | Honeywell | |
| | honeywell | |
| SYN | Hughes Aircraft | |
| | hughes aircraft | |
| SYN | Hytek Microsystems | |
| | hytek microsystems | |

| | |
|---|---|
| SYN | Hyundai<br>hyundai |
| SYN | IBM<br>ibm |
| SYN | IC Solutions<br>ic solutions |
| SYN | ICI Array Tech<br>ici array tech |
| SYN | ICI Integrated Ckt<br>ici integrated circuits |
| SYN | IDT<br>idt<br>integrated device technology |
| SYN | IMI<br>imi<br>international microcircuits |
| SYN | IMP<br>imp<br>international microelectronics |
| SYN | INMOS<br>inmos |
| SYN | Inova Microelectron<br>inova microelectronics |
| SYN | Integrated Cmos Sys<br>integrated cmos systems |
| SYN | Integratd Logic Sys<br>integrated logic systems |
| SYN | Integrted Pwr Semi<br>integrated power semiconductors |
| SYN | Intel<br>intel |
| SYN | Interact<br>interact |
| SYN | Intercept Microelec<br>intercept microelectronics |
| SYN | Interdesign<br>interdesign |
| SYN | Int'l Cmos Tech<br>international cmos |
| SYN | Int'l Rectifier<br>international rectifier |
| SYN | Intersil<br>intersil |
| SYN | Invest Mgmt Int'l<br>investment management international<br>zytrex |
| SYN | ITT Semiconductors<br>itt semiconductors |

| | | |
|---|---|---|
| SYN | IXYS Corp | ixys |
| SYN | Krysalis Corp | krysalis |
| SYN | Lansdale Semi | lansdale semiconductor |
| SYN | Lattice Semi Corp | lattice semiconductor |
| SYN | Linear Tech Corp | linear technology |
| SYN | Litronix | litronix |
| SYN | Logic Devices | logic devices |
| SYN | LSI Logic | lsi logic |
| SYN | Marconi Elec Dev | marconi elec devices |
| SYN | MAXIM | maxim |
| SYN | MCE | mce |
| SYN | Micrel | micrel |
| SYN | Micro Linear Corp | micro linear corp |
| SYN | Micro Lsi Corp | micro lsi corp |
| SYN | Micro Power Systems | micro power systems |
| SYN | Micro-Rel | micro-rel |
| SYN | Microchip Tech | microchip technology |
| SYN | Micron Tech | micron technology |
| SYN | Microwave Monolith | microwave monolithics |
| SYN | Microwave Semi | microwave semiconductor |
| SYN | Mitel | mitel |
| SYN | Mitsubishi Elect | mitsubishi electronics |
| SYN | Modular Semi | modular semiconductor |

| | | |
|---|---|---|
| SYN | Monolithic Memories | monolithic memories |
| SYN | Morgan Semi | morgan semiconductor |
| SYN | Mosel | mosel |
| SYN | Mostek Corp | mostek |
| SYN | Motorola | motorola |
| SYN | Multichip Tech | multichip technology |
| SYN | National Semi | national semiconductor |
| SYN | NCR Microelectron | ncr microelectronics |
| SYN | NEC | nec |
| SYN | OKI Semiconductor | oki semiconductor |
| SYN | Orbit Semiconductor | orbit semiconductor |
| SYN | Pacific Monolithics | pacific monolithic |
| SYN | Panasonic | panasonic |
| SYN | Panatech Semi | panatech semiconductor |
| SYN | Performnc Semi Corp | performance semiconductor |
| SYN | Phillips Labs | phillips labs |
| SYN | Plessey | plessey |
| SYN | PLX Technology | plx technology |
| SYN | Polycore Electronic | polycore electronics |
| SYN | Power Integrations | power integrations |
| SYN | Precision Monolith | precision monolith |
| SYN | Prentice | prentice |
| SYN | Quasel | quasel |

| | | |
|---|---|---|
| SYN | Raytheon | |
| | raytheon | |
| SYN | Rca Corp | |
| | rca | |
| SYN | Ricoh Corp | |
| | ricoh corporation | |
| SYN | Rockwell Int Corp | |
| | rockwell international | |
| SYN | Rohm Corp | |
| | rohm corporation | |
| SYN | Ross Technology | |
| | ross technology | |
| SYN | S-MOS Systems | |
| | s [2] mos systems | |
| SYN | Sahni Corp | |
| | sahni | |
| SYN | Samsung Semi | |
| | samsung semiconductor | |
| SYN | Saratoga Semi | |
| | saratoga semiconductor | |
| SYN | SEEQ | |
| | seeq | |
| SYN | Sematech | |
| | sematech | |
| SYN | SGS Semi Corp | |
| | sgs semiconductor | |
| SYN | SGS Tmomson | |
| | sgs tmomson | |
| SYN | Siemens Components | |
| | siemens components | |
| SYN | Sierra Semi | |
| | sierra semiconductor | |
| SYN | Signetics | |
| | signetics | |
| SYN | Silicon Macrosystem | |
| | silicon macrosystem | |
| SYN | Silicon Systems | |
| | silicon systems | |
| SYN | Siliconix | |
| | siliconix | |
| SYN | Solid State Scien | |
| | solid state scientific | |
| SYN | Solid State Tech | |
| | solid state technology | |
| SYN | Sprague Solid State | |
| | sprague solid state | |

| | | |
|---|---|---|
| SYN | Standard Microsys | |
| | standard microsystems | |
| SYN | Supertex | |
| | supertex | |
| SYN | Synertek | |
| | synertek | |
| SYN | Tachonics Corp | |
| | tachonics corp | |
| SYN | Taiwan Semi Mftg | |
| | taiwan semiconductor manufacturing | |
| SYN | Teledyne | |
| | teledyne | |
| SYN | Telmos | |
| | telmos | |
| SYN | Texas Instruments | |
| | texas instruments | |
| SYN | Thomson Components | |
| | thomson components | |
| SYN | Three Five Semi | |
| | three five semiconductor | |
| SYN | Toshiba America | |
| | toshiba america | |
| SYN | Trilogy | |
| | trilogy | |
| SYN | Triquint Semi | |
| | triquint semiconductor | |
| SYN | Tristar | |
| | tristar | |
| SYN | TRW | |
| | trw | |
| SYN | Unicorn Microelect | |
| | unicorn microelectronics | |
| SYN | UNISYS | |
| | unisys | |
| SYN | United Tech Micro | |
| | united technologies microelectronics | |
| SYN | Unitrode | |
| | unitrode | |
| SYN | Universal | |
| | universal | |
| SYN | Vadem | |
| | vadem | |
| SYN | Visic | |
| | visic | |
| SYN | Vitelic Corp | |
| | vitelic | |

| | |
|---|---|
| SYN | Vitesse Elect Corp<br>vitesse electronics |
| SYN | VLSI Standards<br>vlsi standards |
| SYN | VLSI Technology<br>vlsi technology<br>vti |
| SYN | VTC<br>vtc<br>vhsic technology |
| SYN | Waferscale Integrat<br>waferscale integration |
| SYN | Weitek<br>weitek |
| SYN | Western Digital<br>western digital |
| SYN | Western Microtech<br>western microtechnology |
| SYN | White Technologies<br>white technologies |
| SYN | Xicor<br>xicor |
| SYN | Xilinx<br>xilinx |
| SYN | Zilog<br>zilog |
| SYN | Zoran<br>zoran |
| SYN | Zymos<br>zymos |
| SYN | Zytrex<br>zytrex |
| CLASS | Semiconductors<br>=(Abb Hafo)<br>=(Acrian)<br>=(Actel Corp)<br>=(Adv Linear Devices)<br>=(Alliance Semi)<br>=(Alphatron)<br>=(Altera Semi)<br>=(AMCC)<br>=(AMD)<br>=(AMI)<br>=(Analog Devices)<br>=(Anthem Electronics)<br>=(Array Technology)<br>=(Arrow Electronics)<br>=(Aspen Semi)<br>=(AT&T)<br>=(ATMEL)<br>=(Avantek)<br>=(Barvon Research)<br>=(Bipolar Integ Tech)<br>=(Brooktree Corp) |

-(Burr-Brown)
-(California Devices)
-(Calif Micro Devices)
-(Calogic Corp)
-(Catalyst Semi)
-(Cermetek Microelect)
-(Cherry Semi)
-(Semiconductor)
-(Chips & Tech)
-(Cirrus Logic)
=(CITEL)
=(Commodore)
=(Crystal Semi Corp)
=(Custom Arrays Corp)
=(Custom Mos Arrays)
=(Custom Silicon)
=(Cypress)
=(Dallas Semi Corp)
=(Data General)
=(Data Linear Corp)
=(DEC)
=(ECI Semiconductor)
=(EG&G Reticon)
=(Elantec)
=(Electronic Designs)
=(European Silicon)
=(EXAR)
=(Exel Micro)
=(Fairchild)
=(Faraday Electronics)
=(Focus Semi Systems)
=(Ford Microelectron)
=(Fujitsu Microelect)
=(G2)
=(Gain Electronics)
=(Gazelle Microcirc)
=(GE Corporate R&D)
=(GE Microelectronics)
=(GE Semiconductor)
=(General Instruments)
=(General Semi Ind)
=(GESS)
=(Gigabit Logic)
=(Goldstar Tech)
=(Gould)
=(Hamilton/Avnet)
=(Harris Microwv Semi)
=(Harris Semi)
=(Hewlett Packard)
=(Hilevel Technology)
=(Hitachi Semi)
=(Holt ICs)
=(Honeywell GaAs Prod)
=(Honeywell)
=(Hughes Aircraft)
=(Hytek Microsystems)
=(Hyundai)
=(IBM)
=(IC Solutions)
=(ICI Array Tech)
=(ICI Integrated Ckt)
=(IDT)
=(IMI)
=(IMP)
=(INI)
=(INMOS)
=(Inova Microelectron)
=(Integrated Cmos Sys)

=(Integratd Logic Sys)
=(Integrted Pwr Semi)
=(Intel)
=(Interact)
=(Intercept Microelec)
=(Interdesign)
=(Interdesign)
=(Int'l Cmos Tech)
=(Int'l Rectifier)
=(Intersil)
=(Invest Mgmt Int'l)
=(ITT Semiconductors)
=(IXYS Corp)
=(Krysalis Corp)
=(Lansdale Semi)
=(Lattice Semi Corp)
=(Linear Tech Corp)
=(Litronix)
=(Logic Devices)
=(LSI Logic)
=(Marconi Elec Dev)
=(Matra Design Sys)
=(MAXIM)
=(MCE)
=(Micrel)
=(Micro Linear Corp)
=(Micro Lsi Corp)
=(Micro Power Systems)
=(Micro-Rel)
=(Microchip Tech)
=(Microchip Tech)
=(Micron Tech)
=(Microwave Monolith)
=(Microwave Semi)
=(Mitel)
=(Mitsubishi Elect)
=(Modular Semi)
=(Monolithic Memories)
=(Morgan Semi)
=(Mosel)
=(Mostek Corp)
=(Motorola)
=(Multichip Tech)
=(National Semi)
=(NCR Microelectron)
=(NEC)
=(OKI Semiconductor)
=(Orbit Semiconductor)
=(Pacific Monolithics)
=(Panasonic)
=(Panatech Semi)
=(Performnc Semi Corp)
=(Phillips Labs)
=(Plessey)
=(PLX Technology)
=(Polycore Electronic)
=(Power Integrations)
=(Precision Monolith)
=(Prentice)
=(Quasel)
=(Raytheon)
=(Rca Corp)
=(Ricoh Corp)
=(Rockwell Int Corp)
=(Rohm Corp)
=(Ross Technology)
=(S-MOS Systems)
=(Sahni Corp)

= (Samsung Semi)
= (Saratoga Semi)
= (SEEQ)
= (Sematech)
= (Semiconductor)
= (SGS Semi Corp)
= (SGS Tmomson)
= (Siemens Components)
= (Sierra Semi)
= (Signetics)
= (Silicon Macrosystem)
= (Silicon Systems)
= (Siliconix)
= (Solid State Scien)
= (Solid State Tech)
= (Sprague Solid State)
= (Standard Microsys)
= (Supertex)
= (Synertek)
= (Tachonics Corp)
= (Taiwan Semi Mftg)
= (Teledyne)
= (Telmos)
= (Texas Instruments)
= (Thomson Components)
= (Three Five Semi)
= (Toshiba America)
= (Trilogy)
= (Triquint Semi)
= (Tristar)
= (TRW)
= (Unicorn Microelect)
= (UNISYS)
= (United Tech Micro)
= (Unitrode)
= (Universal)
= (Vadem)
= (Visic)
= (Vitelic Corp)
= (Vitesse Elect Corp)
= (VLSI Standards)
= (VLSI Technology)
= (VTC)
= (Waferscale Integrat)
= (Weitek)
= (Western Digital)
= (Western Microtech)
= (White Technologies)
= (Xicor)
= (Xilinx)
= (Zilog)
= (Zoran)
= (Zymos)
= (Zytrex)

SYN    ACER Counterpoint
       acer counterpoint**

SYN    Adaptec
       adaptec

SYN    Altos Comp Systems
       altos comp systems

SYN    Amdahl
       amdahl

| | | |
|---|---|---|
| SYN | Apple<br>apple | |
| SYN | Ardent<br>ardent<br>dana computer | |
| SYN | Arix<br>arete systems<br>arix | |
| SYN | AST<br>ast | |
| SYN | Atari<br>atari | |
| SYN | Centigram Corp<br>centigram | |
| SYN | Compaq<br>compaq | |
| SYN | Control Data Corp<br>control data corp<br>CDC | |
| SYN | Convergent Tech<br>convergent technologies | |
| SYN | Counterpnt Computer<br>counterpoint computer | |
| SYN | Cray<br>cray | |
| SYN | Elxsi<br>elxsi | |
| SYN | Epson<br>epson | |
| SYN | Everex<br>everex | |
| SYN | Fortune<br>fortune | |
| SYN | Grid<br>grid | |
| SYN | Interactive Systems<br>interactive systems | |
| SYN | MIPS<br>mips | |
| SYN | Mountain Comp<br>mountain -computer | |
| SYN | Olivetti<br>olivetti | |
| SYN | Plexus Comp<br>plexus -computer | |
| SYN | Pyramid<br>pyramid | |

| | |
|---|---|
| SYN | Schlumberger<br>schlumberger |
| SYN | Storage Technology<br>storage technology |
| SYN | Sun Microsystems<br>sun microsystems |
| SYN | System Industries<br>system industries |
| SYN | Tandem Computers<br>tandem computers |
| SYN | Televideo Systems<br>televideo systems |
| SYN | Triad<br>triad |
| SYN | Unisys Corp<br>unisys corp |
| SYN | Wang Labs<br>wang labs |
| SYN | Wyse Technology<br>wyse technology |
| CLASS | Systems<br>-(ACER Counterpoint)<br>-(Adaptec)<br>-(Altos Comp Systems)<br>-(Amdahl)<br>-(Apple)<br>-(Ardent)<br>-(Arix)<br>-(AST)<br>-(Atari)<br>-(Centigram Corp)<br>-(Commodore)<br>-(Compaq)<br>-(Control Data Corp)<br>-(Convergent Tech)<br>-(Counterpnt Computer)<br>-(Cray)<br>-(Elxsi)<br>-(Epson)<br>-(Everex)<br>-(Fortune)<br>-(Grid)<br>-(Hewlett Packard)<br>-(Interactive Systems)<br>-(MIPS)<br>-(Mountain Comp)<br>-(Olivetti)<br>-(Plexus Comp)<br>-(Pyramid)<br>-(Schlumberger)<br>-(Storage Technology)<br>-(Sun Microsystems)<br>-(System Industries)<br>-(Tandem Computers)<br>-(Televideo Systems)<br>-(Triad)<br>-(Unisys Corp)<br>-(Wang Labs)<br>-(Wyse Technology) |

SYN     Genrad
        genrad

SYN     Megatest
        megatest

CLASS   Systems/Ate
        -(Genrad)
        -(Megatest)

SYN     Equatorial
        equatorial

SYN     Mcdonnell Douglas
        mcdonnell douglas

SYN     Racal Vadic
        racal vadic

SYN     Rolm
        rolm

CLASS   Systems/Com
        =(Equatorial)
        =(Mcdonnell Douglas)
        =(Racal Vadic)
        =(Rolm)

SYN     Connor Peripherals
        connor peripherals

SYN     Maxtor
        maxtor

SYN     Priam Corp
        priam corp

SYN     Quantum
        quantum

SYN     Seagate
        seagate

CLASS   Systems/DD
        -(Connor Peripherals)
        -(Maxtor)
        -(Priam Corp)
        -(Quantum)
        -(Seagate)

SYN     Boeing
        boeing

SYN     FMC
        fmc

SYN     GTE
        gte

SYN     Kaiser Electronics
        kaiser electronics

SYN     Lockheed
        lockheed

SYN     Loral
        loral

```
SYN     Singer Link
        singer link

CLASS   Systems/Def
        -(Boeing)
        -(FMC)
        -(GTE)
        -(Kaiser Electronics)
        -(Lockheed)
        -(Loral)
        -(Singer Link)

SYN     Wollongong
        wollongong

CLASS   Systems/LAN
        -(Wollongong)

SYN     Datacopy
        datacopy

SYN     Dest Corp
        dest

CLASS   Systems/OCR
        -(Datacopy)
        -(Dest Corp)

SYN     Applied Materials
        applied materials

SYN     ASM Litho
        asm litho

SYN     EATON
        eaton

SYN     KLA
        kla

SYN     Perkin Elmer
        perkin elmer

SYN     Silicon Valley Grp
        silicon valley group

SYN     Varian
        varian

CLASS   Systems/Semiequi
        -(Applied Materials)
        -(ASM Litho)
        -(EATON)
        -(KLA)
        -(Perkin Elmer)
        -(Silicon Valley Grp)
        -(Varian)

SYN     Adobe
        adobe

SYN     Ashton/Tate
        ashton [2] tate

SYN     Borland
        borland
```

| | |
|---|---|
| SYN | Computer Assoc<br>computer association |
| SYN | Lotus<br>lotus |
| SYN | Metaphor<br>metaphor |
| SYN | Microport Systems<br>microport systems |
| SYN | Micropro<br>micropro |
| SYN | Microsoft<br>microsoft |
| SYN | co<br>co<br>corp<br>inc<br>corporation |
| SYN | Software Publishing<br>software publishing -co |
| SYN | Symantec<br>symantec |
| SYN | SCO<br>the santa cruz operation |
| SYN | Touch Communication<br>touch communications |
| SYN | Unisoft<br>unisoft |
| SYN | Word Perfect<br>word perfect |
| CLASS | Systems/SW<br>-(Adobe)<br>-(Ashton/Tate)<br>-(Borland)<br>-(Computer Assoc)<br>-(Lotus)<br>-(Metaphor)<br>-(Microport Systems)<br>-(Micropro)<br>-(Microsoft)<br>-(Software Publishing)<br>-(Symantec)<br>-(SCO)<br>-(Touch Communication)<br>-(Unisoft)<br>-(Word Perfect) |
| SYN | Britton Lee<br>britton lee |
| SYN | Informix<br>informix |
| SYN | Oracle<br>oracle |

| | |
|---|---|
| SYN | RTI<br>rti<br>relational technology |
| SYN | Sybase<br>sybase |
| SYN | Unify<br>unify |
| CLASS | Systems/SW/RDBMS<br>-(Britton Lee)<br>-(Informix)<br>-(Oracle)<br>-(RTI)<br>-(Sybase)<br>-(Unify) |
| SYN | Boreland<br>boreland |
| CLASS | Company<br>-(Apollo Computer)<br>-Cadence<br>-(Daisy Systems Corp)<br>-(Mentor Graphics)<br>-(Silicon Graphics)<br>-(Valid Logic Systems)<br>-3COM<br>-Novell<br>-AMD<br>-(Analog Devices)<br>-(Chips & Tech)<br>-Cypress<br>-(Fujitsu Microelect)<br>-(GE Semiconductor)<br>-(Harris Semi)<br>-(Hewlett Packard)<br>-(Hitachi Semi)<br>-IDT<br>-Intel<br>-(LSI Logic)<br>-(Microchip Tech)<br>-(Mitsubishi Elect)<br>-(Monolithic Memories)<br>-(Motorola)<br>-(National Semi)<br>-NEC<br>-(SGS Semi Corp)<br>-(Signetics)<br>-(Silicon Systems)<br>-(Texas Instruments)<br>-(Toshiba America)<br>-(VLSI Technology)<br>-Zilog<br>-Amdahl<br>-Apple<br>-MIPS<br>-(Sun Microsystems)<br>-(Tandem Computers)<br>-Seagate<br>-Boreland<br>-(Computer Assoc)<br>-Microsoft<br>-Oracle<br>/(Systems/SW/RDBMS)<br>/(Systems/SW)<br>/(Systems/Semiequi)<br>/(Systems/OCR) |

```
          /(Systems/LAN)
          /(Systems/Def)
          /(Systems/DD)
          /(Systems/Com)
          /(Systems/Ate)
          /(Systems)
          /(Semiconductors)
          /(LAN)
          /(CAE)
          /(CIM)

#uses sections.def

SYN       division manager
          division manager

SYN       NonManager
          database
          file
          systems
          system
          presentation
          data base SYN       Manager
          [N I] -NonManager [2] manager $
  [N W I] -(division manager)
          supervisor
          foreman
          section head
          department head
          project leader SYN       Executive
          director
          vice president [W I] -EXPERIENCE_SECTION
          V.P. [W I] -EXPERIENCE_SECTION
          chief executive officer
          CEO
          president [W I] -EXPERIENCE_SECTION
          chief operations officer
          chief financial officer
          CFO
          COO
          division head
          -(division manager)

CLASS     Buzz_Management
          -Manager
          -Executive

CLASS     Skill_Management
ACTION    AtLeastSTANDARD
          /Buzz_Management   [N W I] -OBJECTIVE_SECTION CLASS     Management
ACTION    TotalSkillBuzz
          /Buzz_Management [N W I] -OBJECTIVE_SECTION uses common.def
uses sections.def

; this file should contain all synonyms common to
; two or more files

SYN       OSHA
          OSHA
          occupational safety -& health -admin
```

| | |
|---|---|
| SYN | programming<br>programming<br>programmer |
| SYN | Systems Programming<br>-systems -programming |
| SYN | Program/Analysis<br>programmer [2] analyst |
| SYN | Programming<br>-programming [N W I] -(Systems Programming) $<br>[N W I] -(Program/Analysis) |
| SYN | Circuit Simulation<br>circuit simulation |
| SYN | Fault Simulation<br>fault simulation |
| SYN | Logic Simulation<br>logic simulation |
| SYN | Simulation<br>simulation [N W I] -(Circuit Simulation) $<br>[N W I] -(Fault Simulation) [N W I] -(Logic Simulation) |
| SYN | Cognos Powerhouse<br>cognos powerhouse |
| SYN | Quiz/Quick<br>quiz ^/ quick |
| SYN | SVID<br>SVID<br>system v interface definition |
| SYN | Cross Compiler<br>cross [3] -compiler |
| SYN | Compiler Driver<br>compiler -driver |
| SYN | Fault Tolerant<br>fault tolerant |
| SYN | Firmware<br>firmware |
| SYN | Graphics Standards<br>-graphics -standard |
| SYN | Graphics Library<br>-graphics -library |
| SYN | Graphics<br>-graphics [N W I] -(Graphics Standards) [N W I] -(Graphics Library) |
| SYN | Human Factors<br>human factors |
| SYN | Realtime<br>realtime<br>real time |
| SYN | Spreadsheet<br>spreadsheet<br>spreadsheets . |

| | |
|---|---|
| SYN | TSO<br>tso |
| SYN | Apollo<br>apollo |
| SYN | PC<br>PC<br>personal computer |
| SYN | IBM PC AT [80286]<br>IBMPC [2] at<br>=PC [2] at<br>80286<br>=PC [2] 286 |
| SYN | IBM PC 80386<br>80386<br>=PC [2] 386 |
| SYN | IBM PC<br>IBM =PC [N W I] =(IBM PC AT [80286])<br>IBMPC [N W I] =(IBM PC AT [80286]) |
| SYN | SUN<br>Sun |
| SYN | controller<br>controller<br>controllers |
| SYN | Disk Controller<br>Disk controller |
| SYN | Tape Controller<br>Tape controller |
| SYN | Graphic Controller<br>graphic controller |
| SYN | Micro Controller<br>micro [O] - =controller<br>microcontroller<br>microcontrollers |
| SYN | Embedded Controller<br>embedded controller |
| SYN | Insurance<br>insurance |
| SYN | Stock Option<br>stock =option |
| SYN | Profit Sharing<br>profit sharing |
| SYN | VAR<br>VAR<br>value added reseller |
| SYN | Interview<br>interview<br>interviewed<br>interviewer<br>interviews<br>interviewing |
| SYN | Artwork<br>artwork |

```
SYN     Facility Planning
        -facility planning
        -facility design SYN     Human Factors Eng
        human factors -engineer SYN     NCP
        NCP
        network control program SYN     Shell Script
        shell script
        shell scripts SYN     Script
        script [N W I] -(Shell Script)

SYN     inter
        inter
        internal
        internet

SYN     TCP/IP
        TCP
        transaction control processor
        -inter protocol SYN     VTAM
        VTAM
        virtual telecomm access method SYN     Labor Arbitration
        labor [B F] -arbitration [W I] -SENTENCE
        -arbitration [B F] labor [W I] -SENTENCE SYN     Arbitration
        -arbitration [N W I] -(Labor Arbitration)

SYN     GL
        GL
        generation -language

SYN     4-Gl
        4 [2] -GL
        4th -GL

SYN     GPL
        gpl

SYN     Union Negotia'on
        union [1] negotiations
        union [1] -contract SYN     Union
        union [N W I] -(Union Negotia'on)
        unions SYN     Contract Negotia'on
        -negotiate [1] -contract
        -contract [1] -negotiate SYN     Negotiations
        -negotiate [N W I] -(Union Negotia'on) $
  [N W I] -(Contract Negotia'on)

SYN     Business Plan
        business [B F] -plan [W I] -SENTENCE
        -plan [B F] business [W I] -SENTENCE
```

| | | |
|---|---|---|
| SYN | Cash Forecasting | |

```
SYN     Cash Forecasting
        cash forecasting

SYN     Forecasting
        forecast
        forecasts
        forecasting [N W I] -(Cash Forecasting)

SYN     Licensing
        licensing

SYN     promotion
        promo
        promotion
        promotions
        promotional SYN     Marketing Promotion
        marketing [1] -promotion SYN     FCC
        FCC
        federal communications commission SYN     Manuals
        manual
        manuals
        manuscript SYN     Gate Width
        gate width
        gate oxide SYN     Mapping
        mapping SYN     Thin Film Categor
        thin film categorization SYN     Thin Films
        thin -film [N W I] -(Thin Film Categor)

SYN     ESD
        ESD
        electrical static discharge

SYN     Bench Test
        bench test

SYN     Design Verification
        design verification

SYN     Device Character
        device characterization

SYN     Failure Analysis
        failure [1] analysis

SYN     Yield Improvement
        yield improvement
        yield enhancement

SYN     Invoice
        invoice
        invoices

SYN     JIT
        JIT
        just in time
```

| | |
|---|---|
| SYN | Purchase Order<br>PO<br>purchase -order<br>purchase -agreement |
| SYN | Calibration<br>calibrate<br>calibration |
| SYN | CMR<br>CMR |
| SYN | audit<br>audit<br>audited<br>audits |
| SYN | Annual Audit<br>annual -audit |
| SYN | Audit<br>-audit [N W I] -(Annual Audit) |
| SYN | OEM<br>oem<br>original equipment manufacturer |
| SYN | SPC<br>SPC<br>statistical process control |
| SYN | 29000<br>29000 |
| SYN | 3X0X0<br>3x0x0 |
| SYN | 680X0<br>680x0<br>68010<br>68000<br>68020<br>68030<br>68040<br>68xxx<br>680xx |
| SYN | 80960<br>80960 |
| SYN | 80X86<br>8086<br>8088<br>80x86<br>80186<br>80286<br>80386<br>80486 |
| SYN | 88000<br>88000 |
| SYN | NSC 320X0<br>nsc 32000<br>nsc 32010<br>nsc 32020<br>nsc 32030<br>nsc 32040<br>nsc 32050 |

```
           nsc 32060
           nsc 32070
           nsc 32080
           nsc 32090

SYN    R2/30X0
           r2 ^/ 30x0

SYN    SPARC
           SPARC
           scalable processor architecture

SYN    VLC86C010
           vlc86c010

SYN    Z80
           z80
           z8000

SYN    6502
           6502

SYN    AnyMicroproc
           =(29000)
           =(3X0X0)
           =(6502)
           =(680X0)
           =(80960)
           =(80X86)
           =(88000)
           =(NSC 320X0)
           =(R2/30X0)
           =(SPARC)
           =(VLC86C010)
           =(Z80)

SYN    C
           "C"
           c [2] language
           c programming
           wrote [2] c
           c [2] pascal
           pascal [2] c
           c [2] fortran
           fortran [2] c
           c [2] unix
           unix [2] c SYN    Pascal
           pascal SYN    UNIX
           unix
           xenix
           ultrix
           aix
           a ^/ ux
           hp ^/ ux
           Berkeley 4.2
           Berkeley 4.3
           4.2BSD
           4.3BSD
           System V
           System 5

SYN    Fortran
           fortran

SYN    Assembly Language
           =assembly [8] =(C)
```

```
          =assembly [12] =(Pascal)
          =assembly [12] =(Fortran)
          =assembly [8] =(UNIX)
          =(C) [8] =assembly
          =(Pascal) [12] =assembly
          =(Fortran) [12] =assembly
          =(UNIX) [8] =assembly
          =assembly language
          =AnyMicroproc =assembly SYN       Compiler
          =compiler [N W I] =(Cross Compiler) $
[N W I]   =(Compiler Driver)

SYN       MVS
          MVS
          multiple virtual storage

SYN       VMS
          vms

SYN       VM/CMS
          VM ^/ CMS

SYN       I/O
          i ^/ o
          io
          input [2] output

SYN       Root Cause Diagnost
          root cause diagnostics

SYN       Diagnostics
          diagnostics [N W I] =(Root Cause Diagnost)

SYN       Parametric Test
          parametric =tester

SYN       Debugging
          debug
          debugging

SYN       Documentation Req
          documentation requirements

SYN       Documentation
          documentation [N W I] =(Documentation Req)

SYN       Packaging
          packaging

SYN       CIM
          CIM
          computer integrated manufacturing

SYN       IC
          IC
          integrated =circuit

SYN       vlsi
          very [1] large [1] scale [1] integrated [1] =circuit
          vlsi SYN       Architecture
          architecture
          architectures SYN       Image Processing
          image processing
          imageprocessing
```

| | |
|---|---|
| SYN | Cluster Controller<br>cluster -controller |
| SYN | Bad Controller<br>disk Controller<br>cartridge Controller<br>tape Controller<br>esdi Controller<br>Controller [N W I] -(Micro Controller) $<br>[N W I] -(Embedded Controller) [N W I] -(Graphic Controller) $<br>[N W I] -(Cluster Controller) |
| SYN | Controller<br>Controller [N W I] -(Bad Controller) |
| SYN | DASD<br>DASD<br>direct access storage device |
| SYN | PGA<br>PGA<br>pin grid array |
| SYN | Bipolar<br>bipolar |
| SYN | Logic Analyzer<br>logic -analyzer |
| SYN | FAX<br>FAX<br>facsimile |
| SYN | payable<br>payable<br>payables |
| SYN | Accounts Payable<br>accounts -payable'<br>A ^/ P |
| SYN | receivable<br>receivable<br>receivables |
| SYN | Accounts Receivable<br>accounts -receivable<br>A ^/ R |
| SYN | Specifications<br>spec<br>specs<br>spec's<br>specification<br>specifications |
| SYN | PR<br>public [1] relations<br>pr |
| SYN | EEO<br>EEO<br>EEOC<br>equal [1] employment [1] opportunity |
| SYN | AA<br>affirmative action |
| SYN | resource<br>resource |

```
            resources
            relations

SYN     hr
        HR
        human -resource

SYN     HR Systems
        -hr -systems

SYN     HR
        -hr [N W I] -(HR Systems)

SYN     Schematic Capture
        schematic capture

SYN     Schematic
        schematic [N W I] -(Schematic Capture)

SYN     Letter of Credit
        letter of credit

SYN     Accounting Systems
        accounting -systems

SYN     Payroll Systems
        payroll -systems

SYN     Purchasing Systems
        purchasing [1] -systems

SYN     Financial Analysis
        financial -analysis

SYN     Financial Systems
        finance -systems
        financial -systems

SYN     Financial
        financial [N W I] -(Financial Analysis) $
  [N W I] -(Financial Analysis)
        financials SYN     Sales Tax
        sales -tax SYN     Stock Admin
        stock administration SYN     Admin Asssistant
        administrative asssistant SYN     Inventry Ctrl Clerk
        inventory control clerk SYN     Samples Clerk
        samples clerk SYN     Ship & Receiv Clerk
        shipping clerk
        receiving clerk SYN     Accts Payable Clerk
        -(Accounts Payable) clerk SYN     Accts Receiv Clerk
        -(Accounts Receivable) clerk SYN     Accounting Clerk
        accounting clerk
```

SYN     Clerk
        clerk [N W I] =(Inventry Ctrl Clerk) [N W I] =(Samples Clerk) $
  [N W I] =(Ship & Receiv Clerk) [N W I] =(Accts Payable Clerk) $
  [N W I] =(Accts Receiv Clerk) [N W I] =(Accounting Clerk)

SYN     Executive Secretary
        executive secretary

SYN     Office Assistant
        office assistant

SYN     Office Manager
        office manager
        office management

SYN     Personnel Assistant
        personnel assistant

SYN     Receptionist
        receptionist

SYN     Secretary
        secretary [N W I] =(Executive Secretary)

SYN     twx
        twx
        telex

SYN     Telex Operator
        =twx operator

SYN     Typist
        typist

SYN     analyst
        analyst
        analysts

; Titles
SYN     Attorney
        attorney

SYN     Contract Admin
        =contract =admin

SYN     System Admin
        =systems administration
        =systems administrator SYN     Reliability Eng
        reliability =engineer SYN     Test Engineering
        test =engineer SYN     Release Engineering
        release =engineer SYN     Hewlett Packard
        hewlett packard
        HP SYN     Field Applic Eng
        field application =engineer
        field applications =engineer
        FAE SYN     Field Sales Eng
        field sales =engineer
        FSE ; this file should contain all synonyms/classes used by two
; or more definition files.

```
SYN     graphics
        graphic
        graphics

SYN     standard
        standard
        standards

SYN     library
        library
        libraries

SYN     design
        design
        designed
        designing
        designer SYN     process
        process
        processor
        processors
        processing SYN     contract
        contract
        contracts SYN     negotiate
        negotiate
        negotiates
        negotiation
        negotiations SYN     develop
        develop
        developer
        developed
        developing
        development SYN     program
        program
        programs SYN     systems
        system
        systems SYN     test
        test
        tester
        testing SYN     &
        &
        and SYN     layout
        layout
        layouts SYN     compiler
        compilation
        compiler
```

| | | |
|---|---|---|
| SYN | terminal<br>terminal<br>terminals | |
| SYN | computer<br>computer<br>computers | |
| SYN | rule<br>rule<br>rules | |
| SYN | sales<br>sale<br>sales | |
| SYN | facility<br>facility<br>facilities | |
| SYN | document<br>document<br>documents | |
| SYN | analyze<br>analyze<br>analyzed<br>analysis<br>analyzing | |
| SYN | analysis<br>analysis<br>analyst | |
| SYN | plan<br>plan<br>plans<br>planned<br>planning | |
| SYN | negotiation<br>negotiation<br>negotiations | |
| SYN | product<br>product<br>products | |
| SYN | manage<br>manage<br>managed<br>managing<br>management<br>manager | |
| SYN | line<br>lines<br>line | |
| SYN | proposal<br>propose<br>proposing<br>proposal<br>proposed | |
| SYN | developer<br>developer<br>developers | |

| | | |
|---|---|---|
| SYN | communication<br>communication<br>communications | |
| SYN | package<br>package<br>packages | |
| SYN | junction<br>junction<br>junctions | |
| SYN | tester<br>tester | |
| SYN | analyzer<br>analyzer<br>analyzers | |
| SYN | language<br>language<br>languages | |
| SYN | driver<br>driver<br>drivers | |
| SYN | computing<br>computer<br>computing | |
| SYN | automatic<br>automatic<br>automated | |
| SYN | vector<br>vector<br>vectors | |
| SYN | procedure<br>procedure<br>procedures | |
| SYN | testing<br>test<br>tests<br>tested<br>testing<br>tester | |
| SYN | administer<br>adminster<br>adminstered<br>adminstrate<br>administration | |
| SYN | policy<br>policy<br>policies | |
| SYN | statement<br>statement<br>statements | |
| SYN | tool<br>tool<br>tools | |
| SYN | report<br>reports | |

| | | |
|---|---|---|
| SYN | code | |
| | code | |
| | codes | |
| SYN | memo | |
| | memo | |
| | memos | |
| SYN | environment | |
| | environment | |
| | environments | |
| SYN | control | |
| | control | |
| | controls | |
| SYN | regulation | |
| | regulation | |
| | regulations | |
| SYN | law | |
| | law | |
| | laws | |
| SYN | option | |
| | option | |
| | options | |
| SYN | agreement | |
| | agreement | |
| | agreements | |
| SYN | engineer | |
| | engineer | |
| | engineering | |
| SYN | fab | |
| | fab | |
| | fabrication | |
| SYN | mask | |
| | mask | |
| | masking | |
| | masks | |
| SYN | film | |
| | film | |
| | films | |
| SYN | circuit | |
| | circuit | |
| | circuits | |
| | circuitry | |
| SYN | vendor | |
| | vendor | |
| | vendors | |
| SYN | order | |
| | order | |
| | orders | |
| SYN | inspection | |
| | inspection | |
| | inspections | |
| SYN | admin | |
| | administration | |
| | administrative | |
| | administrator | |

```
SYN     signal
        signal
        signals

SYN     chip
        chip
        chips

SYN     place
        place
        placement

SYN     application
        application
        applications

SYN     mech
        mech
        mechanical

SYN     assembly
        assembly
        assembler

SYN     tax
        tax
        taxes

SYN     arbitration
        arbitrate
        arbitrator
        arbitration uses system.def
uses dates.def
uses degrees.def

SYN     DESIRED
        desired
        sought

SYN     OBJECTIVE_HEADER
        /BLOCK_MARK [2] OBJective!3
        /BLOCK_MARK [1] Goal
        /BLOCK_MARK position =DESIRED
        [N] /BLOCK_MARK [2] OBJective!3 :
        [N] /BLOCK_MARK [1] Goal :
        [N] /BLOCK_MARK position =DESIRED :

CLASS   EXPERIENCE_TYPE
        work
        job
        professional
        employment!4 [N] resume

SYN     POSS_EDU_HEADER

SYN     EDUCATION_HEADER
ACTION  FirstFit
        /BLOCK_MARK [2] EDUcation!2
        [N] /BLOCK_MARK [2] EDUcation!2 :
        /EOL EDUCATION SYN     EXPERIENCE
        EXPerience!2
        HIStory!2
        EMPloyment!2 [N] resume
```

```
SYN       FULL_EXP_HEADER
          /EXPERIENCE_TYPE [1] =EXPERIENCE [N C I] =EDUCATION_HEADER
          /EOL [1] EXPERIENCE
          /EOL [1] EMPLOYMENT
          /EOL [1] WORK HISTORY

SYN       EXPERIENCE_HEADER
          =FULL_EXP_HEADER
          /BLOCK_MARK [4] =EXPERIENCE [N C I] =EDUCATION_HEADER $
 [N C I]  =FULL_EXP_HEADER
          [N] /BLOCK_MARK [4] =EXPERIENCE : [N C I] =EDUCATION_HEADER $
 [N C I]  =FULL_EXP_HEADER

SYN       REFERENCE_HEADER
          /BLOCK_MARK References!2

SYN       SUMMARY_HEADER
          /BLOCK_MARK Summary
          /BLOCK_MARK Strengths
          /BLOCK_MARK CAPAbilities!3
          /BLOCK_MARK ACCOMplishments!4

SYN       AFFILIATIONS_HEADER
          /BLOCK_MARK Professional [N 1] =EXPERIENCE [N 1] record
          /BLOCK_MARK Affiliations
          /BLOCK_MARK Memberships SYN       PERSONAL_HEADER
          /BLOCK_MARK personal SYN       HONORS_HEADER
          /BLOCK_MARK Honor
          /BLOCK_MARK Honors
          /BLOCK_MARK Papers
          /BLOCK_MARK Publications
          /BLOCK_MARK Patent
          /BLOCK_MARK Awards CLASS     useless_header
          Miscellaneous
          Activities
          Languages
          Hobbies
          Certification
          Certifications
          Other
          Special
          Additional Information
          Areas [1] Expertise
          Operating Systems
          Coursework
          Courses
          Clearances
          Qualifications
          Interests
          Curriculum
          Strengths
          License
          Background
          Additional [N] experience SYN       OTHER_HEADER
          /BLOCK_MARK [1] /useless_header SYN       skills
          Skills
          Skill SYN       SKILLS_HEADER
          /BLOCK_MARK [3] =skills
```

```
SYN     GOOD_HEADER
            =REFERENCE_HEADER
            =SUMMARY_HEADER
            =AFFILIATIONS_HEADER
            =EDUCATION_HEADER
            =OBJECTIVE_HEADER
            =EXPERIENCE_HEADER
            =PERSONAL_HEADER
            =OTHER_HEADER
            =HONORS_HEADER
            =SKILLS_HEADER

SYN     NONED_HEADER
            =GOOD_HEADER [N W I] =EDUCATION_HEADER $
    [N C I] =EDUCATION_HEADER

SYN     NONEXP_HEADER
            =GOOD_HEADER [N W I] =EXPERIENCE_HEADER $
    [N C I] =EXPERIENCE_HEADER

SYN     TENTH_LINE
            [I] /BOD [B F I] /EOL [B F I] /EOL [B F I] /EOL [B F I] /EOL $
    [B F I] /EOL [B F I] /EOL [B F I] /EOL [B F I] /EOL [B F I] /EOL $
    [B F I] /EOL [B F I] /EOL [B F I] /EOL [B F I] /EOL [B F] /EOL

SYN     FIRST_TEN_LINES
            /BOD [B F] /EOL [B F] /EOL [B F] /EOL [B F] /EOL [B F] /EOL $
    [B F] /EOL [B F] /EOL [B F] /EOL [B F] /EOL [B F] /EOL [B F] /EOL $
    [B F] /EOL [B F] /EOL [B F] /EOL

SYN     FIRST_TWO_EOLS
            /BOD [B F] /EOL [B F] /EOL

SYN     END_HEADER
            references [B I] =TENTH_LINE
            summary [B I] =TENTH_LINE
            strengths [B I] =TENTH_LINE
            capabilities [B I] =TENTH_LINE
            accomplishments [B I] =TENTH_LINE
            professional [B I] =TENTH_LINE
            affiliations [B I] =TENTH_LINE
            memberships [B I] =TENTH_LINE
            experience [B I] =TENTH_LINE
            history [B I] =TENTH_LINE
            employment [B I] =TENTH_LINE
            education [B I] =TENTH_LINE
            objective [B I] =TENTH_LINE
            goal [B I] =TENTH_LINE
            position [B I] =TENTH_LINE
            honor [B I] =TENTH_LINE
            honors [B I] =TENTH_LINE
            papers [B I] =TENTH_LINE
            patents [B I] =TENTH_LINE
            publications [B I] =TENTH_LINE
            awards [B I] =TENTH_LINE
            useless_header [B I] =TENTH_LINE
            /DATE_RANGE [B I] =TENTH_LINE
            =TENTH_LINE SYN     UNK_HEADER
            /BLOCK_MARK [N 1] /DATE $
    [N W I] =GOOD_HEADER [N W I] =FIRST_TWO_EOLS

SYN     UNKNOWN_HEADER
            =UNK_HEADER [N C I] =GOOD_HEADER

SYN     ANY_HEADER
            =GOOD_HEADER
            =UNKNOWN_HEADER
```

```
SYN       BLOCK
          =ANY_HEADER [B F] =ANY_HEADER

SYN       OTHER_BLOCK
          =UNKNOWN_HEADER [B F] =GOOD_HEADER
          =UNKNOWN_HEADER [B] /EOD [N C I] =GOOD_HEADER

SYN       FIRST_DATE_HEADER
ACTION    FirstOccurrence
          /BLOCK_MARK /DATE [N W I] =GOOD_HEADER [N W I] =FIRST_TWO_EOLS SYN       POSS_EXP_SECT
          /EOL [1] EXPERIENCE!2 [* B F I] =NONEXP_HEADER
          /EOL [1] EXPERIENCE!2 [B] /EOD SYN       EXPERIENCE_SECTION
ACTION    FirstFit
          =EXPERIENCE_HEADER [B F] =NONEXP_HEADER [C I] /DATE
          =EXPERIENCE_HEADER [B] /EOD [N C I] =NONEXP_HEADER [C I] /DATE
          =POSS_EXP_SECT [N C I] =NONEXP_HEADER [C I] /DATE
          =OTHER_BLOCK [N C I] =FIRST_TWO_EOLS [C I] /DATE_RANGE
          =OTHER_BLOCK [N C I] =FIRST_TWO_EOLS [C I] /DATE
          =FIRST_DATE_HEADER [B F] =GOOD_HEADER
          =FIRST_DATE_HEADER [B] /EOD [N C I] =GOOD_HEADER
          [I] /BOD [B F] /EOL [B F] =GOOD_HEADER
          [I] /BOD [B F] /EOL [B] /EOD [N C I] =GOOD_HEADER SYN       FinalExp
          =EXPERIENCE_SECTION

SYN       SKILLS_SECTION
          =SKILLS_HEADER [B F] =ANY_HEADER

SYN       PERSONAL_SECTION
          =PERSONAL_HEADER [B F] =ANY_HEADER

SYN       FIRST_THREE_LINES
          /BOD [B F] /EOL [B F] /EOL [B F] /EOL

SYN       FIRST_LINE
          /BOD [B F] /EOL

SYN       FIRST_TWO_LINES
          /BOD [B F] /EOL [B F] /EOL

SYN       PossEdSection
ACTION    FirstOccurrence
          =EDUCATION_HEADER [B F] =NONED_HEADER [C I] /Degree
          =EDUCATION_HEADER [B] /EOD [N C I] =NONED_HEADER $
   [C I]  /Degree
          =EDUCATION_HEADER [B F] /EOL [B F] /EOL $
   [B F]  /EOL [B F] /EOL [B F] /EOL [B F] /EOL $
   [B F]  /EOL [B F] /EOL [B F] /EOL [B F] /EOL $
   [B F]  /EOL [B F] /EOL [B F] /EOL [B F] /EOL $
   [B F]  /EOL [B F] /EOL [B F] /EOL [B F] /EOL $
   [C I]  /Degree SYN       PossEdSection2
ACTION    FirstOccurrence
          /EOL [1] EDUcation!2 [B F I] =NONED_HEADER [N C I] =NONED_HEADER [C I] /Deg
          /EOL [1] EDUcation!2 [B] /EOD [N C I] =NONED_HEADER [C I] /Degree
          /EOL [1] EDUcation!2 [B F] /EOL [B F] /EOL $
   [B F]  /EOL [B F] /EOL [B F] /EOL [B F] /EOL $
   [B F]  /EOL [B F] /EOL [B F] /EOL [B F] /EOL $
   [B F]  /EOL [B F] /EOL [B F] /EOL [B F] /EOL $
   [B F]  /EOL [B F] /EOL [B F] /EOL [B F] /EOL $
   [C I]  /Degree SYN       FirstDegree
ACTION    FirstOccurrence
          /Degree [W] =LINE
```

```
SYN     EDUCATION_SECTION
ACTION  FirstFit
        =PossEdSection
        =PossEdSection2
        =FirstDegree [B F] =NONED_HEADER
        =FirstDegree [B] /EOD [N C I] =NONED_HEADER SYN     FinalEdSectTest
        =EDUCATION_SECTION SYN     OBJECTIVE_SECTION
ACTION  FirstOccurrence
        =OBJECTIVE_HEADER [B F] /BLOCK_MARK
        =OBJECTIVE_HEADER [B F] /EOL [B F] /EOL [B F] /EOL $
   [B F] /EOL [B F] /EOL [B F] /EOL uses system.def
SYN     DATE_SEPARATOR
        -
        ^/

SYN     Jan
        january
        jan [O] .
        1 =DATE_SEPARATOR
        01 =DATE_SEPARATOR SYN     Feb
        february
        feb [O] .
        2 =DATE_SEPARATOR
        02 =DATE_SEPARATOR SYN     Mar
        march
        mar [O] .
        3 =DATE_SEPARATOR
        03 =DATE_SEPARATOR SYN     Apr
        april
        apr [O] .
        4 =DATE_SEPARATOR
        04 =DATE_SEPARATOR SYN     May
        may
        5 =DATE_SEPARATOR
        05 =DATE_SEPARATOR SYN     Jun
        june
        jun [O] .
        6 =DATE_SEPARATOR
        06 =DATE_SEPARATOR SYN     Jul
        july
        jul [O] .
        7 =DATE_SEPARATOR
        07 =DATE_SEPARATOR SYN     Aug
        august
        aug [O] .
        8 =DATE_SEPARATOR
        08 =DATE_SEPARATOR SYN     Sep
        september
        sept [O] .
        sep [O] .
```

```
          9 =DATE_SEPARATOR
          09 =DATE_SEPARATOR

SYN       Oct
          october
          oct [O] .
          10 =DATE_SEPARATOR SYN       Nov
          november
          nov [O] .
          11 =DATE_SEPARATOR SYN       Dec
          december
          dec [O] .
          12 =DATE_SEPARATOR CLASS     MONTH
          =Jan
          =Feb
          =Mar
          =Apr
          =May
          =Jun
          =Jul
          =Aug
          =Sep
          =Oct
          =Nov
          =Dec CLASS     DAY
ACTION    Days
          /NUMBER1A
          /NUMBER2A CLASS     YEAR
ACTION    Years
          /NUMBER4A
          /NUMBER2A [N 0 I] %

CLASS     MONTH_DAY_YEAR
          /MONTH [1] /DAY [1] /YEAR

CLASS     MONTH_YEAR
          /MONTH [1 I] /DAY [1] /YEAR
          /MONTH [1] /YEAR [N W I] /MONTH_DAY_YEAR

SYN       Present
          present
          ·date
          current

SYN       Summer
          summer

SYN       Fall
          fall
          autumn

SYN       Spring
          spring

SYN       Winter
          winter

CLASS     SEASON_YEAR
          =Summer [1] /YEAR
```

```
              =Fall [1] /YEAR
              =Winter [1] /YEAR
              =Spring [1] /YEAR

CLASS     JUST_YEAR
              /YEAR [N W I] /MONTH_YEAR [N W I] /SEASON_YEAR

CLASS     DATE
              /MONTH_YEAR
              /SEASON_YEAR
              /JUST_YEAR

SYN       to
              [0] /EOL [0] until [0 0] /EOL
              [0] /EOL [0] to [0 0] /EOL
              [0] /EOL [0] - [0 0] /EOL [N W I] /DATE CLASS     DATE_RANGE
              /DATE =to [2 F] /DATE [N C I] < [N C I] >
              /DATE =to [2 F] =Present
              /MONTH [0] =to [2 F] /DATE SYN       AA
              AA
              A [0] . [0] A
              associate [1] arts SYN       AS
              AS
              A [0] . [0] s
              associate [1] science SYN       MBA
              Mba
              m [0] . [0] b [0] . [0] a SYN       MPA
              MPA
              masters [2] public administration SYN       bachelor
              bachelor!2
              baccalaureate!3

SYN       BA
              BA
              b [0] . [0] a [N W I] =MBA
              =bachelor [N 2] science SYN       tech
              tech
              technology SYN       BS
              Bs
              Bse
              BSc
              b [0] . [0] s
              b . =tech
              b [0] . [0] sc
              [N] . s [0] . [0] b
              =bachelor [2] science
              BSEET
              BSEE
              BSCS
              BSME CLASS     MASS_CITY
              boston [2] MA
              cambridge [2] MA
```

```
SYN        M.Eng.
ACTION     FirstFit
           M . Eng
           M [0] . Engineering
           master [1] of [1] engineering SYN        thesis
           thesis
           dissertation SYN        MS
           NLs
           ms
           m [0] . [0] s
           m [0] . [0] sc
           [N] . s [0] . [0] m
           master [2] science
           MSEE
           MSCS SYN        MA
           ma [N W I] /MASS_CITY
           m [0] . [0] a
           master of arts
           masters
           master [N 2] science
           =M.Eng.
           =MPA

SYN        BE
           [N 0] . B [0] . [0] E [0] .
           BE

SYN        BSL
           BSL

CLASS      Bachelors
           =BA
           =BS
           =BE
           =BSL SYN        Bachelors
           =BA
           =BS
           =BE
           =BSL CLASS      Masters
           =MA [N 1] =thesis
           =MBA
           =MS [N 1] =thesis SYN        Masters
           =MA [N 1] =thesis
           =MBA
           =MS [N 1] =thesis SYN        Associates
           =AA
           =AS CLASS      Associates
           =AA
           =AS SYN        Certificate
           certificate
```

```
SYN     Doctorate
        Ph [1] d
        Phd
        doctorate

SYN     Phd
        =Doctorate [N 1] =thesis

SYN     High School
        [N] junior High School
        H.S

CLASS   Degree
        =(High School)
        =Certificate
        /Associates
        /Bachelors
        /Masters
        =Phd CLASS   MMI_Degrees
        =(High School)
        =Associates
        =Bachelors
        =Certificate
        =Masters
        =Phd

SYN     LINE
        /BOD [B F] /EOL
        /EOL [B F] /EOL

SYN     STOPPER
        /EOL
        |
        \
        /EOD
        /BOD

CLASS   BLOCK_MARK
        \
        |
        /EOD
        /BOD

SYN     DelimitSentence
        /BLOCK_MARK
        .
        /EOD

; This definition of sentence will fail if abbreviations are used
SYN     SENTENCE
        =DelimitSentence [B F] =DelimitSentence SYN     0
        o SYN     1
        i
        l SYN     2
        z

SYN     4
        A

SYN     5
        s
```

| | | |
|---|---|---|
| SYN | 8 | |
| | R | |
| SYN | 00 | |
| | oo | |
| SYN | 01 | |
| | oi | |
| | ol | |
| SYN | 02 | |
| | oz | |
| SYN | 05 | |
| | os | |
| SYN | 10 | |
| | io | |
| | lo | |
| SYN | 11 | |
| | ii | |
| | il | |
| | li | |
| | ll | |
| SYN | 12 | |
| | iz | |
| | lz | |
| SYN | 15 | |
| | ls | |
| SYN | 20 | |
| | zo | |
| SYN | 21 | |
| | zi | |
| | zl | |
| SYN | 22 | |
| | zz | |
| SYN | 25 | |
| | zs | |
| SYN | 50 | |
| | so | |
| SYN | 51 | |
| | sl | |
| | si | |
| SYN | 52 | |
| | sz | |
| SYN | 55 | |
| | ss | |
| CLASS | NUMBER1A | |
| | /NUMBER1 | |
| | =0 | |
| | =1 | |
| | =2 | |
| | =4 | |
| | =5 | |
| | =8 | |

```
CLASS    NUMBER2A
         /NUMBER2
         /NUMBER1A  [M]  /NUMBER1A
           -00
           -01
           -02
           -05
           -10
           -11
           -12
           -15
           -20
           -21
           -22
           -25
           -50
           -51
           -52
           -55

CLASS    NUMBER3A
         /NUMBER3
         /NUMBER2A  [M]  /NUMBER1A
         /NUMBER1A  [M]  /NUMBER2A

CLASS    NUMBER4A
         /NUMBER4
         /NUMBER3A  [M]  /NUMBER1A
         /NUMBER1A  [M]  /NUMBER3A
         /NUMBER2A  [M]  /NUMBER2A

CLASS    NUMBER5A
         /NUMBER5
         /NUMBER4A  [M]  /NUMBER1A
         /NUMBER1A  [M]  /NUMBER4A
         /NUMBER2A  [M]  /NUMBER3A
         /NUMBER3A  [M]  /NUMBER2A
```

We claim:

1. An apparatus for analyzing a text document on a computer having a memory, said text document comprising one or more blocks of contiguous text, said blocks of contiguous text having one or more boundaries, said apparatus comprising:

digital imaging means for scanning the text document and for converting the text document into a matrix of picture elements representing a digital image of the text document;

spatial analysis means coupled to the digital imaging means for scanning the matrix of picture elements in two dimensions to identify horizontal and vertical boundaries of the blocks of contiguous text in the digital image;

character recognition means coupled to the spatial analysis means for converting the blocks of contiguous text into a text file, said text file comprising word patterns and block identifiers;

a grammar stored in said memory comprising predetermined word patterns and block identifiers;

extractor means coupled to the memory and character recognition means for matching the word patterns and block identifiers contained in the grammar with the word patterns and block identifiers in the text file; and formatting means coupled to the extractor means for generating output in a predefined pattern using the matched word patterns and block identifiers.

2. The apparatus of claim 1, wherein each picture element is represented by a binary value, the spatial analysis means further comprising:

vertical boundary detection means for determining blocks of text which are vertically separated from one or more other blocks of text by summing a portion of pixel values in one or more rows of the matrix and identifying rows having sums above a first predetermined threshold; and horizontal boundary detection means for determining blocks of text which are horizontally separated from one or more other blocks of text by summing a portion of pixel values in one or more columnar strips of the matrix, wherein a columnar strip has a width of a predetermined number of matrix columns, wherein the horizontal boundary detection means identifies columnar strips having sums above a second predetermined threshold.

3. The apparatus of claim 1, wherein the block identifiers indicate whether the block is a header block or a text block.

4. A method executing on a computer to analyze a text document comprising one or more blocks of contiguous text, said blocks of contiguous text having one or more boundaries, the method comprising the steps of:

making a digital image of the printed document, said digital image comprising a matrix of picture elements;

scanning the digital image in two dimensions to identify horizontal and vertical boundaries of the blocks of contiguous text in the digital image;

converting the blocks of contiguous text into a text file, the text file comprising word patterns and block identifiers;

storing a grammar in the computer, said grammar comprising predetermined word patterns and block identifiers;

matching the word patterns and block identifiers from the text file with the word patterns and block identifiers in the computer data base; and generating output in a predefined format using the matched word patterns and block identifiers.

5. The method of claim 4 wherein the output is generated as printed output.

6. The method of claim 4 wherein the output is generated as computer storable digital data.

7. The method of claim 4 wherein the block identifiers indicate whether the block is a header block or text block.

8. The method of claim 4 wherein the step of converting the blocks comprises the steps of passing the digital image of the blocks through an optical character reader.

9. The method of claim 4 wherein the step of storing the computer data base further comprises:

determining information to be obtained from the document;

choosing individual words, word groups and alphanumeric groups which embody the information; and organizing the word, word groups and alphanumeric groups so that they are in grammatical relationship to one another.

10. The method of claim 4 wherein the step of generating output comprises filling in predefined templates using the words, word groups and alphanumeric groups extracted from the document.

11. The method of claim 4 wherein each picture element is represented by a binary value, the step of scanning the digital image further comprising the steps of:
summing a portion of pixel values in one or more rows of the matrix and identifying rows having sums above a first predetermined threshold; and
summing a portion of pixel values in one or more columnar strips of the matrix, wherein a columnar strip has a width of a predetermined number of matrix columns, and identifying columnar strips having sums above a second predetermined threshold.

12. The method of claim 4, wherein the step of scanning the digital image in two dimensions to identify horizontal and vertical boundaries of the blocks of contiguous text is performed both before and after the step of converting the blocks into a text file.

* * * * *

UNITED STATES PATENT AND TRADEMARK OFFICE
CERTIFICATE OF CORRECTION

PATENT NO. : 5,164,899  
DATED : November 17, 1992  
INVENTOR(S) : David Sobotka, et al.

Page 1 of 2

It is certified that error appears in the above-indentified patent and that said Letters Patent is hereby corrected as shown below:

Column 1, line 54 of the patent, "Obviously" should be capitalized;

Column 2, line 1 of the patent "form" should be --forms--;

Column 3, line 37 of the patent, delete "/";

Column 9, line 13, of the patent "` ´" should be --`\´--

Column 9, line 37, of the patent "` ´" should be --`\´--

Column 9, line 67, of the patent "` ´" should be --`\´--

Column 10, line 31 of the patent "impotant" should be --important--;

UNITED STATES PATENT AND TRADEMARK OFFICE
CERTIFICATE OF CORRECTION

PATENT NO. : 5,164,899
DATED : November 17, 1992
INVENTOR(S) : David Sobotka, et al.

It is certified that error appears in the above-indentified patent and that said Letters Patent is hereby corrected as shown below:

Column 13, line 29 of the patent, "store" should be --stored--;

Column 410, line 54 of the patent "steps" should be --step--;

Column 411, line 8 of the patent, "wherein" should be --where--.

Signed and Sealed this

Twenty-fourth Day of December, 1996

Attest:

BRUCE LEHMAN

*Attesting Officer*     *Commissioner of Patents and Trademarks*